US011119635B2

(12) United States Patent
Ubillos et al.

(10) Patent No.: US 11,119,635 B2
(45) Date of Patent: Sep. 14, 2021

(54) FANNING USER INTERFACE CONTROLS FOR A MEDIA EDITING APPLICATION

(71) Applicant: Apple Inc., Cupertino, CA (US)

(72) Inventors: Randy Ubillos, Los Altos, CA (US); Samuel M. Roberts, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/683,104

(22) Filed: Nov. 13, 2019

(65) Prior Publication Data

US 2020/0081587 A1 Mar. 12, 2020

Related U.S. Application Data

(63) Continuation of application No. 14/885,933, filed on Oct. 16, 2015, now Pat. No. 10,545,631, which is a continuation of application No. 13/629,436, filed on Sep. 27, 2012, now Pat. No. 9,189,876.

(60) Provisional application No. 61/607,525, filed on Mar. 6, 2012, provisional application No. 61/607,540, filed on Mar. 6, 2012, provisional application No.
(Continued)

(51) Int. Cl.
*G06F 3/00* (2006.01)
*G06F 3/0482* (2013.01)
*G06T 11/60* (2006.01)
*G06F 3/0484* (2013.01)
*H04W 8/00* (2009.01)

(52) U.S. Cl.
CPC ........ *G06F 3/0482* (2013.01); *G06F 3/04845* (2013.01); *G06F 3/04847* (2013.01); *G06T 11/60* (2013.01); *H04W 8/00* (2013.01)

(58) Field of Classification Search
CPC .............. G06F 3/0482; G06F 3/04845; G06F 3/04847; G06T 11/60; H04W 8/00
See application file for complete search history.

(56) References Cited

U.S. PATENT DOCUMENTS 5,287,448 A 2/1994 Nicol et al.
5,491,782 A 2/1996 King et al.
(Continued)

FOREIGN PATENT DOCUMENTS

CN 1099885 A 3/1995
CN 1710521 A 12/2005
(Continued)

OTHER PUBLICATIONS

"Photoshop Blend Modes Explained" Thomas, Robert. Jun. 7, 2011. 22 pages. Accessed via the web on Mar. 7, 2017 at http://web.archive.Org/web/20110607041239/http://photoblogstop.com/photoshop/photoshop-blend-modes-explained.
(Continued)

*Primary Examiner* — Kieu D Vu
*Assistant Examiner* — Andrew Chung
(74) *Attorney, Agent, or Firm* — Invoke

(57) ABSTRACT

Some embodiments provide a method of presenting several user interface (UI) controls for editing images. Upon receiving a selection of an image to edit, the method displays the image in a display area for displaying edits to the image. At a first location, the method receives input to activate a UI tool includes the several UI tools. In response to the input, the method displays, at a second location, a fanning animation that fans the several UI controls from a fanned closed layout to a fanned open layout.

20 Claims, 51 Drawing Sheets

Related U.S. Application Data

61/607,569, filed on Mar. 6, 2012, provisional application No. 61/607,574, filed on Mar. 6, 2012, provisional application No. 61/607,580, filed on Mar. 3, 2012, provisional application No. 61/607,524, filed on Mar. 6, 2012, provisional application No. 61/607,554, filed on Mar. 6, 2012.

(56) References Cited

U.S. PATENT DOCUMENTS

| | | |
|---|---|---|
| 5,517,335 A | 5/1996 | Shu |
| 5,615,347 A | 3/1997 | Davis et al. |
| 5,774,112 A | 6/1998 | Kasson |
| 5,808,610 A | 9/1998 | Benson et al. |
| 5,908,997 A | 6/1999 | Arnold et al. |
| 5,915,250 A | 6/1999 | Jain et al. |
| 5,977,972 A | 11/1999 | Bates et al. |
| 5,995,101 A | 11/1999 | Clark et al. |
| 5,999,190 A | 12/1999 | Sheasby et al. |
| 6,035,323 A | 3/2000 | Narayen et al. |
| 6,058,428 A | 5/2000 | Wang et al. |
| 6,115,717 A | 9/2000 | Mehrotra et al. |
| 6,118,385 A | 9/2000 | Leard et al. |
| 6,201,539 B1 | 3/2001 | Miller et al. |
| 6,238,217 B1 | 5/2001 | Mirando et al. |
| 6,262,817 B1 | 7/2001 | Sato et al. |
| 6,281,872 B1 | 8/2001 | Cariffe |
| 6,348,936 B1 | 2/2002 | Berteig |
| 6,351,557 B1 | 2/2002 | Gonsalves |
| 6,373,979 B1 | 4/2002 | Wang |
| 6,400,375 B1 | 6/2002 | Okudaira |
| 6,438,264 B1 | 8/2002 | Gallagher et al. |
| 6,463,432 B1 | 10/2002 | Murakawa |
| 6,542,171 B1 | 4/2003 | Satou et al. |
| 6,567,983 B1 | 5/2003 | Shiimori |
| 6,636,648 B2 | 10/2003 | Loui et al. |
| 6,680,749 B1 | 1/2004 | Anderson et al. |
| 6,686,953 B1 | 2/2004 | Holmes |
| 6,758,403 B1 | 7/2004 | Keys et al. |
| 6,778,186 B2 | 8/2004 | Mehigan |
| 6,842,541 B2 | 1/2005 | Curry |
| 6,850,259 B1 | 2/2005 | Rzepkowski et al. |
| 6,883,143 B2 | 4/2005 | Driskell |
| 6,922,816 B1 | 7/2005 | Amin et al. |
| 7,012,621 B2 | 3/2006 | Crosby et al. |
| 7,034,881 B1 | 4/2006 | Hyodo et al. |
| 7,079,707 B2 | 7/2006 | Baron |
| 7,092,122 B2 | 8/2006 | Iwaki |
| 7,095,434 B1 | 8/2006 | Ikeda |
| 7,148,990 B2 | 12/2006 | Atkins et al. |
| 7,184,056 B2 | 2/2007 | Brody et al. |
| 7,188,310 B2 | 3/2007 | Schwartzkopf |
| 7,227,990 B2 | 6/2007 | Hirao |
| 7,242,409 B2 | 7/2007 | Cain |
| 7,292,370 B2 | 11/2007 | Iwaki |
| 7,302,650 B1 | 11/2007 | Allyn et al. |
| 7,304,753 B1 * | 12/2007 | Richter ............... G06F 3/1204 358/1.14 |
| 7,366,307 B2 | 4/2008 | Yanz et al. |
| 7,382,915 B2 | 6/2008 | Bala et al. |
| 7,408,673 B1 | 8/2008 | Chinn et al. |
| 7,467,222 B2 | 12/2008 | Kacker |
| 7,479,949 B2 | 1/2009 | Jobs et al. |
| 7,489,305 B2 | 2/2009 | Salisbury et al. |
| 7,502,033 B1 | 3/2009 | Axelrod |
| 7,546,532 B1 | 6/2009 | Nichols et al. |
| 7,558,835 B1 | 7/2009 | Shafer |
| 7,559,034 B1 | 7/2009 | Paperny et al. |
| 7,562,310 B2 | 7/2009 | Champion et al. |
| 7,576,752 B1 | 8/2009 | Benson et al. |
| 7,598,964 B2 | 10/2009 | Olson |
| 7,602,991 B2 | 10/2009 | Kokemohr |
| 7,623,722 B2 * | 11/2009 | Prentice ............. G06F 3/04845 345/594 |
| 7,636,108 B2 | 12/2009 | Suzuki et al. |
| 7,636,485 B2 | 12/2009 | Simon et al. |
| 7,656,847 B2 | 2/2010 | Mela et al. |
| 7,660,510 B2 | 2/2010 | Kawahara et al. |
| 7,675,648 B2 | 3/2010 | Ernst et al. |
| 7,689,933 B1 | 3/2010 | Parsons |
| 7,693,679 B1 | 4/2010 | Warnke et al. |
| 7,702,149 B2 | 4/2010 | Ohkubo et al. |
| 7,702,728 B2 | 4/2010 | Zaner et al. |
| 7,705,860 B2 | 4/2010 | Sloo et al. |
| 7,706,606 B1 | 4/2010 | Ruzon et al. |
| 7,750,947 B2 | 7/2010 | Ahn |
| 7,765,491 B1 | 7/2010 | Cotterill |
| 7,768,535 B2 | 8/2010 | Reid et al. |
| 7,770,148 B2 | 8/2010 | Stallo et al. |
| 7,783,983 B1 | 8/2010 | Mayers et al. |
| 7,849,116 B2 | 12/2010 | Jacobs et al. |
| 7,853,094 B2 | 12/2010 | Pan et al. |
| 7,864,347 B2 | 1/2011 | Moran et al. |
| 7,870,412 B2 | 1/2011 | Maes |
| 7,873,710 B2 | 1/2011 | Kiley et al. |
| 7,898,529 B2 | 3/2011 | Fitzmaurice et al. |
| 7,903,904 B1 | 3/2011 | Loeb et al. |
| 7,907,152 B2 | 3/2011 | Sloo et al. |
| 7,907,776 B2 | 3/2011 | Ubillos |
| 7,920,739 B2 | 4/2011 | Chien et al. |
| 7,921,370 B1 | 4/2011 | Legault |
| 7,932,909 B2 | 4/2011 | Niles et al. |
| 7,954,067 B2 | 5/2011 | Breglio |
| 7,974,486 B2 | 7/2011 | Seely |
| 7,978,938 B1 | 7/2011 | Wilensky |
| 8,001,470 B1 | 8/2011 | Chen et al. |
| 8,023,164 B2 | 9/2011 | Ogawa |
| 8,024,658 B1 | 9/2011 | Fagans et al. |
| 8,031,365 B2 | 10/2011 | Oka |
| 8,055,067 B2 | 11/2011 | Petrescu et al. |
| 8,081,221 B2 | 12/2011 | Chou et al. |
| 8,098,964 B2 | 1/2012 | Kasperkiewicz et al. |
| 8,117,542 B2 | 2/2012 | Radtke et al. |
| 8,139,080 B2 | 3/2012 | Relyea et al. |
| 8,144,234 B2 | 3/2012 | Morita |
| 8,146,016 B2 | 3/2012 | Himberger et al. |
| 8,155,465 B2 | 4/2012 | Cho et al. |
| 8,159,506 B2 | 4/2012 | Yano et al. |
| 8,214,766 B1 * | 7/2012 | Berger ............... G06F 3/04847 715/838 |
| 8,261,205 B2 * | 9/2012 | Lee ................... G06F 3/04817 715/784 |
| 8,261,212 B2 | 9/2012 | Wigdor et al. |
| 8,341,542 B2 | 12/2012 | Brody et al. |
| 8,355,566 B2 | 1/2013 | Ng |
| 8,380,005 B1 | 2/2013 | Jonsson |
| 8,441,499 B2 | 5/2013 | Heynen et al. |
| 8,464,173 B2 | 6/2013 | Victor |
| 8,468,465 B2 | 6/2013 | Warner et al. |
| 8,526,719 B2 | 9/2013 | Lee et al. |
| 8,564,618 B2 | 10/2013 | Ryu et al. |
| 8,594,419 B2 | 11/2013 | Majewicz et al. |
| 8,660,345 B1 | 2/2014 | Fang et al. |
| 8,661,418 B2 | 2/2014 | Saji et al. |
| 8,666,223 B2 * | 3/2014 | Momosaki ........... G11B 27/034 386/239 |
| 8,686,962 B2 | 4/2014 | Christie |
| 8,713,479 B2 | 4/2014 | Mikawa et al. |
| 8,731,322 B2 | 5/2014 | Lee |
| 8,732,187 B1 | 5/2014 | Jing et al. |
| 8,744,231 B2 * | 6/2014 | Lee ..................... A61B 1/041 386/224 |
| 8,793,619 B2 | 7/2014 | Roe et al. |
| 8,806,331 B2 | 8/2014 | Grosz et al. |
| 8,810,535 B2 | 8/2014 | Moosavi |
| 8,970,629 B2 | 3/2015 | Kim et al. |
| 9,009,612 B2 | 4/2015 | Fleizach et al. |
| 9,202,433 B2 | 12/2015 | Webb |
| 9,523,772 B2 | 12/2016 | Rogan et al. |
| 2001/0028738 A1 | 10/2001 | Pettigrew et al. |
| 2001/0036310 A1 | 11/2001 | Pettigrew et al. |
| 2002/0033850 A1 | 3/2002 | Bates et al. |
| 2002/0040375 A1 | 4/2002 | Simon et al. |
| 2002/0097914 A1 | 7/2002 | Yaung |

(56) References Cited

U.S. PATENT DOCUMENTS

| | | | |
|---|---|---|---|
| 2002/0109728 A1* | 8/2002 | Tiongson | G06F 3/04855 715/786 |
| 2003/0012437 A1 | 1/2003 | Zaklika et al. | |
| 2003/0021488 A1 | 1/2003 | Shaw et al. | |
| 2003/0025835 A1 | 2/2003 | Segman | |
| 2003/0038832 A1 | 2/2003 | Sobol | |
| 2003/0103057 A1 | 6/2003 | Graves et al. | |
| 2003/0103234 A1 | 6/2003 | Takabayashi et al. | |
| 2003/0125776 A1 | 7/2003 | Turney et al. | |
| 2003/0151611 A1 | 8/2003 | Turpin et al. | |
| 2003/0169286 A1* | 9/2003 | Misawa | G09G 5/00 715/716 |
| 2004/0165012 A1 | 8/2004 | Nelson et al. | |
| 2004/0192365 A1 | 9/2004 | Dalton et al. | |
| 2004/0201752 A1 | 10/2004 | Parulski et al. | |
| 2004/0205286 A1 | 10/2004 | Bryant et al. | |
| 2004/0208475 A1 | 10/2004 | Ohmura et al. | |
| 2004/0212605 A1 | 10/2004 | Fitzmaurice et al. | |
| 2004/0223004 A1 | 11/2004 | Lincke et al. | |
| 2004/0225961 A1 | 11/2004 | Ohashi et al. | |
| 2005/0010258 A1 | 1/2005 | Peterson et al. | |
| 2005/0034083 A1 | 2/2005 | Jaeger | |
| 2005/0047681 A1* | 3/2005 | Hori | G06F 16/78 382/305 |
| 2005/0094014 A1 | 5/2005 | Haas et al. | |
| 2005/0204305 A1 | 9/2005 | Keely et al. | |
| 2005/0212824 A1 | 9/2005 | Marcinkiewicz et al. | |
| 2005/0262451 A1 | 11/2005 | Remignanti et al. | |
| 2005/0268234 A1 | 12/2005 | Rossi et al. | |
| 2005/0276573 A1 | 12/2005 | Abbate | |
| 2005/0281482 A1 | 12/2005 | Nishiyama | |
| 2005/0289478 A1 | 12/2005 | Landman et al. | |
| 2006/0004914 A1 | 1/2006 | Kelly et al. | |
| 2006/0022953 A1 | 2/2006 | Franttila | |
| 2006/0028483 A1 | 2/2006 | Kondo et al. | |
| 2006/0036959 A1 | 2/2006 | Heatherly et al. | |
| 2006/0053374 A1 | 3/2006 | Wilensky | |
| 2006/0095865 A1 | 5/2006 | Rostom | |
| 2006/0109517 A1 | 5/2006 | Catalan | |
| 2006/0119619 A1 | 6/2006 | Fagans et al. | |
| 2006/0150091 A1 | 7/2006 | Suzuki et al. | |
| 2006/0203004 A1 | 9/2006 | Hwang et al. | |
| 2006/0204034 A1 | 9/2006 | Steinberg et al. | |
| 2006/0284895 A1 | 12/2006 | Marcu et al. | |
| 2006/0291666 A1 | 12/2006 | Ball et al. | |
| 2007/0021152 A1 | 1/2007 | Jung | |
| 2007/0055940 A1 | 3/2007 | Moore et al. | |
| 2007/0061723 A1 | 3/2007 | Ohga et al. | |
| 2007/0064011 A1 | 3/2007 | Barnes et al. | |
| 2007/0065006 A1 | 3/2007 | Wilensky | |
| 2007/0065011 A1 | 3/2007 | Schiehlen | |
| 2007/0094597 A1 | 4/2007 | Rostom | |
| 2007/0094611 A1* | 4/2007 | Sasaki | G11B 27/34 715/804 |
| 2007/0110422 A1 | 5/2007 | Minato et al. | |
| 2007/0113180 A1 | 5/2007 | Danninger | |
| 2007/0113183 A1 | 5/2007 | Brinkmann et al. | |
| 2007/0171443 A1 | 7/2007 | Pan | |
| 2007/0174790 A1 | 7/2007 | Jing et al. | |
| 2007/0189627 A1 | 8/2007 | Cohen et al. | |
| 2007/0195343 A1 | 8/2007 | Yoneda | |
| 2007/0216773 A1 | 9/2007 | Kojima et al. | |
| 2007/0229465 A1 | 10/2007 | Sakai et al. | |
| 2007/0236475 A1 | 10/2007 | Wherry | |
| 2007/0291140 A1 | 12/2007 | Baba et al. | |
| 2007/0294634 A1 | 12/2007 | Kokemohr | |
| 2008/0034289 A1 | 2/2008 | Doepke et al. | |
| 2008/0046218 A1 | 2/2008 | Dontcheva et al. | |
| 2008/0049256 A1 | 2/2008 | Ohkubo et al. | |
| 2008/0056564 A1 | 3/2008 | Lindbloom | |
| 2008/0056598 A1 | 3/2008 | Murakata | |
| 2008/0062443 A1 | 3/2008 | Olson | |
| 2008/0086688 A1* | 4/2008 | Chandratillake | G06F 16/739 715/719 |
| 2008/0091723 A1 | 4/2008 | Zuckerberg et al. | |
| 2008/0109722 A1 | 5/2008 | Gengler et al. | |
| 2008/0117333 A1 | 5/2008 | Walsh | |
| 2008/0119237 A1 | 5/2008 | Kim | |
| 2008/0120565 A1 | 5/2008 | Stiso et al. | |
| 2008/0152297 A1* | 6/2008 | Ubillos | G06F 3/04817 386/333 |
| 2008/0155413 A1* | 6/2008 | Ubillos | G06F 3/04842 715/716 |
| 2008/0155421 A1* | 6/2008 | Ubillos | G11B 27/10 715/724 |
| 2008/0163053 A1 | 7/2008 | Hwang et al. | |
| 2008/0194326 A1 | 8/2008 | Brunet et al. | |
| 2008/0225058 A1 | 9/2008 | Hertzfeld et al. | |
| 2008/0229232 A1 | 9/2008 | Schulz et al. | |
| 2008/0250314 A1 | 10/2008 | Larsen | |
| 2008/0256450 A1* | 10/2008 | Takakura | G06F 16/447 715/721 |
| 2008/0256489 A1 | 10/2008 | Maurer et al. | |
| 2008/0301237 A1 | 12/2008 | Parsons et al. | |
| 2008/0309644 A1 | 12/2008 | Arimoto | |
| 2009/0002391 A1 | 1/2009 | Williamson et al. | |
| 2009/0019397 A1 | 1/2009 | Buffet et al. | |
| 2009/0023513 A1 | 1/2009 | Shibata et al. | |
| 2009/0049410 A1 | 2/2009 | Fagans et al. | |
| 2009/0060378 A1 | 3/2009 | Curtis | |
| 2009/0067753 A1 | 3/2009 | Hanechak | |
| 2009/0070675 A1 | 3/2009 | Li | |
| 2009/0080801 A1 | 3/2009 | Hatfield et al. | |
| 2009/0094557 A1 | 4/2009 | Howard | |
| 2009/0138825 A1 | 5/2009 | Duarte | |
| 2009/0146961 A1 | 6/2009 | Cheung et al. | |
| 2009/0147011 A1 | 6/2009 | Buck et al. | |
| 2009/0154795 A1 | 6/2009 | Tan et al. | |
| 2009/0169132 A1 | 7/2009 | Sagawa | |
| 2009/0172532 A1 | 7/2009 | Chaudhri | |
| 2009/0199126 A1 | 8/2009 | Kumar et al. | |
| 2009/0201310 A1 | 8/2009 | Weiss | |
| 2009/0202170 A1 | 8/2009 | Weiss | |
| 2009/0202173 A1 | 8/2009 | Weiss et al. | |
| 2009/0204538 A1 | 8/2009 | Ley et al. | |
| 2009/0204894 A1 | 8/2009 | Bhatt et al. | |
| 2009/0204913 A1 | 8/2009 | Kawano et al. | |
| 2009/0220155 A1 | 9/2009 | Yamamoto et al. | |
| 2009/0244646 A1 | 10/2009 | Kondo et al. | |
| 2009/0249208 A1* | 10/2009 | Song | G11B 27/105 715/721 |
| 2009/0256947 A1 | 10/2009 | Ciurea et al. | |
| 2009/0276731 A1* | 11/2009 | Yamakawa | G06F 3/04847 715/833 |
| 2009/0285506 A1 | 11/2009 | Benson et al. | |
| 2009/0289913 A1 | 11/2009 | Chang et al. | |
| 2009/0292762 A1 | 11/2009 | Mettala et al. | |
| 2009/0303199 A1 | 12/2009 | Cho et al. | |
| 2009/0319897 A1 | 12/2009 | Kotler et al. | |
| 2009/0324077 A1 | 12/2009 | Wu et al. | |
| 2010/0014721 A1 | 1/2010 | Steinberg et al. | |
| 2010/0020221 A1 | 1/2010 | Tupman et al. | |
| 2010/0026831 A1 | 2/2010 | Ciuc et al. | |
| 2010/0054549 A1 | 3/2010 | Steinberg et al. | |
| 2010/0056221 A1 | 3/2010 | Park | |
| 2010/0063961 A1 | 3/2010 | Guiheneuf et al. | |
| 2010/0063992 A1 | 3/2010 | Ma et al. | |
| 2010/0077330 A1* | 3/2010 | Kaplan | G06F 3/0481 715/764 |
| 2010/0088646 A1* | 4/2010 | Nishimori | H04N 21/47 715/838 |
| 2010/0091330 A1 | 4/2010 | Marchesotti et al. | |
| 2010/0131294 A1 | 5/2010 | Venon et al. | |
| 2010/0134425 A1 | 6/2010 | Storrusten | |
| 2010/0176963 A1 | 7/2010 | Vymenets | |
| 2010/0185976 A1 | 7/2010 | Sadanandan | |
| 2010/0185983 A1 | 7/2010 | Szoczei et al. | |
| 2010/0191831 A1 | 7/2010 | Moon et al. | |
| 2010/0192102 A1 | 7/2010 | Chmielewski et al. | |
| 2010/0230493 A1 | 9/2010 | Akiyama | |
| 2010/0251177 A1 | 9/2010 | Geppert et al. | |
| 2010/0255914 A1 | 10/2010 | Poh et al. | |

(56) References Cited

U.S. PATENT DOCUMENTS

| | | |
|---|---|---|
| 2010/0257477 A1 | 10/2010 | Nielsen et al. |
| 2010/0281367 A1 | 11/2010 | Langmacher et al. |
| 2010/0281374 A1 | 11/2010 | Schulz et al. |
| 2010/0281382 A1 | 11/2010 | Meaney et al. |
| 2010/0281383 A1 | 11/2010 | Meaney et al. |
| 2010/0299598 A1 | 11/2010 | Shin et al. |
| 2010/0306702 A1 | 12/2010 | Warner |
| 2010/0310136 A1 | 12/2010 | Tsuda |
| 2010/0331052 A1 | 12/2010 | Watanabe |
| 2011/0012848 A1 | 1/2011 | Li et al. |
| 2011/0025711 A1* | 2/2011 | Doi .............. G06F 3/04883 345/635 |
| 2011/0025924 A1 | 2/2011 | Price et al. |
| 2011/0026898 A1 | 2/2011 | Lussier et al. |
| 2011/0052051 A1 | 3/2011 | Takeshita |
| 2011/0087984 A1 | 4/2011 | Jitkoff et al. |
| 2011/0093815 A1 | 4/2011 | Gobeil |
| 2011/0102457 A1 | 5/2011 | Bhatt et al. |
| 2011/0103684 A1 | 5/2011 | Bhatt et al. |
| 2011/0103685 A1 | 5/2011 | Bhatt |
| 2011/0107369 A1 | 5/2011 | O'Brien et al. |
| 2011/0113086 A1 | 5/2011 | Long et al. |
| 2011/0125765 A1 | 5/2011 | Tuli |
| 2011/0126096 A1 | 5/2011 | Ohashi et al. |
| 2011/0131543 A1 | 6/2011 | Majumder et al. |
| 2011/0154192 A1 | 6/2011 | Yang et al. |
| 2011/0163971 A1 | 7/2011 | Wagner et al. |
| 2011/0181618 A1 | 7/2011 | Diverdi et al. |
| 2011/0182511 A1 | 7/2011 | Chien et al. |
| 2011/0184980 A1 | 7/2011 | Jeong et al. |
| 2011/0185297 A1 | 7/2011 | Reid et al. |
| 2011/0196933 A1 | 8/2011 | Jackson et al. |
| 2011/0197160 A1 | 8/2011 | Kim et al. |
| 2011/0202875 A1 | 8/2011 | Kimura |
| 2011/0202877 A1 | 8/2011 | Lassonde et al. |
| 2011/0213670 A1 | 9/2011 | Strutton et al. |
| 2011/0219329 A1 | 9/2011 | Breglio |
| 2011/0231544 A1 | 9/2011 | Jaevenpaeae et al. |
| 2011/0235920 A1 | 9/2011 | Iwamoto et al. |
| 2011/0249074 A1 | 10/2011 | Cranfill et al. |
| 2011/0252344 A1 | 10/2011 | Van Os |
| 2011/0265033 A1 | 10/2011 | Lindsay et al. |
| 2011/0286647 A1 | 11/2011 | Cao et al. |
| 2011/0292237 A1 | 12/2011 | Imai |
| 2012/0009896 A1 | 1/2012 | Bandyopadhyay et al. |
| 2012/0017154 A1 | 1/2012 | Fagans et al. |
| 2012/0019550 A1 | 1/2012 | Pettigrew et al. |
| 2012/0019687 A1 | 1/2012 | Razavi et al. |
| 2012/0020553 A1 | 1/2012 | Pettigrew et al. |
| 2012/0032982 A1 | 2/2012 | Williamson et al. |
| 2012/0036480 A1 | 2/2012 | Warner et al. |
| 2012/0047459 A1 | 2/2012 | Ejima et al. |
| 2012/0050306 A1 | 3/2012 | Kurzweil et al. |
| 2012/0050789 A1 | 3/2012 | Bachman et al. |
| 2012/0051658 A1 | 3/2012 | Tong et al. |
| 2012/0069053 A1 | 3/2012 | Kojo |
| 2012/0072871 A1 | 3/2012 | Seo et al. |
| 2012/0131519 A1 | 5/2012 | Jitkoff |
| 2012/0136853 A1 | 5/2012 | Kennedy et al. |
| 2012/0159635 A1 | 6/2012 | He et al. |
| 2012/0162093 A1 | 6/2012 | Buxton et al. |
| 2012/0163710 A1 | 6/2012 | Skaff et al. |
| 2012/0173317 A1 | 7/2012 | Kelley |
| 2012/0190388 A1 | 7/2012 | Castleman et al. |
| 2012/0206344 A1 | 8/2012 | Hill et al. |
| 2012/0209902 A1 | 8/2012 | Outerbridge |
| 2012/0210223 A1 | 8/2012 | Eppolito |
| 2012/0226651 A1 | 9/2012 | Chidlovskii |
| 2012/0306788 A1 | 12/2012 | Chen et al. |
| 2012/0311448 A1 | 12/2012 | Achour et al. |
| 2012/0315954 A1 | 12/2012 | Ann et al. |
| 2012/0324042 A1 | 12/2012 | Graham et al. |
| 2013/0019172 A1 | 1/2013 | Kotler et al. |
| 2013/0019206 A1 | 1/2013 | Kotler et al. |
| 2013/0019208 A1 | 1/2013 | Kotler et al. |
| 2013/0044050 A1 | 2/2013 | Ylivainio |
| 2013/0104079 A1 | 4/2013 | Yasui et al. |
| 2013/0106899 A1 | 5/2013 | Bhatt |
| 2013/0108175 A1 | 5/2013 | Ptucha |
| 2013/0121569 A1 | 5/2013 | Yadav |
| 2013/0125068 A1 | 5/2013 | Harris et al. |
| 2013/0132859 A1 | 5/2013 | Chou et al. |
| 2013/0176212 A1 | 7/2013 | Nan et al. |
| 2013/0205208 A1 | 8/2013 | Kim et al. |
| 2013/0219010 A1 | 8/2013 | Mahendran et al. |
| 2013/0227448 A1 | 8/2013 | Heynen et al. |
| 2013/0235067 A1 | 9/2013 | Cherna et al. |
| 2013/0235068 A1 | 9/2013 | Ubillos et al. |
| 2013/0235069 A1 | 9/2013 | Ubillos et al. |
| 2013/0235070 A1 | 9/2013 | Webb |
| 2013/0235071 A1 | 9/2013 | Ubillos et al. |
| 2013/0235074 A1 | 9/2013 | Cherna et al. |
| 2013/0235076 A1 | 9/2013 | Cherna et al. |
| 2013/0236091 A1 | 9/2013 | Ubillos et al. |
| 2013/0236093 A1 | 9/2013 | Gatt et al. |
| 2013/0238724 A1 | 9/2013 | Cunningham |
| 2013/0238747 A1 | 9/2013 | Albouze et al. |
| 2013/0238990 A1 | 9/2013 | Ubillos et al. |
| 2013/0239031 A1 | 9/2013 | Ubillos et al. |
| 2013/0239051 A1 | 9/2013 | Albouze et al. |
| 2013/0239055 A1 | 9/2013 | Ubillos |
| 2013/0239056 A1 | 9/2013 | Ubillos et al. |
| 2013/0239057 A1 | 9/2013 | Ubillos et al. |
| 2013/0239062 A1 | 9/2013 | Ubillos et al. |
| 2013/0239063 A1 | 9/2013 | Ubillos et al. |
| 2013/0254662 A1 | 9/2013 | Dunko et al. |
| 2013/0335452 A1 | 12/2013 | Suchomel |
| 2014/0063047 A1* | 3/2014 | Johnson ............. G09G 5/028 345/594 |
| 2014/0137042 A1 | 5/2014 | Du et al. |
| 2014/0267362 A1 | 9/2014 | Kocienda et al. |
| 2015/0109324 A1 | 4/2015 | Ubillos et al. |
| 2015/0161217 A1 | 6/2015 | Zhang et al. |
| 2015/0205502 A1 | 7/2015 | Ubillos et al. |
| 2015/0331595 A1 | 11/2015 | Ubillos et al. |
| 2016/0063952 A1 | 3/2016 | Webb |
| 2016/0173726 A1 | 6/2016 | Ubillos et al. |
| 2016/0188131 A1 | 6/2016 | Ubillos et al. |
| 2016/0342325 A1 | 11/2016 | Blumenberg |
| 2016/0378316 A1 | 12/2016 | Jakubiec |
| 2017/0177556 A1 | 6/2017 | Fay et al. |
| 2018/0096036 A1 | 4/2018 | Haldenby et al. |

FOREIGN PATENT DOCUMENTS

| | | |
|---|---|---|
| CN | 101004746 A | 7/2007 |
| CN | 101216747 A | 7/2008 |
| CN | 101330556 A | 12/2008 |
| CN | 101551915 A | 10/2009 |
| CN | 101617308 A | 12/2009 |
| CN | 102054285 A | 5/2011 |
| CN | 102073404 A | 5/2011 |
| CN | 102082864 A | 6/2011 |
| EP | 0632363 A2 | 1/1995 |
| EP | 0693738 A2 | 1/1996 |
| EP | 0989739 A2 | 3/2000 |
| EP | 1087614 A2 | 3/2001 |
| EP | 1324227 A2 | 7/2003 |
| EP | 1326425 A2 | 7/2003 |
| EP | 1398982 A1 | 3/2004 |
| EP | 1521449 A2 | 4/2005 |
| EP | 1573501 A2 | 9/2005 |
| EP | 2325741 A2 | 5/2011 |
| EP | 2685362 A1 | 1/2014 |
| EP | 2685363 A1 | 1/2014 |
| GB | 2409789 A | 7/2005 |
| JP | 09-081718 A | 3/1997 |
| JP | 2002-010196 A | 1/2002 |
| JP | 2003-242278 A | 8/2003 |
| JP | 2004-303197 A | 10/2004 |
| JP | 2004-334337 A | 11/2004 |
| JP | 2007-080074 A | 3/2007 |
| JP | 2007-310833 A | 11/2007 |
| JP | 2007-328537 A | 12/2007 |

(56) References Cited

FOREIGN PATENT DOCUMENTS

| | | |
|---|---|---|
| JP | 2007-334651 A | 12/2007 |
| JP | 2008-011480 A | 1/2008 |
| JP | 2008-159077 A | 7/2008 |
| JP | 2008-210304 A | 9/2008 |
| JP | 2009-060566 A | 3/2009 |
| JP | 2009-187215 A | 8/2009 |
| JP | 2009-284084 A | 12/2009 |
| JP | 2010-015198 A | 1/2010 |
| JP | 2010-187093 A | 8/2010 |
| JP | 2011-507099 A | 3/2011 |
| JP | 2011-082965 A | 4/2011 |
| JP | 2013-519154 A | 5/2013 |
| KR | 10-2001-0089462 A | 10/2001 |
| KR | 10-2003-0005908 A | 1/2003 |
| KR | 10-2009-0039960 A | 4/2009 |
| KR | 10-2009-0116435 A | 11/2009 |
| KR | 10-2011-0042635 A | 4/2011 |
| KR | 10-2011-0076849 A | 7/2011 |
| KR | 10-2011-0093528 A | 8/2011 |
| KR | 10-2012-0010525 A | 2/2012 |
| WO | 2004/046906 A2 | 6/2004 |
| WO | 2007/031981 A2 | 3/2007 |
| WO | 2007/145654 A1 | 12/2007 |
| WO | 2008/102223 A1 | 8/2008 |
| WO | 2009/031135 A2 | 3/2009 |
| WO | 2009/102514 A1 | 8/2009 |
| WO | 2010/038653 A1 | 4/2010 |
| WO | 2010/047843 A1 | 4/2010 |
| WO | 2010/138360 A1 | 12/2010 |
| WO | 2010/151255 A1 | 12/2010 |
| WO | 2013/133893 A1 | 9/2013 |
| WO | 2013/133894 A1 | 9/2013 |
| WO | 2013/133895 A1 | 9/2013 |
| WO | 2013/133901 A2 | 9/2013 |
| WO | 2013/133905 A1 | 9/2013 |

OTHER PUBLICATIONS

"Photoshop Touch for Android: Part 2 The Tools" gamefromscratch.com, Jan. 20, 2012 (per the Way Back Machine) accessed via the web @ http://www.gamefromscratch.com/page/Photoshop-Touch-for-Android-Part-2-The-Tools.aspx. Accessed Jan. 1, 2015.

Agarawala, Anand, et al., "Keepin' It Real: Pushing the Desktop Metaphor with Physics, Piles and the Pen," Proceedings of the SIGCHI Conference on Human Factors in Computing Systems, Apr. 22-27, 2006, pp. 1283-1292, ACM, Montreal, Quebec, Canada.

Author Unknown , "Screenshots #1-13 of Microsoft Windows NT 4.0," Microsoft Corporations, Copyright 1981-1998. Released Aug. 1996. Screenshots created Oct. 13, 2004, 17 pages.

Author Unknown, "Using Adobe Photoshop CS4," Jan. 10, 2010, 707 pages, Adobe Systems Incorporated, San Jose, California, USA.

Author Unknown, "Adobe Photoshop 5.0 Limited Edition, Chapter 4: Making Color and Tonal Adjustments," Adobe Photoshop 5.0 User Guide, Jan. 1, 1998, 11 pages.

Author Unknown, "Adobe Photoshop Express", Android Application 1420, Feb. 13, 2011, available at http://octoba.net/archives/20110213-android-1420.html, 7 pages.

Author Unknown, "An Upgrade to Facebook Pages, Now, more ways to share your story," Feb. 10, 2011, 8 pages, available at http://f.cl.ly/items/1 D0F1 F1 m1 R0S3E460n0R/Pages_Transition Guide Feb2011 .pdf.

Author Unknown, "Enhanced HTML5 Pack for Dreamweaver CS5," Jun. 11, 2010, 4 pages, OutsourceAge, Wayback Machine Internet Archive.

Author Unknown, "Flicks Help: Stats XP-002716138," Jul. 11, 2013, 4 pages, available at http://www.flickr.com/help/stats/.

Author Unknown, "Flickr: Help: Tags XP-002716137", Jul. 11, 2013, 3 pages, available at http://www.flickr.com/help/tags/.

Author Unknown, "GWT DND: Keep Draggable Within an AbsolutePanel," Stackoverflow.com, Aug. 2009, 2 pages, <http://stackoverflow.com/questions/1304607/gwt-dnd-keep-draggable-within-an-absolutepanel>.

Author Unknown, "How to Manage and Work with Digital Images, Using FastStone Image Viewer Version 4.5," FastStone Soft, Jun. 10, 2011, pp. 1-95.

Author Unknown, "How to Straighten Photos in iPhoto," Mac Tip #476, Mar. 2, 2011, 11 pages, MacTips.

Author Unknown, "iPhoto '11 has developed to be a communication tool via pictures," Dec. 1, 2010, pp. 22-24, Mac Fan, vol. 18, No. 12, Mainichi Communications Inc., Japan.

Author Unknown, "myPANTONE," Apple iTunes App Store, updated Sep. 26, 2011, 2 pages.

Author Unknown, "Photographic Editinga—Workflow," May 9, 2011, 68 pages, Wayback Machine Internet Archive.

Author Unknown, "TouchRetouch", Android Application 1852, Jul. 21, 2011, available at URL: http://octoba.net/archives/20110721-android-1852.html, 5 pages.

Bederson, Benjamin B., "PhotoMesa: A Zoomable Image Browser Using Quantum Treemaps and Bubblemaps," UIST 2001, Month Unknown, 2001, pp. 71-80, ACE, Orlando, Florida, USA.

Ben Long, "Snapseed raises the bar for iPad image editors", MacWorld, Jun. 10, 2011.

Benedetti, Luca, et al., "Color to Gray Conversions in the Context of Stereo Matching Algorithms," Machine Vision and Applications, Dec. 7, 2010, pp. 1-32.

Brandl, Peter, et al., "Occlusion-Aware Menu Design for Digital Tabletops," CHI 2009, Apr. 4-9, 2009, pp. 3223-3228, ACM, Boston, Massachusetts, USA.

Chastain, Sue, "How do I Save My Edited Photos in Lightroom?" About.com Guide, Jun. 3, 2012, 2 pages.

Chi, Pei-Yu, et al., "Raconteur: Integrating Authored and Real-Time Social Media," CHI 2011, May 7-12, 2011, 4 pages, ACM, Vancouver, BC, Canada.

Children's Technology Review, Crayola ColorStudio App and Stylus Review, https://www.youtube.com/watch?v=iq4QLgzjyDw, Jul. 15, 2011, pp. 1-5.

Colorillo Screenshot, URL:www.colorillo.com, last accessed Jul. 17, 2014.

Corel, PaintShop Pro X4 User Guide, Corel, 2011.

Crayola ColorStudio HD for iPad review, Consumer Reports News, https://www.consumerreports.org/cro/news/2011/08/app- review-crayola-colorstudio-hd-for-ipad/index.htm, Aug. 8, 2011, pp. 1-3.

Dodgson, Neil A., et al., "Contrast Brushes: Interactive Image Enhancement by Direct Manipulation," Computational Aesthetics in Graphics, Visualization, and Imaging, Month Unknown, 2009, 8 paqes, The Euroqraphics Association.

Galitz, Wilbert, "The Essential Guide to User Interface Design," Wiley, 3rd Edition, passim.

Gomi, AI, et al., "CAT: Hierarchical Image Browser Using a Rectangle Packing Technique," 12th International Conference Information Visualisation, Jul. 9, 2008, pp. 82-87, IEEE.

Haibin Ling, Techniques for Image Retrieval: Deformation Insensitivity and Automatic Thumbnail Cropping, 2006.

Ho, Kevin I-J., et al., "Automatic Image Processing System for Beautifying Human Faces," Color Science and Imaging Technologies—Proceedings of SPIE, Month Unknown, 2002, pp. 23-32, vol. 4922.

Jong, Wilko De, "Multi Slider," MATLAB Central, Apr. 23, 2005 (Updated Jun. 2009), 2 pages, The Mathworks, Inc, <http://www.mathworks.com/matlabcentral/fileexchange/7514-multi-slider- >.

Kim et al, "Camera Canvas: Image Editor for People with Severe Disabilities", Technical Report BUCS-TR-2008-010,Directed Study Project, CAS CS 492, Spring 2008, Department of Computer Science, Boston University, Boston, MA 02215, USA.

Kurtenbach, Gordon, et al., The Design of a Gui Paradigm based on Tablets, Two- hands, and Transparency, CHI 1997, Mar. 22-27, 1997, pp. 35-42, ACM, Atlanta, Georaia, USA.

Leithinger, Daniel, et al., "Improving Menu Interaction for Cluttered Tabletop Setups with User-Drawn Path Menus," Second Annual IEEE International Workshop on Horizontal Interactive Human-Computer System, Oct. 10, 2007, pp. 121-128, IEEE.

Leopard, "How to straighten photos in iPhoto MacTips—Top Tips and Tricks for Mac, IOS, Ipad, IOS, Iphone and Everything Apple", 2011.

(56) References Cited

OTHER PUBLICATIONS

Ling, Haibin, "Techniques in Image Retrieval: Deformation Insensitivity and Automatic Thumbnail Cropping," Dissertation, Month Unknown 2006, 201 pages, University of Maryland—College Park, College Park, USA.

Luniewski, Maciej Adam, "Context-Aware Photo Gallery for Mobile Phone," Month Unknown, 2009, 131 pages, Department of Informatics and Mathematical Modeling (IMM) at the Technical University of Denmark (DTU), Denmark.

Marty Yawnick, Review_ LevelCam—Good Auto Crop and Straighten _Life In LoFi_ iPhoneography—Apr. 29, 2010, Iphoneography.

McGuffin, Michael J., et al., "Using Deformations for Browsing Volumetric Data," IEEE Visualization, Oct. 19-24, 2003, pp. 401-408, IEEE.

Messieh, Nancy, "Snapseed for iPad: Photo editing at the swipe of a finger, "Jun. 8, 2011,10 pages, available at http://thenextweb.com/apps/2011/06/08/snapseed-for-ipad-photo-editing-at-the-swipe-of-a-finger/.

O'Neil, Steve, "Using Adobe Photoshop," Chapter 7—Image Adjustments, Month Unknown, 2006, pp. 1-12.

OutsourceAge, "Enhanced HTML5 Pack for Dreamweaver CS5 _ PSD to wordpress conversion", Jul. 10, 2011.

Perez, Sarah, "Metadata and the Windows Live Photo Gallery", Jan. 22, 2008, 6 pages, Windows Live Photo & Video Blog, USA.

Photoschop CS5 Bible, Wiley, 2010, passim.

Sencha, Carousel_ auto-resize images when iphone is rotated, Dec. 8, 2011 (Year: 2011).

Shneiderman, Ben, et al., "Visualizing Digital Library Search Results with Categorical and Hierarchical Axes," Proceeding of the Fifth ACM Conference on Digital Libraries, Month Unknown, 2000, 10 pages, ACM.

Surdam, Sherry, "Using Picasa 3 Part 2," Sep. 20, 2009, 86 pages. Using Adobe Bridge, 2011.

Vernier, Frederic, et al., "Visualization Techniques for Circular Tabletop Interfaces," Proceedings of the Working Conference on Advanced Visual Interfaces, Mar. 2002, 10 pages, Mitsubishi Electric Research Laboratories, Inc., Cambridge, Massachusetts.

Yanz, Jerry, et al., "Hearing Instrument Technology: Tech Topic, Toward New Software Goals: Delighting Patients with Interactivity," The Hearing Review, Jan. 2008, pp. 1-9, Allied Media.

Yawnick, Marty, "Review: LevelCam—Good Auto Crop and Straighten," Apr. 29, 2010, 6 pages, iPhoneography, LifeinLofi.com.

Yeh, Tom et al. "Creating Contextual Help for GUIs Using SCreenshots," Oct. 19, 2011, ACM UIST '11, 145-154.

Author Adobe Press Title: Adobe PhotoshopLightroom 3 Classrom in a Book Date: Jul. 2010 pp. 20-35 of Chapter 6 (Year: 2010).

\* cited by examiner

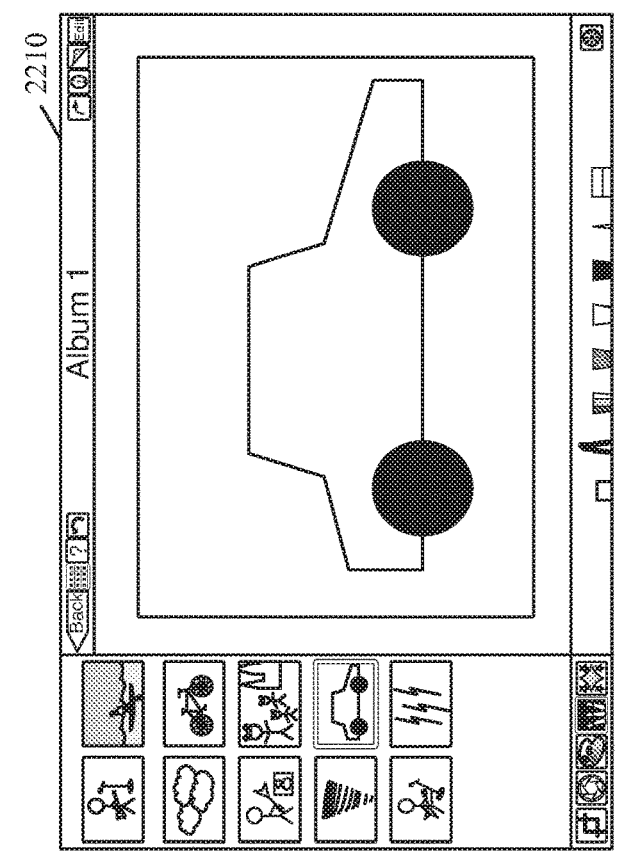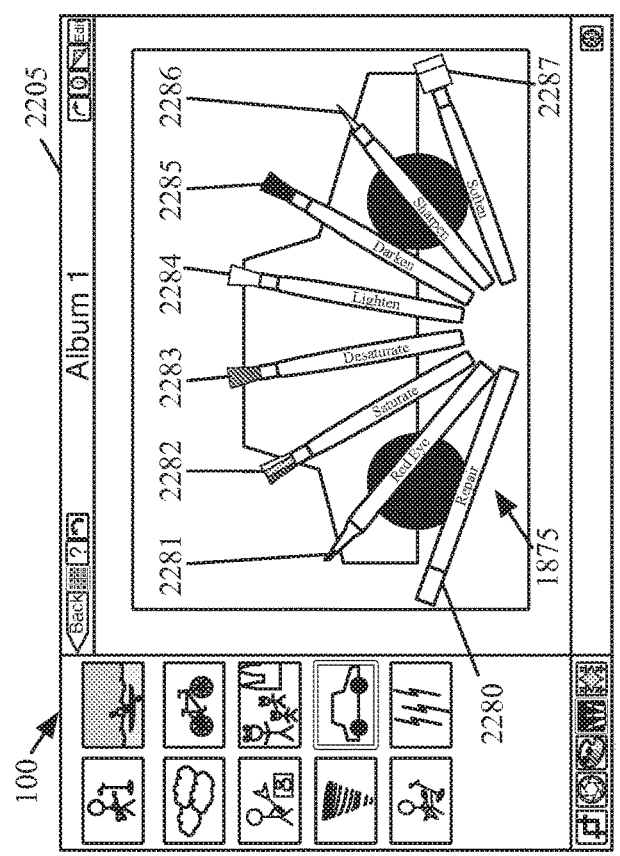
Figure 22

| Tool In Use | Applied Effects | | | | | | |
|---|---|---|---|---|---|---|---|
| | Crop | Exposure | Color | Repair | Brushes | | Effects |
| | | | | | Redeye | Paint | |
| Crop | ✓ | ✓ | ✓ | ✓ | ✓ | ✓ | ✓ |
| Exposure | ✓ | ✓ | ✓ | | | | |
| Color | ✓ | ✓ | ✓ | | | | |
| Repair | ✓ | | | ✓ | ✓ | | |
| Redeye | ✓ | ✓ | ✓ | ✓ | ✓ | ✓ | |
| Paint | ✓ | ✓ | ✓ | ✓ | ✓ | ✓ | |
| Effects | | | | | | | ✓ |

*Figure 35*

FANNING USER INTERFACE CONTROLS FOR A MEDIA EDITING APPLICATION

INCORPORATION BY REFERENCE; DISCLAIMER

Each of the following applications are hereby incorporated by reference: application Ser. No. 14/885,933, filed on Oct. 16, 2015; application Ser. No. 13/629,436, filed on Sep. 27, 2012; application 61/607,524, filed Mar. 6, 2012; application 61/607,525, filed Mar. 6, 2012; application 61/607,540 filed on Mar. 6, 2012; application 61/607,554, filed Mar. 6, 2012; application 61/607,569, filed Mar. 6, 2012; application 61/607,574, filed Mar. 6, 2012; and application 61/607,580, filed May 15, 2012. The Applicant hereby rescinds any disclaimer of claim scope in the parent application(s) or the prosecution history thereof and advises the USPTO that the claims in this application may be broader than any claim in the parent application(s).

BACKGROUND

Today, many image editing applications provide a number of different tools to managed and manipulate digital images. Examples of such applications are iPhoto, which is provided by Apple Inc., Picasa, which is provided by Google, Photoshop, which is provided by Adobe, Express Media, which is provided by Microsoft, etc. Some image editing applications allow the user to view images, edit images, and/or organize images.

Users often wish to edit images in order to improve the appearance of the image, to make the images appear a certain way, to apply effects to the image, etc. In many instances, a user must iterate through many steps while using many different tools in order to modify the image in the way that the user desires. This usually results in the user spending an inordinate amount of time editing the image, and, at the end, the user may still not be able to edit the image in way that the user wishes.

In many instances, the user knows what the user wants the image to look like, but the user either lacks the knowledge to produce the desired appearance of the image and/or the user cannot find the tools in the image editing application that allows the user to produce the desired appearance. Thus, many users may need to spend a large amount of time learning to use the media editing application.

When editing images with an image editing application, the edits made to the images are typically permanent. Therefore, if a user makes a mistake or wishes to changed or undo edits, the user has to start over by editing the original image file or the user has to fix the mistake by further editing the image.

BRIEF SUMMARY

For an image editing application, some embodiments of the invention provide a novel user interface (UI) tool that provides a set of fanning UI controls. In some embodiments, when the UI tool is activated, the UI tool provides an animation that fans the UI controls open. When one of the UI controls of the UI tool is selected to be used, the UI tool provides a an animation that fans the UI controls closed to show the selected UI control Different embodiments of the UI tool provide different types of fanning animations. For instance, the UI tool of some embodiments fans the UI controls by fanning the UI controls in one direction about a fixed location. This way, the UI controls appear like the UI controls are pinned at one end of the UI controls and the UI controls fan open and closed about the location at which the UI controls are pinned.

In some embodiments, the UI tool fans the UI controls by fanning the UI controls two directions about a fixed location. In such embodiments, the UI tool fans some of the UI controls in one direction about the fixed location and fans the other UI controls in the opposite direction about the fixed location.

While the fanning open the UI controls, the UI tool of some embodiments displays the UI controls such that the UI controls appear to slide onto a display area (e.g., the entire screen of a computing device) from outside the display area. Similarly, while the fanning closed the UI controls, the UI tool of some embodiments displays the UI controls such that the UI controls appear to slide off of the display area from near the center of the display area.

The UI tool of different embodiments provides different types of UI controls. For example, in some embodiments, the UI tool provides UI controls for applying effects to an image. These types of UI controls will be interchangeably referred to as effects controls in this application. Examples of effects include various filter effects, duotone effects, non-photorealistic desaturation, gradient effects, vignette effects, tilt-shift effect, etc.

Different embodiments provide different types of effects controls. For example, a first type of effects control displays a set of selectable thumbnail images of an image being edited. Each selectable thumbnail image displays a different extent of an effect associated with the effects control applied to the thumbnail image. Selecting a thumbnail image causes the application to apply the effect to the image being edited to the extent that the effect is applied to the thumbnail image. This way, the selectable thumbnail images provide a preview of the effect applied to the image being edited before applying the effect to the image.

A second type of effects control includes a sliding region. Different locations along the sliding region are for applying different extents of the effect to the image being edited. A user may apply different extents of the effect to the image being edited by selecting different locations (e.g., by touching the location on a touchscreen) along the sliding region. Alternatively, the user may apply different extents of the effect to the image by touching the sliding region and continuing to touch the sliding region while sliding along different locations of the sliding region.

For the second type of effects control, a set of thumbnail images of the image being edited are displayed at different location along the sliding region. Each thumbnail image displays a different extent of the effect associated with the effects control applied to the thumbnail image. The location at or near a particular thumbnail image along the sliding region corresponds to the extent of the effect that is applied to the thumbnail image. Thus, the location of a thumbnail image with a full extent of the effect to the thumbnail image is for applying a full extent of the effect to the image being edited, the location of a thumbnail image with a half extent of the effect to the thumbnail image is for applying a half extent of the effect to the image being edited, etc.

Another type of UI control that the UI tool of some embodiments provides is for applying brush effects to portions of an image. These types of UI controls will be interchangeably referred to as brush controls in this application. Examples of brush controls include brush controls to remove red-eye and blemishes, brush controls to saturate, desaturate, lighten, darken, sharpen, or soften a portion of an image, etc.

In some embodiments, the image editing application of some embodiments provides various tools for editing an image. When different edits are made to the image using different tools, the application applies the different edits in a particular order. For instance, the application might apply exposure edits to an image before applying effects edits to the image. To ensure that a first type of edits are applied to the image before a second types of edits, the application of some embodiments temporarily removes the second type of edits, if any, from the image when the user is wishes to apply the first type of edit to the image. After the user is finished applying the first type of edits, the application applies back to the image the second type of edits that were removed from the image. In some embodiments, the application provides a peeling on and peeling off animation to indicate to the user that edits are being removed or being applied back to the image.

The application of some embodiments stores information in a data structure that represents images managed by the application. In some embodiments, the application stores the data structure in a manner that preserves the original image when the image is edited. To provide quick viewing of images in through the GUI of the application, the application of some embodiments caches different versions of the image that are frequently accessed, used, and/or displayed. In some embodiments, the application provides a feature that allows the user to switch between the current edited version of the image and the original image. To facilitate the quick switching between the different versions of the image, the application of some embodiments utilizes the non-destructive method of storing images.

In addition to the features described above, the application of some embodiments provides a feature that allows the user of the application to send images to users of other devices that are also running the application. In some embodiments, the application sends the image in a data structure that stores the image in a non-destructive manner. This way, the recipient of the image may view the original image, the version edited by the sender, make additional and/or different edits to the image, send the image to other users, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 22 conceptually illustrates brush controls with different appearances.

FIG. 35 illustrates a table of orders for applying edits according to some embodiments.

DETAILED DESCRIPTION

Figure 1:
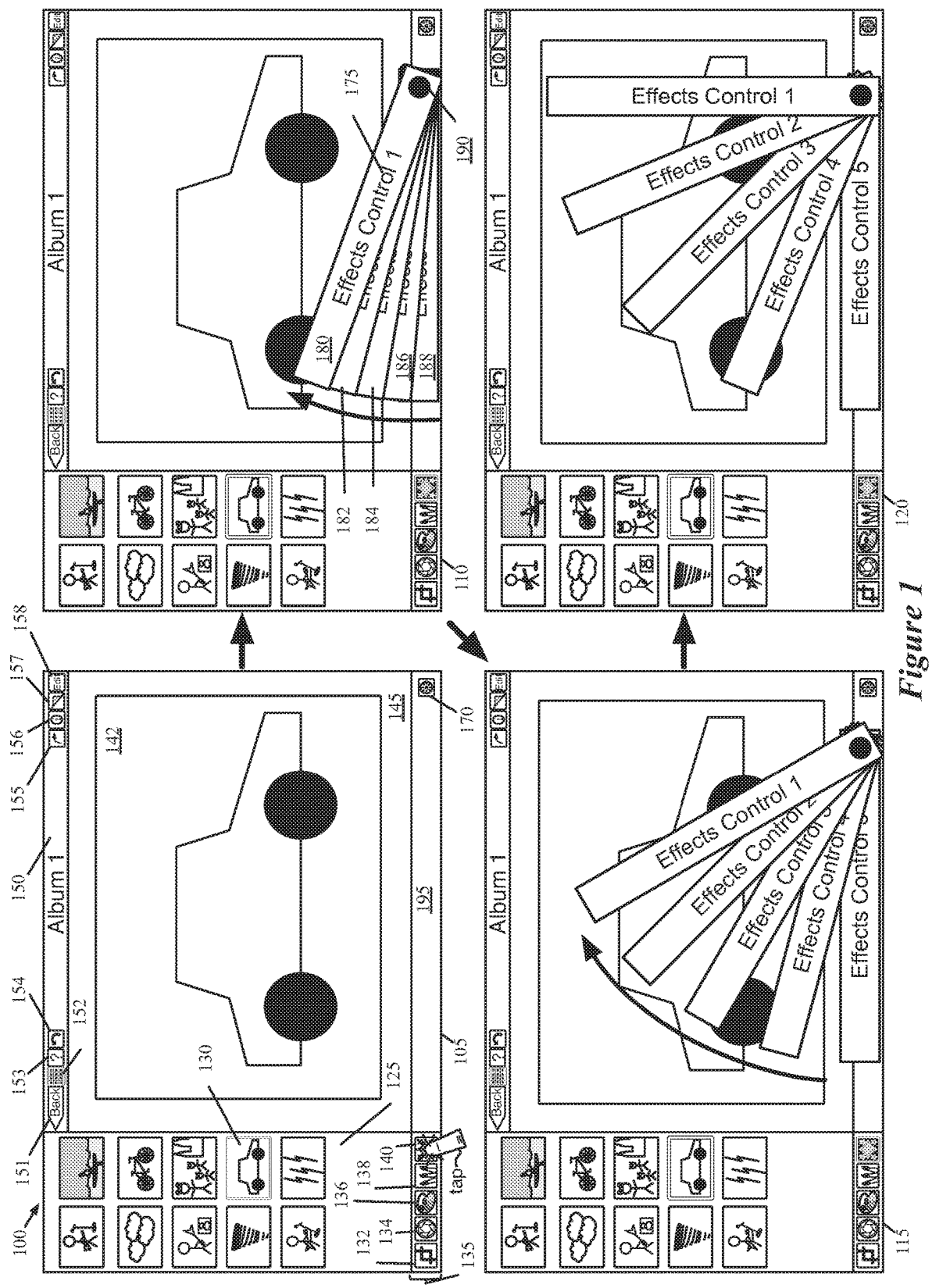
FIG. 1 conceptually illustrates a graphical user interface (GUI) of an image editing application that includes an effects tool of some embodiments and the activation of the effects tool.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For an image editing application, some embodiments of the invention provide a novel user interface (UI) tool that provides a set of fanning UI controls. In some embodiments, when the UI tool is activated, the UI tool provides an animation that fans the UI controls open. When one of the UI controls of the UI tool is selected to be used, the UI tool provides an animation that fans the UI controls closed to show the selected UI control.

Different embodiments of the UI tool provide different types of fanning animations. For instance, the UI tool of some embodiments fans the UI controls by fanning the UI controls in one direction about a fixed location. This way, the UI controls appear like the UI controls are pinned at one end of the UI controls and the UI controls fan open and closed about the location at which the UI controls are pinned.

In some embodiments, the UI tool fans the UI controls by fanning the UI controls two directions about a fixed location. In such embodiments, the UI tool fans some of the UI controls in one direction about the fixed location and fans the other UI controls in the opposite direction about the fixed location.

While the fanning open the UI controls, the UI tool of some embodiments displays the UI controls such that the UI controls appear to slide onto a display area (e.g., the entire screen of a computing device) from outside the display area. Similarly, while the fanning closed the UI controls, the UI tool of some embodiments displays the UI controls such that the UI controls appear to slide off of the display area from near the center of the display area.

The UI tool of different embodiments provides different types of UI controls. For example, in some embodiments, the UI tool provides UI controls for applying effects to an image. These types of UI controls will be interchangeably referred to as effects controls in this application. Examples of effects include various filter effects, duotone effects, non-photorealistic desaturation effects, gradient effects, vignette effects, tilt-shift effects, etc.

Different embodiments provide different types of effects controls. For example, a first type of effects control displays a set of selectable thumbnail images of an image being edited. Each selectable thumbnail image displays a different extent of an effect associated with the effects control applied to the thumbnail image. Selecting a thumbnail image causes the application to apply the effect to the image being edited to the extent that the effect is applied to the thumbnail image. This way, the selectable thumbnail images provide a preview of the effect applied to the image being edited before applying the effect to the image.

A second type of effects control includes a sliding region. Different locations along the sliding region are for applying different extents of the effect to the image being edited. A user may apply different extents of the effect to the image being edited by selecting different locations (e.g., by touching the location on a touchscreen) along the sliding region. Alternatively, the user may apply different extents of the effect to the image by touching the sliding region and continuing to touch the sliding region while sliding along different locations of the sliding region.

For the second type of effects control, a set of thumbnail images of the image being edited are displayed at different location along the sliding region. Each thumbnail image displays a different extent of the effect associated with the effects control applied to the thumbnail image. The location at or near a particular thumbnail image along the sliding region corresponds to the extent of the effect that is applied to the thumbnail image. Thus, the location of a thumbnail image with a full extent of the effect to the thumbnail image is for applying a full extent of the effect to the image being edited, the location of a thumbnail image with a half extent of the effect to the thumbnail image is for applying a half extent of the effect to the image being edited, etc.

Another type of UI control that the UI tool of some embodiments provides is for applying brush effects to portions of an image. These types of UI controls will be interchangeably referred to as brush controls in this application. Examples of brush controls include brush controls to remove red-eye and blemishes, brush controls to saturate, desaturate, lighten, darken, sharpen, or soften a portion of an image, etc.

In some embodiments, the image editing application of some embodiments provides various tools for editing an image. When different edits are made to the image using different tools, the application applies the different edits in a particular order. For instance, the application might apply exposure edits to an image before applying effects edits to the image. To ensure that a first type of edits are applied to the image before a second types of edits, the application of some embodiments temporarily removes the second type of edits, if any, from the image when the user is wishes to apply the first type of edit to the image. After the user is finished applying the first type of edits, the application applies back to the image the second type of edits that were removed from the image. In some embodiments, the application provides a peeling on and peeling off animation to indicate to the user that edits are being removed or being applied back to the image.

The application of some embodiments stores information in a data structure that represents images managed by the application. In some embodiments, the application stores the data structure in a manner that preserves the original image when the image is edited. To provide quick viewing of images in through the GUI of the application, the application of some embodiments caches different versions of the image that are frequently accessed, used, and/or displayed. In some embodiments, the application provides a feature that allows the user to switch between the current edited version of the image and the original image. To facilitate the quick switching between the different versions of the image, the application of some embodiments utilizes the non-destructive method of storing images.

In addition to the features described above, the application of some embodiments provides a feature that allows the user of the application to send images to users of other devices that are also running the application. In some embodiments, the application sends the image in a data structure that stores the image in a non-destructive manner. This way, the recipient of the image may view the original image, the version edited by the sender, make additional and/or different edits to the image, send the image to other users, etc.

Several more detailed embodiments of the invention are described in the sections below. Section I conceptually describes details of UI tools that have fanning UI controls. Next, Section II conceptually describes details of ordered edit processing according to some embodiments of the invention. Section III follows this with a description of a data structure that for representing images according to some embodiments. Next, Section IV describes details of a beaming feature provided by the application of some embodiments. Section V describes an example image viewing, editing, and organization application of some embodiments. Finally, Section VI describes several electronic systems that implement some embodiments of the invention.

I. User Interface Tools with Fanning UI Controls

As mentioned above, the image editing application of some embodiments provides a UI tool that includes a set of fanning UI controls. Different embodiments of the UI tool provide different types of UI controls. The following section will describe examples of UI tools for applying effects to an image and examples of UI tools for applying brush effects to an image.

A. Effects Tool

FIG. 1 conceptually illustrates a graphical user interface (GUI) 100 of an image editing application that includes an effects tool 175 of some embodiments and the activation of the effects tool 175. Specifically, FIG. 1 illustrates the GUI 100 at four different stages 105-120 of an effects tool activation operation. Each of the stages 105-120 will be described in further detail below. However, the elements of the GUI 100 will be described first.

As shown, the GUI 100 includes a thumbnail display area 125, an image display area 145, a first toolbar 150, a second toolbar 135, and a third toolbar 195. The thumbnail display area 125 displays thumbnails of the images in a selected collection. Thumbnails are small representations of a full-size image, and represent only a portion of an image in some embodiments. A user may select one or more images in the thumbnail display area (e.g., by touching the thumbnail image). The selected thumbnails are displayed with a highlight or other indicator of selection. In thumbnail display area 125, the thumbnail 130 is selected.

The image display area 145 displays the selected thumbnail image at a larger resolution. This will typically not be the full size of the image (which are often of a higher resolution than the display screen of the device on which the application displays the image). In some embodiments, the image in the image display area 145 is displayed in the aspect ratio of the full-size image.

The first toolbar 150 displays title information (e.g., the name of the collection shown in the GUI, a caption that a user has added to the currently selected image, etc.). In addition, the toolbar 150 includes a first set of UI items 151-154 and a second set of UI items 155-158.

In the first set of items, the back button 151 enables the user to navigate back to a collection organization GUI. Selection of the grid button 152 causes the application to move the thumbnail display area on or off of the GUI (e.g., via a slide animation). In some embodiments, users can also slide the thumbnail display area on or off of the GUI 100 via a swipe gesture. The help button 153 activates a context-sensitive help feature that identifies a current set of tools active for the user and provides help indicators for those tools that succinctly describe the tools to the user. In some embodiments, the help indicators are selectable to access additional information about the tools. Selection of the undo button 154 causes the application to remove the most recent edit to the image, whether this edit is a crop, color adjustment, etc.

In the second set of UI items, the sharing button 155 enables a user to share an image in a variety of different ways. In some embodiments, the user can send a selected image to another compatible device on the same network (e.g., Wi-Fi or Bluetooth network), upload an image to an image hosting or social media website, and create a journal (i.e., a presentation of arranged images to which additional content can be added) from a set of selected images, among others.

The information button 156 activates a display area that displays additional information about one or more selected images. The information displayed in the activated display area may include Exif data stored for an image (e.g., camera settings, timestamp, etc.). The show original button 157 enables the user to toggle between the original version of an image and the current edited version of the image.

The edit button 158 allows the user to enter or exit edit mode. When a user has selected one of the sets of editing tools in the toolbar 135, the edit button 158 returns the user to a viewing and organizing mode. When the user selects the edit button 158 while in the viewing mode, the application returns to the last used set of editing tools in the order shown in toolbar 135. That is, the items in the toolbar 135 are arranged in a particular order, and the edit button 158 activates the rightmost of those items for which edits have been made to the selected image.

The toolbar 135 includes five UI items 132-140, arranged in a particular order from left to right. The crop item 132 activates a cropping and rotation tool that allows the user to align crooked images and remove unwanted portions of an image. The exposure item 134 activates a set of exposure tools that allow the user to modify the black point, shadows, contrast, brightness, highlights, and white point of an image. In some embodiments, the set of exposure tools is a set of connected sliders that work together to modify the luminance histogram of an image. Details of exposure tools are described in concurrently filed U.S. patent application Ser. No. 13/629,514, entitled "Unified Slider Control for Modifying Multiple Image Properties". U.S. patent application Ser. No. 13/629,514, is hereby incorporated by reference. The color item 136 activates a set of color tools that enable the user to modify the saturation and vibrancy, as well as color-specific saturations (e.g., blue pixels or green pixels) and white balance. In some embodiments, some of these tools are presented as a set of sliders. The brushes item 138 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 140 activates a set of special effects that the user can apply to the image. These effects include gradients, tilt shifts, non-photorealistic desaturation effects, grayscale effects, various filters, etc. In some embodiments, the application presents these effects as a set of items that fan out from the toolbar 195.

The toolbar 195 includes a settings item 170. The settings button 170 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the GUI 100 is only one example of many possible graphical user interfaces for an image editing application. For instance, the various items could be located in different areas or in a different order, and some embodiments might include items with additional or different functionalities. The thumbnail display area of some embodiments might display thumbnails that match the aspect ratio of their corresponding full-size images, etc.

An example activation operation of the effects tool 175 will now be described by reference to the four stages 105-120 illustrated in FIG. 1. The first stage 105 of the GUI 100 shows the activation of the effects tool 175. As shown, a user is selecting the selectable effects tool UI item 140 (e.g., by touching the UI item 140) to activate the effects tool 175.

The second stage 110 illustrates the GUI 100 after the effects tool 175 is activated. As shown, the GUI 100 is displaying the start of the fanning open animation of effects controls of the effects tool 175 and the effects tool UI item 140 is highlighted. As shown, the effects tool 175 includes a set of effects controls 180-188 and a selectable UI item 190. Each of the effects controls 180-188 is for applying a set of effects to an image being edited (the image 142 in this example). The selectable UI item 190 is for initiating a fanning open animation of the effects controls 180-188.

When the image editing application receives the selection of the effects tool UI item 140, the application highlights the UI item 140 and starts displaying the fanning open animation of the set of effects controls 180-188. In this example, the starting position and location of the effects controls 180-188 for the fanning open animation is the position of the effects control 188, which positioned over the toolbar 195. That is, all of the effects controls 180-188 start at the location and position of the effects control 188 at the beginning of the fanning open animation. The image editing application displays the fanning open animation of the effects controls 180-188 by displaying rotations of different effects controls from the starting position and location by different amounts about a fixed location (e.g., a pivot point). In this example, the fixed location is the UI item 190. As shown, each of the effects controls 180-186 rotates about the fixed location in decreasing amounts, and the effects control 188 does not rotate at all. In other words, the effects control 180 rotates the largest amount about the fixed location, the effects control 182 rotates the second largest amount about the fixed location, the effects control 184 rotates the third largest amount about the fixed location, the effects control 186 rotates the fourth largest amount about the fixed location, and the effects control 188 does not rotate about the fixed location.

In some embodiments, the image editing application displays the fanning open animation of the effects controls 180-188 by displaying, for a defined interval of time, rotations of different effects controls about the fixed location at different speeds from the starting position and location. The effects control 180 rotates at the fastest speed about the fixed location, the effects control 182 rotates at the second fastest speed about the fixed location, the effects control 184 rotates at the third fastest speed about the fixed location, the effects control 186 rotates at the fourth fastest speed about the fixed location, and the effects control 188 does not rotate about the fixed location.

The image editing application of some embodiments displays the fanning open animation of the effects controls 180-188 by displaying rotations of the effects controls about the fixed location at the same speed from the starting position and location. To display a fanning open animation with the effects controls 180-188 moving at the same speed, the image editing application starts moving different effects controls at different times (e.g., start moving a particular effects control after a defined amount of time). Under this approach, the application starts moving the effects control 180 first, the effects control 182 second, the effects control 184 third, the effects control 186 fourth, and the effects control 188 last.

The third stage 115 illustrates the GUI 100 near the end of the fanning open animation of the effects controls 180-188 of the effects tool 175. As shown, the position of the effects controls 180-188 is fanned open more than the position of the effects controls 180-188 illustrated in the second stage 110.

The fourth stage 120 shows the GUI 100 after the completion of the fanning open animation of the effects controls 180-188. As shown, the effects control 180 has rotated approximately 90 degrees clockwise about the UI item 190 from its starting location and position (the location and position of the effects control 188 in this example), the effects control 182 has rotated approximately 67.5 degrees clockwise about the UI item 190 from its starting location and position, the effects control 184 has rotated approximately 45 degrees clockwise about the UI item 190 from its starting location and position, and the effects control 186 has rotated approximately 22.5 degrees clockwise about the UI item 190 from its starting location and position.

FIG. 1 illustrates an example of a fanning open animation of the effects controls of an effects tool when the effects tool is activated. In some embodiments, the image editing application does not display a fanning open animation of the effects controls of the effects tool when the effects tool is activated. Instead, the application of some such embodiments displays the last state (e.g., the most recent state) of the effects tool. For instance, the image editing application might display the selected effects control in a manner similar to the fourth stage 220, which is described below by reference to FIG. 2, when the effects tool is activated and an effects controls of the effects tool is selected in the last state of the effects tool.

Figure 2:
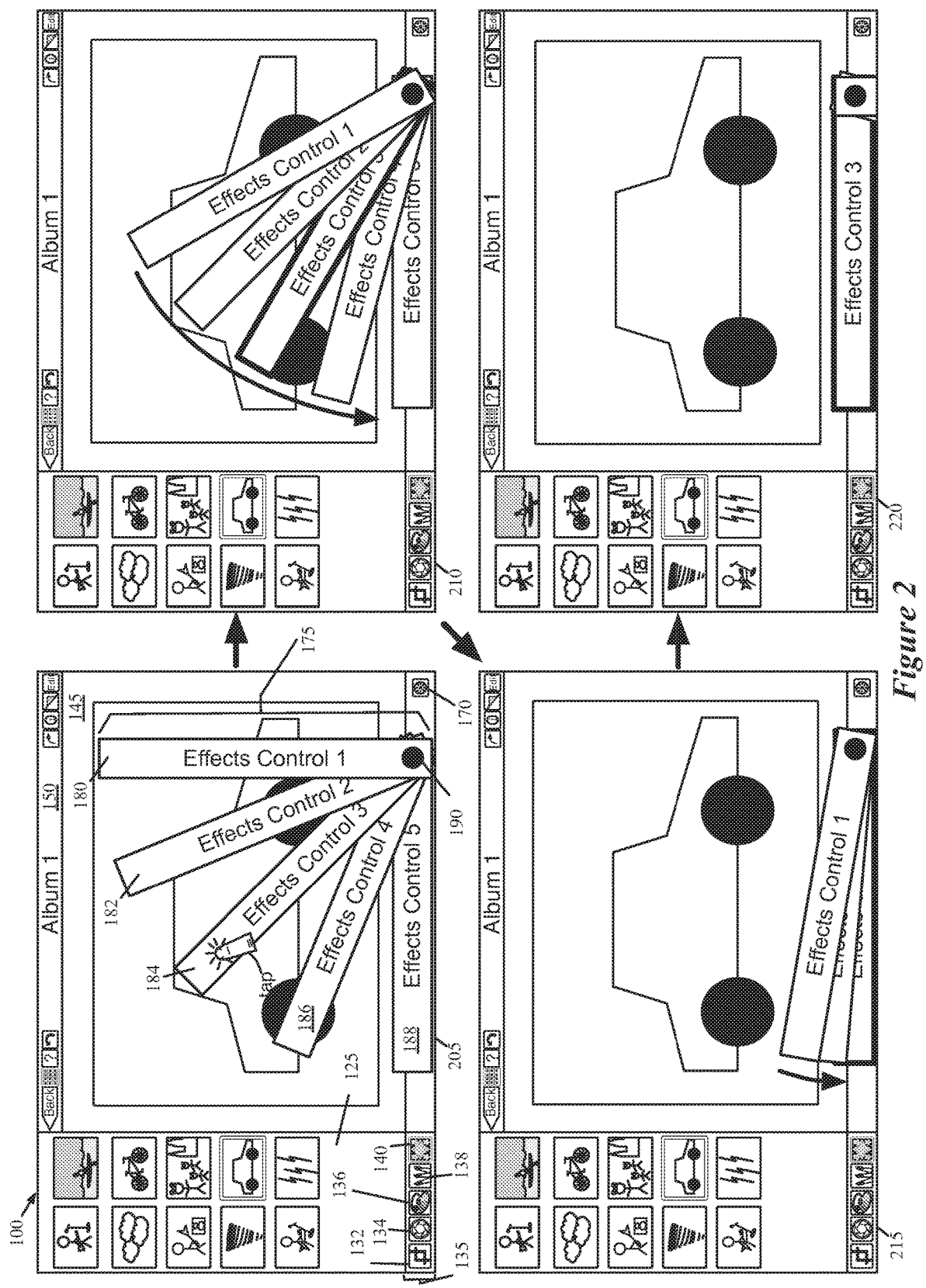
FIG. 2 conceptually illustrates selecting an effects control of the effects tool illustrated in FIG. 1.

FIG. 2 conceptually illustrates selecting an effects control of the effects tool 175 illustrated in FIG. 1. In particular, FIG. 2 illustrates the GUI 100 at four different stages 205-220 of an effects control selection operation.

The first stage 205 of the GUI 100 shows the selection of an effects control of the effects tool 175. As shown, a user is selecting the effects controls 184 (e.g., by touching the effects control 184). When the image editing application receives the selection of the effects control 184, the application highlights the selected effects control (the effects control 184 in this example) and starts displaying a fanning closed animation of the set of effects controls 180-188.

The second stage 210 illustrates the GUI 100 after the effects control 184 is selected and the fanning closed animation of the set of effects controls 180-188 has started. The image editing application highlights the effects control 184 by bolding the border of the effects control 184. In this example, the positions and locations of the set of effects controls 180-188 shown in the fourth stage 120 of FIG. 1 are the set of effects controls 180-188s' starting positions and locations for the fanning closed animation.

The image editing application displays the fanning closed animation of the effects controls 180-188 by displaying rotations of different effects controls from the effects controls' starting positions and locations by different amounts about a fixed location (the UI item 190 in this example). As shown, each of the effects controls 180-186 rotates about the fixed location in decreasing amounts, and the effects control 188 does not rotate at all. In other words, the effects control 180 rotates the largest amount about the fixed location, the effects control 182 rotates the second largest amount about the fixed location, the effects control 184 rotates the third largest amount about the fixed location, the effects control 186 rotates the fourth largest amount about the fixed location, and the effects control 188 does not rotate about the fixed location. The direction of rotation of the effects control 180-186 illustrated in FIG. 2 (counter-clockwise in this example) is opposite of the direction of the rotation of the effects control 180-186 during the fanning open animation illustrated in FIG. 1.

In some embodiments, the image editing application displays the fanning closed animation of the effects controls 180-188 by displaying, for a defined interval of time, rotations of different effects controls about the fixed location at different speeds from the effects controls' different starting positions and locations. The effects control 180 rotates at the fastest speed about the fixed location, the effects control 182 rotates at the second fastest speed about the fixed location, the effects control 184 rotates at the third fastest speed about the fixed location, the effects control 186 rotates at the fourth fastest speed about the fixed location, and the effects control 188 does not rotate about the fixed location.

The image editing application of some embodiments displays the fanning closed animation of the effects controls 180-188 by displaying rotations of the effects controls about the fixed location at the same speed from effects controls' different starting positions and locations. To display a fanning closed animation with the effects controls 180-188 moving at the same speed, the application starts moving different effects controls at different times (e.g., start moving a particular effects control after a defined amount of time). Under this approach, the image editing application starts moving the effects control 180 first, the effects control 182 second, the effects control 184 third, the effects control 186 fourth, and the effects control 188 last. In some embodiments, the application starts moving the effects control 182 second when the first effects control 180 is at or near the position of the effects control 182. In this way, the effects controls 180 and 182 appear to move together as one effects control. The image editing application starts moving the effects controls 184 and 186 in a similar manner—the application starts moving the effects control 184 when the effects controls 180 and 182 are at or near the position of the effects control 184 and the application starts moving the effects control 186 when the effects controls 180-184 are at or near the position of the effects control 186.

The third stage 215 illustrates the GUI 100 near the end of the fanning closed animation of the effects controls 180-188 of the effects tool 175. As shown, the effects controls 184 and 186 have stopped rotating about the fixed location. The positions of the effects controls 186 and 188, which underlap the selected effects control 184, are the same position as the position of the selected effects control 184. The effects controls 180 and 182 are still rotating counter-clockwise about the fixed location. As shown in the third stage 215, the position of effects controls 180-188 is fanned closed more than the position of the effects controls 180-188 illustrated in the second stage 210.

The fourth stage 220 shows the GUI 100 after the completion of the fanning closed animation of the effects controls 180-188. When the image editing application displays a fanning closed animation of the set of effects controls 180-188, the application displays the effects controls that overlap the selected effects control rotating about the fixed location past the location and position of the effects controls 188. The fanning closed animation of the effects controls that overlap the selected effects control end at a position and location that is rotated approximately 90 degrees counter-clockwise about the fixed location from the location and position at which the effects controls that underlap the selected effects control and the selected effects control end. At the end of the fanning closed animation of the set of the effects controls 180-188, the effects controls that overlap the selected effects control appear to hang from the fixed location about which the effects controls 180-186 rotated.

For the example illustrated in the fourth stage 220 of FIG. 2, the selected effects control is the effects control 184. Thus, at the end of the fanning closed animation, the effects controls 184-188 end at the location and position illustrated in the fourth stage 220. In addition, the effects controls 180 and 182, which overlap the selected effects control 184, end at the location and position that is rotated approximately 90 degrees counter-clockwise about the fixed location from the ending location and position of the effects controls 184-188.

While FIG. 2 illustrates selecting a particular effects control of an effects tool, one of ordinary skill in the art will recognize that any of the effects controls of the effects tool may be selected after the effects tool is activated. For example, the user could have selected effects controls 180, 182, 186, or 188.

Figure 3:
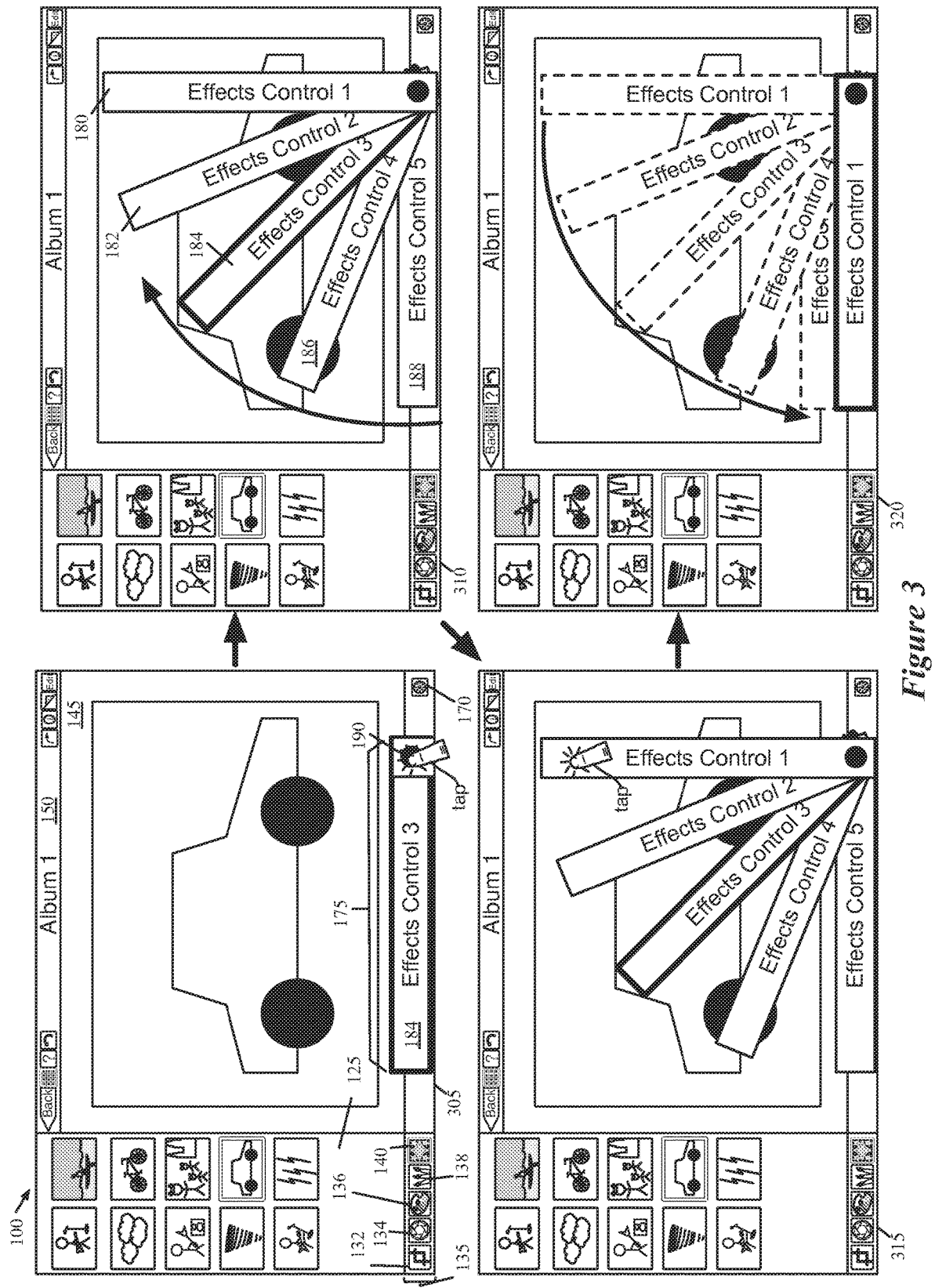
FIG. 3 conceptually illustrates changing the selected effects control of the effects tool illustrated in FIG. 1.

After selecting an effects control of the effects tool, a user might want to change the selection of the effects control. FIG. 3 conceptually illustrates changing the selected effects control of the effects tool 175 illustrated in FIG. 1. Specifically, FIG. 3 illustrates the GUI 100 at four different stages 305-320 of an effects control change operation.

The first stage 305 of the GUI 100 is similar to the fourth stage 220 of the GUI 100 illustrated in FIG. 2. That is, the first stage 305 shows the GUI 100 after the effects control 184 is selected, the effects control 184 is highlighted with a bolded border, and a fanning closed animation of the set of effects controls 180-188 has completed. In addition, the first stage 305 illustrates the invocation of an operation for changing the selection of the effects control of the effects tool 175. As shown, a user is selecting the selectable UI item 190 (e.g., by touching the UI item 190) to invoke the operation for changing the selection of the effects control.

The second stage 310 illustrates the GUI 100 after the image editing application has finished a fanning open animation of the set of effects controls 180-188. When the application receives the selection of the UI item 190, the application displays a fanning open animation of the set of effects controls 180-188 that is similar to the fanning open animation described above by reference to FIG. 1. As shown, the effects control 184 remains highlighted because the effects control 184 is the current selected effects control of the effects tool 175.

In the third stage 315, the GUI 100 shows a selection of a different effects control of the effects tool 175. As shown, the user is selecting the effects control 180 (e.g., by touching the effects control 180). When the image editing application receives the selection of the effects control 180, the application highlights the effects control 180 and displays a fanning closed animation of the set of effects controls 180-188 that is similar to the fanning closed animation of the set of effects controls 180-188 described above by reference to FIG. 2.

The fourth stage 320 illustrates the GUI 100 after the fanning closed animation of the set of effects controls 180-188 is finished and the selected effects control 180 is highlighted. In this example, the set of effects controls 180-186 rotate about the UI item 190 and end the position of the selected effects control 190. Since none of the other effects controls (i.e., the effects controls 182-188) of the effects tool 175 overlap the selected effects control 180, the end positions of the effects controls 182-188 are the same as the end position of the selected effects control 180. Therefore, none of the effects controls appear to hang from the fixed location about which the effects controls 180-186 rotated.

FIG. 3 illustrates one example of changing the selected effects control of an effects tool. One of ordinary skill in the art will realize that any effects control of the effects tool may be selected when changing the selected effects control of the effects tool. Moreover, the selected effects control of the effects tool may be changed any number of different times.

In some embodiments, the image editing application provides the GUI described above in FIGS. 1-3 when the application is in a landscape-viewing mode. The following figures will describe a GUI that the application of some such embodiments provides when the application is in a portrait-viewing mode.

Figure 4:
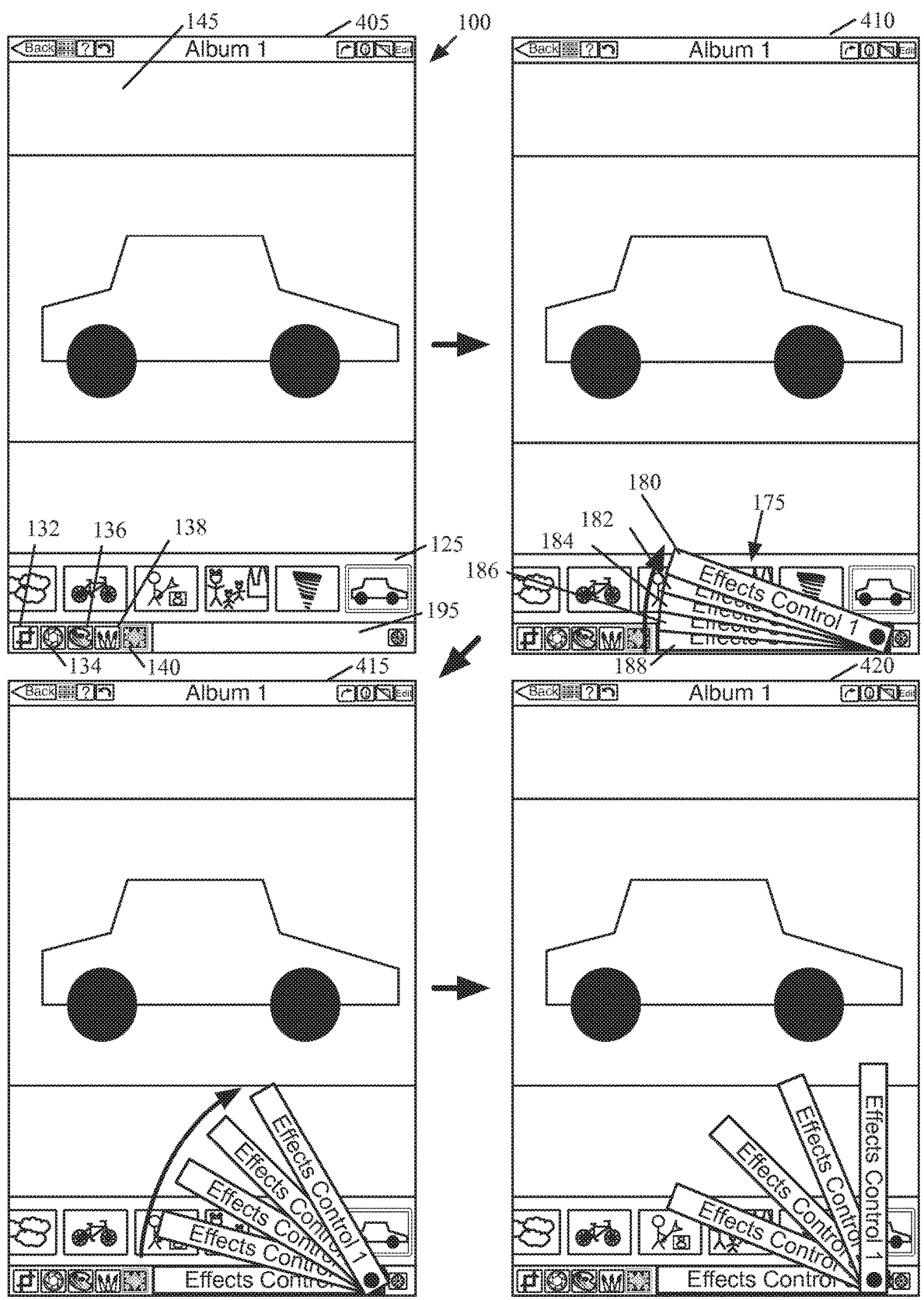
FIG. 4 conceptually illustrates a GUI that includes an effects tool of some embodiments and the activation of the effects tool.

FIG. 4 conceptually illustrates a GUI 400 that includes the effects tool 175 of some embodiments and the activation of the effects tool 175. In particular, FIG. 4 illustrates the GUI 400 at four different stages 405-420 of an effects tool activation operation. The GUI 400 is similar to the GUI 100 that is described above by reference to FIG. 1 except the thumbnail display area 125 in the GUI 400 is arranged below the image display area 145 and above the toolbar 195. Also, the GUI 400 does not include the toolbar 135, and, thus, the UI items 132-140 are displayed in the toolbar 195 instead.

The stages 405-420 of the GUI 400 are similar to the stages 105-120 described above by reference to FIG. 1. That is, the first stage 405 shows the activation of the effects tool 175, the second stage 410 shows the start of the fanning open animation of the effects controls 180-188, the third stage 415 shows the effects controls 180-188 near the end of the fanning closed animation, and the fourth stage 420 shows the effects controls 180-188 at the end of the fanning open animation.

In addition, the fanning closed animation of the effects tool 175 in the GUI 400 when an effects control of the effects tool 175 is similar to the animation described above by reference to FIG. 2. Also, the technique for changing the selection of an effects control of the effects tool 175 in the GUI 400 and the accompanying animations are similar to the technique and animations described above by reference to FIG. 3.

In some embodiments, the GUI for the example operations described above by reference to FIGS. 1-3 may be provided by an image editing application when the application is in a landscape-viewing mode. The image editing application of some embodiments provides GUI described above by reference to FIG. 4 for the example operations when the application is in a portrait-viewing mode. However, in some cases, the image editing application provides a yet another GUI for the example operations. For instance, the display screen of a mobile computing device (e.g., a smartphone) on which the application is running might not have enough space to display the example operations illustrated in FIGS. 1-4.

Figure 5:
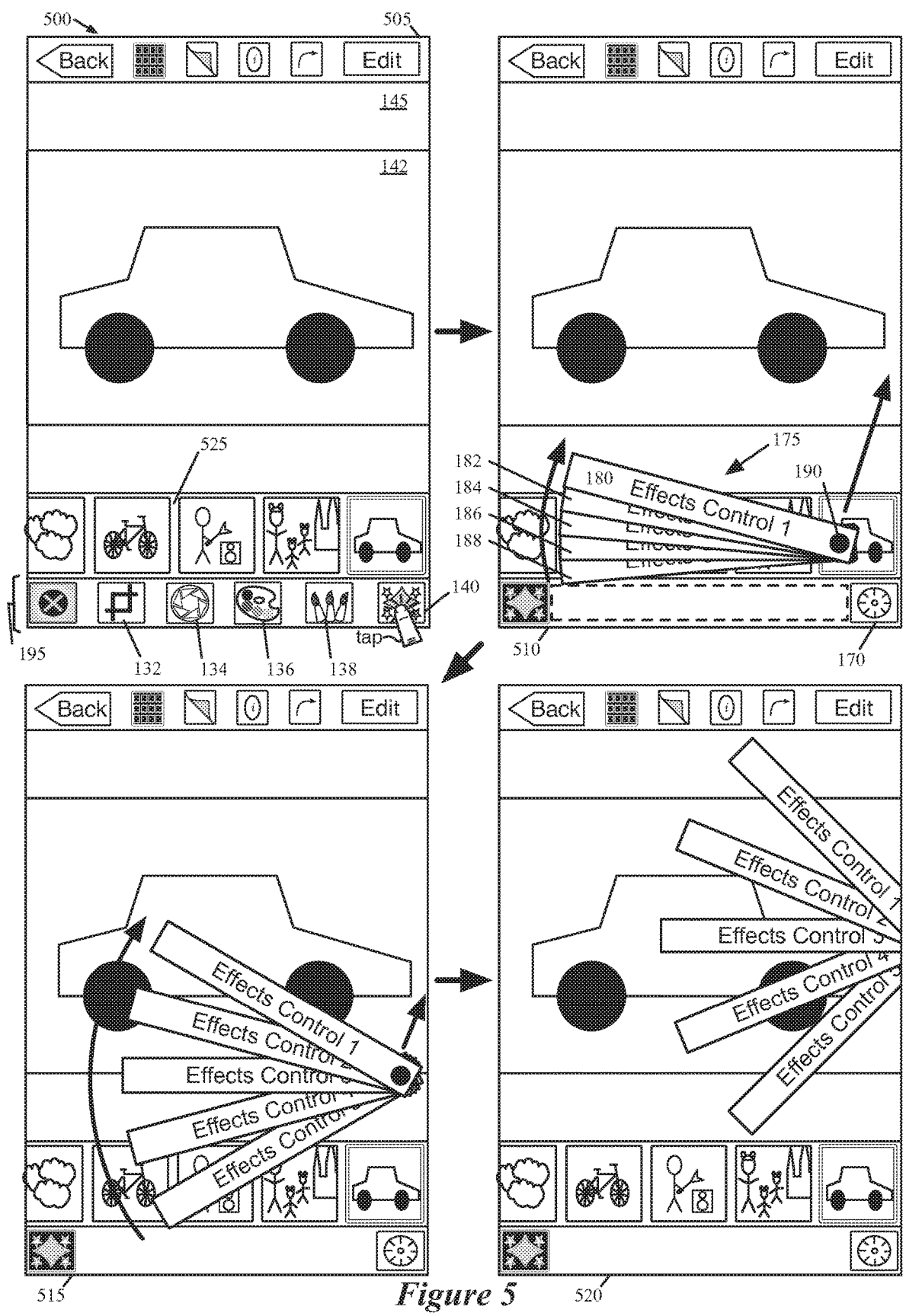
FIG. 5 conceptually illustrates a GUI of an image editing application that includes an effects tool of some embodiments and the activation of the effects tool.

FIG. 5 conceptually illustrates a GUI 500 of an image editing application that includes an effects tool 175 of some embodiments and the activation of the effects tool 175. Specifically, FIG. 5 illustrates the GUI 500 at four different stages 505-520 of an effects tool activation operation.

The GUI 500 is similar to the GUI 100 that is described above by reference to FIG. 1 except the thumbnail display area 125 in the GUI 500 is arranged below the image display area 145 and above the toolbar 195. Also, the GUI 500 does not include the toolbar 135, and, thus, the UI items 132-140 are displayed in the toolbar 195 instead.

The first stage 505 of the GUI 500 shows the activation of the effects tool 175. In this stage, a user is selecting the selectable effects tool UI item 140 (e.g., by touching the UI item 140) to activate the effects tool 175.

The second stage 510 illustrates the GUI 500 after the effects tool 175 is activated. As shown, the GUI 500 is displaying the start of the fanning open animation of the set of effects controls 180-188 and the effects tool UI item 140 is highlighted. When the image editing application receives the selection of the effects tool UI item 140, the application highlights the UI item 140, removes the UI items 132-140 from the toolbar 195 (e.g., by displaying an animation of the UI items 132-140 sliding towards the left and off the toolbar 195), and displays the UI item 140 on the left side of the toolbar 195.

When the image editing application receives the selection of the effects tool UI item 140, the application also starts displaying the fanning open animation of the set of effects controls 180-188. For this example, the starting position of the effects controls 180-188 for the fanning open animation indicated with a dashed rectangle in the toolbar 195. As the fanning open animation starts, the image editing application displays the effects controls 180-186 as rotating clockwise about a fixed location (the selectable UI item 190 in this example) relative to the effects control 188. While fanning open the effects controls 180-188, the application also moves the fixed location, and, in turn, the effects controls 180-186, towards the middle of the right side of the image display area 145. In other words, the application displays the effects controls 180-188 fanning open as the application displays the effects controls 180-188 sliding the effects controls 180-188 up and towards the middle of the right side of the image display area 145.

The image editing application displays the fanning open animation of the effects controls 180-188 by displaying rotations of different effects controls from the starting position and location by different amounts about the fixed location. As shown, the effects control 180-186 each rotates about the fixed location in decreasing amounts relative to the effects control 188.

In some embodiments, the image editing application displays the fanning open animation of the effects controls 180-188 by displaying, for a defined interval of time, rotations of different effects controls about the fixed location at different speeds from the starting position and location. The interval of time is defined in some embodiments as the time that the application starts moving the effects controls 180-188 from the toolbar 195 until the application stops moving the effects controls 180-188 off the middle of the right side of the image display area 145. In such embodiments, the effects control 180 rotates at the fastest speed about the fixed location, the effects control 182 rotates at the second fastest speed about the fixed location, the effects control 184 rotates at the third fastest speed about the fixed location, the effects control 186 rotates at the fourth fastest speed about the fixed location, and the effects control 188 does not rotate about the fixed location.

The image editing application of some embodiments displays the fanning open animation of the effects controls 180-188 by displaying rotations of the effects controls about the fixed location at the same speed from the starting position and location. To display a fanning open animation with the effects controls 180-188 moving at the same speed, the application starts moving different effects controls at different times (e.g., start moving a particular effects control after a defined amount of time). Under this approach, the application starts moving the effects control 180 first, the effects control 182 second, the effects control 184 third, the effects control 186 fourth, and the effects control 188 last.

The third stage 515 illustrates the GUI 500 near the end of the fanning open animation of the effects controls 180-188 of the effects tool 175. As shown, the position of the effects controls 180-188 is fanned open more than the position of the effects controls 180-188 illustrated in the second stage 510. Also, the location of the fixed location, and, in turn, the effects controls 180-188, is farther towards the middle of the right side of the image display area 145 than the location of the fixed location illustrated in the second stage 510.

The fourth stage 520 shows the GUI 500 after the completion of the fanning open animation of the effects controls 180-188. As shown, the effects control 180 has rotated approximately 90 degrees clockwise about the fixed location from its starting location and position, the effects control 182 has rotated approximately 67.5 degrees clockwise about the fixed location from its starting location and position, the effects control 184 has rotated approximately 45 degrees clockwise about the fixed location from its starting location and position, and the effects control 186 has rotated approximately 22.5 degrees clockwise about the fixed location from its starting location and position.

FIG. 5 illustrates an example of a fanning open animation of the effects controls of an effects tool when the effects tool is activated. In some embodiments, the image editing application does not display a fanning open animation of the effects controls of the effects tool when the effects tool is activated. Instead, the application of some such embodiments displays the last state (e.g., the most recent state) of the effects tool. For instance, the application might display the selected effects control in a manner similar to the fourth stage 620 illustrated in FIG. 6 when the effects tool is activated and an effects control of the effects tool is selected in the last state of the effects tool.

Figure 6:
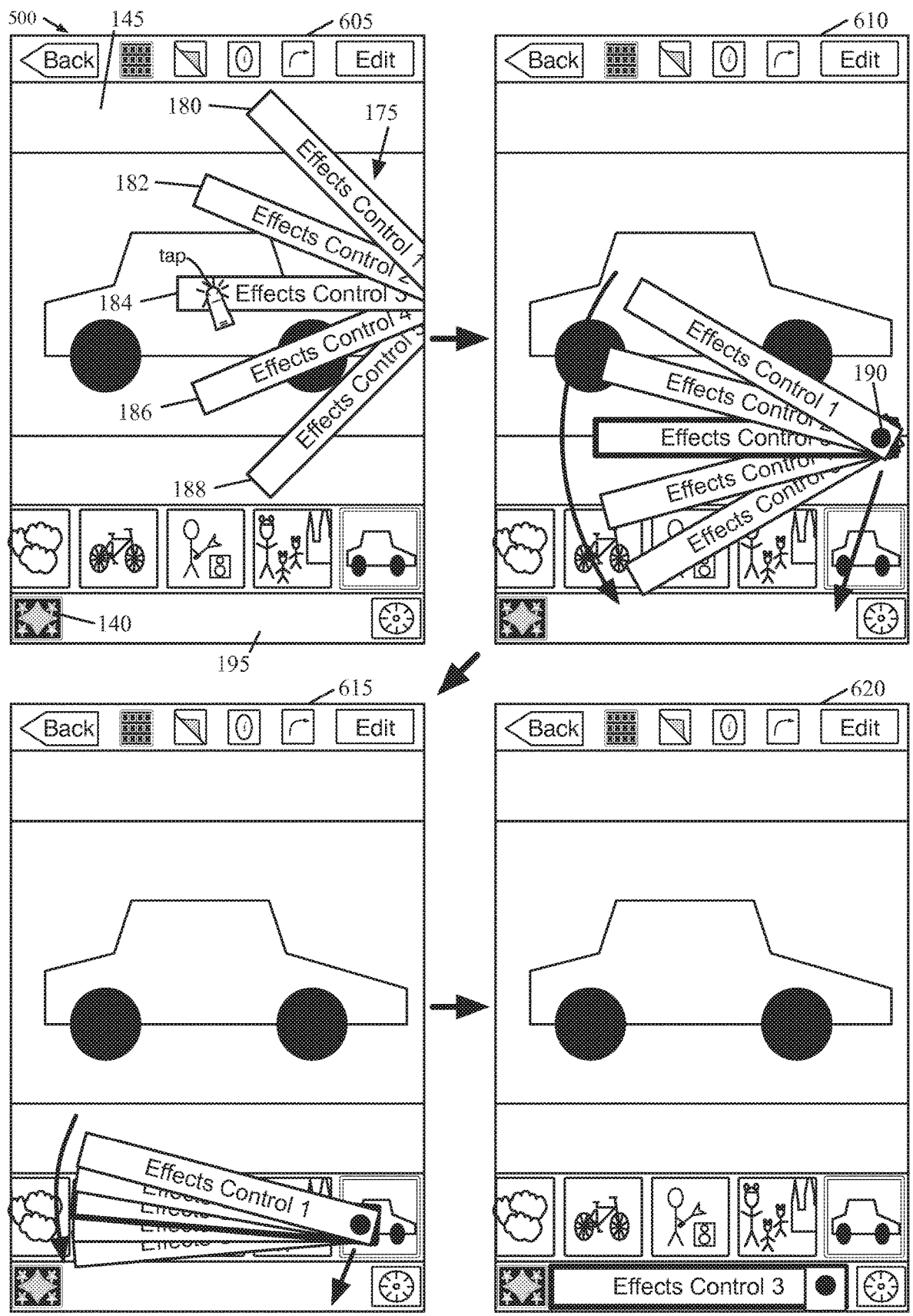
FIG. 6 conceptually illustrates selecting an effects control of the effects tool illustrated in FIG. 5.

FIG. 6 conceptually illustrates selecting an effects control of the effects tool 175 illustrated in FIG. 5. In particular, FIG. 6 illustrates the GUI 500 at four different stages 605-620 of an effects control selection operation.

The first stage 605 of the GUI 500 shows the selection of an effects control of the effects tool 175. As shown, a user is selecting the effects controls 184 (e.g., by touching the effects control 184). When the image editing application receives the selection of the effects control 184, the application highlights the selected effects control (the effects control 184 in this example) and starts displaying a fanning closed animation of the set of effects controls 180-188.

The second stage 610 illustrates the GUI 500 after the effects control 184 is selected and the fanning closed animation of the set of effects controls 180-188 has started. The application highlights the effects control 184 by bolding the border of the effects control 184. In this example, the positions and locations of the set of effects controls 180-188 shown in the fourth stage 510 of FIG. 5 are the set of effects controls 180-188s' starting positions and locations for the fanning closed animation.

As the fanning closed animation starts, the image editing application displays the effects controls 180-186 as rotating counter-clockwise about the fixed location (e.g., the UI item 190 in this example) relative to the effects control 188. While fanning the effects controls 180-188, the application also moves the fixed location, and, in turn, the effects controls 180-188, from the middle of the right side of the image display area 145 towards the right side of the toolbar 195. In other words, the application displays the effects controls 180-188 fanning closed as the application displays the fixed location sliding from the middle of the rights side of the image display area 145 towards the right side of the toolbar 195.

The image editing application displays the fanning closed animation of the effects controls 180-188 by displaying rotations of different effects controls from the effects controls' starting positions and locations by different amounts about a fixed location. As shown, the effects control 180-186 each rotates about the fixed location relative to the effects control 188, which is described above by reference to FIG. 5, in decreasing amounts. The direction of rotation of the effects control 180-186 illustrated in FIG. 6 (counter-clockwise in this example) is opposite of the direction of the rotation of the effects control 180-186 during the fanning open animation illustrated in FIG. 5.

In some embodiments, the image editing application displays the fanning closed animation of the effects controls 180-188 by displaying, for a defined interval of time, rotations of different effects controls about the fixed location at different speeds from the effects controls' different starting positions and locations. The interval of time is defined in some embodiments as the time that the application starts moving the fixed location, and, in turn, the effects controls 180-188, from the middle of the right side of the image display area 145 and towards the right side of the toolbar 195 until the application has moved the effects controls 180-188 over the toolbar 195.

The image editing application of some embodiments displays the fanning closed animation of the effects controls 180-188 by displaying rotations of the effects controls about the fixed location at the same speed from effects controls' different starting positions and locations. To display a fanning closed animation with the effects controls 180-188 moving at the same speed, the application starts moving different effects controls at different times (e.g., start moving a particular effects control after a defined amount of time). Under this approach, the image editing application starts moving the effects control 180 first, the effects control 182 second, the effects control 184 third, the effects control 186 fourth, and the effects control 188 last. In some embodiments, the application starts moving the effects control 182 second when the first effects control 180 is at or near the position of the effects control 182. In this way, the effects controls 180 and 182 appear to move together as one effects control. The image editing application starts moving the effects controls 184 and 186 in a similar manner—the application starts moving the effects control 184 when the effects controls 180 and 182 are at or near the position of the effects control 184 and the application starts moving of the effects control 186 when the effects controls 180-184 are at or near the position of the effects control 186.

The third stage 615 illustrates the GUI 500 near the end of the fanning open animation of the effects controls 180-188 of the effects tool 175. As shown, the position of the effects controls 180-188 is fanned closed more than the position of the effects controls 180-188 illustrated in the second stage 610. Also, the location of the fixed location, and, in turn, the effects controls 180-188, is farther towards the right side of the toolbar 195 than the location of the fixed location illustrated in the second stage 610.

The fourth stage 620 shows the GUI 500 after the completion of the fanning closed animation of the effects controls 180-188. When the image editing application finishes the fanning closed animation, the application displays the selected effects control over the toolbar 195. The application also displays the effects controls that overlap the selected effects control in a similar way that is illustrated in the fourth stage 220 of FIG. 2. That is, the image editing application displays the effects controls that overlap the selected effects control at a position and location that is rotated approximately 90 degrees counter-clockwise about the selectable UI item 190 from the location and position at which the application displays the selected effects control. At the end of the fanning closed animation of the set of the effects controls 180-188 in the fourth stage 620, the effects controls that overlap the selected effects control appear to hang from the selectable UI item 190.

For the example illustrated in the fourth stage 620 of FIG. 6, the selected effects control is the effects control 184. Thus, the image editing application displays the effects controls 180 and 182, which overlap the selected effects control 184, at the location and position that is rotated approximately 90 degrees counter-clockwise about the UI item 190 from the selected effects control 184.

While FIG. 6 illustrates selecting a particular effects control of an effects tool, one of ordinary skill in the art will recognize that any of the effects controls of the effects tool may be selected after the effects tool is activated. For example, the user could have selected effects controls 180, 182, 186, or 188.

Figure 7:
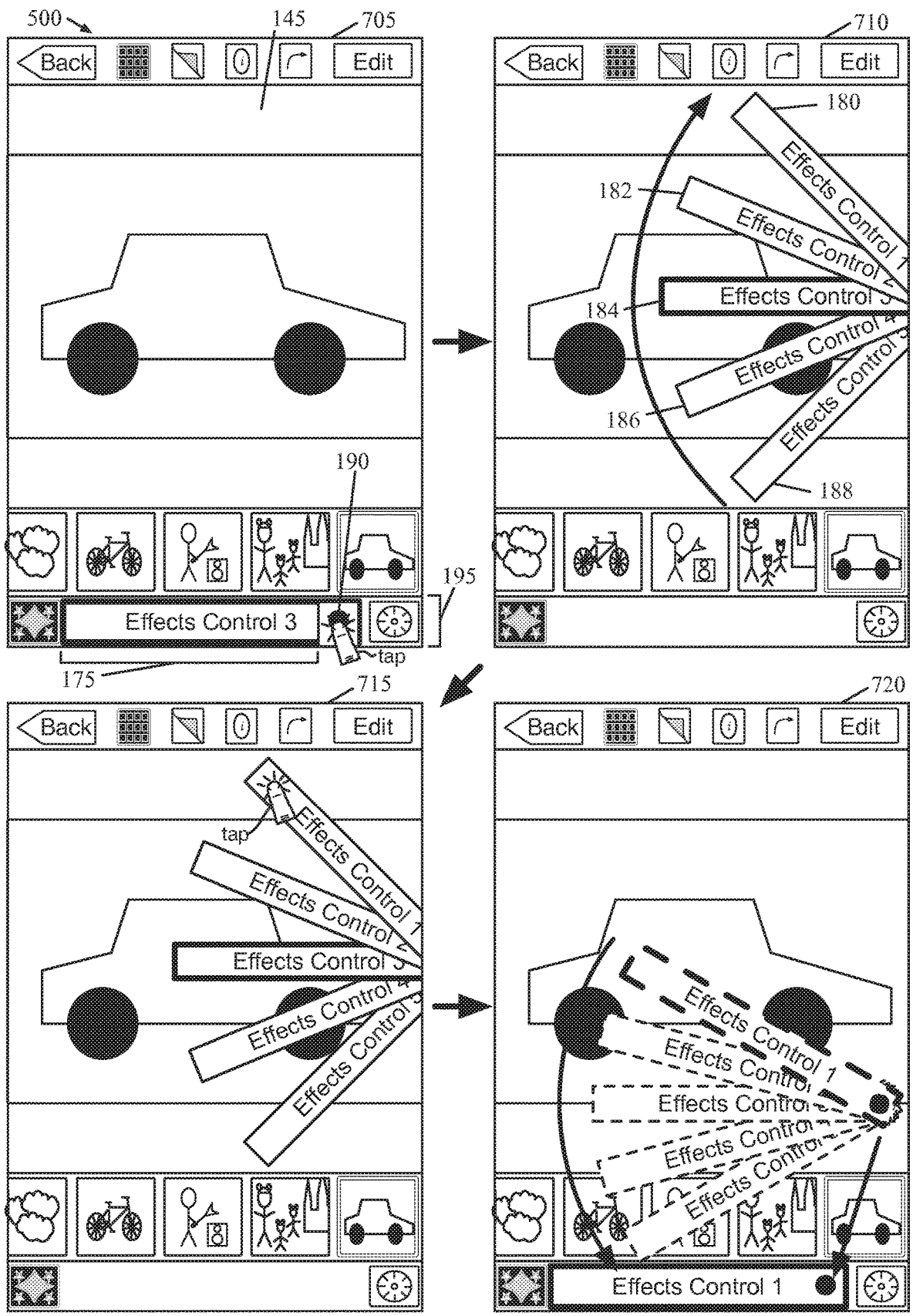
FIG. 7 conceptually illustrates changing the selected effects control of the effects tool illustrated in FIG. 5.

As mentioned above, after selecting an effects control of the effects tool, a user might want to change the selection of the effects control. FIG. 7 conceptually illustrates changing the selected effects control of the effects tool 175 illustrated in FIG. 5. Specifically, FIG. 7 illustrates the GUI 500 at four different stages 705-720 of an effects control change operation.

The first stage 705 of the GUI 500 is similar to the fourth stage 620 of the GUI 500 illustrated in FIG. 6. That is, the first stage 705 shows the GUI 500 after the effects control 184 is selected, the effects control 184 is highlighted with a bolded border, a fanning closed animation of the set of effects controls 180-188 has completed, and the selected effects control 184 is displayed over the toolbar 195. In addition, the first stage 705 illustrates the invocation of an operation for changing the selection of the effects control of the effects tool 175. As shown, a user is selecting the selectable UI item 190 (e.g., by touching the UI item 190) to invoke the operation for changing the selection of the effects control.

The second stage 710 illustrates the GUI 500 after the image editing application has finished a fanning open animation of the set of effects controls 180-188. When the application receives the selection of the UI item 190, the application displays a fanning open animation of the set of effects controls 180-188 that is similar to the fanning open animation described above by reference to FIG. 5. As shown, the effects control 184 remains highlighted because the effects control 184 is the current selected effects control of the effects tool 175.

In the third stage 715, the GUI 100 shows a selection of a different effects control of the effects tool 175. As shown, the user is selecting the effects control 180 (e.g., by touching the effects control 180). When the image editing application receives the selection of the effects control 180, the application removes the highlighting of the previously selected effects control 186, highlights the newly selected effects control 180, and displays a fanning closed animation of the set of effects controls 180-188 that is similar to the fanning closed animation of the set of effects controls 180-188 described above by reference to FIG. 2.

The fourth stage 720 illustrates the GUI 500 after the fanning closed animation of the set of effects controls 180-188 is finished and the selected effects control 180 is highlighted and displayed over the toolbar 195. Since none of the other effects controls (i.e., the effects controls 182-188) of the effects tool 175 overlap the selected effects control 180, the end positions of the effects controls 182-188 are the same as the end position of the selected effects control 180. Therefore, none of the effects controls appear to hang from the UI item 190.

FIG. 7 illustrates one example of changing the selected effects control of an effects tool. One of ordinary skill in the art will realize that any effects control of the effects tool may be selected when changing the selected effects control of the effects tool. Moreover, the selected effects control of the effects tool may be changed any number of different times.

FIGS. 5-7 show example layouts and animations of the effects controls 180-188 when the effects controls fan open and closed. In some embodiments, the layouts and animations of the effects controls 180-188 illustrated in FIGS. 5-7 are provided when the image editing application is in a right-hand mode that facilitates the use of a user's right hand to interact with the GUI 500 of the application. In some such embodiments, when the image editing application is in a left-hand mode, the application provides different layouts and animations of the effects controls 180-188 when the effects controls fan open and closed. For instance, in the left-hand mode of the application, the image editing application of some embodiments displays the fanning open animation in a similar manner as that shown in FIG. 5 except the effects controls starts near the lower left of the image display area 145 and fans open toward the upper right of the image display area 145 while the effects controls move from the left side of the image display area 145 to the center of the image display area 145. The left-hand mode of the application of such embodiments displays the fanning closed animation in a similar manner as that shown in FIG. 6 except the effects controls fan in towards the lower left of the image display area 145 while the effects controls move from near the center of the image display area 145 to the left side of the image display area 145. In some embodiments, the arrangement of the effects controls 180-188 illustrated in FIGS. 5-7 is provided when the image editing application is in a left-hand mode and the arrangement the effects controls 180-188 described above for the left-hand mode is instead provided when the application is in a right-hand mode. One of ordinary skill in the art will realize that any of the animations illustrated in the above-described FIGS. 1-7 may be used in any of the GUIs in the above-described FIGS. 1-7.

The FIGS. 1-7 described above show several techniques for fanning UI controls open and fanning UI controls closed. For instance, FIGS. 3 and 7 show selecting a UI item (the UI item 190 in those examples) to fan open the UI controls in order to select a different UI control and selecting a UI control to fan closed the UI controls. However, other techniques may be used to fan open and closed the UI controls in some embodiments. For example, the UI tool of some embodiments allows a user to perform a gesture (e.g., a swipe up gesture) on the selected UI control in order to fan open the UI controls. Similarly, in some embodiments, the UI tool allows the user to perform a gesture (e.g., a swipe down gesture) on the image display area in order to fan closed the UI controls when the UI controls are fanned open and the user does not want to select a different UI control (i.e., the user wants to keep the current selected UI control as selected). Other techniques are possible.

As noted above, each effects control of an effects tool of some embodiments is for applying a set of effects to an image being edited. Different embodiments of effects tools include different types of effects controls. The following FIGS. 8-11 will illustrate several examples of different effects tools that include different types of effects controls.

Figure 8:
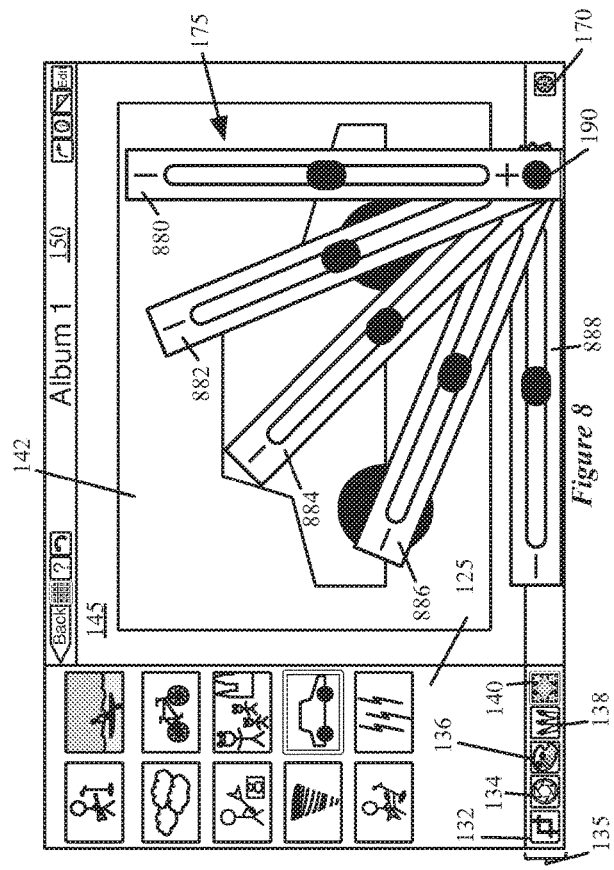
FIG. 8 conceptually illustrates an effects tool of some embodiments that includes one type of effects controls.

FIG. 8 conceptually illustrates the effects tool 175 of some embodiments that includes one type of effects controls. As shown, the effects tool 175 includes a set of slider controls 880-888. Each of the slider controls 880-888 includes a sliding region and a slider that is movable along an axis of the sliding region in order to adjust an effect associated with the slider control. In some embodiments, different positions of the slider along the sliding region indicate different extents of an effect associated with the slider control to apply to an image being edited.

Figure 9:
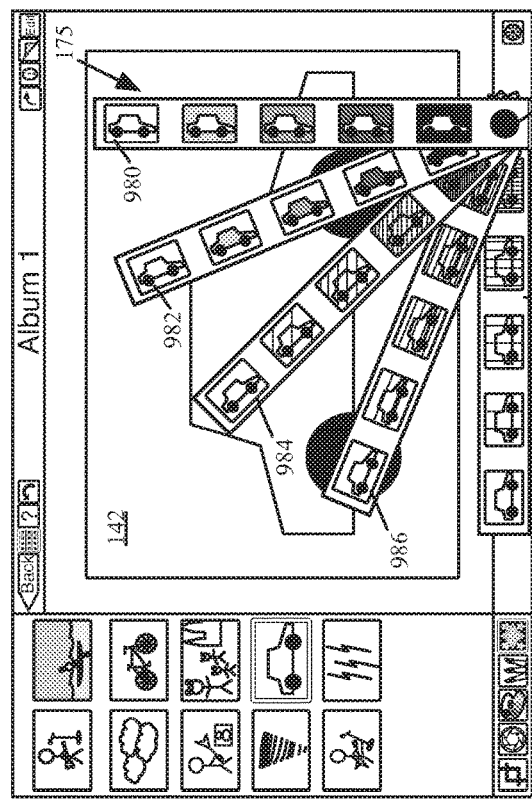
FIG. 9 conceptually illustrates an effects tool of some embodiments that includes another type of effects controls.

FIG. 9 conceptually illustrates the effects tool 175 of some embodiments that includes another type of effects controls. FIG. 9 illustrates that the effects tool 175 includes a set of thumbnail slider controls 980-988. Each of the thumbnail slider controls 980-988 includes a set of selectable UI items located at different positions along the thumbnail slider control. Each set of selectable UI items are for applying different extents of an effect associated with a thumbnail slider control to the image being edited (the image 142 in this example).

As shown, each UI item of a thumbnail slider control displays a thumbnail image of the image being edited (e.g., a small representation of a full-size version of the image being edited) and an extent of an effect associated with the thumbnail slider control applied to the thumbnail image. In this example, several of the effects are represented by different types of lines (vertical lines, horizontal lines, and diagonal lines). The more lines displayed on an image represents a greater extent of the effect that is applied to the image and the less lines displayed on the image represents a lesser extent of the effect that is applied to the image.

For instance, the thumbnail slider control 988 is for applying an effect that is represented by displaying vertical lines on an image. Each UI item of the thumbnail slider control 988 displays a thumbnail image of the image 142 and an extent of the effect associated with the thumbnail slider control 988 applied to the thumbnail image. The leftmost UI item of the thumbnail slider control 988 does not have any vertical lines displayed on its thumbnail image to indicate that a very small extent of the effect is applied to the thumbnail image of the leftmost UI item. The second leftmost UI item of the thumbnail slider control 988 has two vertical lines displayed on its thumbnail image to indicate that a small extent of the effect is applied to the thumbnail image of the second leftmost UI item. The middle UI item of the thumbnail slider control 988 has three vertical lines displayed on its thumbnail image to indicate that a medium extent of the effect is applied to the thumbnail image of the middle UI item. The second rightmost UI item of the thumbnail slider control 988 has six vertical lines displayed on its thumbnail image to indicate that a large extent of the effect is applied to the thumbnail image of the second rightmost UI item. The rightmost UI item of the thumbnail slider control 988 has eleven vertical lines displayed on its thumbnail image to indicate that a very large extent of the effect is applied to the thumbnail image of the rightmost UI item.

Figure 10:
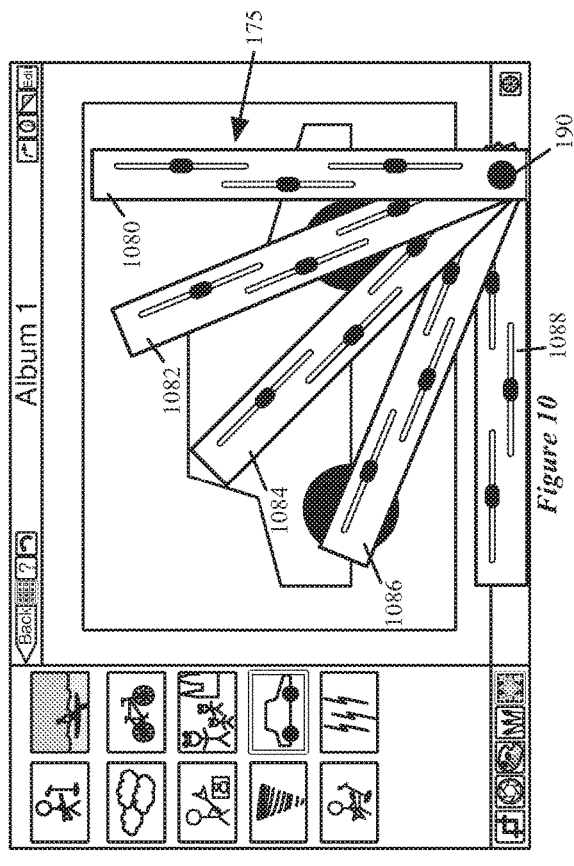
FIG. 10 conceptually illustrates an effects tool of some embodiments that includes another type of effects controls.

FIG. 10 conceptually illustrates the effects tool 175 of some embodiments that includes another type of effects controls. As shown, the effects tool 175 includes a set of multi-slider controls 1080-1088. Each of the multi-slider controls 1080-1088 includes a set of slider controls that are similar to the slider control describe above by reference to FIG. 8. In some embodiments, a multi-slider control is for applying one effect to an image being edited and each of the slider controls of the multi-slider control is for adjusting a different aspect of the effect associated with the multi-slider control. This way, the different aspects of an effect associated with a multi-slider control may be adjusted using a different slider control of the multi-slider control. In some embodiments, a multi-slider control is for applying several different effects to an image being edited and each of the slider controls of the multi-slider control is for adjusting a different effect associated with the multi-slider control.

Figure 11:
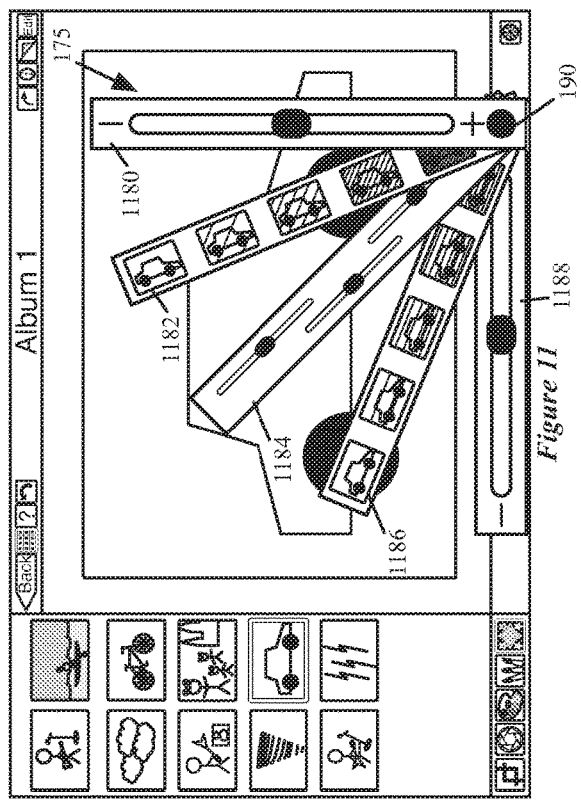
FIG. 11 conceptually illustrates an effects tool of some embodiments that includes several types of effects controls.

FIGS. 8-10 described above illustrate effects tool that include the same type of effects controls. In some embodiments, the effects tool includes several different types of effects controls. FIG. 11 conceptually illustrates an example of such an effects tool. As shown, FIG. 11 conceptually illustrates the effects tool 175 of some embodiments that includes a set of effects controls 1180-1188. In particular, the effects controls 1180 and 1188 are similar to the slider controls described above by reference to FIG. 8, the effects controls 1182 and 1186 are similar to the thumbnail slider controls described above by reference to FIG. 9, and the effects control 1184 is similar to the multi-slider controls described above by reference to FIG. 10.

Figure 12:
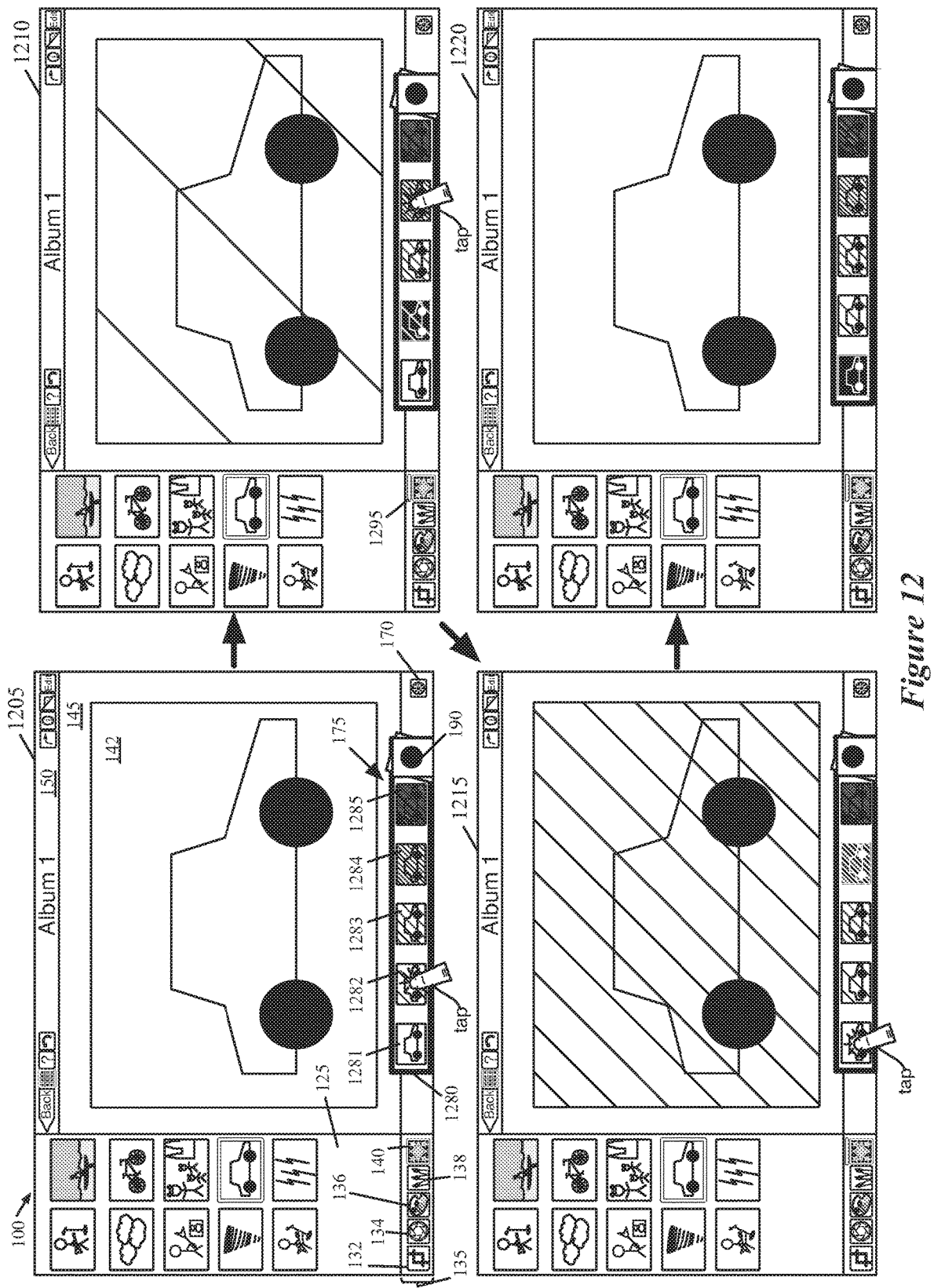
FIG. 12 conceptually illustrates a thumbnail slider control of some embodiments and using the thumbnail slider control to apply an effect to an image.

FIG. 12 conceptually illustrates a thumbnail slider control 1280 of some embodiments and using the thumbnail slider control 1280 to apply an effect to an image. Specifically, FIG. 12 illustrates the GUI 100 at four different stages 1205-1220 of an effect application operation.

The first stage 1205 of the GUI 100 is similar to the fourth stage 220 illustrated in FIG. 2 except the effects tool 175 in FIG. 12 includes a set of thumbnail slider controls. As shown, a user has activated the effects tool 175 (e.g., by selecting the UI item 140), as indicated by the highlighting of the effects item 140. Additionally, the user has selected a thumbnail slider control 1280 of the effects tool 175 (e.g., by touching the thumbnail slider control 1280 when the set of thumbnail slider controls of the effects tool 175 were fanned out).

The thumbnail slider control 1280 is similar to the thumbnail slider controls described above by reference to FIG. 9. That is, the thumbnail slider control 1280 includes a set of selectable UI items 1281-1285 located at different positions along the thumbnail slider control 1280. The set of selectable UI items 1281-1285 are for applying different extents of an effect associated with the thumbnail slider control 1280 to the image being edited (the image 142 in this example). As shown, each selectable UI item displays a thumbnail image of the image 142 and an extent of an effect associated with the thumbnail slider control 1280 applied to the thumbnail image. Each UI item is for applying the effect to the image 142 to the extent that the effect is applied to the UI item's thumbnail image. In this example, the effect associated with the thumbnail slider control 1280 is represented by diagonal lines that run from the lower left to the upper right. The more diagonal lines displayed on an image represents a greater extent of the effect that is applied to the image and the less diagonal lines displayed on the image represents a lesser extent of the effect that is applied to the image.

The second stage 1210 illustrates the GUI 100 after a selectable UI item of the thumbnail slider control 1280 is selected. Here, the user has selected the UI item 1282 to apply the effect associated with the thumbnail slider control 1280 to the image 142. The selection of the UI item 1282 is indicated by a highlighting of the UI item 1282. When the image editing application receives the selection of the UI item 1282, the application highlights the UI item 1282 and applies the effect to the image 142 to the extent that the effect is applied to the UI item 1282's thumbnail image. As shown in the second stage 1210, three diagonal lines are displayed on image 142, which is the same number of diagonal lines displayed on the thumbnail image of the UII item 1282, to indicate that the effect associated with the thumbnail slider control 1280 is applied to the image 142.

Some effects may be difficult to notice or an effect is applied to an image at a very small extent. To indicate that an effect is applied to an image, the image editing application of some embodiments displays an indicator (e.g., a highlight) above the effects tool UI item 140 when the application applies an effect to the image. As illustrated in the second stage 1210, such an indicator is displayed above the effects tool UI item 140 and represented by a thick white line with a black border. The application displays the indicator when the application receives the selection of the UI item 1282. In some embodiments, the application continues to display the indicator above the effects tool UI item 140 as long as one or more effects are applied to the image being edited (even if a different tool is activated).

The third stage 1215 illustrates the GUI 100 after the user has selected another selectable UI item of the thumbnail slider control 1280. In this stage, the user has selected the UI item 1284 (e.g., by touching the UI item 1284) to apply the effect associated with the thumbnail slider control 1280 to the image 142 in order to increase the extent that the effect is applied to the image 142. The selection of the UI item 1284 is indicated by a highlighting of the UI item 1284. When the image editing application receives the selection of the UI item 1284, the application highlights the UI item 1284, removes the highlighting of the UI item 1282, and applies the effect to the image 142 to the same extent that the effect is applied to the UI item 1284's thumbnail image. As shown in the third stage 1215, more diagonal lines are displayed on image 142 compared to the number of diagonal lines displayed on the image 142 in the second stage 1210 to indicate that a larger extent of the effect is applied to the image 142.

In the fourth stage 1220, the GUI 100 illustrates that the user has selected another selectable UI item of the thumbnail slider control 1280 to change the extent that the effect is applied to the image 142. In the fourth stage 1220, the user has selected the UI item 1281 (e.g., by touching the UI item 1281) to apply the effect associated with the thumbnail slider control 1280 to the image 142 in order to decrease the extent that the effect is applied to the image 142. The selection of the UI item 1281 is indicated by a highlighting of the UI item 1281. When the image editing application receives the selection of the UI item 1281, the application highlights the UI item 1281, removes the highlighting of the UI item 1284, and applies the effect to the image 142 to the same extent that the effect is applied to the UI item 1281's thumbnail image. As shown, no diagonal lines are displayed on image 142 to indicate that a smaller extent of the effect is applied to the image 142.

FIG. 12 illustrates a thumbnail slider control that includes a set of selectable UI items that, when selected, apply a set of defined extents of an effect to an image being edited. Such a thumbnail slider control may also be referred to as a discrete thumbnail slider control. In some embodiments, the application provides a thumbnail slider control for applying an effect to the image being edited with finer granularity. This thumbnail slider control may be referred to as a continuous thumbnail slider control.

Figure 13:
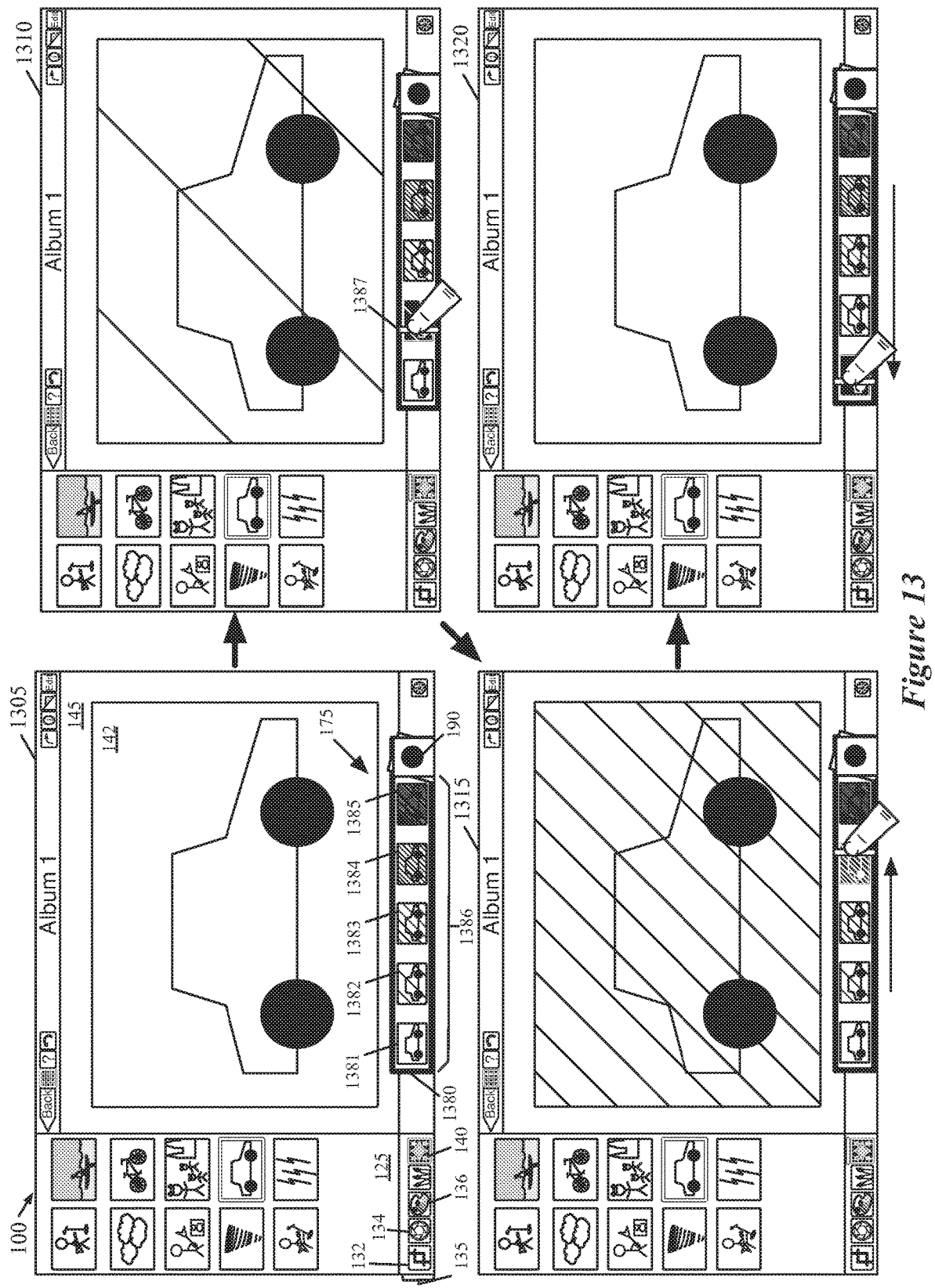
FIG. 13 conceptually illustrates a thumbnail slider control of some embodiments and using the thumbnail slider control to apply an effect to an image.

FIG. 13 conceptually illustrates a continuous thumbnail slider control 1380 of some embodiments and using the thumbnail slider control 1380 to apply an effect to an image.

In particular, FIG. 13 illustrates the GUI 100 at four different stages 1305-1320 of an effect application operation.

The first stage 1305 of the GUI 100 is similar to the fourth stage 220 illustrated in FIG. 2 except the effects tool 175 in FIG. 13 includes a set of thumbnail slider controls. As shown, a user has activated the effects tool 175 (e.g., by selecting the UI item 140), as indicated by the highlighting of the effects item 140. In addition, the user has selected a thumbnail slider control 1380 of the effects tool 175 (e.g., by touching the thumbnail slider control 1380 when the set of thumbnail slider controls of the effects tool 175 were fanned out).

As shown, the thumbnail slider control 1380 includes a selectable sliding region 1386 and a set of thumbnail images 1381-1385 located at different positions along the selectable sliding region 1386. The sliding region 1386 is for applying different extents of an effect associated with the thumbnail slider control 1380 to the image being edited (the image 142 in this example). Different locations along the horizontal axis of the sliding region 1386 are for applying different extents of the effect to the image being edited. For instance, in some embodiments, a first horizontal end of the sliding region 1386 corresponds to little or no effect applied to the image being edited, a second horizontal end of the sliding region 1386 corresponds to a full extent of the effect applied to the image being edited, and the incremental horizontal locations from the first end to the second end of the sliding region correspond to incremental extents of the effect applied to the image being edited. In this example, the left side of the selectable sliding region 1386 corresponds to no extent of the effect applied to the image being edited and the right side of the selectable sliding region 1386 corresponds to a full extent of the effect applied to the image being edited.

As shown, each of the thumbnail images 1381-1385 displays a thumbnail image of the image 142 and an extent of an effect associated with the thumbnail slider control 1380 applied to the thumbnail image. In this example, the location in the middle of each thumbnail image in the selectable sliding region 1386 corresponds to the extent of the effect that is applied to the thumbnail image. This way, the thumbnail images 1381-1385 provide the user with a visual indication of the extent that the effect will be applied to the image being edited when the user selects the middle of the thumbnails. Different embodiments use different locations in the selectable sliding region 1386 relative to the thumbnail images 1381-1385 to correspond to the extent of the effect that is applied to the thumbnail images. For instance, some embodiments may use the location near the left of each thumbnail image in the selectable sliding region 1386 to correspond to the extent of the effect that is applied to the thumbnail image.

The second stage 1310 illustrates the GUI 100 after a location on the sliding region 1386 of the thumbnail slider control 1380 is selected. Here, the user has selected a location near the thumbnail image 1382 to apply the effect associated with the thumbnail slider control 1380 to the image 142. When a location on the sliding region 1386 is select, the image editing application displays an indicator 1387 that indicates the selected location and highlights the thumbnail closest to the location. As shown, the user has selected a location near the thumbnail image 1382. When the application receives the selection of this location, the application highlights the thumbnail image 1382 and applies the effect to the image 142 to the extent that corresponds with the selected location. As shown in the second stage 1310, the extent of the effect applied to the image 142 is similar to the extent that the effect is applied to the thumbnail image 1382. In this example, since no effect is applied to the image 142 prior to the second stage 1310, the application displays an indicator above the effects tool UI item 140 when the application receives the selection of the thumbnail image 1382 to indicate that an effect is applied to the image 142.

The third stage 1315 illustrates the GUI 100 after the user has selected another location along the selectable sliding region 1386 of the thumbnail slider control 1380. In this stage, the user has selected a location on the sliding region 1386 to increase the extent that the effect is applied to the image 142. The user may select the location by continuing to touch the sliding region 1386 in the second stage 1310 and sliding along the sliding region 1386 to the location or by touching the location on the sliding region 1386.

The selection of the location shown in the third stage 1310 is indicated by a highlighting of the thumbnail image 1384, which is the thumbnail image closest to the location. In instances where the user selects the location by sliding a finger along the sliding region 1386, the application of some embodiments continues to display the indicator 1387 at the location that is selected. That is, as the finger is moving along the sliding region 1386, the application moves the location of the indicator 1387 along with the finger.

In some embodiments, the application continues to highlight the nearest thumbnail image in the sliding region 1386 while the user is sliding a finger along the sliding region 1386. Thus, the application of such embodiments highlights the thumbnail image 1383 and removes the highlighting of the thumbnail image 1382 when the location of the sliding finger is closer to the thumbnail image 1383 than the thumbnail image 1382. Similarly, the application highlights the thumbnail image 1384 and removes the highlighting of the thumbnail image 1383 when the location of the sliding finger is closer to the thumbnail image 1384 than the thumbnail image 1383.

The application of some embodiments applies the effect to the image 142 to the extent that corresponds with the selected location while the user is sliding the finger along the sliding region 1386. As shown in the third stage 1315, more diagonal lines are displayed on image 142 compared to the number of diagonal lines displayed on the image 142 in the second stage 1310 to indicate that a larger extent of the effect is applied to the image 142.

In the fourth stage 1320, the GUI 100 illustrates that the user has selected another location along the selectable sliding region 1386 to change the extent that the effect is applied to the image 142. In the fourth stage 1320, the user has selected a location on the sliding region 1386 to reduce the extent that the effect is applied to the image 142. The user may select this location by continuing to touch the sliding region 1386 in the third stage 1315 and sliding along the sliding region 1386 to the location or by touching the location on the sliding region 1386.

In some embodiments, the image editing application highlights the thumbnail images 1381-1385, displays the indicator 1387, and applies the effect to the image 142 in a similar manner described above in the third stage 13815. As shown in this stage, no diagonal lines are displayed on image 142 to indicate that a smaller extent of the effect is applied to the image 142.

FIGS. 12 and 13 illustrate examples of thumbnail slider controls for controlling a single effect that is applied to an image being edited. Details of single effects that may be implemented by a thumbnail slider control are described in U.S. patent application Ser. No. 13/629,549, entitled "Method and Interface for Converting Images to Grayscale";

and U.S. patent application Ser. No. 13/629,523, entitled "Multi Operation Slider". U.S. patent application Ser. Nos. 13/629,549 and 13/629,523, are herein incorporated by reference.

Figure 14:
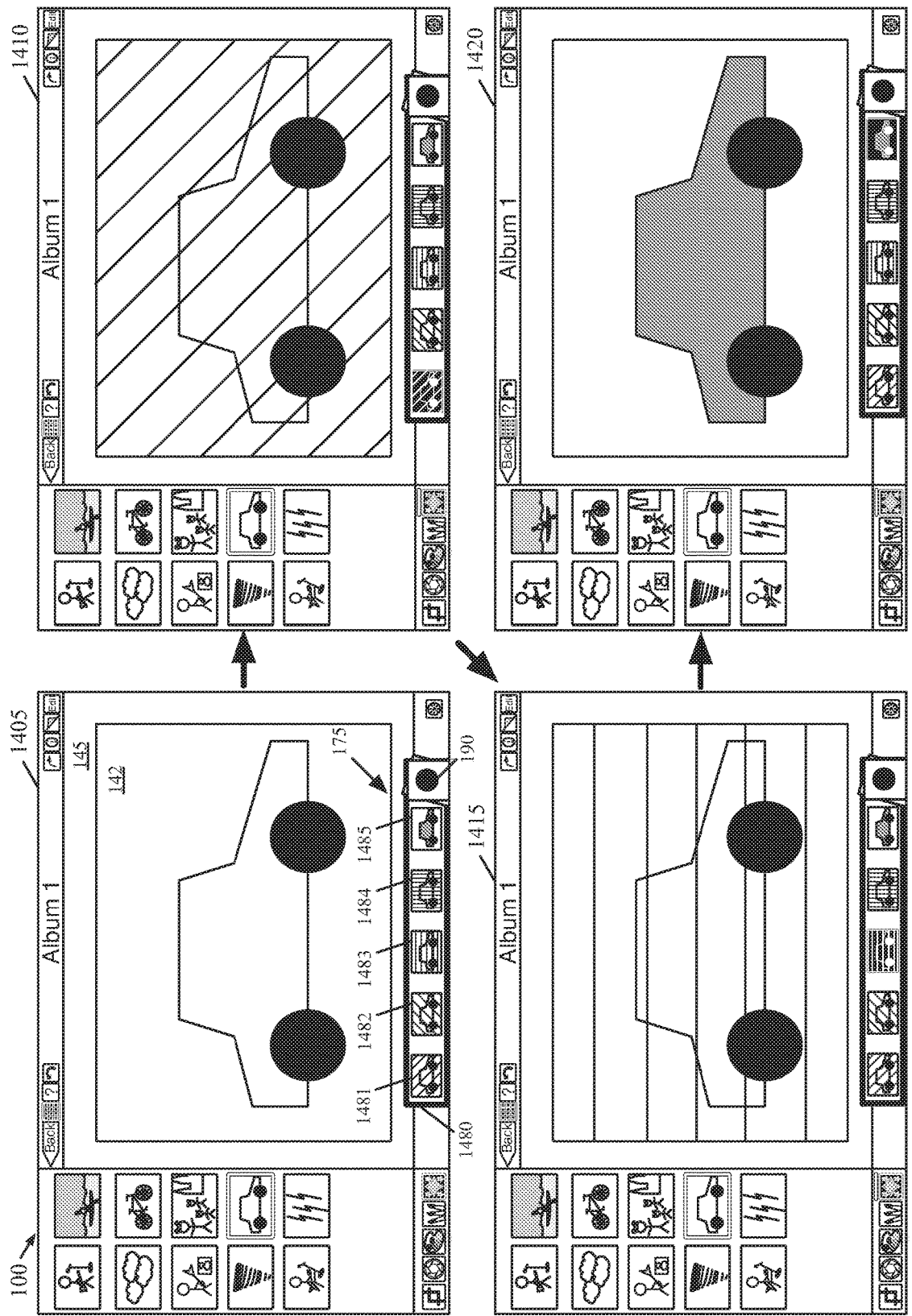
FIG. 14 conceptually illustrates a thumbnail slider control of some embodiments and using the thumbnail slider control to apply different effects to an image.

In some embodiments, the application provides a thumbnail slider control for applying several different effects to an image being edited. FIG. 14 conceptually illustrates a thumbnail slider control 1480 of some embodiments and using the thumbnail slider control 1480 to apply different effects to an image. Specifically, FIG. 14 illustrates the GUI 100 at four different stages 1405-1420 of several effect application operations.

The first stage 1405 of the GUI 100 is similar to the fourth stage 220 illustrated in FIG. 2 except the effects tool 175 in FIG. 14 includes a set of thumbnail slider controls. As shown, a user has activated the effects tool 175 (e.g., by selecting the UI item 140), as indicated by the highlighting of the effects item 140. In addition, the user has selected a thumbnail slider control 1480 of the effects tool 175 (e.g., by touching the thumbnail slider control 1480 when the set of thumbnail slider controls of the effects tool 175 were fanned out).

As shown in FIG. 14, the thumbnail slider control 1480 includes a set of selectable UI items 1481-1485 located at different positions along the thumbnail slider control 1480. The set of selectable UI items 1481-1485 are for applying different effects associated with the thumbnail slider control 1480 to the image being edited (the image 142 in this example). In this example, several of the different effects are represented by different types of lines (vertical lines, horizontal lines, left-to-right diagonal lines, and right-to-left diagonal lines in this example). As shown, each selectable UI item displays a thumbnail image of the image 142 and a different effect applied to the thumbnail image.

In some embodiments, the thumbnail slider control 1480 provides different effects of the same type. For instance, the thumbnail slider control 1480 of some embodiments provides different painting effects, different black and white effects, different color effects, etc. The thumbnail slider control 1480 provides different types of different effects, in some embodiments.

The second stage 1410 illustrates the GUI 100 after a selectable UI item of the thumbnail slider control 1480 is selected. Here, the user has selected the UI item 1481 to apply an effect that corresponds to the UI item 1481 to the image 142. The selection of the UI item 1481 is indicated by a highlighting of the UI item 1481. When the image editing application receives the selection of the UI item 1481, the application highlights the UI item 1481 and applies the effect that corresponds to the UI item 1481 to the image 142. In this example, since no effect is applied to the image 142 prior to the second stage 1410, the application displays an indicator above the effects tool UI item 140 when the application receives the selection of the UI item 1481 to indicate that an effect is applied to the image 142.

The third stage 1415 illustrates the GUI 100 after the user has selected another selectable UI item of the thumbnail slider control 1280. In this stage, the user has selected the UI item 1483 (e.g., by touching the UI item 1483) to apply a different effect associated with the thumbnail slider control 1280 to the image 142. The selection of the UI item 1483 is indicated by a highlighting of the UI item 1483. When the image editing application receives the selection of the UI item 1483, the application highlights the UI item 1483, removes the highlighting of the UI item 1481, and applies the effect that corresponds to the UI item 1483 to the image 142.

In the fourth stage 1420, the GUI 100 illustrates that the user has selected another selectable UI item of the thumbnail slider control 1480 to change the effect that is applied to the image 142. In the fourth stage 1420, the user has selected the UI item 1485 (e.g., by touching the UI item 1485) to apply the effect that corresponds to the UI item 1485 to the image 142. The selection of the UI item 1485 is indicated by a highlighting of the UI item 1485. When the image editing application receives the selection of the UI item 1485, the application highlights the UI item 1485, removes the highlighting of the UI item 1483, and applies the effect that corresponds to the UI item 1485 to the image 142.

Details of effects that may be implemented by a thumbnail slider control for applying different types of effects to an image are described in U.S. patent application Ser. No. 13/629,383, entitled "Overlaid User Interface Tools for Applying Effects to Image"; U.S. patent application Ser. No. 13/602,124, filed Sep. 1, 2012; and U.S. patent application Ser. No. 13/602,135, filed Sep. 1, 2012. U.S. patent application Ser. Nos. 13/629,383, 13/602,135 and 13/602,135 are hereby incorporated by reference.

Figure 15:
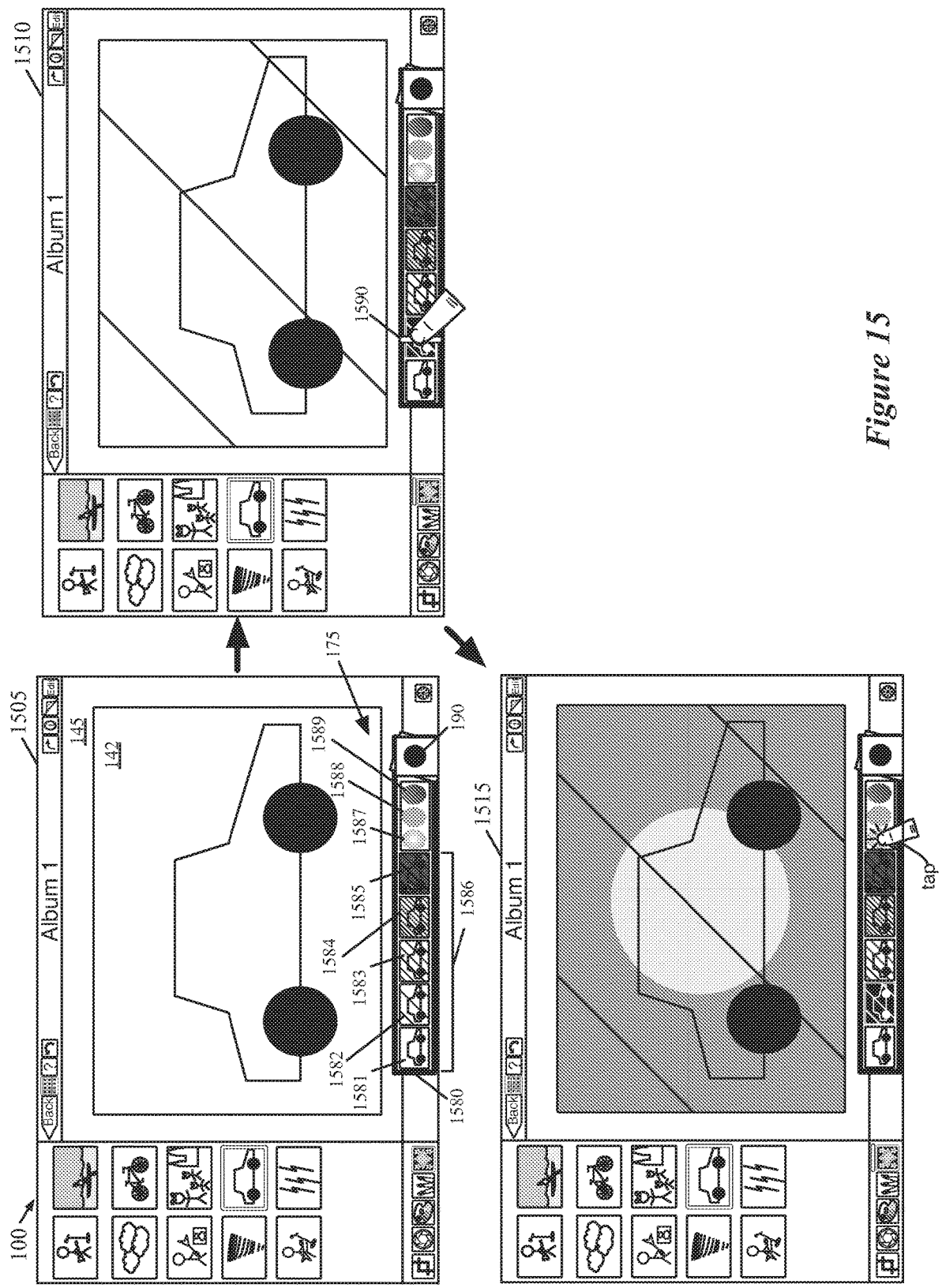
FIG. 15 conceptually illustrates a thumbnail slider control of some embodiments and using the thumbnail slider control to apply multiple effects to an image.

FIG. 15 conceptually illustrates a continuous thumbnail slider control 1580 of some embodiments and using the thumbnail slider control 1580 to multiple effects to an image. In particular, FIG. 15 illustrates the GUI 100 at three different stages 1505-1515 of applying multiple effects to an image being edited.

The first stage 1505 of the GUI 100 is similar to the fourth stage 220 illustrated in FIG. 2 except the effects tool 175 in FIG. 15 includes a set of thumbnail slider controls. As shown, a user has activated the effects tool 175 (e.g., by selecting the UI item 140), as indicated by the highlighting of the effects item 140. In addition, the user has selected a thumbnail slider control 1580 of the effects tool 175 (e.g., by touching the thumbnail slider control 1580 when the set of thumbnail slider controls of the effects tool 175 were fanned out).

As shown, the thumbnail slider control 1580 includes a selectable sliding region 1586, a set of thumbnail images 1581-1585 located at different positions along the selectable sliding region 1586, and a set of selectable UI items 1587-1589. The sliding region 1586 is for applying different extents of an effect associated with the thumbnail slider control 1580 to the image being edited (the image 142 in this example). Different locations along the horizontal axis of the sliding region 1586 are for applying different extents of the effect to the image being edited. For instance, in some embodiments, a first horizontal end of the sliding region 1586 corresponds to little or no effect applied to the image being edited, a second horizontal end of the sliding region 1586 corresponds to a full extent of the effect applied to the image being edited, and the incremental horizontal locations from the first end to the second end of the sliding region correspond to incremental extents of the effect applied to the image being edited. In this example, the left side of the selectable sliding region 1586 corresponds to no extent of the effect applied to the image being edited and the right side of the selectable sliding region 1586 corresponds to a full extent of the effect applied to the image being edited.

As shown, each of the thumbnail images 1581-1585 displays a thumbnail image of the image 142 and an extent of an effect associated with the thumbnail slider control 1580 applied to the thumbnail image. In this example, the location in the middle of each thumbnail image in the selectable sliding region 1586 corresponds to the extent of the effect that is applied to the thumbnail image. This way, the thumbnail images 1581-1585 provide the user with a visual indication of the extent that the effect will be applied to the image being edited when the user selects the middle of the thumbnails. Different embodiments use different locations in the selectable sliding region 1586 relative to the thumbnail images 1581-1585 to correspond to the extent of the effect that is applied to the thumbnail images. For instance, some embodiments may use the location near the left of each thumbnail image in the selectable sliding region 1586 to correspond to the extent of the effect that is applied to the thumbnail image.

The set of selectable UI items 1587-1589 are for applying different effects to the image being edited after an effect is applied to the image using the sliding region 1586. In some embodiment, set of selectable UI items 1587-1589 may be used to apply the different effects to the image without having applied effects to the image using the sliding region 1586. Examples of effects include a vignette effect, a sepia effect, a grain effect, or any other effect for modifying the appearance of the image. While first stage 1505 shows the GUI 100 displaying the set of UI items 1587-1589, the application of some embodiments provides the UI items 1587-1589 after an effect has been applied using the sliding region 1586.

The second stage 1510 illustrates the GUI 100 after a location on the sliding region 1586 of the thumbnail slider control 1580 is selected. Here, the user has selected a location near the thumbnail image 1582 to apply the effect associated with the thumbnail slider control 1580 to the image 142. When a location of the sliding region 1586 is select, the image editing application displays an indicator 1590 that indicates the selected location and highlights the thumbnail closest to the location. As shown, the user has selected a location near the thumbnail image 1582. When the application receives the selection of this location, the application highlights the thumbnail image 1582 and applies the effect to the image 142 to the extent that corresponds with the selected location. As shown in the second stage 1510, the extent of the effect applied to the image 142 is similar to the extent that the effect is applied to the thumbnail image 1582. In this example, since no effect is applied to the image 142 prior to the second stage 1510, the application displays an indicator above the effects tool UI item 140 when the application receives the selection of the thumbnail image 1582 to indicate that an effect is applied to the image 142.

The third stage 1515 of the GUI 100 illustrates that the user has selected one of the selectable UI items for applying and additional effect to the image begin edited. As shown, the user has selected the UI item 1587 (e.g., by touching the UI item 1587) to apply a vignette effect to the image 142. The third stage 1515 also shows that the vignette effect applied to the image as indicated by a darkening of the area around the border of the image 142.

Although FIGS. 12-15 illustrate several examples of thumbnail slider controls with thumbnails of an image being edited positioned in a straight line along the thumbnail slider control, different embodiments position the thumbnails along the thumbnail slider control differently. For instance, the thumbnail slider control of some embodiments has thumbnails of an imaged being edited positioned in a curved manner along the thumbnail slider control. As another example, thumbnails of the image being edited may be positioned in a staggered fashion along the thumbnail slider control of some embodiments (e.g., some thumbnails staggered up and some thumbnails staggered down). Many other ways of positioning thumbnails along a thumbnail slider controls are possible in other embodiments.

The above-described FIGS. 13 and 15 illustrate examples of a continuous thumbnail slider control. Those examples show an indicator that indicates the selected location and a highlighting of the thumbnail closest to the location indicated by the indicator. Different embodiments use different techniques for highlighting the selected location. For example, alternatively or in conjunction with highlighting the closest thumbnail, the image editing application of some embodiments highlights the indicator. Other techniques for indicating the selected location are possible.

Figure 16:
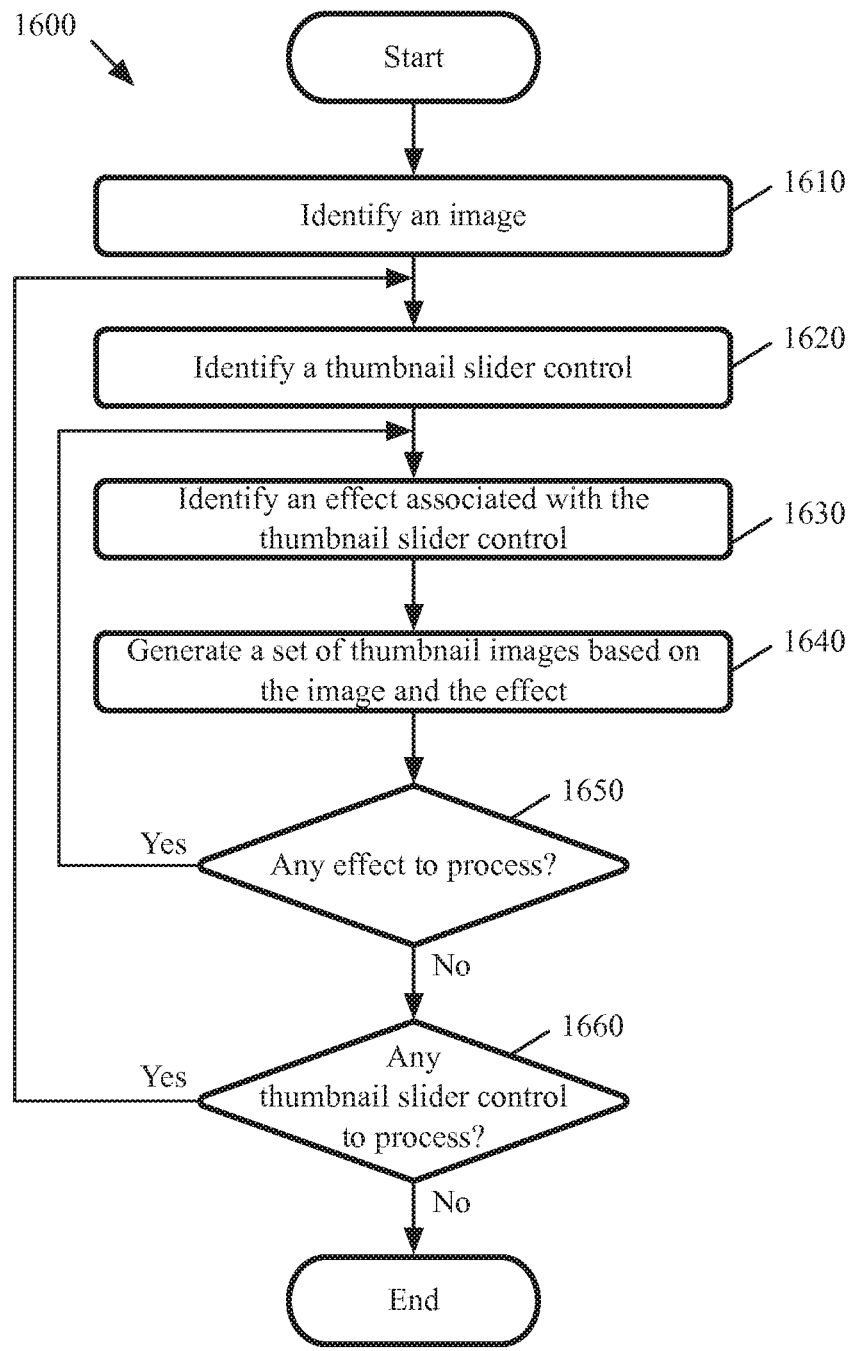
FIG. 16 conceptually illustrates a process of some embodiments for generating thumbnails for thumbnail slider controls of an effects tool.

FIG. 16 conceptually illustrates a process 1600 of some embodiments for generating thumbnails for thumbnail slider controls of an effects tool. In some embodiments, the process 1600 is performed when an effects tool is activated (e.g., as shown in the first stages illustrated in FIGS. 1 and 5). The process 1600 of some embodiments is performed when the effects tool is active and a different image is selected for editing (e.g., an image selected from the thumbnail display area 125).

The process 1600 begins by identifying (at 1610) an image from which to generate thumbnails. In some embodiments, the process 1600 identifies the image that is being edited. Referring to FIG. 9 as an example, the process 1600 identifies the image 142 since the image 142 is the image being edited (i.e., the image 142 is the image that is displayed in the image display area 145).

Next, the process 1600 identifies (at 1620) a thumbnail slider control of an effects tool. Continuing with the example shown in FIG. 9, the process 1600 identifies one of the thumbnail slider controls 980-988 of the effects tool 175.

The process 1600 then identifies (at 1630) an effect associated with the identified thumbnail slider control. Different effects may be associated with the thumbnail slider control. Examples of different effects include a black and white effect, a sepia effect, a duotone effect, a gradient effect, a vignette effect, a tilt-shift effect, or any other effect that can be applied to an image.

Next, the process 1600 generates (at 1640) a set of thumbnail images based on the identified image and the identified effect. As described above, the thumbnail slider control of some embodiments is for controlling different extents of a single effect that is applied to an image being edited. In such embodiments, the process 1600 generates a set of thumbnail images of the identified image with different extents of the identified effect applied to different thumbnail images.

As noted above, in some embodiments, the thumbnail slider control is for applying several different effects to an image being edited. In these embodiments, the process 1600 generates a thumbnail image of the identified image with the one of the different effects applied to the thumbnail image.

After generating the set of thumbnails, the process 1600 determines (at 1650) whether any effect is left to process. When the process 1600 determines that there is an effect left to process, the process 1600 returns to 1630 to continue generating thumbnails for any remaining effects of the identified thumbnail slider control. For instance, in cases where the thumbnail slider control is for applying several different effects to an image being edited, the process 1600 performs 1630 and 1640 for each of the different effects associated with the thumbnail slider control. When the process 1600 determines that there is no effect left to process, the process 1600 proceeds to 1660.

At 1660, the process 1600 determines whether any thumbnail slider control is left to process. When the process 1600 determines that there is a thumbnail slider control left to process, the process 1600 returns to 1620 to continue generating thumbnails for any remaining thumbnail slider controls of the effects tool. Referring to FIG. 9 as an example, the process 1600 performs 1620-1650 for each of the thumbnail slider controls 980-988. When the process 1600 determines that there is no thumbnail slider control left to process, the process 1600 ends.

Figure 17:
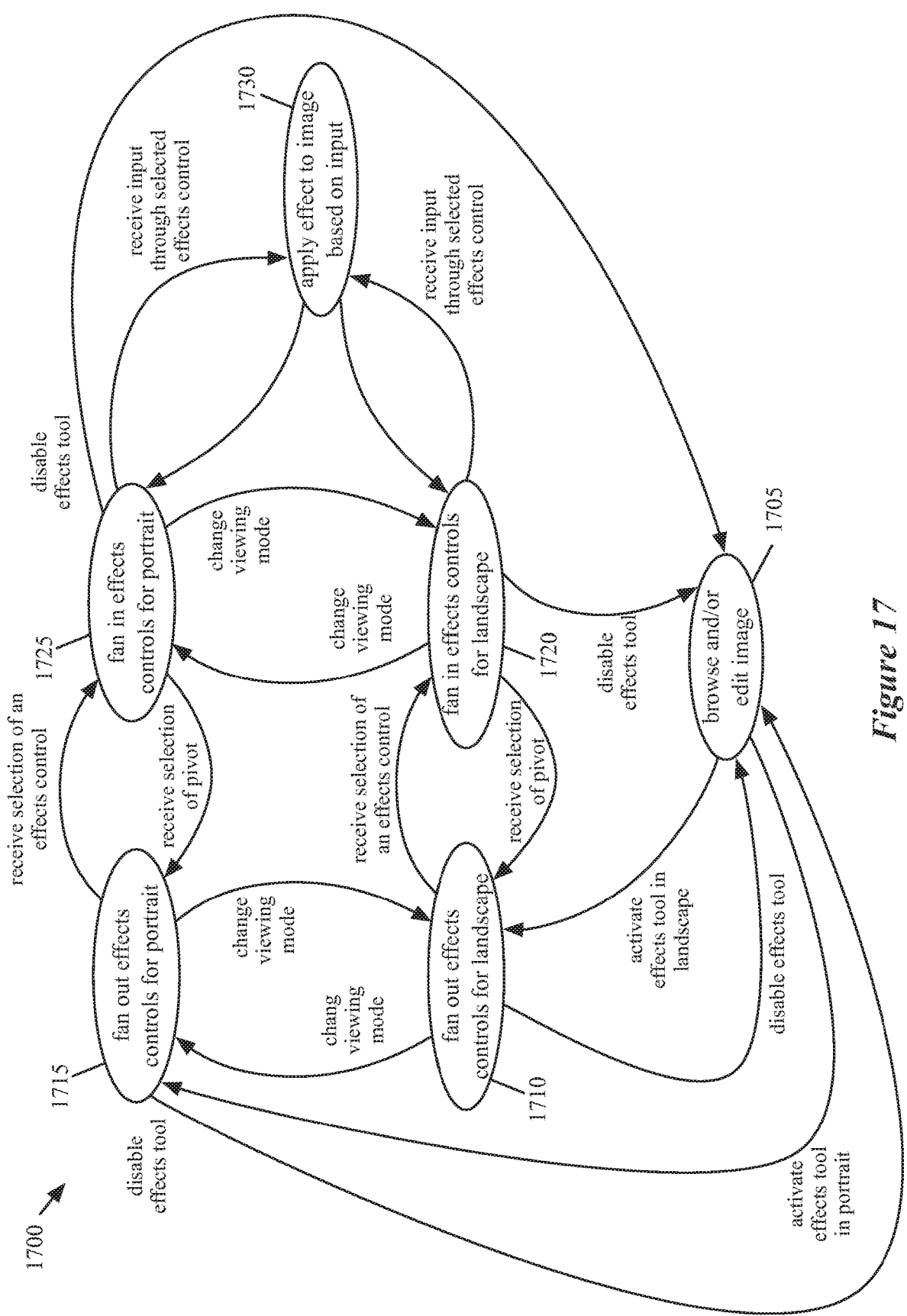
FIG. 17 conceptually illustrates a state diagram of an application of some embodiments that provides an effects tool.

FIG. 17 conceptually illustrates a state diagram 1700 of an application of some embodiments that provides the effects tool 175. Specifically, FIG. 17 illustrates several states of the application of some embodiments and transitions between these states.

At state 1705, the application is in an image editing, viewing, or organizing state. In some embodiments, the application begins in the state 1705 when the application is first started. When the application is in the state 1705, the application is providing tools for editing, viewing, or organizing images. For example, the application may be providing sharing tools for sharing images, providing various editing tools (e.g., a crop and rotate tool, an exposure tool, a color tool, etc.), providing tools for tagging images, etc.

When the application activates the effects tool 175 while the application is in a landscape-viewing mode, the application transitions from state 1705 to state 1710. When the application activates the effects tool 175 while the application is in a portrait-viewing mode, the application transitions from state 1705 to state 1715. In some cases, when the application activates the effects tool 175, the application returns to the last used state. In some such cases, the application transitions from state 1705 to state 1720 if the application is in a landscape-viewing mode and transitions from state 1705 to state 1725 if the application is in a portrait-viewing mode (not shown in FIG. 17). As shown in FIG. 17, when the application is in any of the states 1710-1725 and the application disables the effects tool 175 (e.g., by activating another tool), the application returns to state 1705.

At state 1710, the application is in a landscape-viewing mode and provides a GUI for displaying the effects controls of the effects tool 175 in a fanned open layout. For instance, the application of some embodiments provides the GUI illustrated in the fourth stage 120 of FIG. 1 when in state 1710.

When the application changes to state 1710 (e.g., from state 1715 or state 1720), the application displays a fanning open animation of the effects controls of the effects tool 175. In some embodiments, the application displays the fanning open animation similar to the animation described above by reference to FIG. 1.

If an effects control of the effects tool 175 is selected when the application transitions to state 1710 (e.g., the application transitioned from state 1720), the application continues to highlight the selected effects control while in state 1710. When the application is in state 1710 and the application receives a selection of an effects control of the effects tool 175, the application transitions to state 1720. When the application is in state 1710 and the application changes from a landscape-viewing mode to a portrait-viewing mode, the application transitions to state 1715. For example, when the orientation of the display screen of a mobile computing device on which the application is running is changed, the application of some embodiments changes from a landscape-viewing mode to a portrait-viewing mode and then transitions to state 1715. As another example, when a display area for displaying the GUI of the application is adjusted (e.g., adjusting the size of the display area, decreasing the width of the display area, increasing the height of the display area, etc.), the application of some embodiments changes from a landscape-viewing mode to a portrait-viewing mode and then transitions to state 1715.

At state 1720, the application is in a landscape-viewing mode and provides a GUI for displaying the effects controls of the effects tool 175 in a fanned open layout. For instance, the application of some embodiments provides the GUI illustrated in the fourth stage 220 of FIG. 2 when in state 1710.

When the application changes to state 1720 from state 1710, the application displays a fanning closed animation of the effects controls of the effects tool 175. In some embodiments, the application displays the fanning closed animation similar to the animation described above by reference to FIG. 2. When the application transitions to state 1720, the application highlights the selected effects control of the effects tool 175.

When the application is in state 1720 and the application receives a selection of a UI item (e.g., the UI item 190) for fanning open the effects controls of the effects tool 175, the application transitions to state 1710. When the application is in state 1720 and the application changes from a landscape-viewing mode to a portrait-viewing mode, the application transitions to state 1725. For example, when the orientation of the display screen of a mobile computing device on which the application is running is changed, the application of some embodiments changes from a landscape-viewing mode to a portrait-viewing mode and then transitions to state 1725. As another example, when a display area for displaying the GUI of the application is adjusted (e.g., adjusting the size of the display area, decreasing the width of the display area, increasing the height of the display area, etc.), the application of some embodiments changes from a landscape-viewing mode to a portrait-viewing mode and then transitions to state 1725.

When the application is in state 1720 and the application receives input (e.g., touch input) through the selected effects control of the effects tool 175, the application transitions to state 1730. Referring to FIG. 12 as an example, when the application is in state 1720, the application might receive a selection of a selectable UI item of the thumbnail slider control 1280 to apply an extent of an effect associated with the thumbnail slider control 1280 to the image being edited. Referring to FIG. 13 as another example, when the application is in state 1720, the application might receive a sliding gesture through the selectable sliding region 1386 of the thumbnail slider control 1380 in order to apply an extent of an effect associated with the thumbnail slider control 1380 to the image being edited.

At state 1715, the application is in a portrait-viewing mode and provides a GUI for displaying the effects controls of the effects tool 175 in a fanned open layout. For instance, the application of some embodiments provides the GUI illustrated in the fourth stage 520 of FIG. 5 when in state 1715.

When the application changes to state 1715 (e.g., from state 1710 or state 1725), the application displays a fanning open animation of the effects controls of the effects tool 175. In some embodiments, the application displays the fanning open animation similar to the animation described above by reference to FIG. 5.

If an effects control of the effects tool 175 is selected when the application transitions to state 1715 (e.g., the application transitioned from state 1725), the application continues to highlight the selected effects control while in state 1715. When the application is in state 1715 and the application receives a selection of an effects control of the effects tool 175, the application transitions to state 1725. When the application is in state 1715 and the application changes the viewing mode from a portrait-viewing mode to a landscape-viewing mode, the application transitions to state 1710. For example, when the orientation of the display screen of a mobile computing device on which the application is running is changed, the application of some embodiments changes from a portrait-viewing mode to a landscape-viewing mode and then transitions to state 1710. As another example, when a display area for displaying the GUI of the application is adjusted (e.g., adjusting the size of the display area, increasing the width of the display area, decreasing the height of the display area, etc.), the application of some embodiments changes from a portrait-viewing mode to a landscape-viewing mode and then transitions to state 1710.

At state 1725, the application is in a portrait-viewing mode and provides a GUI for displaying the effects controls of the effects tool 175 in a fanned open layout. For instance, the application of some embodiments provides the GUI illustrated in the fourth stage 620 of FIG. 6 when in state 1725.

When the application changes to state 1725 from state 1715, the application displays a fanning closed animation of the effects controls of the effects tool 175. In some embodiments, the application displays the fanning closed animation similar to the animation described above by reference to FIG. 6. When the application transitions to state 1725, the application highlights the selected effects control of the effects tool 175.

When the application is in state 1725 and the application receives a selection of a UI item (e.g., the UI item 190) for fanning open the effects controls of the effects tool 175, the application transitions to state 1715. When the application is in state 1725 and the application changes from a portrait-viewing mode to a landscape-viewing mode, the application transitions to state 1720. For example, when the orientation of the display screen of a mobile computing device on which the application is running is changed, the application of some embodiments changes from a portrait-viewing mode to a landscape-viewing mode and then transitions to state 1720. As another example, when a display area for displaying the GUI of the application is adjusted (e.g., adjusting the size of the display area, increasing the width of the display area, decreasing the height of the display area, etc.), the application of some embodiments changes from a portrait-viewing mode to a landscape-viewing mode and then transitions to state 1720.

When the application is in state 1725 and the application receives input (e.g., touch input) through the selected effects control of the effects tool 175, the application transitions to state 1730. Referring to FIG. 12 as an example, when the application is in state 1725, the application might receive a selection of a selectable UI item of the thumbnail slider control 1280 to apply an extent of an effect associated with the thumbnail slider control 1280 to the image being edited. Referring to FIG. 13 as another example, when the application is in state 1720, the application might receive a sliding gesture through the selectable sliding region 1386 of the thumbnail slider control 1380 in order to apply an extent of an effect associated with the thumbnail slider control 1380 to the image being edited.

At state 1730, the application applies an effect to the image being edited based on input received through the selected effects control of the effects tool 175. For instance, referring to FIG. 12, if the application receives a selection of a UI item through the thumbnail slider control 1280 in state 1720 or state 1725, the application, in state 1730, applies the effect associated with the thumbnail slider control 1280 to the image being edited to an extent of the effect that corresponds to the selected UI item. As another example, referring to FIG. 13, when the application is in state 1720 or state 1725 and the application receives a selection of a location along the selectable sliding region 1386 of the thumbnail slider control 1380, the application, in state 1730, applies the effect associated with the thumbnail slider control 1380 to the image being edited to an extent that corresponds to the selected location along the sliding region 1386. After applying the effect based on the received input through the selected effects control of the effects tool 175, the application transitions back to the state from which the application transitioned to state 1730. In other words, the application transitions back to state 1720 when the application transitions to state 1730 from state 1720 and the application transitions back to state 1725 when the application transitions to state 1730 from state 1725.

The state diagram illustrated in FIG. 17 shows several different states of the image editing application of some embodiments. One of ordinary skill in the art will recognize that the various actions represented by the states and transitions in FIG. 17 are only a subset of the possible actions that can be performed in the application, in some embodiments. Additionally, other functions that are not shown may be performed while in a particular state. For instance, in some embodiments, when the image editing application is in fanned closed state (e.g., state 1720 or state 1725) and the application receives input to apply an effect to the image being edited that does not yet have any effects applied to the image, the application displays an indicator above the effects tool UI item 140 to indicate that an effect is applied to the image being edited.

B. Brushes Tool

The above Sub-section A illustrates examples and embodiments of UI tool for applying effects to an image. The following Sub-section B will illustrate examples and embodiments of a UI tool for applying brush effects to an image.

Figure 18:
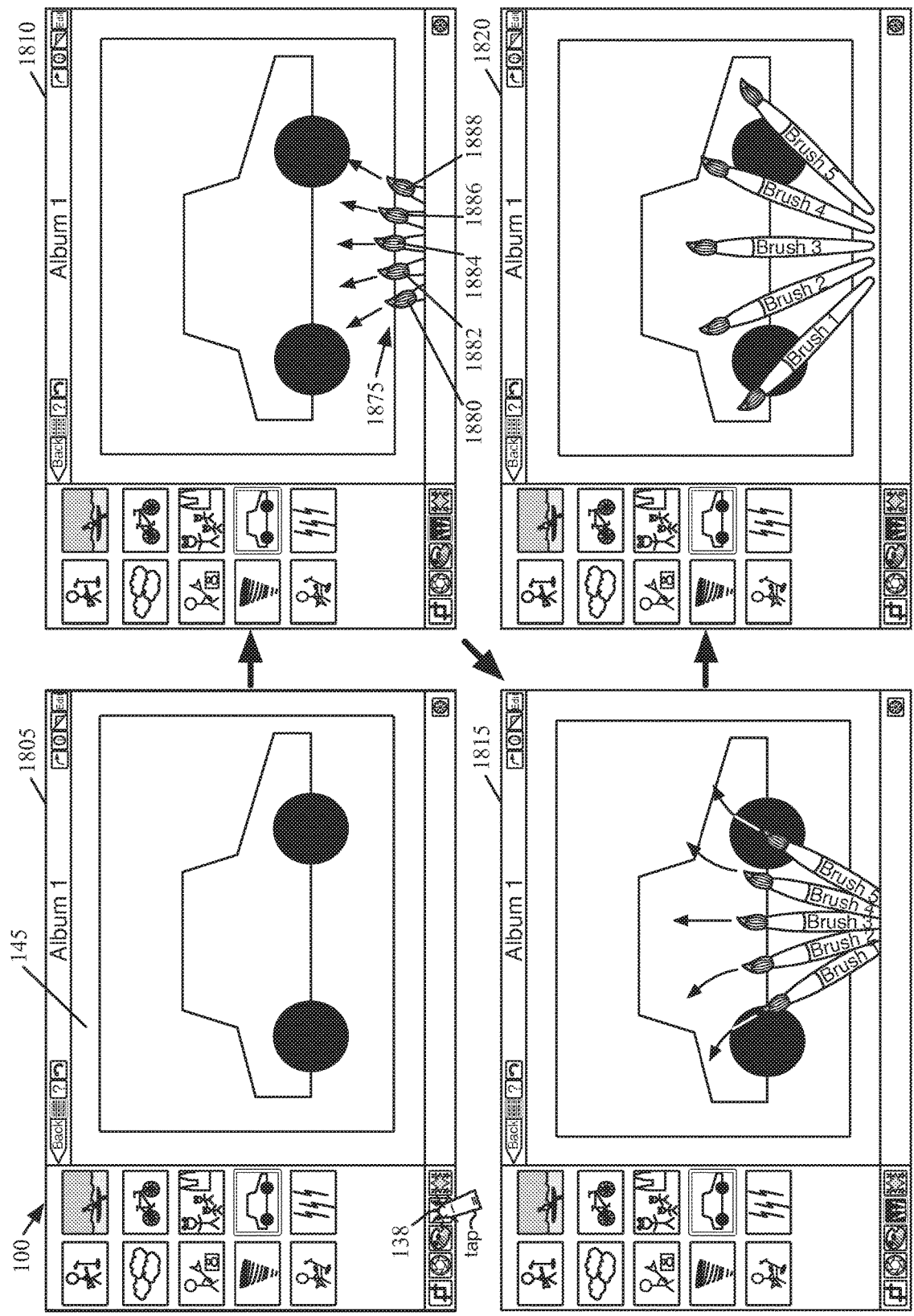
FIG. 18 conceptually illustrates a GUI that includes a brushes tool of some embodiments and the activation of the brushes tool.

FIG. 18 conceptually illustrates the GUI 100 that includes a brushes tool 1875 of some embodiments and the activation of the brushes tool 1875. Specifically, FIG. 18 illustrates the GUI 100 at four different stages 1805-1820 of a brushes tool activation operation.

The first stage 1805 of the GUI 100 shows the activation of the brushes tool 1875. As shown, a user is selecting the brushes tool UI item 138 (e.g., by touching the UI item 138) to activate the brushes tool 1875.

The second stage 1810 illustrates the GUI 100 after the brushes tool 1875 is activated. As shown, the GUI 100 is displaying the start of the fanning open animation of brush controls of the brushes tool 1875 and the UI item 138 is highlighted. As shown, the brushes tool 1875 includes a set of brush controls 1880-1888. Each of the brush controls 1880-1888 is for applying a set of brush effects to an image being edited (the image 142 in this example).

When the image editing application receives the selection of the brushes tool UI item 138, the application highlights the UI item 138 and starts displaying the fanning open animation of the set of brush controls 1880-1888. In this example, the brush controls 1880-1888 start the fanning open animation at the bottom of the image display area 145 from a same vertical position and location, and slide from the bottom of the image display area 145 towards the center of the image display area 145 while fanning open. As shown, the brush controls 1880-1888 are slightly fanned opened from the vertical position and location.

The image editing application displays the fanning open animation of the brush controls 1880-1888 by displaying rotations of different brush controls by different amounts about a fixed location. As shown, the brush controls 1880 and 1882 rotate about the fixed location towards the left in a counter-clockwise direction, with the brush control 1880 fanned out more than the brush control 1882. The brush controls 1886 and 1888 rotate about the fixed location towards the right in a clockwise manner, with the brush control 1888 fanned out more than the brush control 1886. The brush control 1884 does not rotate at all.

In some embodiments, the image editing application displays the fanning open animation of the brush controls 1880-1888 by displaying, for a defined interval of time, rotations of different brush controls about the fixed location at different speeds from the starting position and location. The brush controls 1880 and 1888 rotate at the same speed about the fixed location, and the brush controls 1882 and 1886 rotate at the same speed about the fixed location. The brush controls 1880 and 1888 rotate at a faster speed than the brush controls 1882 and 1886.

The image editing application of some embodiments displays the fanning open animation of the brush controls 1880-1888 by displaying rotations of the brush controls about the fixed location at the same speed from the starting position and location. To display a fanning open animation with the brush controls 1880-1888 moving at the same speed, the image editing application starts moving different brush controls at different times (e.g., start moving a particular brush control after a defined amount of time). Under this approach, the application starts moving the brush controls 1880 and 1888 and then starts moving the brush controls 1882 and 1886 at a later instance in time.

The third stage 1815 illustrates the GUI 100 near the end of the fanning open animation of the brush controls 1880-1888 of the brushes tool 1875. As shown, the brush controls 1880-1888 are fanned open from the center more than the position of the brush controls 1880-1888 illustrated in the second stage 1810. Additionally, the brush controls 1880-1888 have slid farther up from the bottom of the image display area 145 compared to the position of the brush controls 1880-1888 shown in the second stage 1810. That is, between the second stage 1810 and the third stage 1815, the image editing application fans the brush controls 1880-1888 farther open while sliding the brush controls 1880-1888 farther up from the bottom of the image display area 145 towards the center of the image display area 145.

The fourth stage 1820 shows the GUI 100 after the completion of the fanning open animation of the brush controls 1880-1888. As shown, the brush controls 1880-1888 are fanned open from the center more than the position of the brush controls 1880-1888 illustrated in the third stage 1815. Also, the brush controls 1880-1888 have slid farther up from the bottom of the image display area 145 compared to the position of the brush controls 1880-1888 shown in the third stage 1815. That is, between the third stage 1815 and the fourth stage 1820, the image editing application fans the brush controls 1880-1888 farther open while sliding the brush controls 1880-1888 farther up from the bottom of the image display area 145 towards the center of the image display area 145.

FIG. 18 illustrates an example of a fanning open animation of the brush controls of a brushes tool when the brushes tool is activated. In some embodiments, the image editing application does not display a fanning open animation of the brush controls of the brushes tool when the brushes tool is activated. Instead, the application of some such embodiments displays the last state (e.g., the most recent state) of the brushes tool. For instance, the image editing application might display the selected brush control in a manner similar to the fourth stage 1920, which is described below by reference to FIG. 19, when the brushes tool is activated and a brush controls of the brushes tool is selected in the last state of the brushes tool.

Figure 19:
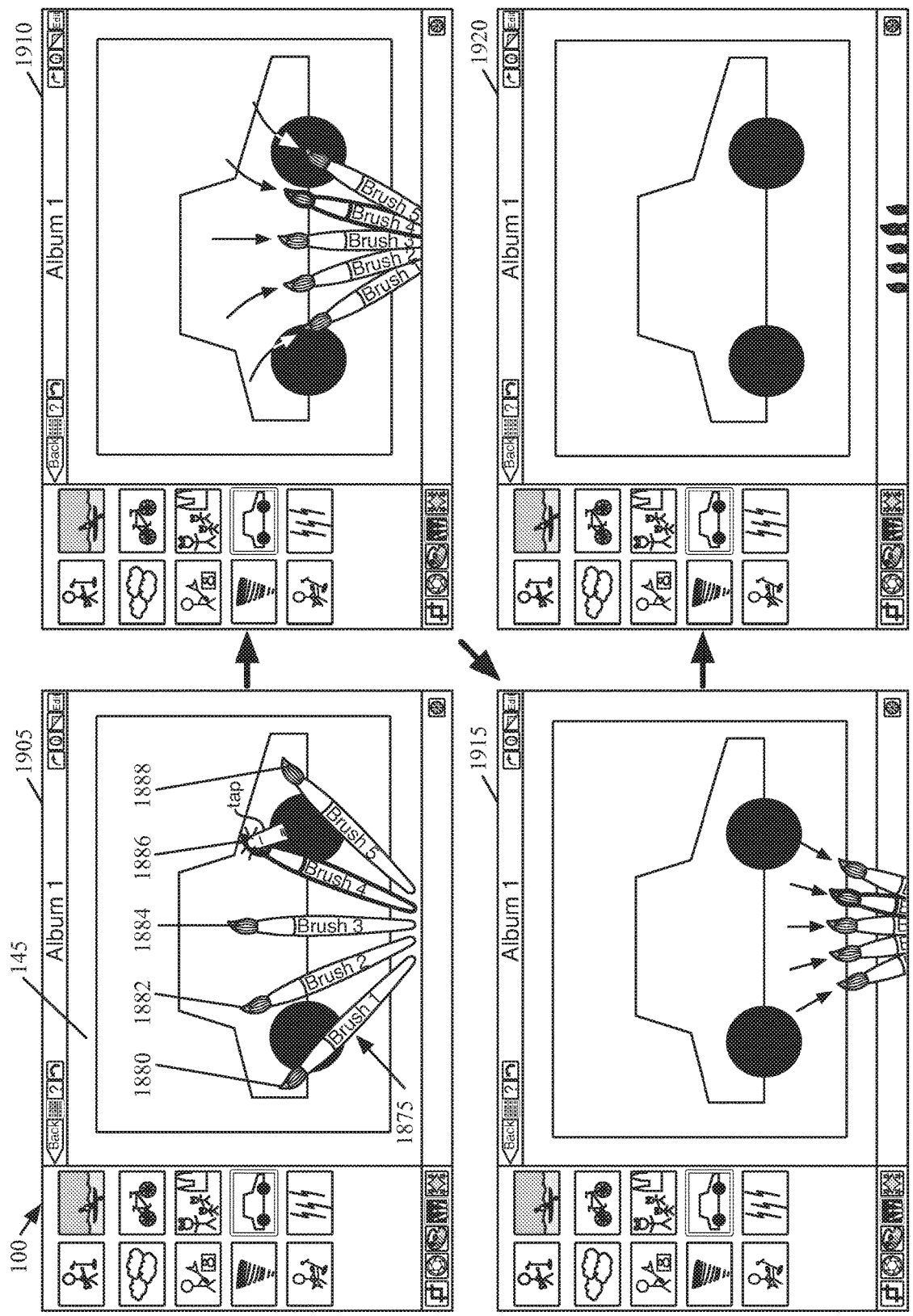
FIG. 19 conceptually illustrates selecting a brush control of the brushes tool illustrated in FIG. 18.

FIG. 19 conceptually illustrates selecting a brush control of the brushes tool 1875 illustrated in FIG. 18. In particular, FIG. 19 illustrates the GUI 100 at four different stages 1905-1920 of a brush control selection operation.

The first stage 1905 of the GUI 100 shows the selection of a brush control of the brushes tool 175. As shown, a user is selecting the brush controls 1886 (e.g., by touching the brush control 1886). When the image editing application receives the selection of the brush control 1886, the application highlights the selected brush control (the brush control 1886 in this example) and starts displaying a fanning closed animation of the set of brush controls 1880-1888.

The second stage 1910 illustrates the GUI 100 after the brush control 1886 is selected and the fanning closed animation of the set of brush controls 1880-1888 has started. The image editing application highlights the brush control 1886 by bolding the border of the brush control 1886. In this example, the positions and locations of the set of brush controls 1880-1888 shown in the fourth stage 1820 of FIG. 18 are the set of brush controls 1880-1888$s'$ starting positions and locations for the fanning closed animation.

The image editing application displays the fanning closed animation of the brush controls 1880-1888 by displaying rotations of different brush controls by different amounts about a fixed location. As shown, the brush controls 1880 and 1882 rotate about the fixed location towards the right in a clockwise direction, with the brush control 1880 fanned in more than the brush control 1882. The brush controls 1886 and 1888 rotate about the fixed location towards the left in a counter-clockwise manner, with the brush control 1888 fanned in more than the brush control 1886. The brush control 1884 does not rotate at all.

In some embodiments, the image editing application displays the fanning closed animation of the brush controls 1880-1888 by displaying, for a defined interval of time, rotations of different brush controls about the fixed location at different speeds from the starting position and location. The brush controls 1880 and 1888 rotate at the same speed about the fixed location, and the brush controls 1882 and 1886 rotate at the same speed about the fixed location. The brush controls 1880 and 1888 rotate at a faster speed than the brush controls 1882 and 1886.

The image editing application of some embodiments displays the fanning closed animation of the brush controls 1880-1888 by displaying rotations of the brush controls about the fixed location at the same speed from the starting position and location. To display a fanning open animation with the brush controls 1880-1888 moving at the same speed, the image editing application starts the movement of different brush controls at different times (e.g., start moving a particular brush control after a defined amount of time). Under this approach, the application starts the movement of the brush controls 1880 and 1888 and then starts the movement of the brush controls 1882 and 1886 at a later instance in time.

As shown in the second stage 1910, the brush controls 1880-1888 are fanned closed towards the center more than the position of the brush controls 1880-1888 illustrated in the first stage 1905. Additionally, the brush controls 1880-1888 have slid farther down from the center of the image display area 145 compared to the position of the brush controls 1880-1888 shown in the first stage 1905. That is, between the first stage 1905 and the second stage 1910, the image editing application fans the brush controls 1880-1888 farther closed while sliding the brush controls 1880-1888 farther down from the center of the image display area 145 toward the bottom of the image display area 145.

The third stage 1915 illustrates the GUI 100 near the end of the fanning closed animation of the brush controls 1880-1888 of the brushes tool 1875. As shown, the brush controls 1880-1888 are fanned closed towards the center more than the position of the brush controls 1880-1888 illustrated in the second stage 1910. Additionally, the brush controls 1880-1888 have slid farther down from the center of the image display area 145 towards the bottom of the image display area 145 compared to the position of the brush controls 1880-1888 shown in the second stage 1910. That is, between the second stage 1910 and the third stage 1915, the image editing application fans the brush controls 1880-1888 farther closed while sliding the brush controls 1880-1888 farther down from the center of the image display area 145 towards the bottom of the image display area 145.

The fourth stage 1920 shows the GUI 100 after the completion of the fanning closed animation of the brush controls 1880-1888. As shown, the application displays the top portions of the brush controls 1880-1888 in the toolbar 195. The image editing application displays the selected brush control 1886 a defined offset amount higher than the unselected brush controls 1880-1884 and 1888.

While FIG. 19 illustrates selecting a particular brush control of a brushes tool, one of ordinary skill in the art will recognize that any of the brush controls of the brushes tool may be selected after the brushes tool is activated. For example, the user could have selected brush controls 1880, 1882, 1884, or 1888.

Figure 20:
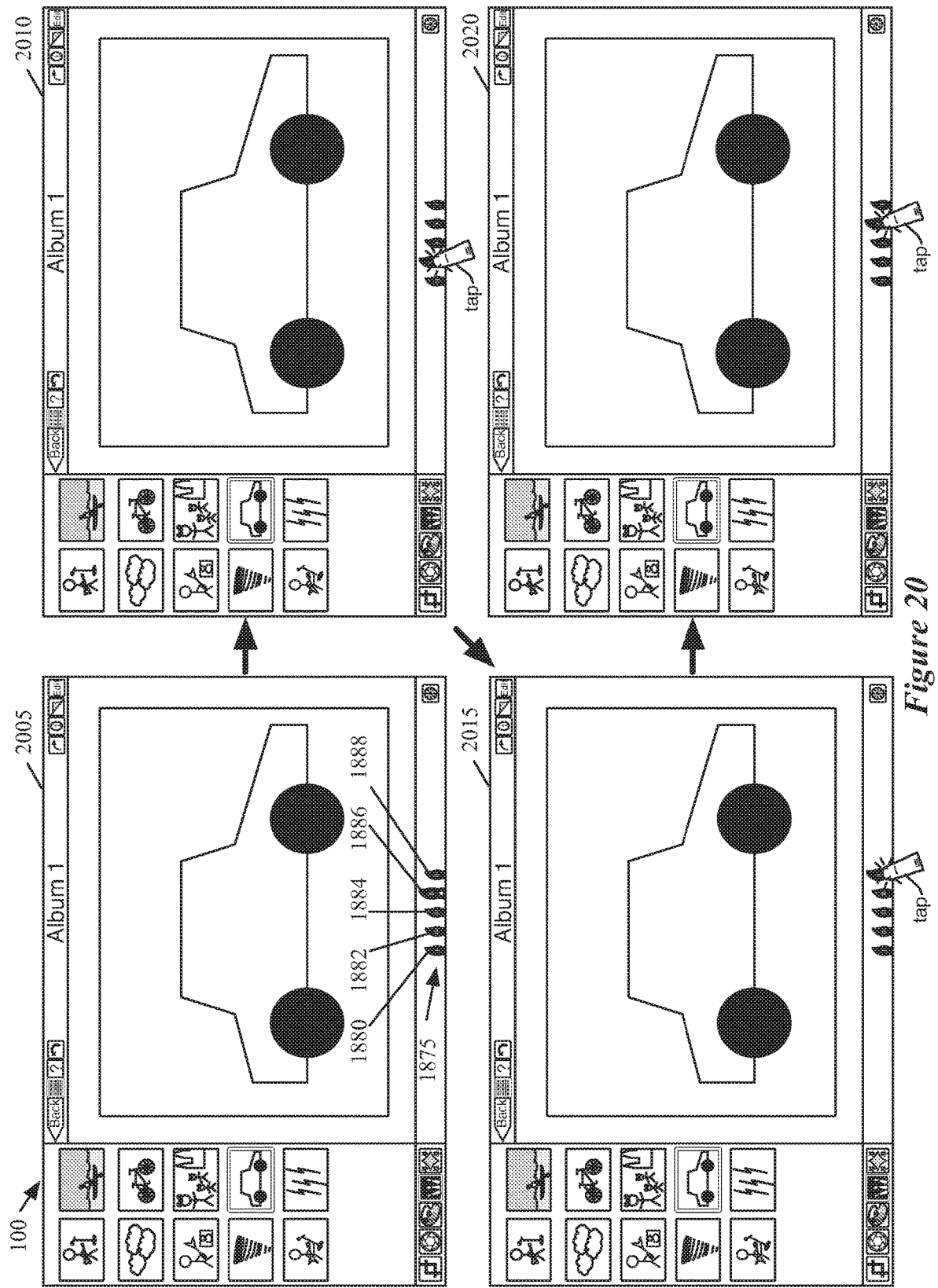
FIG. 20 conceptually illustrates a technique for changing the selected brush control of the brushes tool illustrated in FIG. 18.

After selecting a brush control of the brushes tool, a user might want to change the selection of the brush control. FIG. 20 conceptually illustrates changing the selected brush control of the brushes tool 1875 illustrated in FIG. 18. Specifically, FIG. 20 illustrates the GUI 100 at four different stages 2005-2020 of a brush control change operation.

The first stage 2005 of the GUI 100 is similar to the fourth stage 1920 of the GUI 100 illustrated in FIG. 19. That is, the first stage 2005 shows the GUI 100 after the brush control 1886 is selected, the brush control 1886 is highlighted with a bolded border, and a fanning closed animation of the set of brush controls 1880-1888 has completed.

The second stage 2010 of the GUI 100 illustrates a selection of a different brush control. As shown, a user is selecting the brush control 1882 (e.g., by touching the brush control 1881). When the application receives the selection of the brush control 1882, the application removes the highlighting of the previously selected brush control (the brush control 1886 in this example) and highlights the newly selected brush control (the brush control 1882 in this example). The highlighting of the brush control 1882 is indicated by a bolding of the border of the brush control 1882.

In the third stage 2015, the GUI 100 shows a selection of another brush control of the brushes tool 1875. As shown, the user is selecting the brush control 1888 (e.g., by touching the brush control 1888). When the application receives the selection of the brush control 1888, the application removes the highlighting of the previously selected brush control (the brush control 1882 in this example) and highlights the newly selected brush control (the brush control 1888 in this example). The highlighting of the brush control 1888 is indicated by a bolding of the border of the brush control 1888.

The fourth stage 2020 of the GUI 100 illustrates a selection of another brush control. In this stage, the user is selecting the brush control 1886 (e.g., by touching the brush control 1886). When the application receives the selection of the brush control 1886, the application removes the highlighting of the previously selected brush control (the brush control 1888 in this example) and highlights the selected brush control (the brush control 1886 in this example). The highlighting of the brush control 1886 is indicated by a bolding of the border of the brush control 1886.

Figure 21:
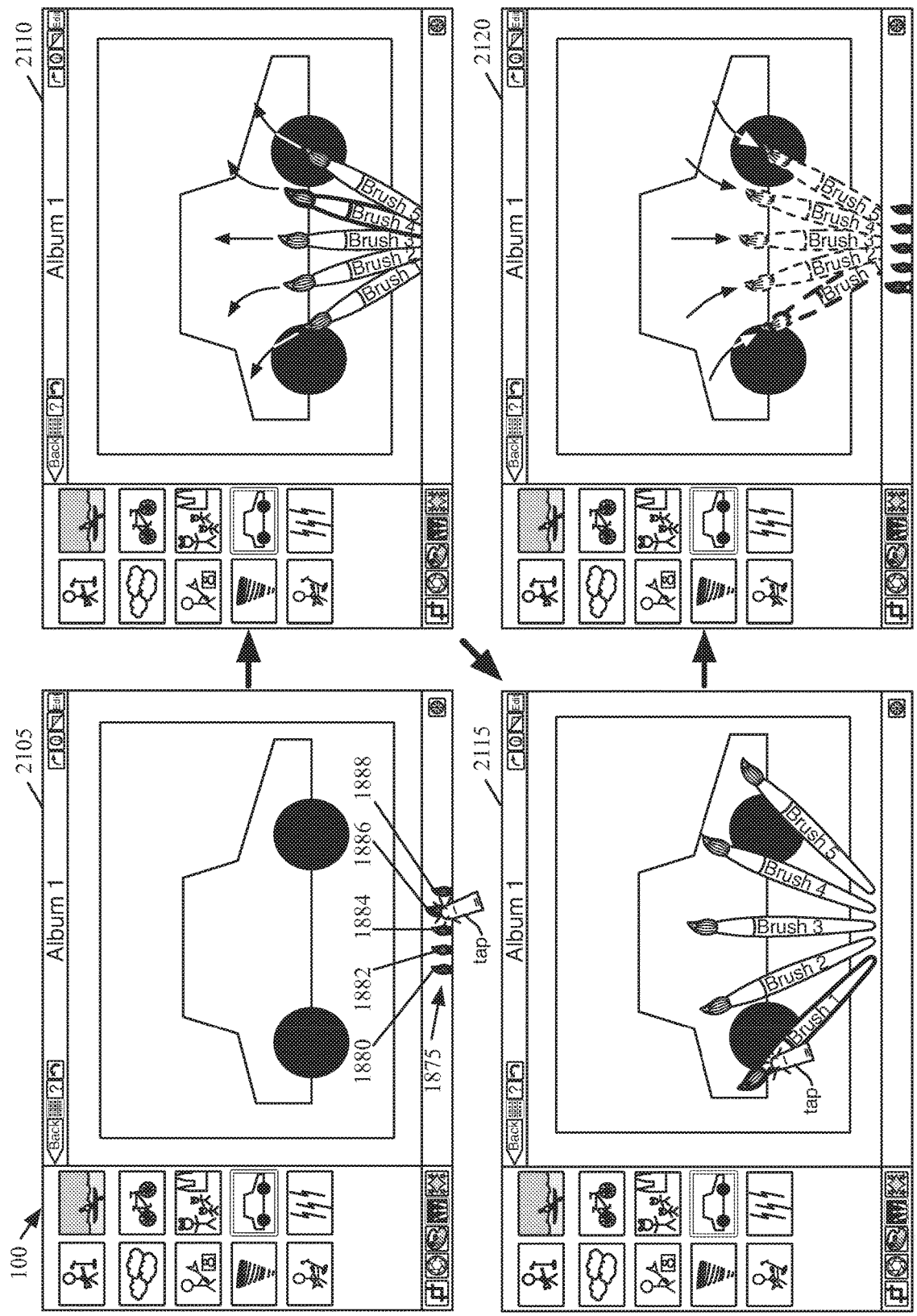
FIG. 21 conceptually illustrates another technique for changing the selected brush control of the brushes tool illustrated in FIG. 18.

FIG. 21 conceptually illustrates another technique for changing the selected brush control of the brushes tool 1875 illustrated in FIG. 18. Specifically, FIG. 21 illustrates the GUI 100 at four different stages 2105-2120 of a brush control change operation by fanning open the brush controls in order to change the selection of a brush control.

The first stage 2105 of the GUI 100 is similar to the fourth stage 1920 of the GUI 100 illustrated in FIG. 19. That is, the first stage 2105 shows the GUI 100 after the brush control 1886 is selected, the brush control 1886 is highlighted with a bolded border, and a fanning closed animation of the set of brush controls 1880-1888 has completed. In addition, the first stage 2105 illustrates the invocation of an operation for changing the selection of the brush control of the brushes tool 1875. As shown, a user is selecting the selected brush control 1886 to fan open the set of brush controls 1880-1880.

The second stage 2110 illustrates the GUI 100 after the image editing application has finished a fanning open animation of the set of brush controls 1880-1888. When the application receives the selection of the selected brush control (the brush control 1886 in this example), the application displays a fanning open animation of the set of brush controls 1880-1888 that is similar to the fanning open animation described above by reference to FIG. 18. As shown, the brush control 1886 remains highlighted because the brush control 1886 is the current selected brush control of the brushes tool 1875.

In the third stage 2115, the GUI 100 shows a selection of a different brush control of the brushes tool 1875. As shown, the user is selecting the brush control 1880 (e.g., by touching the brush control 1880). When the image editing application receives the selection of the brush control 1880, the application highlights the brush control 1880 and displays a fanning closed animation of the set of brush controls 1880-1888 that is similar to the fanning closed animation of the set of brush controls 1880-1888 described above by reference to FIG. 19.

The fourth stage 2120 illustrates the GUI 100 after the fanning closed animation of the set of brush controls 1880-1888 is finished and the selected brush control 1880 is highlighted. As shown, the application displays the top portions of the brush controls 1880-1888 in the toolbar 195 and displays the selected brush control 1880 a defined offset amount higher than the unselected brush controls 1882-1888.

FIGS. 20 and 21 illustrate several examples of changing the selected brush control of a brushes tool. One of ordinary skill in the art will realize that any brush control of the brushes tool may be selected when changing the selected brush control of the brushes tool. Moreover, the selected brush control of the brushes tool may be changed any number of different times.

In the figures described above in this Sub-section B, the appearance of the brush controls are the same or similar. In some embodiments, the brush controls of the brushes tool have different appearances to represent different types of brush controls. FIG. 22 conceptually illustrates an example of such a brushes tool. In particular, FIG. 22 illustrates the GUI 100 in a stage 2205 with the brush controls of the effects tool 1875 fanned open and a stage 2210 with the brush controls of the effects tool 1875 fanned closed. Moreover, any of the operations described above by reference to FIGS. 18-21 may be performed on the brushes tool 1875 shown in FIG. 22.

In the stage 2205, the GUI 100 shows the effects tool 1875 with a set of brush controls 2280-2287 fanned open. Specifically, in this example, the stage 2205 shows the GUI 100 after the image editing application displays a fanning open animation of the brush controls 2280-2287 similar to the animation described above by reference to FIG. 18.

As shown, the set of brush controls 2280-2287 includes a repair brush control 2280 for removing blemishes from an image being edited, a red-eye brush control 2281 for removing red-eye from the image, a saturate brush control 2282 for increasing the saturation of portions of the image, a desaturate brush control 2283 for decreasing the saturation of portions of the image, a lighten brush control 2284 for increasing the brightness of portions of the image, a darken brush control 2285 for decreasing the brightness of portions of the image, a sharpen brush control 2286 for sharpening portions of the image, and a soften brush control 2287 for softening and/or blurring portions of the image. Details of brush controls are described in U.S. patent application Ser. No. 13/629,374, entitled "User Interface Tools for Selectively Applying Effects to Image". U.S. patent application Ser. No. 13/629,374, is hereby incorporated by reference.

In the stage 2210, the GUI 100 shows the effects tool 1875 with the set of brush controls 2280-2287 fanned closed. For this example, the stage 2210 shows the GUI 100 after the image editing application displays a fanning closed animation of the brush controls 2280-2287 similar to the animation described above by reference to FIG. 19. As shown in the stage 2210, the top portions of the brush controls 2280-2287 are displayed in the toolbar 195, the selected brush control (the red-eye brush control 2281 in this example) is highlighted, and the selected brush control is displayed a defined offset amount above the unselected brush controls.

While FIG. 22 illustrates an example of different appearances for brush controls, one of ordinary skill will recognize that a brush control can have any number of different appearances to represent the brush control. For example, a brush control can appear as a highlighter pen, a pencil, a fountain pen, a paint roller, a paint scraper, etc.

In some embodiments, the image editing application provides the GUI described above in FIGS. 18-22 when the application is in a landscape-viewing mode. The following figures will describe a GUI that the application of some such embodiments provides when the application is in a portrait-viewing mode.

Figure 23:
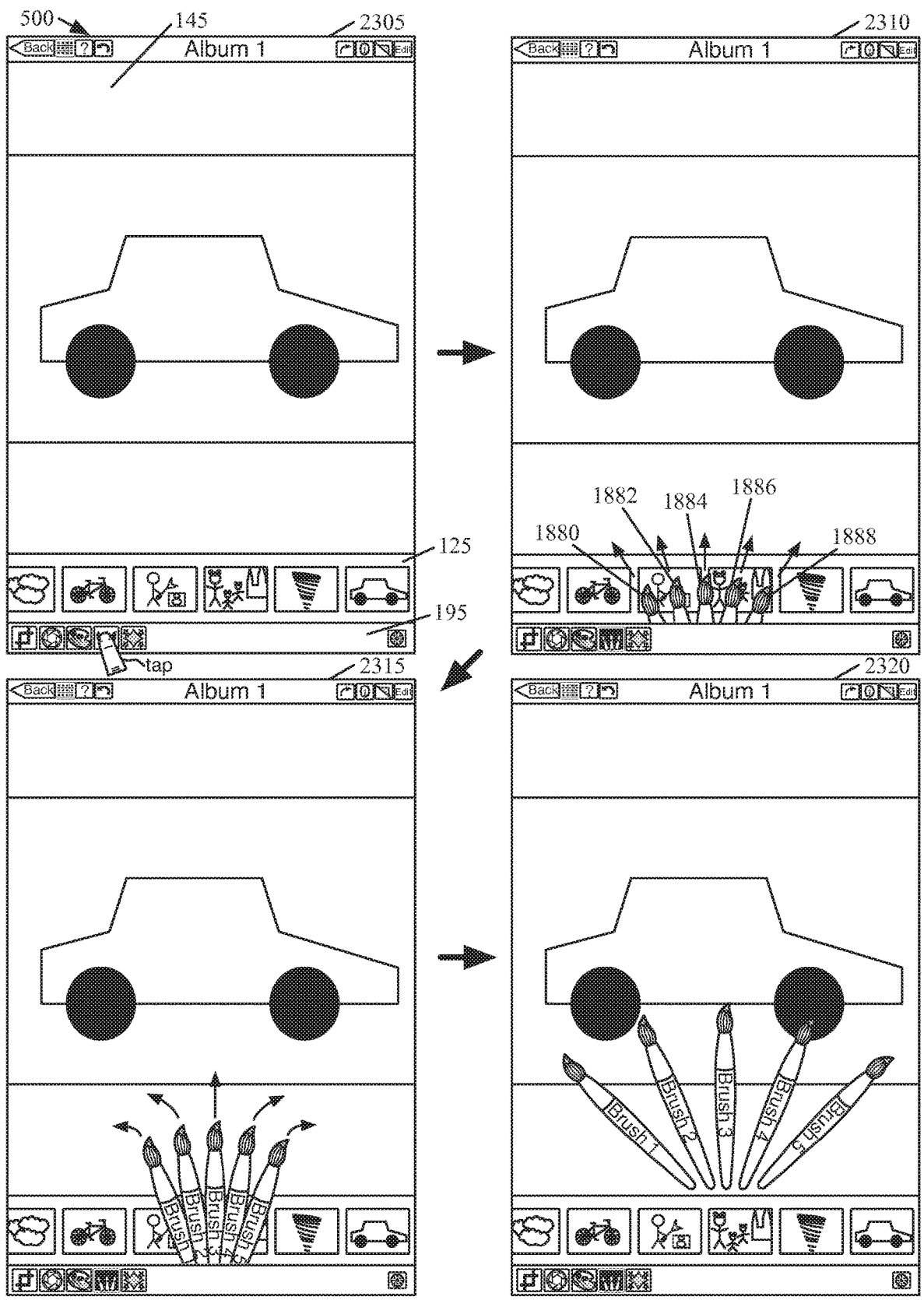
FIG. 23 conceptually illustrates a GUI that includes a brushes tool of some embodiments and the activation of the brushes tool.

FIG. 23 conceptually illustrates a GUI 2300 that includes the brushes tool 1875 of some embodiments and the activation of the brushes tool 1875. Specifically, FIG. 23 illustrates the GUI 2300 at four different stages 2305-2320 of a brushes tool activation operation. The GUI 2300 is similar to the GUI 100 that is described above by reference to FIG. 1 except the thumbnail display area 125 in the GUI 2300 is arranged below the image display area 145 and above the toolbar 195. Also, the GUI 2300 does not include the toolbar 135, and, thus, the UI items 132-140 are displayed in the toolbar 195 instead.

The stages 2305-2320 of the GUI 2300 are similar to the stages 1805-1820 described above by reference to FIG. 18. That is, the first stage 2305 shows the activation of the brushes tool 1875, the second stage 2310 shows the start of the fanning open animation of the brush controls 1880-1888, the third stage 2315 shows the brush controls 1880-1888 near the end of the fanning closed animation, and the fourth stage 2320 shows the brush controls 1880-1888 at the end of the fanning open animation.

Figure 24:
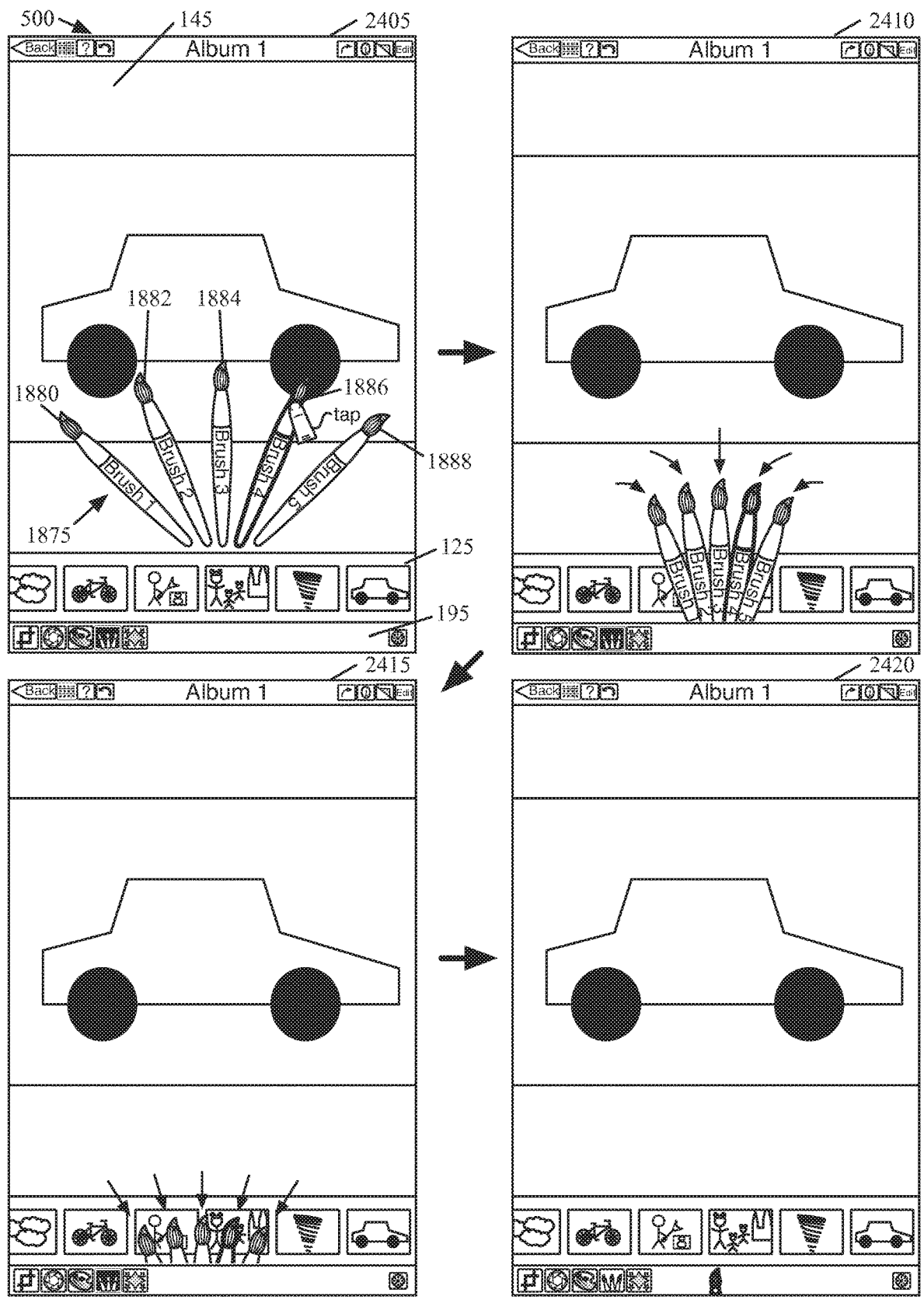
FIG. 24 conceptually illustrates selecting a brush control of the brushes tool illustrated in FIG. 23.

FIG. 24 conceptually illustrates selecting a brush control of the brushes tool 1875 illustrated in FIG. 18. In particular, FIG. 24 illustrates the GUI 100 at four different stages 2405-2420 of a brush control selection operation.

The stages 2405-2415 of the GUI 2300 are similar to the stages 1905-1915 described above by reference to FIG. 19. That is, the first stage 2405 shows the selection of the brush control 1886, the second stage 2410 shows the start of the fanning closed animation of the brush controls 1880-1888, and the third stage 2415 shows the brush controls 1880-1888 near the end of the fanning closed animation, The fourth stage 2420 shows the GUI 100 after the completion of the fanning closed animation of the brush controls 1880-1888. As shown, the image editing application displays only the top portion of the selected brush control 1886 in the toolbar 195 at the end of the fanning closed animation of the brush controls 1880-1888. In some embodiments, the application uses a technique that is similar to the technique described above by reference to FIG. 21 to change the selection of the brush control of the brushes tool. That is, the user selects the selected brush control displayed in the tool bar in order to fan open the brush controls and then selects a different brush control from the fanned open brush controls.

In some embodiments, the GUI for the example operations described above by reference to FIGS. 18-22 may be provided by an image editing application when the application is in a landscape-viewing mode. The image editing application of some embodiments provides the GUI described above by reference to FIGS. 23 and 24 for the example operations when the application is in a portrait-viewing mode. However, in some cases, the image editing application provides a yet another GUI for the example operations. For instance, the display screen of a mobile computing device (e.g., a smartphone) on which the application is running might not have enough space to display the example operations illustrated in FIGS. 1-4.

Figure 25:
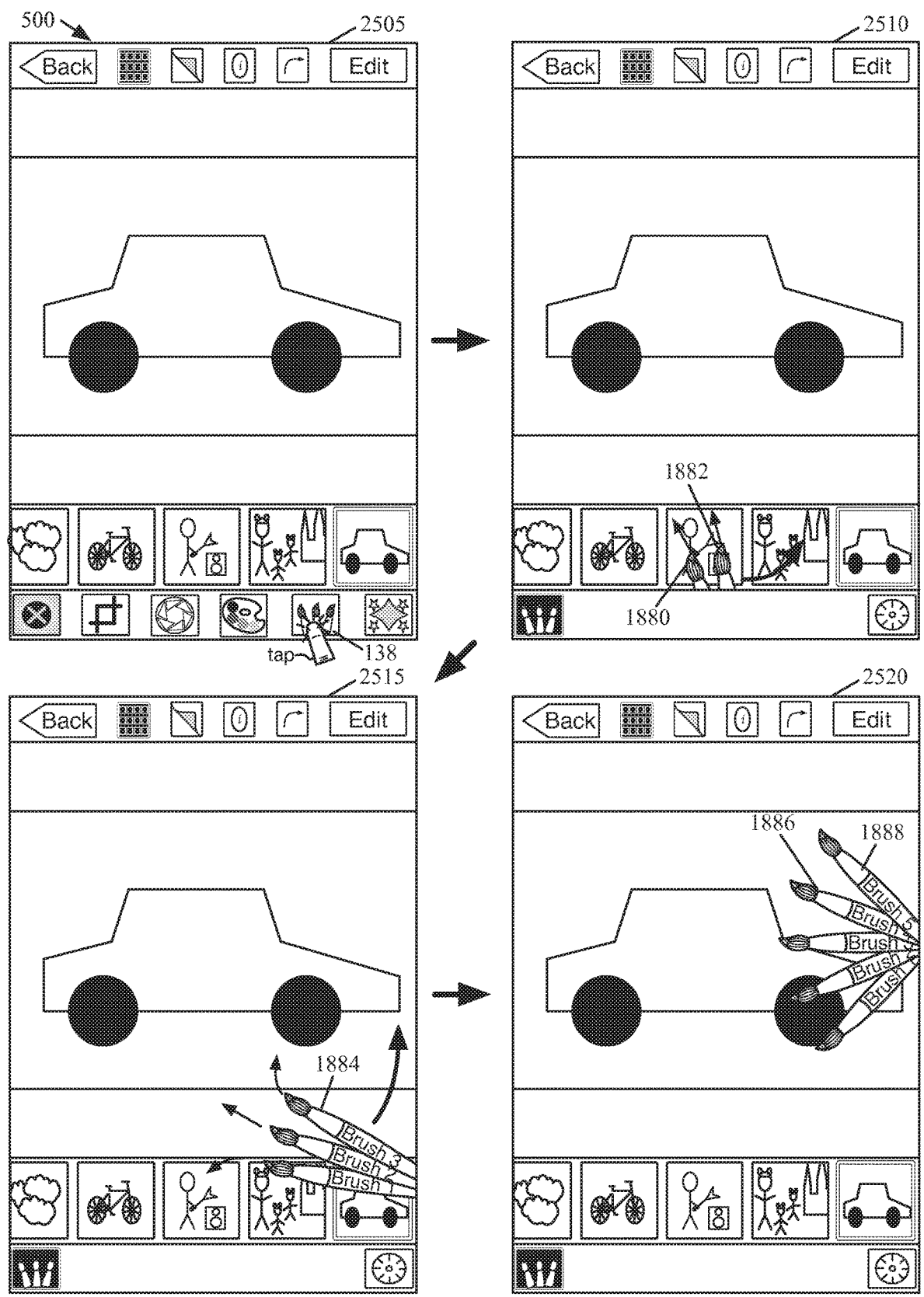
FIG. 25 conceptually illustrates a GUI that includes a brushes tool of some embodiments and the activation of the brushes tool.

FIG. 25 conceptually illustrates the GUI 500 of an image editing application that includes the brushes tool 1875 of some embodiments and the activation of the brushes tool 1875. Specifically, FIG. 25 illustrates the GUI 500 at four different stages 2505-2520 of a brushes tool activation operation.

The first stage 2505 of the GUI 500 shows the activation of the brushes tool 1875. In this stage, a user is selecting the selectable brushes tool UI item 138 (e.g., by touching the UI item 138) to activate the brushes tool 1875.

The second stage 2510 illustrates the GUI 500 after the brushes tool 1875 is activated. As shown, the GUI 500 is displaying the start of the fanning open animation of the set of brush controls 1880-1888 and the brushes tool UI item 138 is highlighted. When the image editing application receives the selection of the brushes tool UI item 138, the application highlights the UI item 138, removes the UI items 132-140 from the toolbar 195 (e.g., by displaying an animation of the UI items 132-140 sliding towards the left and off the toolbar 195), and displays the UI item 138 on the left side of the toolbar 195.

In this example, the brush controls 1880-1888 start the fanning open animation at the bottom of the toolbar 195 from a vertical position. As shown, the brush controls 1880-1888 are slightly fanned opened from the vertical position and location. The image editing application uses any of the fanning techniques described above by reference to FIG. 18 to fan open the brush controls 1880-1888. While fanning open the brush controls 1880-1888, the application moves a fixed location (e.g., a pivot point), relative to the brush controls 1880-1888, about which the brush controls 1880-1888 rotate. The application moves the fixed location towards the middle of the right side of the image display area 145. While fanning the brush controls 1880-1888 and moving the fixed location during the fanning open animation, the application also rotates the brushes tool 1875 counter-clockwise.

The third stage 2515 illustrates the GUI 500 near the end of the fanning open animation of the brush controls 1880-1888 of the brushes tool 1875. As shown, the brush controls 1880-1888 are fanned open from the center more than the position of the brush controls 1880-1888 illustrated in the second stage 2510. Additionally, the fixed location about which the brush controls 1880-1888 rotate has moved farther towards the middle of the right side of the image display area 145 compared to the position of the fixed location in the second stage 2510. Also, the brushes tool 1875 has rotated farther in a counter-clockwise manner. That is, between the second stage 2510 and the third stage 2515, the image editing application fans the brush controls 1880-1888 farther open while moving the fixed location farther towards the middle of the right side of the image display area 145 while rotating the brushes tool 195 counter-clockwise.

The fourth stage 2520 shows the GUI 500 after the completion of the fanning open animation of the brush controls 1880-1888. As shown, the brush controls 1880-1888 are fanned open from the center more than the position of the brush controls 1880-1888 illustrated in the third stage 2515. Also, the fixed location about which the brush controls 1880-1888 rotate has moved farther towards the middle of the right side of the image display area 145 compared to the position of the fixed location in the third stage 2515. Additionally, the brushes tool 1875 has rotated farther in a counter-clockwise manner. That is, between the third stage 2515 and the fourth stage 2520, the image editing application fans the brush controls 1880-1888 farther open while moving the fixed location farther towards the middle of the right side of the image display area 145 while rotating the brushes tool 195 counter-clockwise.

FIG. 25 illustrates an example of a fanning open animation of the brush controls of a brushes tool when the brushes tool is activated. In some embodiments, the image editing application does not display a fanning open animation of the brush controls of the brushes tool when the brushes tool is activated. Instead, the application of some such embodiments displays the last state (e.g., the most recent state) of the brushes tool. For instance, the image editing application might display the selected brush control in a manner similar to the fourth stage 2620, which is described below by reference to FIG. 26, when the brushes tool is activated and a brush controls of the brushes tool is selected in the last state of the brushes tool.

Figure 26:
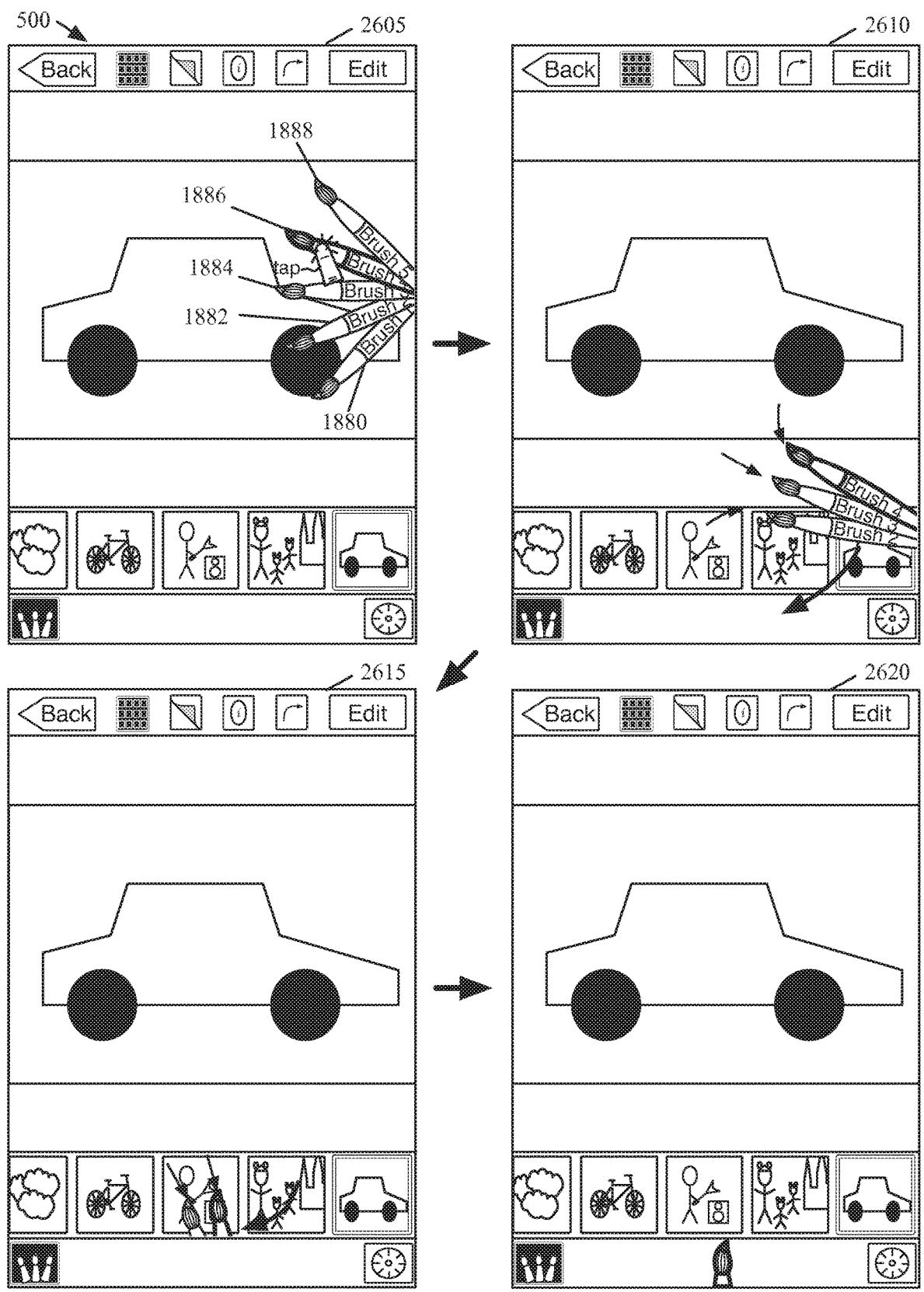
FIG. 26 conceptually illustrates selecting a brush control of the brushes tool illustrated in FIG. 25.

FIG. 26 conceptually illustrates selecting a brush control of the brushes tool 1875 illustrated in FIG. 25. In particular, FIG. 26 illustrates the GUI 500 at four different stages 2605-2620 of a brush control selection operation.

The first stage 2605 of the GUI 500 shows the selection of a brush control of the brushes tool 1875. As shown, a user is selecting the brush controls 1886 (e.g., by touching the brush control 1886). When the image editing application receives the selection of the brush control 1886, the application highlights the selected brush control (the brush control 1886 in this example) and starts displaying a fanning closed animation of the set of brush controls 1880-1888.

The second stage 2610 illustrates the GUI 500 after the brush control 1886 is selected and the fanning closed animation of the set of brush controls 1880-1888 has started. The image editing application highlights the brush control 1886 by bolding the border of the brush control 1886. In this example, the positions and locations of the set of brush controls 1880-1888 shown in the fourth stage 2520 of FIG. 25 are the set of brush controls 1880-1888$s'$ starting positions and locations for the fanning closed animation. As shown, the brush controls 1880-1888 are slightly fanned closed from the brush controls 1880-1888$s'$ starting positions and locations for the fanning closed animation. The image editing application uses any of the fanning techniques described above by reference to FIG. 19 to fan open the brush controls 1880-1888.

The third stage 2615 illustrates the GUI 500 near the end of the fanning closed animation of the brush controls 1880-1888 of the brushes tool 1875. As shown, the brush controls 1880-1888 are fanned closed towards the center more than the position of the brush controls 1880-1888 illustrated in the second stage 2610. Additionally, the fixed location about which the brush controls 1880-1888 rotate has moved farther from the middle of the right side of the image display area 145 towards the middle of the toolbar 195 compared to the position of the brush controls 1880-1888 shown in the second stage 2610. Also, the brushes tool 1875 has rotated farther in a clockwise manner. That is, between the second stage 2610 and the third stage 2615, the image editing application fans the brush controls 1880-1888 farther closed while moving the fixed location towards the middle of the toolbar 195 while rotating the brushes tool 175 clockwise.

The fourth stage 2620 shows the GUI 500 after the completion of the fanning closed animation of the brush controls 1880-1888. As shown, the application displays only the top portion of the selected brush control 1886 in the toolbar 195 at the end of the fanning closed animation of the brush controls 1880-1888. Between the third stage 2615 and the fourth stage 2620, the image editing application fans the brush controls 1880-1888 farther closed while moving the fixed location towards the middle of the toolbar 195 while rotating the brushes tool 175 clockwise.

While FIG. 26 illustrates selecting a particular brush control of a brushes tool, one of ordinary skill in the art will recognize that any of the brush controls of the brushes tool may be selected after the brushes tool is activated. For example, the user could have selected brush controls 1880, 1882, 1884, or 1888.

Figure 27:
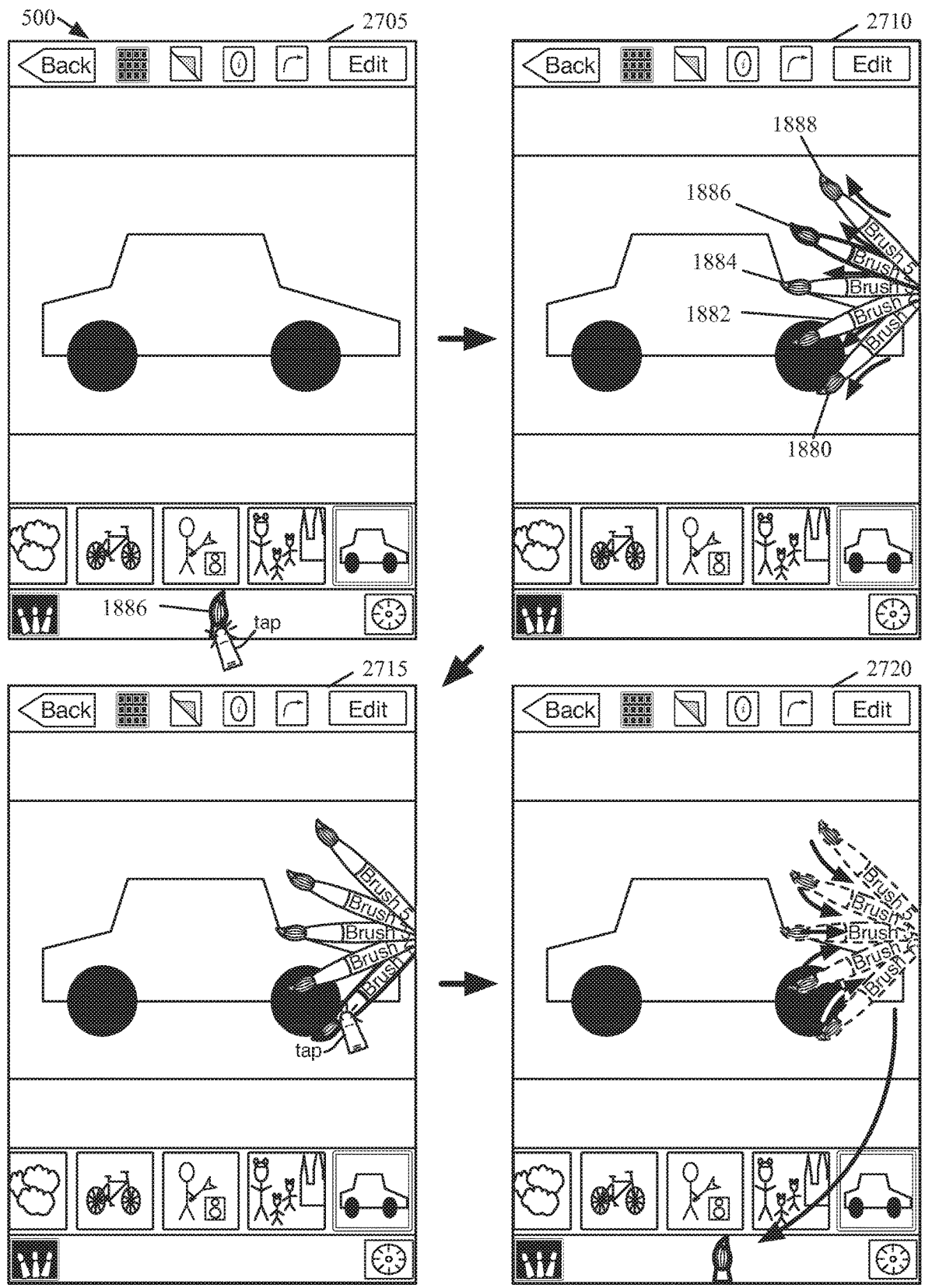
FIG. 27 conceptually illustrates changing the selected brush control of the brushes tool illustrated in FIG. 25.

FIG. 27 conceptually illustrates another technique for changing the selected brush control of the brushes tool 1875 illustrated in FIG. 25. Specifically, FIG. 27 illustrates the GUI 500 at four different stages 2705-2720 of a brush control change operation by fanning open the brush controls in order to change the selection of a brush control.

The first stage 2705 of the GUI 500 is similar to the fourth stage 2620 of the GUI 500 illustrated in FIG. 26. That is, the first stage 2705 shows the GUI 500 after the brush control 1886 is selected, the brush control 1886 is highlighted with a bolded border, a fanning closed animation of the set of brush controls 1880-1888 has completed, and the selected brush control 1886 is displayed over the toolbar 195. In addition, the first stage 2705 illustrates the invocation of an operation for changing the selection of the brush control of the brushes tool 1875. As shown, a user is selecting the selected brush control 1886 to fan open the set of brush controls 1880-1880.

The second stage 2710 illustrates the GUI 500 after the image editing application has finished a fanning open animation of the set of brush controls 1880-1888. When the application receives the selection of the selected brush control (the brush control 1886 in this example), the application displays a fanning open animation of the set of brush controls 1880-1888 that is similar to the fanning open animation described above by reference to FIG. 25. As shown, the brush control 1886 remains highlighted because the brush control 1886 is the selected brush control of the brushes tool 1875.

In the third stage 2715, the GUI 500 shows a selection of a different brush control of the brushes tool 1875. As shown, the user is selecting the brush control 1880 (e.g., by touching the brush control 1880). When the image editing application receives the selection of the brush control 1880, the application removes the highlighting of the previously selected brush control 1886, highlights the newly selected brush control 1880, and displays a fanning closed animation of the set of brush controls 1880-1888 that is similar to the fanning closed animation of the set of brush controls 1880-1888 described above by reference to FIG. 26.

The fourth stage 2720 illustrates the GUI 500 after the fanning closed animation of the set of brush controls 1880-1888 is finished. As shown, the application displays only a highlighted top portion of the selected brush control 1886 in the toolbar 195 at the end of the fanning closed animation of the brush controls 1880-1888.

FIGS. 25-27 show example layouts and animations of the brush controls 1880-1888 when the brush controls fan open and closed. In some embodiments, the layouts and animations of the brush controls 1880-1888 illustrated in FIGS. 25-27 are provided when the image editing application is in a right-hand mode that facilitates the use of a user's right hand to interact with the GUI 500 of the application. In some such embodiments, when the image editing application is in a left-hand mode, the application provides different layouts and animations of the brush controls 1880-1888 when the brush controls fan open and closed. For instance, in the left-hand mode of the application, the image editing application of some embodiments displays the fanning open animation in a similar manner as that shown in FIG. 25 except the brush controls starts near the lower left of the image display area 145 and fans open toward the upper right of the image display area 145 while the brush controls move from the left side of the image display area 145 to the center of the image display area 145. The left-hand mode of the application of such embodiments displays the fanning closed animation in a similar manner as that shown in FIG. 6 except the brush controls fan in towards the lower left of the image display area 145 while the brush controls move from near the center of the image display area 145 to the left side of the image display area 145. In some embodiments, the arrangement of the brush controls 1880-1888 illustrated in FIGS. 25-27 is provided when the image editing application is in a left-hand mode and the arrangement the brush controls 1880-1888 described above for the left-hand mode is instead provided when the application is in a right-hand mode.

The above FIGS. 25-27 illustrates GUIs that the application of some embodiments provides when the application is in a portrait-viewing mode. One of ordinary skill in the art will realize that the application of different embodiments provide different GUIs and animations when in different viewing modes. For instance, in some embodiments, when the application is in a landscape-viewing mode, the application provides a GUI similar to the GUI illustrated in FIGS. 18-21 except the layout of the UI items in the toolbars is similar to the toolbars shown in FIGS. 25-27 (e.g., only the selected brush controls is displayed when the brush controls are fanned closed). In some embodiments, the application displays animations in a similar manner as those shown in FIGS. 18-21. One of ordinary skill in the art will realize that any of the animations illustrated in the above-described FIGS. 18-27 may be used in any of the GUIs in the above-described FIGS. 18-27.

The FIGS. 18-27 described above show several techniques for fanning UI controls open and fanning UI controls closed. For instance, FIGS. 21 and 27 show selecting the current selected UI control to fan open the UI controls in order to select a different UI control and selecting a UI control to fan closed the UI controls. However, other techniques may be used to fan open and closed the UI controls in some embodiments. For example, the UI tool of some embodiments allows a user to perform a gesture (e.g., a swipe up gesture) on the selected UI control in order to fan open the UI controls. Similarly, in some embodiments, the UI tool allows the user to perform a gesture (e.g., a swipe down gesture) on the image display area in order to fan closed the UI controls when the UI controls are fanned open and the user does not want to select a different UI control (i.e., the user wants to keep the current selected UI control as selected). Other techniques are possible.

Figure 28:
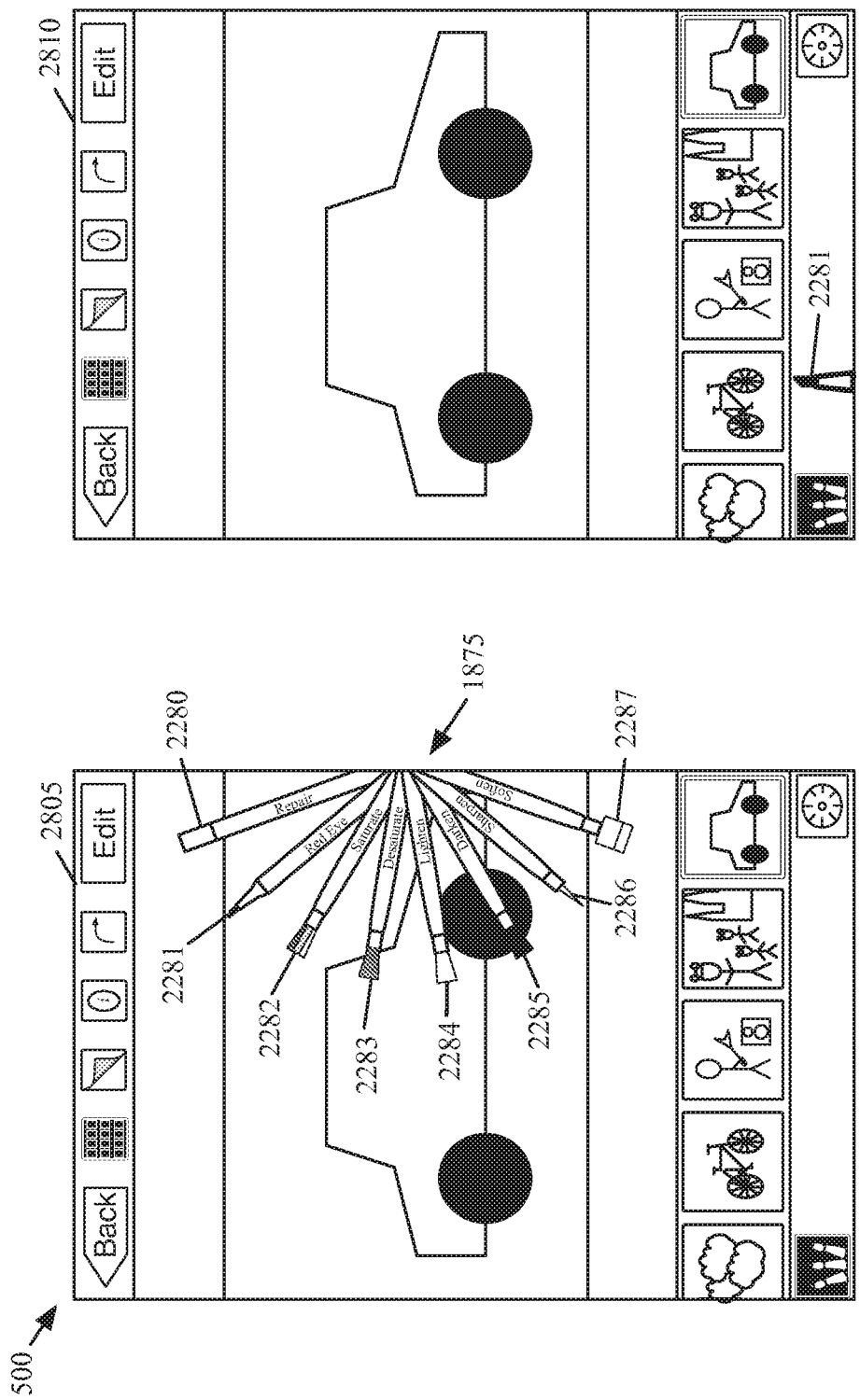
FIG. 28 conceptually illustrates brush controls with different appearances.

As noted above, the brush controls of the brushes tool have different appearances to represent different types of brush controls, in some embodiments. FIG. 28 conceptually illustrates brush controls with different appearances. Specifically, FIG. 28 illustrates the GUI 500 in a stage 2805 with the brush controls of the effects tool 1875 fanned open and a stage 2810 with the brush controls of the effects tool 1875 fanned closed. Moreover, any of the operations described above by reference to FIGS. 25-27 may be performed on the brushes tool 1875 shown in FIG. 28.

The stage 2805 of the GUI 500 shows the effects tool 1875 with the set of brush controls 2280-2287 fanned open. Specifically, in this example, the stage 2805 shows the GUI 500 after the image editing application displays a fanning open animation of the brush controls 2280-2287 similar to the animation described above by reference to FIG. 25.

In the stage 2810, the GUI 100 shows the effects tool 1875 with the set of brush controls 2280-2287 fanned closed. For this example, the stage 2810 shows the GUI 500 after the image editing application displays a fanning closed animation of the brush controls 2280-2287 similar to the animation described above by reference to FIG. 26. As shown in the stage 2810, only the top portion of the selected brush control (the red-eye brush control 2881 in this example) is displayed in the toolbar 195, and the selected brush control is highlighted.

Figure 29:
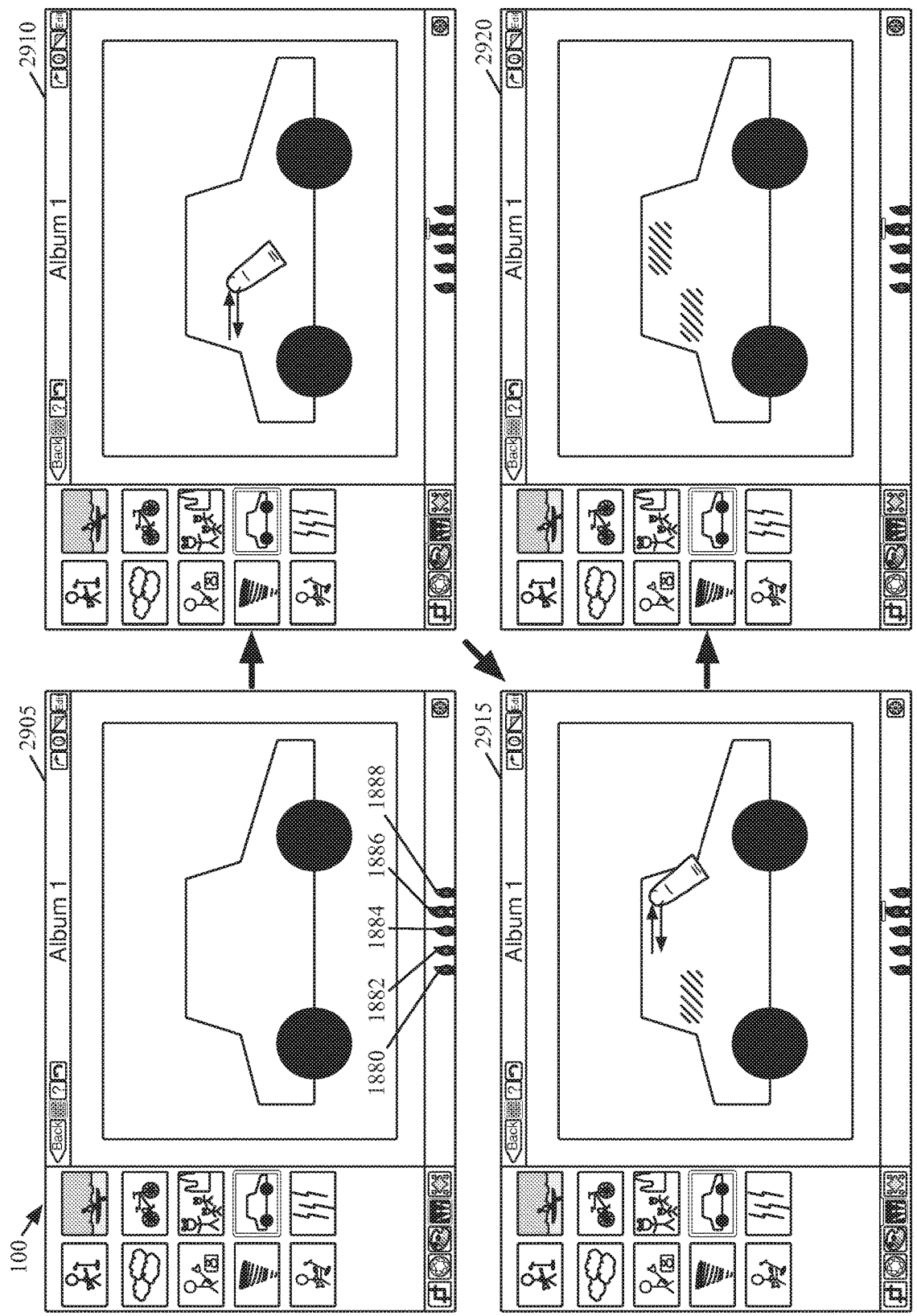
FIG. 29 conceptually illustrates applying a brush effect to an image using a brush control of a brushes tool of some embodiments.

FIG. 29 conceptually illustrates applying a brush effect to an image using a brush control of the brushes tool 1875 of some embodiments. Specifically, FIG. 29 illustrates the GUI 100 at four different stages 2905-2920 of a brush effect application operation.

The first stage 2905 of the GUI 100 is similar to the fourth stage 1920 illustrated in FIG. 19. As shown, a user has activated the brushes tool 1875 (e.g., by selecting the UI item 138), as indicated by the highlighting of the brushes item 138. Additionally, the user has selected the brush control 1886 of the brushes tool 1875 (e.g., by touching the brush control 1886 when the set of brush controls of the brushes tool 1875 were fanned out).

The second stage 2910 of the GUI 100 illustrates a brush effect being applied to the image being edited. As shown, the user is selecting a region of the image 142 (e.g., by touching the region of the image 142 and performing a rubbing gesture) to apply the brush effect to the region of the image 142. When the image editing application receives the selection of the region of the image 142, the application applies the brush effect associated with the brush control 1886 to the region of the image 142. In addition, upon receiving the selection of the region of the image 142, the application displays an indicator above the brush control 1886 to indicate that a brush effect has been applied to the image 142 with the brush control 1886 and displays an indicator above the brushes tool UI item 138 to indicate that edits have been applied to the image 142 with the brushes tool 1875.

The third stage 2915 illustrates the GUI 100 after the user has finished applying the brush effect to the image 142. As shown, the region of the image 142 with the brush effect applied is indicated with diagonal lines.

The third stage 2915 also shows another brush effect being applied to the image being edited. As shown, the user is selecting a second region of the image 142 (e.g., by touching the region of the image 142 and performing a rubbing gesture) to apply the brush effect associated with the brush control 1886 to the second region of the image 142. When the image editing application receives the selection of the second region of the image 142, the application applies the brush effect associated with the brush control 1886 to the second region of the image 142.

The fourth stage 2920 illustrates the GUI 100 after the user has finished applying the brush effect to the image 142. As shown, the second region of the image 142 with the brush effect applied is indicated with diagonal lines.

Figure 30:
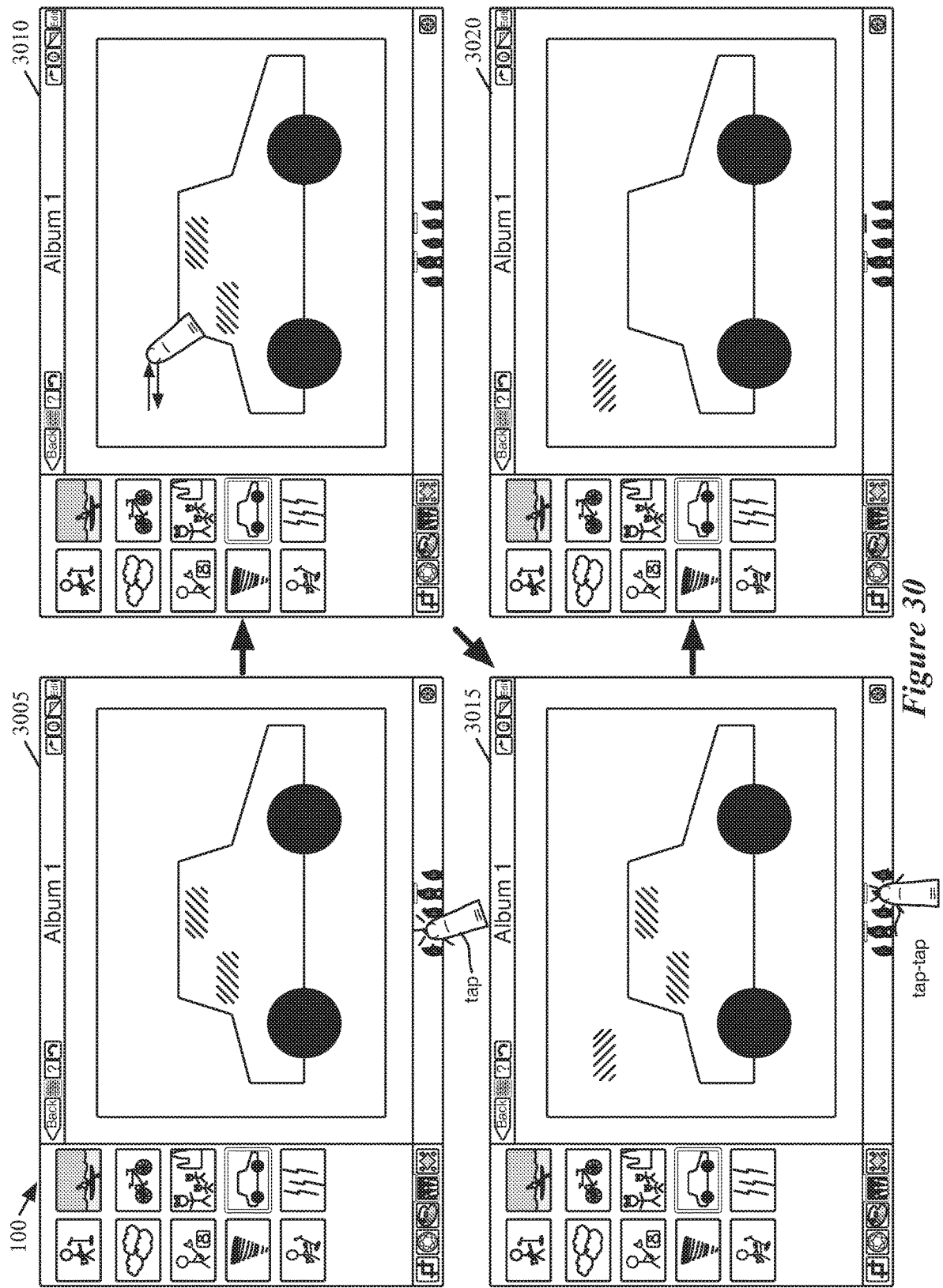
FIG. 30 conceptually illustrates applying a brush effect to an image using a brush control of a brushes tool of some embodiments and disabling the brush effect applied in FIG. 29.

FIG. 30 conceptually illustrates applying a brush effect to an image using a brush control of the brushes tool 1875 of some embodiments and disabling the brush effect applied in FIG. 29. In particular, FIG. 30 illustrates the GUI 100 at four different stages 3005-3020 of a brush effect application operation and a brush effect disabling operation.

The first stage 3005 of the GUI 100 is similar to the fourth stage 2920 illustrated in FIG. 29. As shown, a user has applied brush effects associated with the brush control 1886 to two regions of the image 142, which are indicated by diagonal lines in the image 142. The first stage 3005 also shows the user selecting a different brush control. As illustrated in this stage, the user is selecting the brush control 1882 (e.g., by touching the brush control 1882).

The second stage 3010 illustrates the GUI 100 a brush effect being applied to the image being edited. As shown, the user is selecting a third region of the image 142 (e.g., by touching the region of the image 142 and performing a rubbing gesture) to apply the brush effect to the third region of the image 142. When the image editing application receives the selection of the region of the image 142, the application applies the brush effect associated with the brush control 1882 to the third region of the image 142. In addition, upon receiving the selection of the region of the image 142, the application displays an indicator above the brush control 1882 to indicate that a brush effect has been applied to the image 142 with the brush control 1882.

The third stage 3015 illustrates the GUI 100 after the user has applied the brush effect to the image 142 illustrated in the second stage 3010. As shown, the region of the image 142 with the brush effect applied with the brush control 1882 is indicated with different diagonal lines.

The third stage 3015 also shows the user disabling the brush effects applied to the image 142 with the brush control 1886. In this stage, the user has selected the brush control 1886 (e.g., by touching the brush control 1886 twice in rapid succession) to disable the brush effects applied to the image 142 with the brush control 1886.

The brush effect-disabling feature of the brushes tool 1875 allows the user to disable and enable brush effects that have been applied to the image being edited with a particular brush control. This way, the user may view brush effects applied to the image being edited using different brush controls separately. For instance, the user might apply a first set of brush effects to a region of the image being edited using a first brush control and apply a second set of brush effects to the same region of the image using a second brush control. The brush effect-disabling feature of the brushes tool 1875 allows the user to view only the first set of brush effects applied to the image, only the second set of brush effects applied to the image, or the both the first and second sets of brush effects applied to the image.

The fourth stage 3020 illustrates the GUI 100 after the user has disabled the brush effects applied to the image 142 with the brush control 1886. As shown, the diagonal lines on the car that represents the regions at which brush effects were applied to the image 142 with the brush control 1886 are not displayed in the image 142 in order to indicate that these brush effects have been disabled.

When the image editing application receives the selection of the brush control 1886 to disable the brush effects applied to the image 142 with the brush control 1886, the application removes the brush effects from the regions of the image 142 at which the brush effects have been applied. In addition, upon receiving the selection of the brush control 1886 to disable the brush effects of the brush control 1886, the application displays a different indicator above the brush control 1886. As shown, a thin line displayed above the brush control 1886 is used to indicate that brush effects have been applied to the image 142 with the brush control 1886 but the brush effects have been disabled.

As described above, FIGS. 29 and 30 illustrate examples of applying brush effects to an image using a rubbing gesture (e.g., to incrementally apply brush effects to a region of the image). In some embodiments, brush controls that use rubbing gestures to apply brush effects are referred to as gradual brush controls, incremental brush controls, and/or additive brush controls. Details of brush controls that use rubbing gestures to apply the brush effects are described in U.S. patent application Ser. No. 13/629,374, entitled "User Interface Tools for Selectively Applying Effects to Image". In some embodiments, the brushes tool includes other types of brush controls that do not utilize rubbing gestures to apply the brush controls' brush effects. For instance, for the repair brush control described above, a user removes a blemish from an image by selecting region of an image (e.g., by touching the region of the image) that contains the blemish. In some embodiments, the red-eye brush control described above is used in a similar manner to remove red-eye from an image. These types of brush controls are referred to as discrete brush controls, in some embodiments.

Figure 31:
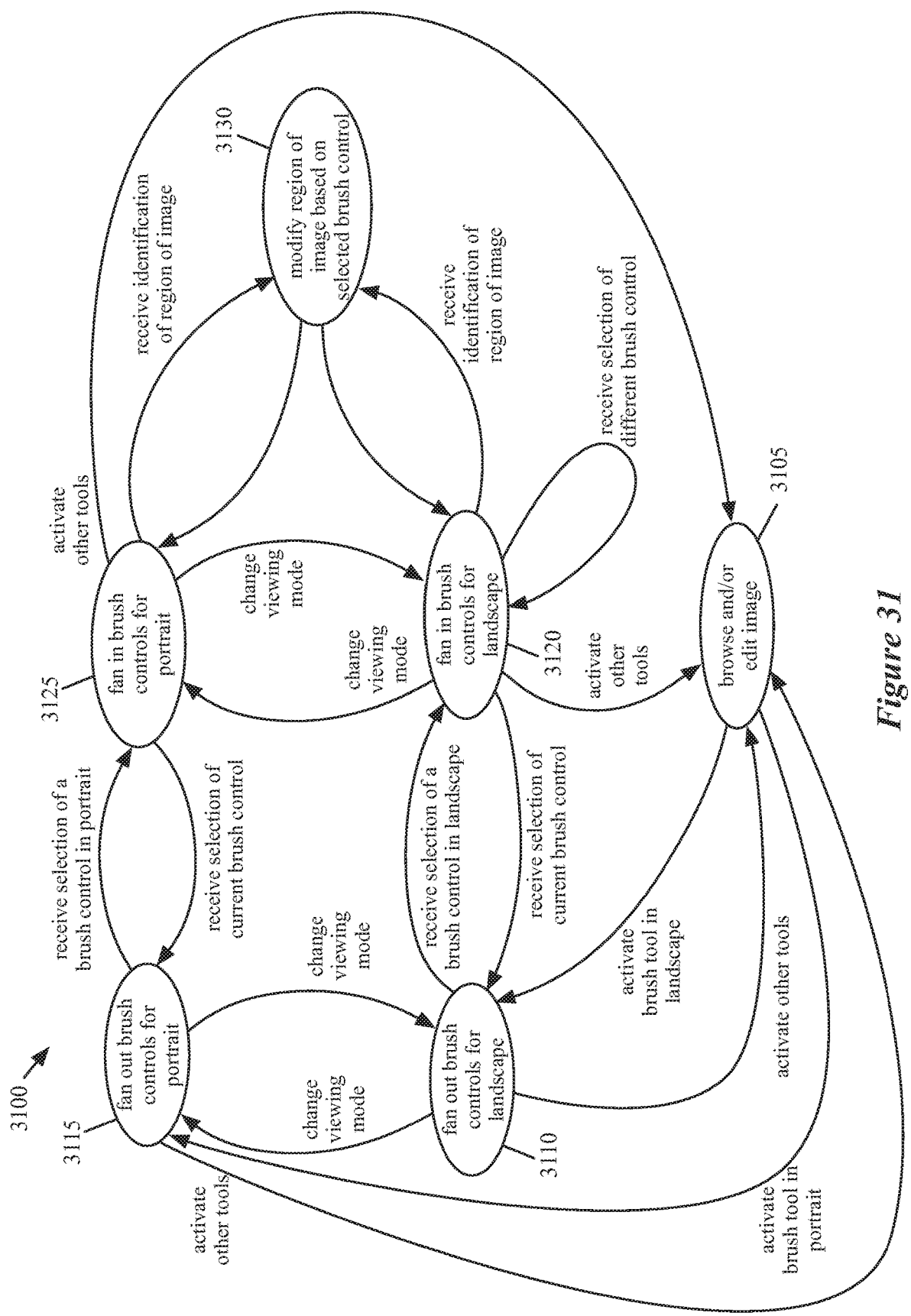
FIG. 31 conceptually illustrates a state diagram of an application of some embodiments that provides the brushes tool.

FIG. 31 conceptually illustrates a state diagram 3100 of an application of some embodiments that provides the brushes tool 1875. Specifically, FIG. 31 illustrates several states of the application of some embodiments and transitions between these states.

At state 3105, the application is in an image editing, viewing, or organizing state. In some embodiments, the application begins in the state 3105 when the application is first started. When the application is in the state 3105, the application is providing tools for editing, viewing, or organizing images. For example, the application may be providing sharing tools for sharing images, providing various editing tools (e.g., a crop and rotate tool, an exposure tool, a color tool, etc.), providing tools for tagging images, etc.

When the application activates the brushes tool 1875 while the application is in a landscape-viewing mode, the application transitions from state 3105 to state 3110. When the application activates the brushes tool 1875 while the application is in a portrait-viewing mode, the application transitions from state 3105 to state 3115. In some cases, when the application activates the brushes tool 1875, the application returns to the last used state. In some such cases, the application transitions from state 3105 to state 3120 if the application is in a landscape-viewing mode and transitions from state 3105 to state 3125 if the application is in a portrait-viewing mode (not shown in FIG. 31). As shown in FIG. 31, when the application is in any of the states 3110-3125 and the application disables the brushes tool 1875 (e.g., by activating another tool), the application returns to state 3105.

At state 3110, the application is in a landscape-viewing mode and provides a GUI for displaying in the landscape-viewing mode the brush controls of the brushes tool 1875 in a fanned open layout. For instance, the application of some embodiments provides the GUI illustrated in the fourth stage 1820 of FIG. 18 when in state 3110.

When the application changes to state 3110 (e.g., from state 3115 or state 3120), the application displays a fanning open animation of the brush controls of the brushes tool 1875. In some embodiments, the application displays the fanning open animation similar to the animation described above by reference to FIG. 18.

If a brush control of the brushes tool 1875 is selected when the application transitions to state 3110 (e.g., the application transitioned from state 3120), the application continues to highlight the selected brush control while in state 3110. When the application is in state 3110 and the application receives a selection of a brush control of the brushes tool 1875, the application transitions to state 3120. When the application is in state 3110 and the application changes from a landscape-viewing mode to a portrait-viewing mode, the application transitions to state 3115. For example, when the orientation of the display screen of a mobile computing device on which the application is running is changed, the application of some embodiments changes from a landscape-viewing mode to a portrait-viewing mode and then transitions to state 3115. As another example, when a display area for displaying the GUI of the application is adjusted (e.g., adjusting the size of the display area, decreasing the width of the display area, increasing the height of the display area, etc.), the application of some embodiments changes from a landscape-viewing mode to a portrait-viewing mode and then transitions to state 3115.

At state 3120, the application is in a landscape-viewing mode and provides a GUI for displaying in the landscape-viewing mode the brush controls of the brushes tool 1875 in a fanned closed layout. For instance, the application of some embodiments provides the GUI illustrated in the fourth stage 1920 of FIG. 19 when in state 3110.

When the application changes to state 3120 from state 3110, the application displays a fanning closed animation of the brush controls of the brushes tool 1875. In some embodiments, the application displays the fanning closed animation similar to the animation described above by reference to FIG. 19. When the application transitions to state 3120, the application highlights the selected brush control of the brushes tool 1875.

When the application is in state 3120 and the application receives a selection of the selected brush control in order to change the selection of the brush control of the brushes tool 1875, the application transitions to state 3110. When the application is in state 3120 and the application changes from a landscape-viewing mode to a portrait-viewing mode, the application transitions to state 3125. For example, when the orientation of the display screen of a mobile computing device on which the application is running is changed, the application of some embodiments changes from a landscape-viewing mode to a portrait-viewing mode and then transitions to state 3125. As another example, when a display area for displaying the GUI of the application is adjusted (e.g., adjusting the size of the display area, decreasing the width of the display area, increasing the height of the display area, etc.), the application of some embodiments changes from a landscape-viewing mode to a portrait-viewing mode and then transitions to state 3125.

In some embodiments, the application receives a selection of a different brush control while in state 3120. For instance, the application of some embodiments that provides the GUI illustrated in the fourth stage 1920 of FIG. 19 might receive a selection of a different brush to change the selection of the brush control of the brushes tool 1875. When the application receives the selection of a different brush while in state 3120, the application removes the highlighting from the previously selected brush control and highlights the newly selected brush control, as illustrated in FIG. 20.

When the application is in state 3120 and the application receives a selection of a region of an image being edited through the selected brush control of the brushes tool 1875, the application transitions to state 3130. Referring to FIG. 29 as an example, when the application is in state 3120, the application receives a selection of a region of the image 142 to apply a brush effect associated with the brushes control 1886 to the image 142.

At state 3115, the application is in a portrait-viewing mode and provides a GUI for displaying in the portrait-viewing mode the brush controls of the brushes tool 1875 in a fanned open layout. For instance, the application of some embodiments provides the GUI illustrated in the fourth stage 2520 of FIG. 25 or the fourth stage 2320 of FIG. 23 when in state 3115.

When the application changes to state 3115 (e.g., from state 3110 or state 3125), the application displays a fanning open animation of the brush controls of the brushes tool 1875. In some embodiments, the application displays the fanning open animation similar to the animation described above by reference to FIG. 25 or 23.

If a brush control of the brushes tool 1875 is selected when the application transitions to state 3115 (e.g., the application transitioned from state 3125), the application continues to highlight the selected brush control while in state 3115. When the application is in state 3115 and the application receives a selection of a brush control of the brushes tool 1875, the application transitions to state 3125. When the application is in state 3115 and the application changes the viewing mode from a portrait-viewing mode to a landscape-viewing mode, the application transitions to state 3110. For example, when the orientation of the display screen of a mobile computing device on which the application is running is changed, the application of some embodiments changes from a portrait-viewing mode to a landscape-viewing mode and then transitions to state 3110. As another example, when a display area for displaying the GUI of the application is adjusted (e.g., adjusting the size of the display area, increasing the width of the display area, decreasing the height of the display area, etc.), the application of some embodiments changes from a portrait-viewing mode to a landscape-viewing mode and then transitions to state 3110.

At state 3155, the application is in a portrait-viewing mode and provides a GUI for displaying in the portrait-viewing mode the brush controls of the brushes tool 1875 in a fanned open layout. For instance, the application of some embodiments provides the GUI illustrated in the fourth stage 2620 of FIG. 26 or the fourth stage 2420 of FIG. 24 when in state 3155

When the application changes to state 3125 from state 3115, the application displays a fanning closed animation of the brush controls of the brushes tool 1875. In some embodiments, the application displays the fanning closed animation similar to the animation described above by reference to FIG. 26 or 24. When the application transitions to state 3125, the application highlights the selected brush control of the brushes tool 1875.

When the application is in state 3125 and the application receives a selection of the selected brush control in order to change the selection of the brush control of the brushes tool 1875, the application transitions to state 3115. When the application is in state 3125 and the application changes from a portrait-viewing mode to a landscape-viewing mode, the application transitions to state 3120. For example, when the orientation of the display screen of a mobile computing device on which the application is running is changed, the application of some embodiments changes from a portrait-viewing mode to a landscape-viewing mode and then transitions to state 3120. As another example, when a display area for displaying the GUI of the application is adjusted (e.g., adjusting the size of the display area, increasing the width of the display area, decreasing the height of the display area, etc.), the application of some embodiments changes from a portrait-viewing mode to a landscape-viewing mode and then transitions to state 3120.

When the application is in state 3125 and the application receives a selection of a region of an image being edited through the selected brush control of the brushes tool 1875, the application transitions to state 3130. Referring to FIG. 29 as an example, when the application is in state 3120, the application receives a selection of a region of the image 142 to apply a brush effect associated with the brushes control 1886 to the image 142.

At state 3130, the application applies a brush effect to the image being edited based on the selection of the image received through the selected brush control of the brushes tool 1875. For instance, referring to FIG. 29, when the application (while in state 3120 or state 3125) receives the selection of the region of the image 142 shown in the second stage 2910 using the selected brush control 1886, the application, in state 3130, applies the brush effect associated with brush control 1886 to the image being edited. After applying the brush effect based on the selection of the region of the image being edited, the application transitions back to the state from which the application transitioned to state 3130. In other words, the application transitions back to state 3120 when the application transitions to state 3130 from state 3120 and the application transitions back to state 3125 when the application transitions to state 3130 from state 3125.

The state diagram illustrated in FIG. 31 shows several different states of the image editing application of some embodiments. One of ordinary skill in the art will recognize that the various actions represented by the states and transitions in FIG. 31 are only a subset of the possible actions that can be performed in the application, in some embodiments. Additionally, other functions that are not shown may be performed while in a particular state. For instance, in some embodiments, when the image editing application is in fanned closed state (e.g., state 3120 or state 3125) and the application receives input to apply a brush effect to the image being edited that does not yet have any brush effects applied to the image, the application displays an indicator above the brushes tool UI item 138 to indicate that a brush effect is applied to the image being edited. As another example, when the image editing application is in a fanned closed state (e.g., state 3120), the application might receive a selection of a brush control to disable or enable brush effects associated with the brush control, as illustrated in FIG. 30.

Figure 32:
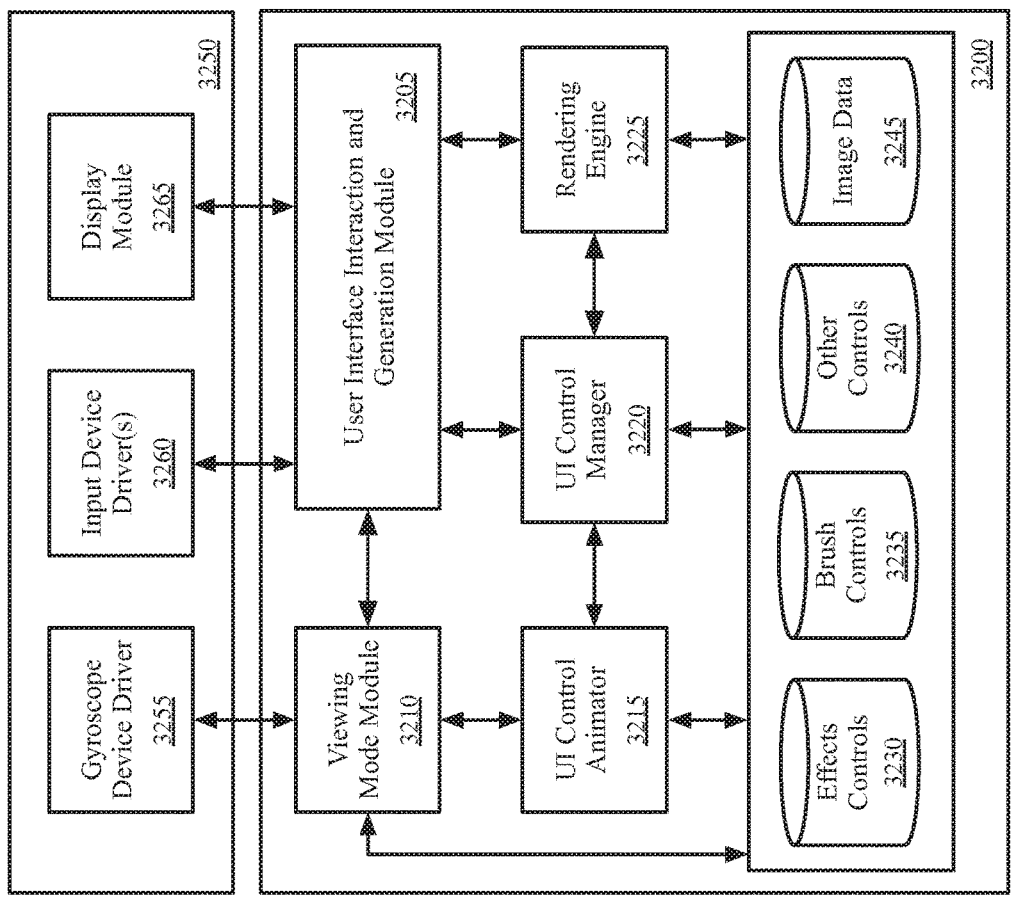
FIG. 32 conceptually illustrates a software architecture of an application of some embodiments that provides a UI tool that includes fanning UI controls.

FIG. 32 conceptually illustrates a software architecture of an image editing application 3200 of some embodiments that provides UI tool that include fanning UI controls. In some embodiments, the image editing application 3200 is a stand-alone application or is integrated into another application (e.g., a compositing application), while in other embodiments the image editing application 3200 might be implemented within an operating system. Furthermore, in some embodiments, the image editing application 3200 is provided as part of a server-based solution. In some such embodiments, the image editing application 3200 is provided via a thin client. That is, the image editing application 3200 runs on a server while a user interacts with the image editing application 3200 via a separate machine remote from the server. In other such embodiments, the image editing application 3200 is provided via a thick client. That is, the image editing application 3200 is distributed from the server to the client machine and runs on the client machine.

As shown in FIG. 32, the image editing application 3200 includes a user interface (UI) interaction and generation module 3205, a viewing mode module 3265, a UI control animator 3215, a UI control manager 3220, and a rendering engine 3225. The image editing application 3200 also includes effects controls storage 3230, brush controls storage 3235, other controls storage 3240, and image data 3245.

The effects controls storage 3230 stores information about effects controls, such as different effects, types of UI controls for controlling the effects, etc. Similarly, the brush controls storage 3235 stores information about brush controls, such as different brush effects, types of UI controls for controlling the brush effects, etc. The other controls storage 3230 stores information about additional and/or other controls (e.g., color controls for adjusting colors of images, exposure controls for adjusting the exposure of images, etc., as well as types of UI controls for controlling the other controls, etc. The image data storage 3245 stores image data (e.g., RAW image files, JPEG image files, thumbnail versions of images, edited versions of images, display resolution versions of image, other generated versions of images, etc.) that a user views, edits, and organizes with the image editing application 3200. In some embodiments, the storages 3230-3245 are stored in one physical storage while, in some embodiments, the storages are stored on separate physical storages. Still, in some embodiments, some of the storages 3230-3245 are stored in one physical storage while other storages 3230-3245 are stored in separate physical storages.

FIG. 32 also illustrates an operating system 3250 that includes gyroscope device driver 3255, input device driver(s) 3260, and display module 3265. In some embodiments, as illustrated, the gyroscope device driver 3255, device drivers 3260, and display module 3265 are part of the operating system 3250 even when the image editing application 3200 is an application separate from the operating system 3250.

The gyroscope device driver 3255 includes a set of drivers for translating signals from a gyroscope that is part of a computing device on which the application 3200 runs. The gyroscope, in some embodiments, is used to identify the orientation of the device. For instance, the gyroscope is used to determine whether the device is being held in a landscape or portrait position. The gyroscope sends signals to the gyroscope device driver 3255, which provides the signals to the viewing mode module 3210. The input device drivers 3260 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction module 3205.

The present application describes several graphical user interfaces that provide users with numerous ways to perform different sets of operations and functionalities. In some embodiments, these operations and functionalities are performed based on different commands that are received from users through different input devices. For example, the present application illustrates the use of touch control to control (e.g., select, move) objects in the graphical user interface. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments. Additionally, in some embodiments, objects in a graphical user interface can also be controlled or manipulated through other controls, such as a cursor in a graphical user interface (e.g., using a trackpad, touchpad, mouse, etc.).

The display module 3265 translates the output of a user interface for a display device. That is, the display module 3265 receives signals (e.g., from the UI interaction and generation module 3205) describing what should be displayed and translates these signals into pixel information that is sent to the display device. The display device may be an LCD, plasma screen, CRT monitor, touchscreen, etc.

The UI interaction and generation module 3205 of the image editing application 3200 interprets the user input data received from the input device drivers 3260 and passes it to various modules, including the viewing mode module 3210, the UI control manager 3220, and the rendering engine 3225. The UI interaction module 3205 also manages the display of the UI (e.g., fanning animations of UI controls, highlights of UI elements, indicators, etc.), and outputs this display information to the display module 3265. This UI display information may be based on information from the UI control manager 3220 and the rendering engine 3225, etc. In addition, the UI interaction module 3205 may generate portions of the UI based just on user input—e.g., when a user moves an item in the UI that only affect the display, not any of the other modules, such as moving a window from one side of the UI to the other.

The viewing mode module 3210 determines a viewing mode for the application based on information the viewing mode module 3210 receives from the gyroscope device driver 3255 and sends the determination to the UI interaction and generation module 3205 so that the UI interaction and generation module 3205 provides the appropriate UI display information to the display module 3265

Alternatively, or in conjunction with the information from the gyroscope device driver 3255, the viewing mode module 3210 of some embodiments uses information from the UI interaction and generation module 3205 to determine the viewing mode. For instance, when the user modifies the display area (e.g., adjusting the size of the display area, adjusting the width of the display area, adjusting the height of the display area, moving the display area, etc.) in which the application displays the GUI, the application might determine that new viewing mode. As described above, the application of some embodiments provides different GUI for different operations in different viewing modes (e.g., landscape-viewing mode, portrait-viewing mode The UI control animator 3215 generates animations for the UI control manager 3220 based on information from the viewing mode module 3210 and the UI control manager 3220. When the UI control manager 3220 requests an animation of UI controls (e.g., animations of fanning in/out of effects controls, animations of fanning in/out of brush controls, peeling on/off animations, etc.), the UI control animator 3215 retrieves viewing mode information from the viewing mode in order to generate the appropriate animation for the UI control manager 3220.

The UI control manager 3220 provides UI controls for the UI interaction and generation module 3205 to send to the display module 3265 to display. For instance, when the user activates a U tool, such as a brushes tool or an effects tool, the U control manager 3220 receives from the UI interaction and generation module 3205 a request for the appropriate UI controls. The UI control manager 3220 then sends a request to the UI control animator 3215 for an animation of the UI controls.

The rendering engine 3225 is responsible for rending different versions of images based on the original image. For instance, the rendering module 3225 uses the image data in the image data storage 3245 to render thumbnails of images and display resolution versions of the images for the UI interaction and generation module 3205 to send to the display module 3265 to display in a GUI. When edits are made to an image, the rendering engine 3225 generates edited thumbnail and display resolution versions of the image based on the image data in the image data storage 3245. In some embodiments, the rendering engine receives requests from the UI control manager 3220 to generate images for UI controls (e.g., thumbnail slider controls). The rendering engine 3225 also renders images when the application of some embodiments exports images to an external source. In some cases, the rendering engine 3225 renders the full-size version of original image.

While many of the features have been described as being performed by one module (e.g., the UI interaction module 3205, the UI control animator 3215, etc.), one of ordinary skill in the art will recognize that the functions described herein might be split up into multiple modules. Similarly, functions described as being performed by multiple different modules might be performed by a single module in some embodiments (e.g., the UI control animator 3215 and the UI control manager 3220).

II. Ordered Edit Processing for Non-Destructive Images

The image editing application of some embodiments provides various tools for editing an image. As described above, the application of some such embodiments provides a crop tool, an exposure tool, a color tool, a brush tool, and an effects tool for editing an image. In some embodiments, when different edits are made to the image using different tools, the application applies the different edits in a particular order. The following section will describe several example operations for facilitating the application of different edits to an image that are made using different tools in a particular order.

Figure 33A:
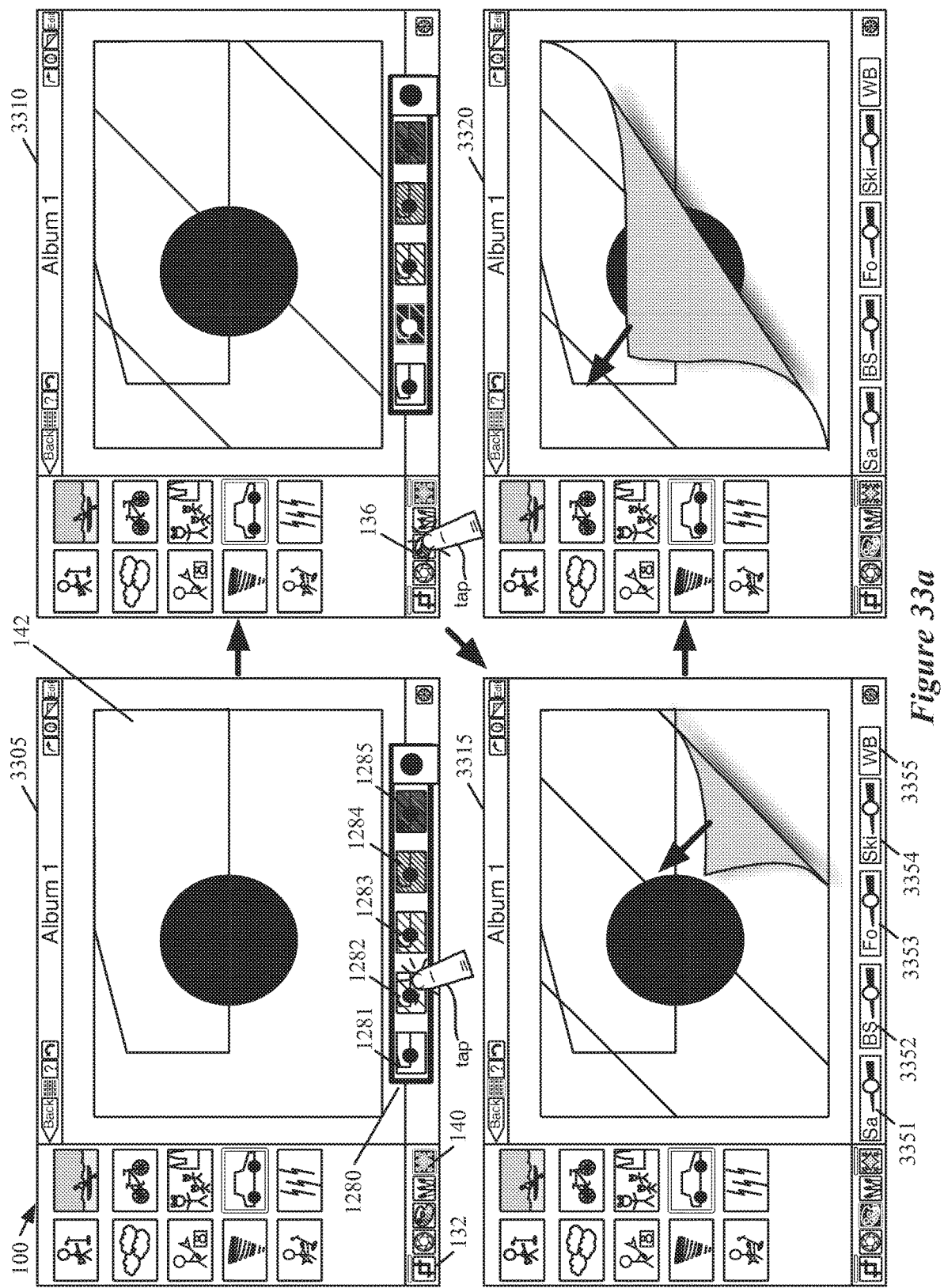
FIGS. 33a-33c conceptually illustrate an example of an ordered edit operation according to some embodiments.
Figure 33B:
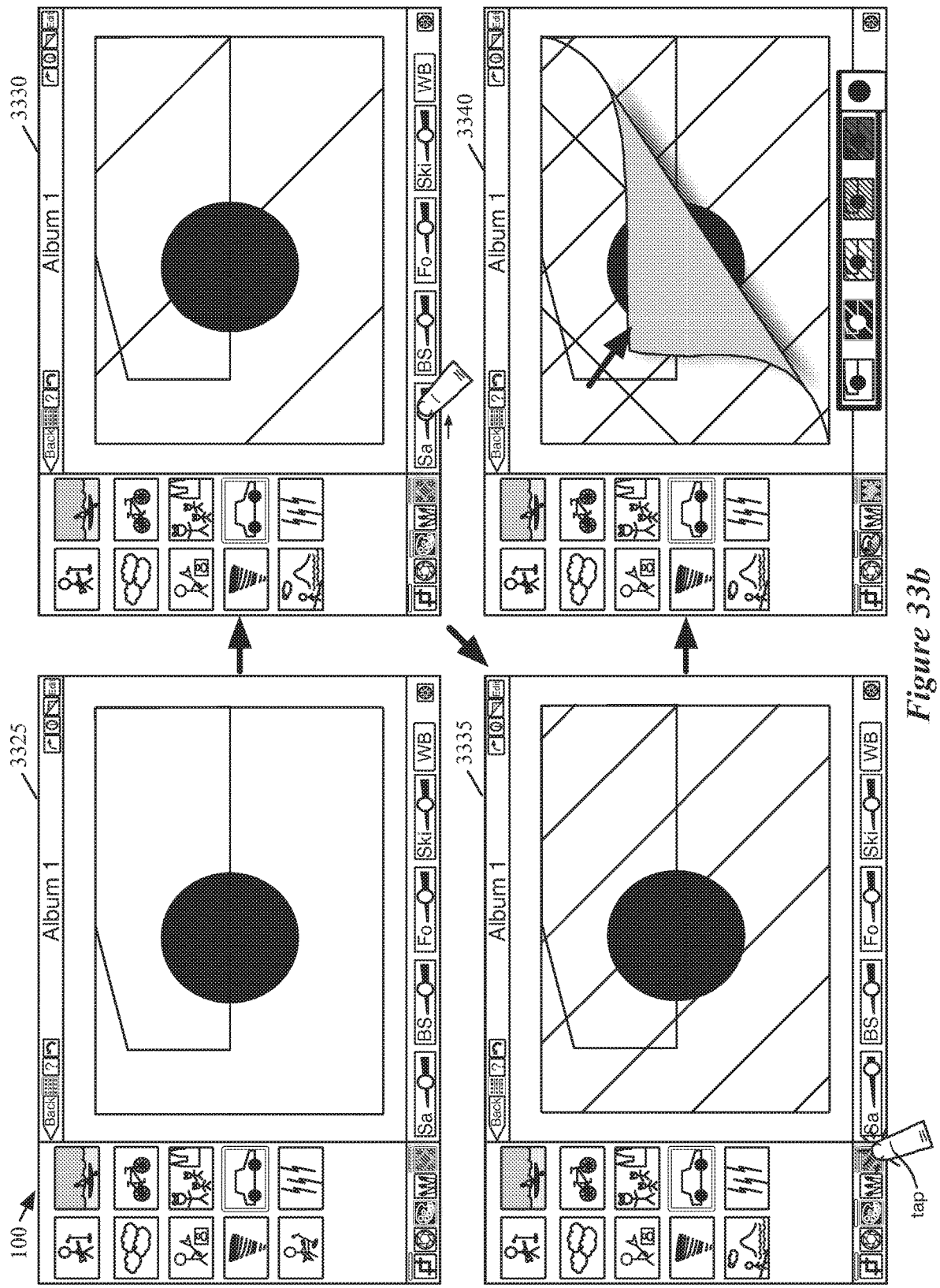
Figure 33C:
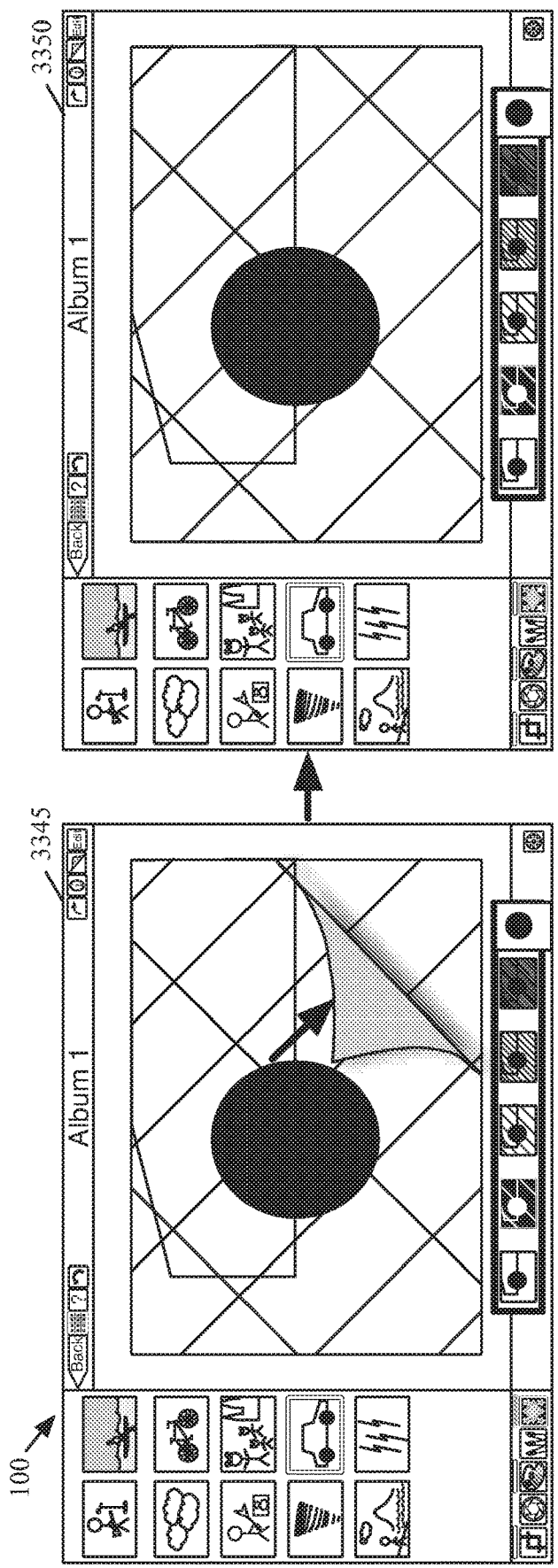

FIGS. 33*a*-33*c* conceptually illustrate an example of an ordered edit operation according to some embodiments. Specifically, FIGS. 33*a*-33*c* illustrate the GUI 100 at ten different stages 3305-3350 of an ordered edit operation.

The first stage 3305 of the GUI 100 is similar to the first stage 1205 of the GUI 100 illustrated in FIG. 12 except a crop tool has been used to crop the lower left portion of the image 142, as indicated by an indicate displayed above the crop tool UI item 132. Details of crop tools are described in U.S. patent application Ser. No. 13/629,370, entitled "User Interface Tools for Cropping and Straightening Image". U.S. patent application Ser. No. 13/629,370, is hereby incorporated by reference.

Also, the first stage 3305 illustrates a selection of a selectable UI item of the effects control 1280. As shown, a user is selecting the UI item 1282 (e.g., by touching the UI item 1282) to apply the effect associated with the thumbnail slider control 1280 to the cropped image 142.

The second stage 3310 shows the GUI 100 after the effect selected in the first stage 3305 is applied to the cropped image 142. The application displays an indicator above the effects tool UI item 140 to indicate that an effect has been applied to the image being edited. As shown, the effect is indicated by diagonal lines on the cropped image 142. The second stage 3310 also illustrates the activation of color tool. As shown, the user is selecting the color tool UI item 136 (e.g., by touching the UI item 136) in order to activate the color tool.

The third stage 3315 illustrates the GUI 100 after the color tool is activated. As shown, the color tool includes a set of color adjustment slider controls 3351-3354 for performing various color adjustment to the image being edited and a UI item 3355 for providing various white balance tools (not shown in FIGS. 33*a*-33*c*). Details of color tools that include color adjustment controls are described in U.S. patent application Ser. No. 13/629,428, entitled "Context Aware User Interface for Image Editing". U.S. patent application Ser. No. 13/629,428, is hereby incorporated by reference.

The third stage 3315 of the GUI 100 also shows that the effects tool UI item 140 is no longer highlighted and that the color tool UI item 136 is highlighted to indicate that the color tool is activated. When the image editing application receives the selection of the color tool UI item 136, the application removes the highlighting from the effects tool UI item 140 and highlights the color tool UI item 136.

In this example, the application applies color adjustment edits to the image before applying effects edits to the image. Thus, in this example, the application temporarily removes the effects edits applied to the cropped image 142 when the color tool is activated. As shown, the application indicates the removal of the effects edits from the cropped image 142 by displaying an animation that is referred to as a peeling off animation. The peeling off animation shows a layer of the cropped image 142, with the effects edits applied to the layer, being removed from the cropped image 142. While displaying the peeling off animation, the application displays a version of the image 142 without the effects edits applied to the image 142, underneath the layer being removed. In other words, the application displays an animation that appears like the layer with the effects edits is being peeled away from the cropped image 142, starting from the lower right corner of the cropped image 142 towards the upper left corner of the cropped image 142.

The fourth stage 3320 shows the GUI 100 near the end of the peeling off animation. Here, the GUI 100 displays the layer being peeled from the cropped image 142 farther from the lower right corner of the image and farther towards the upper left corner of the image.

The fifth stage 3325 illustrates the GUI 100 after the peeling off animation of the effects edits is completed. As shown, the GUI 100 displays the cropped image 142 with the effects edits removed from the image, as illustrated by the diagonal lines no longer displayed. The fifth stage 3325 also shows a different highlighting of the effects tool UI item 140 and the indicator above the UI item 140. This different highlighting is to indicate that effects edits have been applied to the image being edited but the effects are currently removed. When the image editing application finishes displaying the peeling off animation, the application displays the different highlighting of the effects tool UI item 140 and the indicator above the UI item 140.

The sixth stage 3330 of the GUI 100 shows color adjustment edits being applied to the image. As shown, the user is adjusting the color adjustment slider control 3351 (e.g., by touching the slider and dragging along the color adjustment slider control 3351) in order to adjust colors of the cropped image 142. The color adjustments in this example are represented by a different set of diagonal lines displayed on the cropped image 142. Additionally, a different highlighting is displayed above the color tool UI item 136 to indicate that color adjustments have been applied to the cropped image 142.

In the seventh stage 3335, the GUI 100 is showing that the user is finished adjusting the color of the image being edited with the color tool. In this stage, the user has increased the color adjustment of the cropped image 142 from the color adjustment shown in the sixth stage 3330, as indicated by an increase in the different diagonal lines displayed over the cropped image 142.

The seventh stage 3335 also illustrates the activation of the effects tool 175. As shown, the user is selecting the effects tool UI item 140 (e.g., by touching the UI item 140) to activate the effects tool 175.

The eighth stage 3340 illustrates the GUI 100 after the effects tool 175 is activated. The eighth stage 3340 of the GUI 100 also shows that the color tool UI item 136 is no longer highlighted and that the effects tool UI item 140 is highlighted to indicate that the effects tool is activated. When the image editing application receives the selection of the effects tool UI item 140, the application removes the highlighting from the color tool UI item 136 and highlights the effects tool UI item 140. The application continues to display the different highlighting above the effects tool UI item 140 to indicate that the effects edits are still currently removed.

As mentioned above, the application in this example applies color adjustment edits to the image before applying effects edits to the image. Since the user has finished making color edits to the image, the application in this example applies the effects edits that were temporarily removed from to the cropped image 142 when the color tool was activated in the second stage 3310. As shown, the application indicates the application of the effects edits to the cropped image 142 by displaying an animation that is referred to as a peeling on animation. The peeling on animation shows a layer of the cropped image 142, with the color edits and the effects edits applied to the layer, being placed over the color adjusted cropped image 142. Thus, the application displays an animation that appears like the layer with the color edits and the effects edits is being pasted on to the cropped image 142 starting from the upper left corner of the cropped image 142 towards the lower right corner of the cropped image 142.

The ninth stage 3345 shows the GUI 100 near the end of the peeling on animation. In the ninth stage 3345, the GUI 100 displays the layer being place over the cropped image 142 farther from the upper left corner of the image and farther towards the lower right corner of the image. Also, the application continues to display the different highlighting above the effects tool UI item 140 to indicate that the effects edits are still currently removed.

The tenth stage 3350 illustrates the GUI 100 after the peeling on animation is completed. As shown, the effects edits that were temporarily removed have been applied to the cropped image 142. This is indicated by the display of the different types of diagonal lines on the cropped image 142. Here, the application displays the original highlighting above the effects tool UI item 140 to indicate that the effects edits have been applied to the image being edited.

The above-described figures illustrate an example operation of applying different edits made with different tools to an image in a particular order. In some embodiments, different edits made with the same tool to an image are applied in a particular order.

Figure 34A:
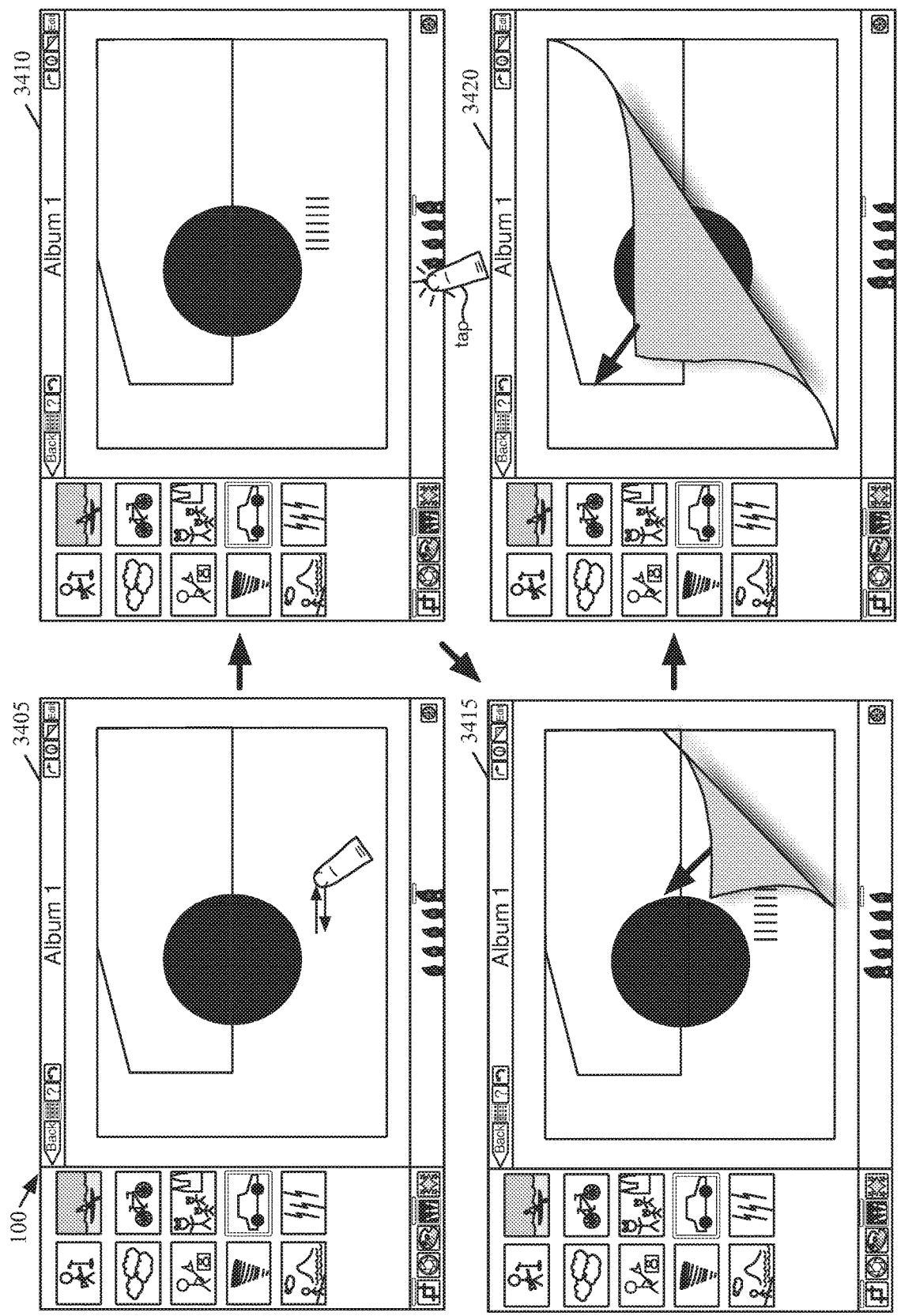
FIGS. 34a-34c conceptually illustrate an example of an ordered edit operation according to some embodiments.
Figure 34B:
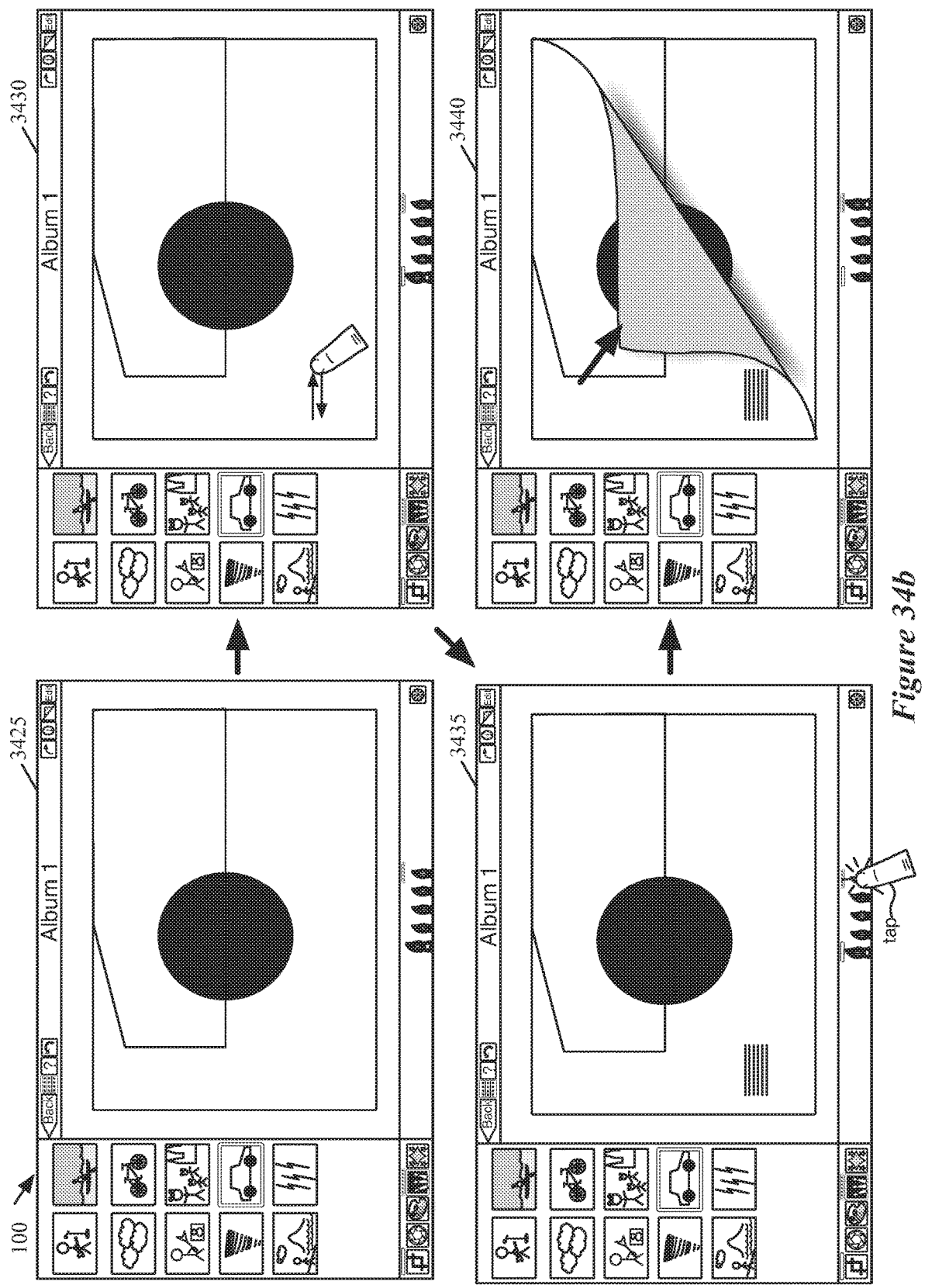
Figure 34C:
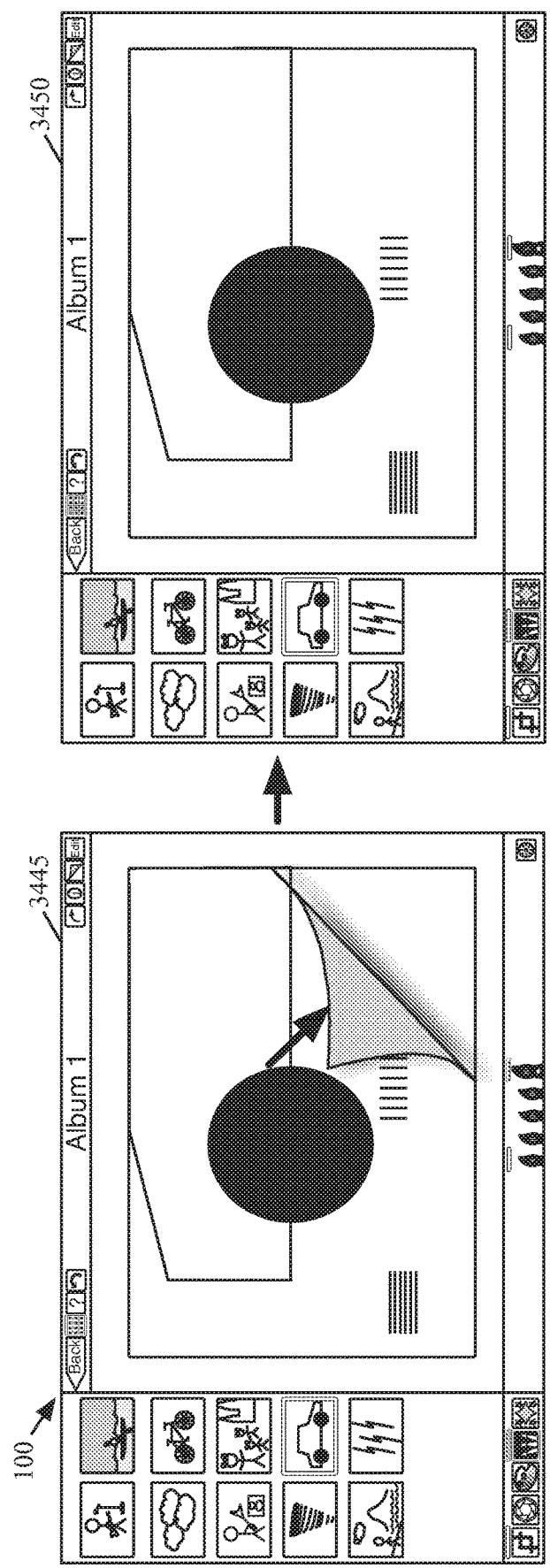

FIGS. 34*a*-34*c* conceptually illustrate an example of an ordered edit operation according to some embodiments. In particular, FIGS. 34*a*-34*c* illustrate the GUI 100 at ten different stages 3405-3450 of an ordered edit operation.

The first stage 3405 of the GUI 100 is similar to the first stage 3305 of the GUI 100 illustrated in FIG. 33*a* except the brushes tool 1875 has been activated instead of the effects tool 175. As shown, the brush control 1888 has been selected and a user is selecting a region of the cropped image 142 (e.g., by touching the region of the image 142 and performing a rubbing gesture) to apply the brush effect associated with the brush control 1888 to the region of the cropped image 142. When receiving the selection of the region of the cropped image 142, the application displays an indicator above the brush control 1888 to indicate that a brush effect has been applied to the cropped image 142 with the brush control 1888 and displays an indicator above the brushes tool UI item 138 to indicate that edits have been applied to the cropped image 142 with the brushes tool 1875.

The second stage 3410 shows the GUI 100 after the user has finished applying the brush effect to the cropped image 142. The region of the image 142 with the brush effect applied is indicated with vertical lines. The second stage 3410 of the GUI 100 also shows the user selecting a different brush control. As shown, the user is selecting the brush control 1880 (e.g., by touching the brush control 1880).

The third stage 3415 illustrates the GUI 100 after the brush control 1880 is selected. When application receives the selection of the brush control 1880, the application removes the highlighting of the brush control 1888 and highlights the selected brush control 1880.

In this example, the application applies the brush control 1880's brush effect edits to the image before applying the brush control 1888's brush effect edits to the image. Therefore, in this example, the application temporarily removes the brush control 1888's brush effect edits that have been applied to the cropped image 142 when the brush control 1880 is selected. As shown, the application indicates the removal of the brush control 1888's brush effect edits from the cropped image 142 by displaying a peeling off animation. The peeling off animation shows a layer of the cropped image 142, with the brush control 1888's brush effect edits applied to the layer, being removed from the cropped image 142. While displaying the peeling off animation, the application displays a version of the image 142 without the brush control 1888's brush effect edits applied to the image 142, underneath the layer being removed. In other words, the application displays an animation that appears like the layer with the brush control 1888's brush effect edits is being peeled away from the cropped image 142, starting from the lower right corner of the cropped image 142 towards the upper left corner of the cropped image 142.

The fourth stage 3420 shows the GUI 100 near the end of the peeling off animation. At this stage, the GUI 100 displays the layer being peeled from the cropped image 142 farther from the lower right corner of the image and farther towards the upper left corner of the image.

The fifth stage 3425 illustrates the GUI 100 after the peeling off animation of the brush control 1888's brush effect edits is completed. As shown, the GUI 100 displays the cropped image 142 with the brush control 1888's brush effect edits removed from the image, as illustrated by the vertical lines no longer displayed. The fifth stage 3325 also shows a different highlighting of the indicator above the brushes tool UI item 138. This different highlighting is to indicate that the brush control 1888's brush effect edits have been applied to the image being edited but the brush effect edits are currently removed. When the image editing application finishes displaying the peeling off animation, the application displays the different highlighting of the indicator above the brushes tool UI item 138.

The sixth stage 3430 of the GUI 100 shows brush effect edits being applied to the image using the brush control 1880. As shown, the user is selecting a second region of the cropped image 142 (e.g., by touching the region of the image 142 and performing a rubbing gesture) to apply the brush effect associated with the brush control 1880 to the second region of the cropped image 142. When receiving the selection of the second region of the cropped image 142, the application displays an indicator above the brush control 1880 to indicate that a brush effect has been applied to the cropped image 142 with the brush control 1880.

The seventh stage 3435 shows the GUI 100 after the user has finished applying the brush effect with the brush control 1880 to the cropped image 142. As shown, the second region of the image 142 with the brush effect applied is indicated with horizontal lines. The seventh stage 3435 of the GUI 100 also shows the user selecting a different brush control. As shown, the user is selecting the brush control 1888 (e.g., by touching the brush control 1888).

The eighth stage 3440 illustrates the GUI 100 after the brush control 1888 is selected. When the image editing application receives the selection of the brush control 1888, the application removes the highlighting from the brush control 1880 and highlights the brush control 1888. The application continues to display the different highlighting above the brushes tool UI item 138 to indicate that the brush control 1888's brush effect edits are still currently removed.

As mentioned above, the application in this example applies the brush control 1880's brush effect edits to the image before applying the brush control 1888's brush effect edits to the image. Since the user has finished making brush effect edits with the brush control 1880 to the image, the application in this example applies the brush control 1888's brush effect edits that were temporarily removed from to the cropped image 142 when the brush control 1880 was selected in the second stage 3410. As shown, the application indicates the application of the brush control 1888's brush effect edits to the cropped image 142 by displaying a peeling on animation. The peeling on animation shows a layer of the cropped image 142, with the brush control 1888's brush effect edits and the brush control 1880's brush effect edits applied to the layer, being placed over the cropped image 142 with just the brush control 1880's brush effect edits. Thus, the application displays an animation that appears like the layer with the brush control 1888's brush effect edits and the brush control 1880's brush effect edits is being pasted on to the cropped image 142 with just the brush control 1880's brush effect edits, starting from the upper left corner of the cropped image 142 towards the lower right corner of the cropped image 142.

The ninth stage 3445 shows the GUI 100 near the end of the peeling on animation. In the ninth stage 3445, the GUI 100 displays the layer being place over the cropped image 142 farther from the upper left corner of the image and farther towards the lower right corner of the image. Also, the application continues to display the different highlighting above the brush control 1888 to indicate that the effects edits are still currently removed.

The tenth stage 3450 illustrates the GUI 100 after the peeling on animation is completed. As shown, the brush control 1888's brush effect edits that were temporarily removed have been applied to the cropped image 142. This is indicated by the display of the vertical lines and the horizontal lines on the cropped image 142. Here, the application displays the original highlighting above the brush control 1888 to indicate that the brush control 1888's brush effect edits have been applied to the image being edited As described above, FIGS. 33*a*-33*c* and 34*a*-34*c* illustrate examples of displaying peeling off animations when edits are temporarily removed from an image and displaying peeling on animations when the edits are applied back on to the image in order to provide visual indications of removing edits from the image and applying edits to the image. Alternatively or in conjunction with displaying the animations, the image editing application of some embodiments provides aural indications of removing edits from the image and applying edits to the image. For instance, in some embodiments, the image editing application plays a sound effect (e.g., a sound of a piece of paper being lifted up) while displaying a peeling off animation. Similarly, the image editing application of some embodiments plays a sound effect (e.g., a sound of a sheet of paper being placed down) while displaying a peeling on animation. Other embodiments may provide additional and/or different types of indications of edits being removed from an image and edits being applied to the image.

FIG. 35 illustrates a table of orders for applying edits according to some embodiments. As shown, the table defines the order for applying edits using a crop tool, an exposure tool, a color tool, a brushes tool, and an effects tool. Also, the table defines, within the brushes tool, the order for applying edits using a repair brush (e.g., the repair brush control illustrated in FIGS. 22 and 28), a red-eye brush (e.g., the red-eye brush control illustrated in FIGS. 22 and 28), and a paint brush (e.g., the saturate brush control, desaturate brush control, lighten brush control, darken brush control, the sharpen brush control, and the soften brush control illustrated in FIGS. 22 and 28)

For each tool listed in the left most column, the corresponding row in the table defines the type of edits that may continue to be applied to an image while the tool in the left column is in use (i.e., is activated) with checkmarks. For instance, when the crop tool is in use, crop edits, exposure edits, and color edits may continue to be applied to the image, as indicated by the checkmarks in the corresponding row. Thus, when the crop tool is activated, the application of some embodiments removes any edits that have been applied to the image with the repair tool, the red-eye tool, the paint tool, or the effects tool.

As described above, FIGS. 34*a*-34*c* illustrate an example operation of applying different edits made with the same tool to an image in a particular order. The row corresponding to the repair tool and the red-eye tool are examples of applying different edits made with the same tool to an image in a particular order. For example, when the red-eye tool is in use only crop edits may continue to be applied to the image. So when the red-eye tool is activated (e.g., by selecting the red-eye brush control 2281), the application of some embodiments removes any edits that have been applied to the image with other brush tools (the repair tool and the paint tool in this example) as well as any edits that have been applied to the image with other tools (the exposure tool, the color tool, and the effects tool in this example).

The table illustrated in FIG. 35 is one example of the orders for applying edits to an image. One of ordinary skill in the art will realize that any number of different orders may be defined for any number of different tools.

Figure 36:
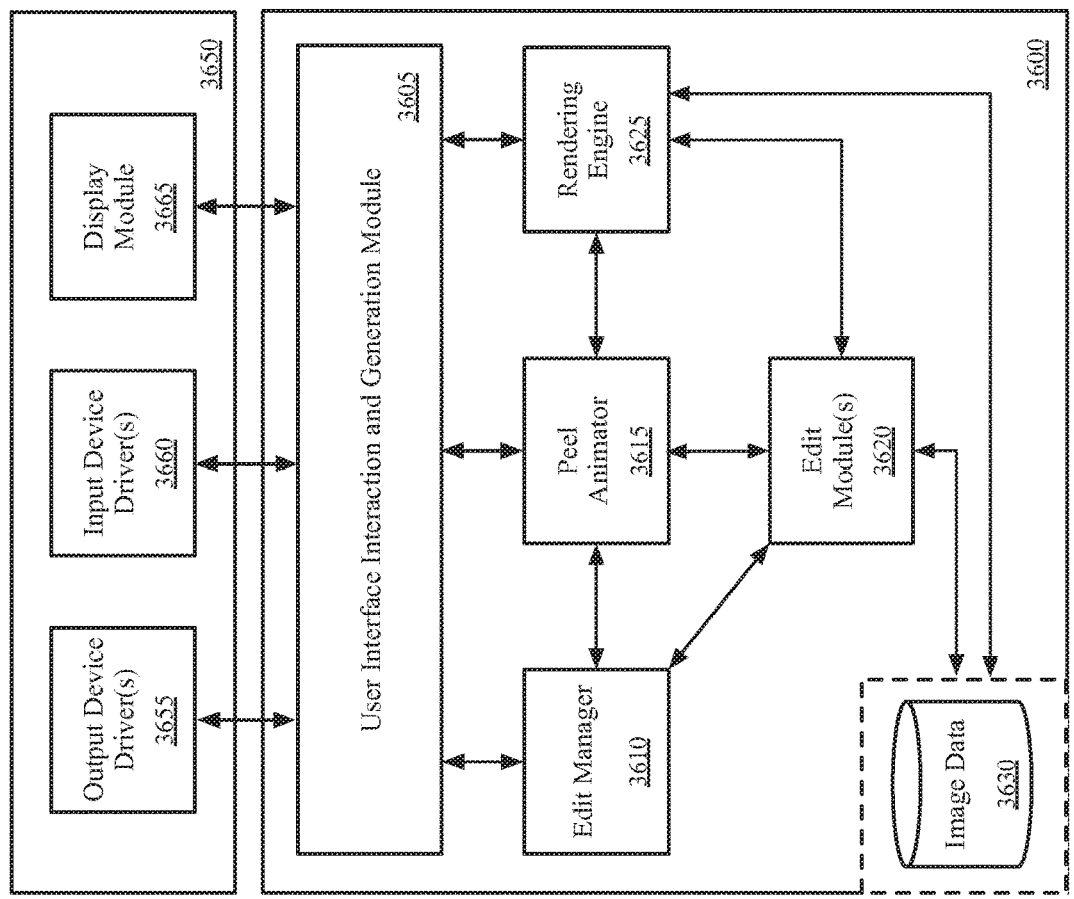
FIG. 36 conceptually illustrates a software architecture of an imaged editing application of some embodiments that provides an ordered edit feature.

FIG. 36 conceptually illustrates a software architecture of an imaged editing application of some embodiments that provides an ordered edit feature. In some embodiments, the image editing application 3600 is a stand-alone application or is integrated into another application (e.g., a compositing application), while in other embodiments the image editing application 3600 might be implemented within an operating system. Furthermore, in some embodiments, the image editing application 3600 is provided as part of a server-based solution. In some such embodiments, the image editing application 3600 is provided via a thin client. That is, the image editing application 3600 runs on a server while a user interacts with the image editing application 3600 via a separate machine remote from the server. In other such embodiments, the image editing application 3600 is provided via a thick client. That is, the image editing application 3600 is distributed from the server to the client machine and runs on the client machine.

As shown in FIG. 36, the image editing application 3600 includes a user interface (UI) interaction and generation module 3605, an edit manager 3610, a peel animator 3615, edit module(s) 3620 and a rendering engine 3625. The image editing application 3600 also includes image data storage 3630. The effects controls storage 3630

The image data storage 3630 stores image data (e.g., RAW image files, JPEG image files, thumbnail versions of images, edited versions of images, display resolution versions of image, other generated versions of images, etc.) that a user views, edits, and organizes with the image editing application 3600. In some embodiments, the image data storage 3630 is stored in one physical storage while, in some embodiments, the image data storage 3630 is stored on separate physical storages.

FIG. 36 also illustrates an operating system 3650 that includes output device driver(s) 3655, input device driver(s) 3660 and display module 3665. In some embodiments, as illustrated, the output device drivers 3655, input device drivers 3660, and display module 3665 are part of the operating system 3650 even when the image editing application 3600 is an application separate from the operating system 3650.

The input device drivers 3660 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction module 3605.

The output device drivers 3655 may include drivers for translating signals to speakers, headphones, printers, etc. In some embodiments, the output device drivers 3655 of some embodiments translate signals from the UI interaction module 3605. For instance, the output device drivers 3655 might receive audio signals (e.g., sound effects) from the UI interaction module 3605 to output to speakers and/or headphones when a peel animation is being displayed.

The present application describes several graphical user interfaces that provide users with numerous ways to perform different sets of operations and functionalities. In some embodiments, these operations and functionalities are performed based on different commands that are received from users through different input devices. For example, the present application illustrates the use of touch control to control (e.g., select, move) objects in the graphical user interface. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments. Additionally, in some embodiments, objects in a graphical user interface can also be controlled or manipulated through other controls, such as a cursor in a graphical user interface (e.g., using a trackpad, touchpad, mouse, etc.).

The display module 3665 translates the output of a user interface for a display device. That is, the display module 3665 receives signals (e.g., from the UI interaction and generation module 3605) describing what should be displayed and translates these signals into pixel information that is sent to the display device. The display device may be an LCD, plasma screen, CRT monitor, touchscreen, etc.

The UI interaction and generation module 3605 of the image editing application 3600 interprets the user input data received from the input device drivers 3660 and passes it to various modules, including the edit manager 3610, the peel animator 3615, and the rendering engine 3625. The UI interaction module 3605 also manages the display of the UI (e.g., fanning animations of UI controls, highlights of UI elements, indicators, etc.), and outputs this display information to the display module 3665. This UI display information may be based on information from the edit manager 3610, the peel animator 3615, and the rendering engine 3625, etc. In addition, the UI interaction module 3605 may generate portions of the UI based just on user input—e.g., when a user moves an item in the UI that only affect the display, not any of the other modules, such as moving a window from one side of the UI to the other. In some embodiments, the UI interaction module 3605 manages the output of audio (e.g., sound effects, etc.) based on user input and/or interaction with the UI.

The edit manager 3610 manages the order of edit processing. For instance, the edit manager 3610 identifies edits that a user has made to an image being edited and determines an order to process identified edits on the image. In some embodiments, the edit manager 3610 determines the order to process edits based on a set of rules. When the edit manager 3610 determines the order, the edit manager 3610 determines a set of edits to display in the UI and sends a request to the peel animator 3615 to generate an animation (e.g., a peeling off animation, a peeling on animation, etc.) and a request to edit modules 3620 to apply the set of edits to the image for the rendering engine 3625 to render.

The peel animator 3615 generates animations for the rendering engine 3625 based on information from the edit manager 3610 and the edit modules 3620. When the edit manager 3610 requests a peeling animation (e.g., a peeling off animation, a peeling on animation, etc.), the peel animator 3615 (1) retrieves from the UI interaction and generation module 3605 a version of the image being edited that is currently displayed in the UI and (2) retrieves from the edit modules 3620 a version of the image being edited that is to be displayed in the UI after the peeling animation. With the information retrieved from the UI interaction module 3605 and the edit modules 3620, the peel animator 3615 generates the requested animation and sends the animation to the rendering engine 3625.

The edit modules 3620 are for applying edits to an image (e.g., an image being edited). When the edit modules 3620 receive from the edit manager 3610 a set of edits to apply to an image, the edit modules 3620 identify the image data in the image data storage 3630 that corresponds to the image and apply the set of edits to the image. The edit modules 3620 send a version of the edited image to the rendering engine 3625 to render a version of the edited image to display. In some embodiments, the edit modules 3620 send a version of the edited image to the peel animator 3615 in order for the peel animator 3615 to generate a peel animation.

The rendering engine 3625 is responsible for rending different versions of images based on the original image. For instance, the rendering module 3625 uses the image data in the image data storage 3630 to render thumbnails of images and display resolution versions of the images for the UI interaction and generation module 3605 to send to the display module 3665 to display in a GUI. When edits are made to an image, the rendering engine 3625 generates edited thumbnail and display resolution versions of the image based on the image data in the image data storage 3630. The rendering engine 3625 also renders images when the application of some embodiments exports images to an external source. In some cases, the rendering engine 3625 renders the full-size version of original image.

While many of the features have been described as being performed by one module (e.g., the UI interaction module 3605, the peel animator 3615, etc.), one of ordinary skill in the art will recognize that the functions described herein might be split up into multiple modules. Similarly, functions described as being performed by multiple different modules might be performed by a single module in some embodiments (e.g., the peel animator 3615 and the edit manager 3610).

III. Data Structure for Non-Destructive Images

Figure 37:
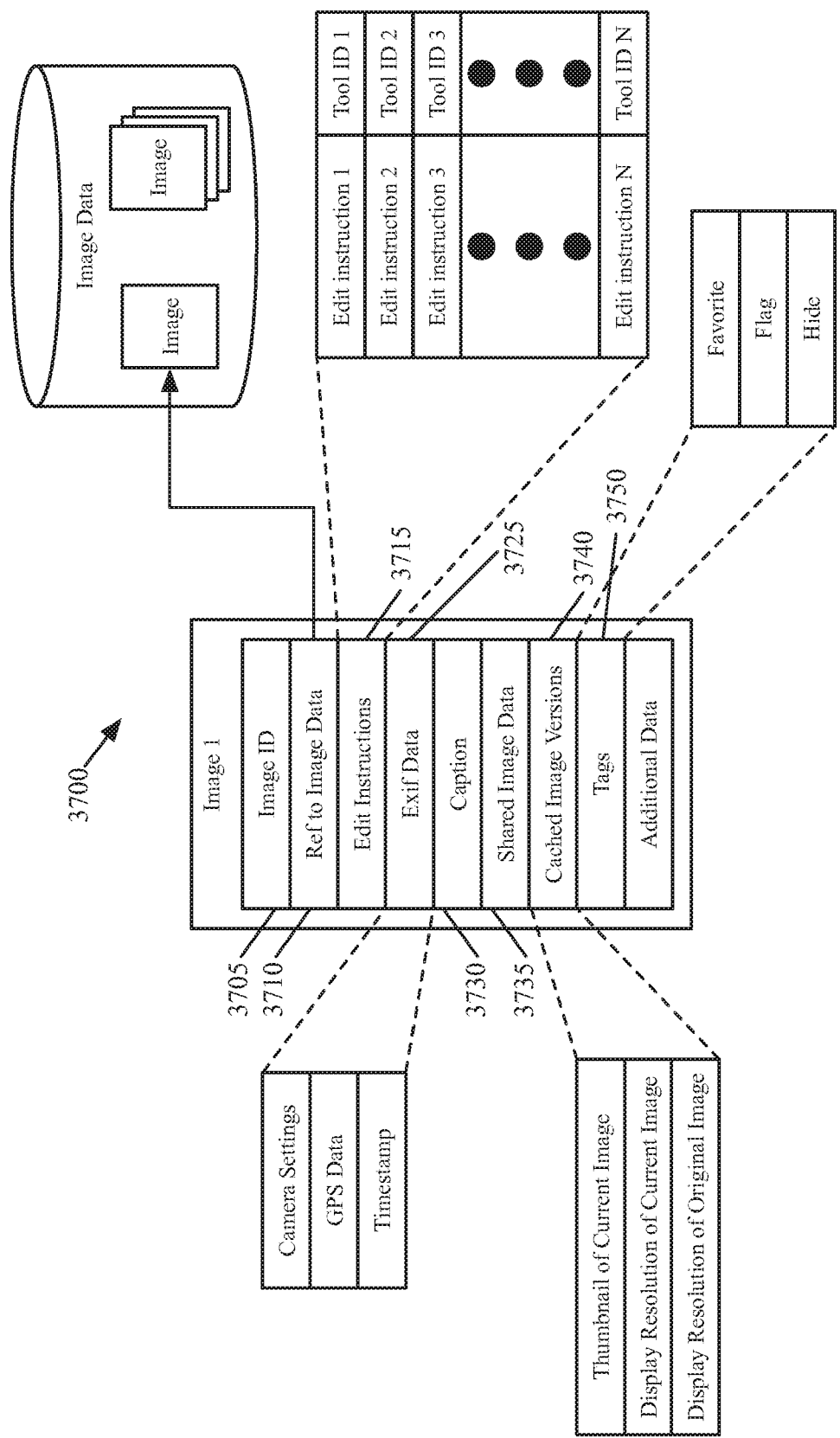
FIG. 37 conceptually illustrates a data structure for an image that is stored by the application of some embodiments.

The above sections describe various operations for editing images in the GUI of some embodiments. The application of some embodiments generates and stores a data structure to represent images. FIG. 37, which conceptually illustrates a data structure 3700 for an image as stored by the application of some embodiments. As shown, the data structure 3700 includes an image ID 3705, a reference to image data 3710, edit instructions 3715, Exchangeable image file format (Exif) data 3725, a caption 3730, shared image data 3735, cached versions 3740 of the image, any tags 3750 on the image, and any additional data for the image. The image ID 3705 is a unique identifier for the image.

The reference to image data 3710 is a pointe to the actual full-size pixel data for displaying the image (e.g., a series of color-space channel values for each pixel in the image or an encoded version thereof). The image data of different embodiments are stored in different locations. For instance, the image data may be stored in a local location (e.g., stored as a file in a file system of a computing device on which the application runs). In such cases, the reference 3710 points to the local location. In some embodiments, the image data is stored in another application (e.g., stored in a database of an image organizing application). The other application, in some embodiments, runs on the same computing device on which the application runs whereas the other application, in other embodiments, runs on a different computing device. The reference 3710 in some such embodiments stores a pointer to the image data stored in the other application. In some embodiments, instead of storing a pointer to the image data stored in the other application, the reference 3710 stores a unique identifier for retrieving the image data from the other application (e.g., via an application programming interface (API) call). In some embodiments, when the image is edited through the application, the application generates retrieves the image that is stored in the other application and then stores the image in the data structure 3700.

The edit instructions 3715 include information regarding any edits the user has applied to the image. In this manner, the application stores the image in a non-destructive format, such that the application can easily revert from an edited version of the image to the original at any time. For instance, if the user applies a saturation effect to the image, leaves the application, and then comes back and decides to remove the effect, the user can easily do so.

As shown, the edit instructions 3715 stores a set of instructions for each edit that the user has applied to the image and the tool identifier for identifier the tool that the user used to apply the edit. Examples of edits include crop edits, rotate edits, exposure edits, color edits, brush effect edits, effects edits, or any other type of edit that modifies the pixels of the image. This way, the application can identify all the edits that the user has applied to the image using a particular tool. This allows the application to identify edits made with a particular tool so that the application can remove and re-apply edits to the image in order to implement features such as the ones describes above by reference to FIGS. 33a-33c, 34a-34c, and 35. Some embodiments store these editing instructions in a particular order, so that users can view different versions of the image with only certain sets of edits applied or the application can easily remove and re-apply certain types of edits. In some embodiments, the editing instructions are stored in the order in which the user has applied the edits to the image.

The Exif data 3725 includes various information stored by the camera that captured the image, when that information is available. While Exif is one particular file format that is commonly used by digital cameras, one of ordinary skill in the art will recognize that comparable information may be available in other formats as well, or may even be directly input by a user. The Exif data 3725 includes camera settings data, GPS data, and a timestamp. The camera settings data includes information about the camera settings for a image, if that information is available from the camera that captured the image. This information, for example, might include the aperture, focal length, shutter speed, exposure compensation, and ISO. The GPS data 3725 indicates the location at which a image was captured, while the timestamp indicates the time (according to the camera's clock) when the image was captured.

The caption 3730 is a user-entered description of the image. In some embodiments, this information is displayed with the photo in the image viewing area, but may also be used to display over the photo in a created journal, and may be used if the image is posted to a social media or photo-sharing website. When the user posts the image to such a website, the application generates shared image data 3735 for the image. This information stores the location (e.g., Facebook®, Flickr®, etc.), as well as an object ID for accessing the image in the website's database. The last access date is a date and time at which the application last used the object ID to access any user comments on the photo from the socialmedia or photo sharing website.

The cached image versions 3740 store versions of the image that are commonly accessed and displayed, so that the application does not need to repeatedly generate these images from the full-size image data 3710. As shown, the cached image versions 3740 include thumbnail image of the current image, a display resolution version (e.g., a version tailored for the image display area) of the current image, and a display resolution version of the original image. In some embodiments, the application generates a new thumbnail image for the current thumbnail image and the new display resolution version for the current display resolution image when an edit is made to the image. For instance, when edits are removed during an ordered edit operation, the application generates new thumbnail and display versions of the image that includes only the edits that have not been removed for display in the GUI.

By storing cached versions of the image, the application of some embodiments does not need to render full-sized versions of the image. In some embodiments, the application generates full-sized versions of the image when the application exports the image. For instance, the user might use a feature of the application of some embodiments that allows the user to save the image to another application (e.g., an image organizing application). In such instances, the application generates a full-sized version of the image and exports it the other application.

As mentioned above, the image data is stored in another application in some embodiments. In some embodiments, the other application also stores a thumbnail version of the image. The application in some such embodiments stores a pointer to the thumbnail version that is stored in the other application while the image is not edited. In some embodiments, when the image is edited through the application, the application generates versions of the image that is stored in the other application and then stores them in the cached image versions field of the data structure 3700.

The tags 3745 are information that the application enables the user to associate with an image. For instance, in some embodiments, users can, mark the image as a favorite, flag the image (e.g., for further review), and hide the image so that the image will not be displayed when the user cycles through a collection that includes the image. Other embodiments may include additional tags. For instance, some embodiments store a tag for indicating that the image data is a raw image, a tag that indicates whether an edit has been applied to the image, etc. Finally, the image data structure 3700 includes additional data 3750 that the application might store with an image (e.g., locations and sizes of faces, etc.).

One of ordinary skill in the art will recognize that the image data structure 3700 is only one possible data structure that the application might use to store the required information for an image. For example, different embodiments might store additional or less information, store the information in a different order, etc.

In some embodiments, the application provides a feature that allows the user to switch between the current edited version of the image and the original image. To facilitate the quick switching between the different versions of the image, the application of some embodiments utilizes the non-destructive method of storing images described above.

Figure 38:
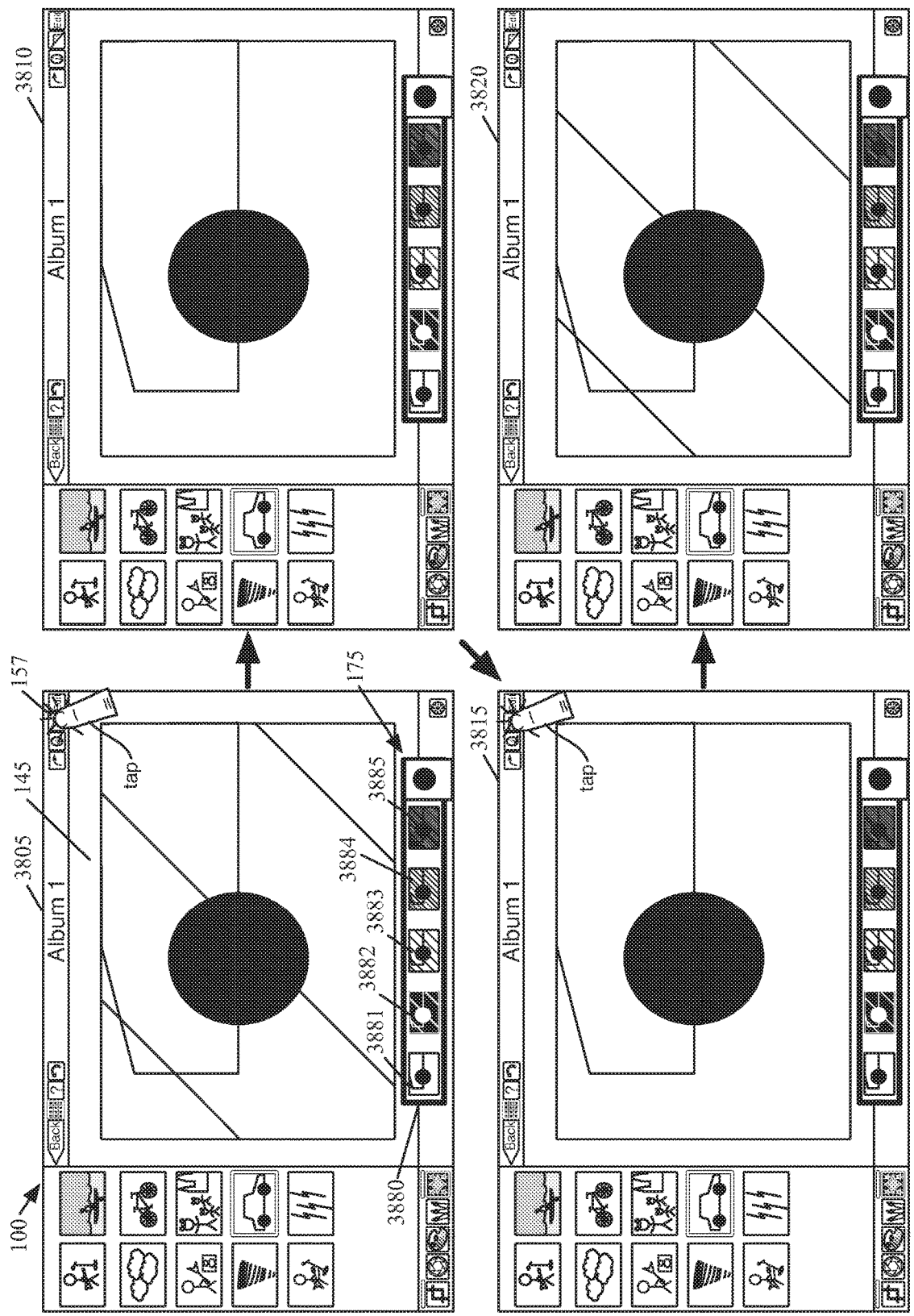
FIG. 38 conceptually illustrates a toggle operation of some embodiments that allows the user to toggle between the original image and the currently edited image.

FIG. 38 conceptually illustrates a toggle operation of some embodiments that allows the user to toggle between the original image and the currently edited image. The application can easily perform this toggle operation because, as mentioned above, the application maintains the original image in a non-destructive way. FIG. 38 illustrates the GUI 100 at four different stages 3805-3820 of a toggle operation that is controlled by a toggle button.

The first stage 3805 of the GUI 100 shows an image after it has been edited through the effects tool. As shown, a user has activated the effects tool 175 (e.g., by selecting the UI item 140), as indicated by the highlighting of the effects item 140. In addition, the user has selected a thumbnail slider control 3880 of the effects tool 175 (e.g., by touching the thumbnail slider control 3880 when the set of thumbnail slider controls of the effects tool 175 were fanned out). The edits are represented in this image through the diagonal lines displayed on the image. The first stage also illustrates that the user has selected the toggle button 157.

The second stage 3810 illustrates the GUI 100 after the user has selected the toggle button 157. The edited image in the image display area 145 has been replaced by the original image. In this FIG. 28, the original image is differentiated from the edited image by the absence of the diagonal lines that were displayed on the edited image in the first stage 3805.

The third stage 3815 then illustrates the GUI 100 after the user has selected the toggle button 157 again, the effect of which is to revert from the original image back to the edited image. This results in the illustration for the fourth stage 3820, which illustrates the edited image with the diagonal lines once again displayed on the image.

Figure 39:
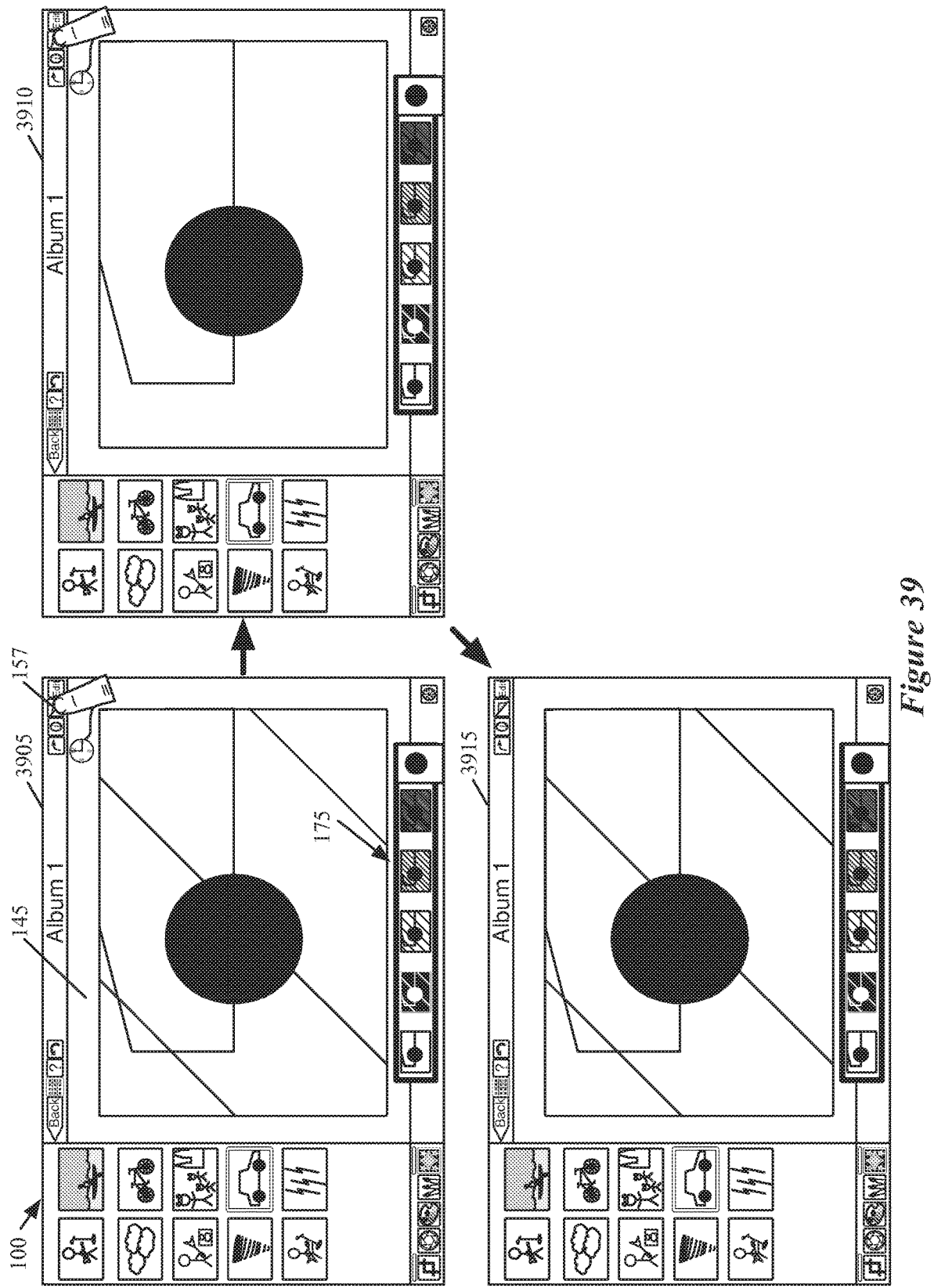
FIG. 39 conceptually illustrates another toggle operation of some embodiments that allows the user to toggle between the edited image to the original image.

FIG. 39 conceptually illustrates another toggle operation of some embodiments that allows the user to toggle between the edited image to the original image by pressing and holding down the toggle button 157. FIG. 39 illustrates the toggle operation of GUI 100 in three stages 3905-3920.

The first stage 3905 of the GUI 100 shows an image after it has been edited through application of certain effects from the effects tool 175. As shown, a user has made certain edits to image. The edits are represented in this image through the diagonal lines displayed on the image. The first stage also illustrates that the user has selected and continues to select the toggle button 157 (e.g. by touching the toggle button without releasing their finger from the screen) the effect of which is illustrated in the second stage.

The second stage 3910 illustrates the GUI 100 and the original image that appears within a certain threshold time period after the user selects and holds down the toggle button 157. The edited image in the image display area 145 has been replaced by the original image. The original image is differentiated from the edited image by the absence of the diagonal lines that were displayed on the edited image in the first stage 3905.

The third stage 3915 then illustrates the GUI 100 after the user has released the toggle button 157, which again reverts the image being displayed from the original image back to the edited image.

Figure 40:
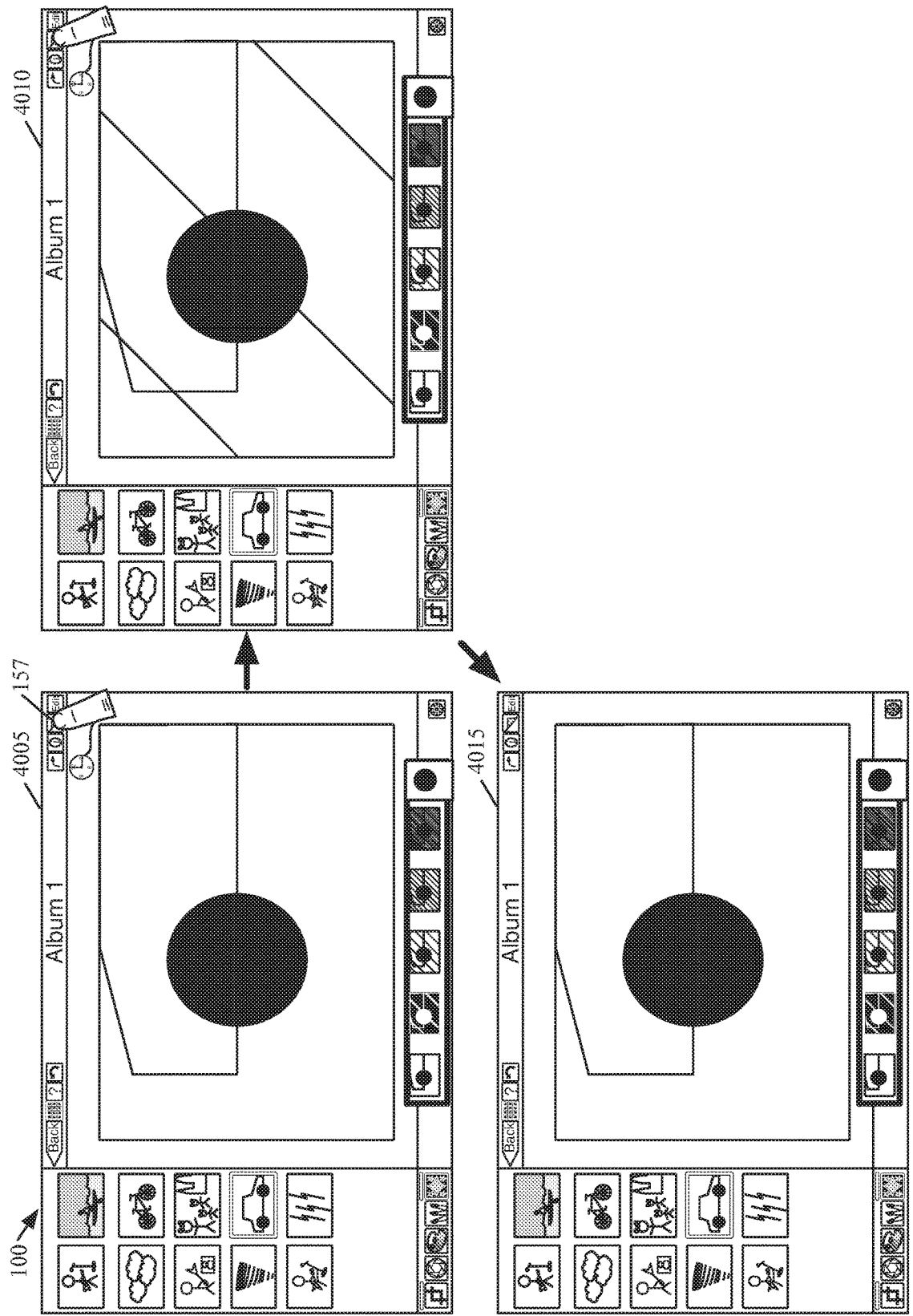
FIG. 40 conceptually illustrates another toggle operation of some embodiments that allows the user to toggle between the original image and an edited image.

FIG. 40 conceptually illustrates another toggle operation of some embodiments that allows the user to toggle between the original image and an edited image by pressing and holding down the toggle button 157. FIG. 20 illustrates the toggle operation of GUI 100 in three stages 4005-4020.

The first stage 4005 of the GUI 100 shows an original image without any edits to the image. The first stage also illustrates that the user has selected and continues to select the toggle button 157 (e.g. by touching the toggle button without releasing their finger from the screen) the effect of which is illustrated in the second stage 4010.

The second stage 4010 illustrates the GUI 100 and the edited image that appears within a certain threshold time period after the user selects and holds down the toggle button 157. The original image in the preview display area has been replaced by the edited image. The edited image is differentiated from the original image in the first stage 4005 by the diagonal lines that are displayed on the edited image.

The third stage 4015 then illustrates the GUI 100 after the user has released the toggle button 157, which again reverts the image being displayed from the edited image back to the original image.

Figure 41:
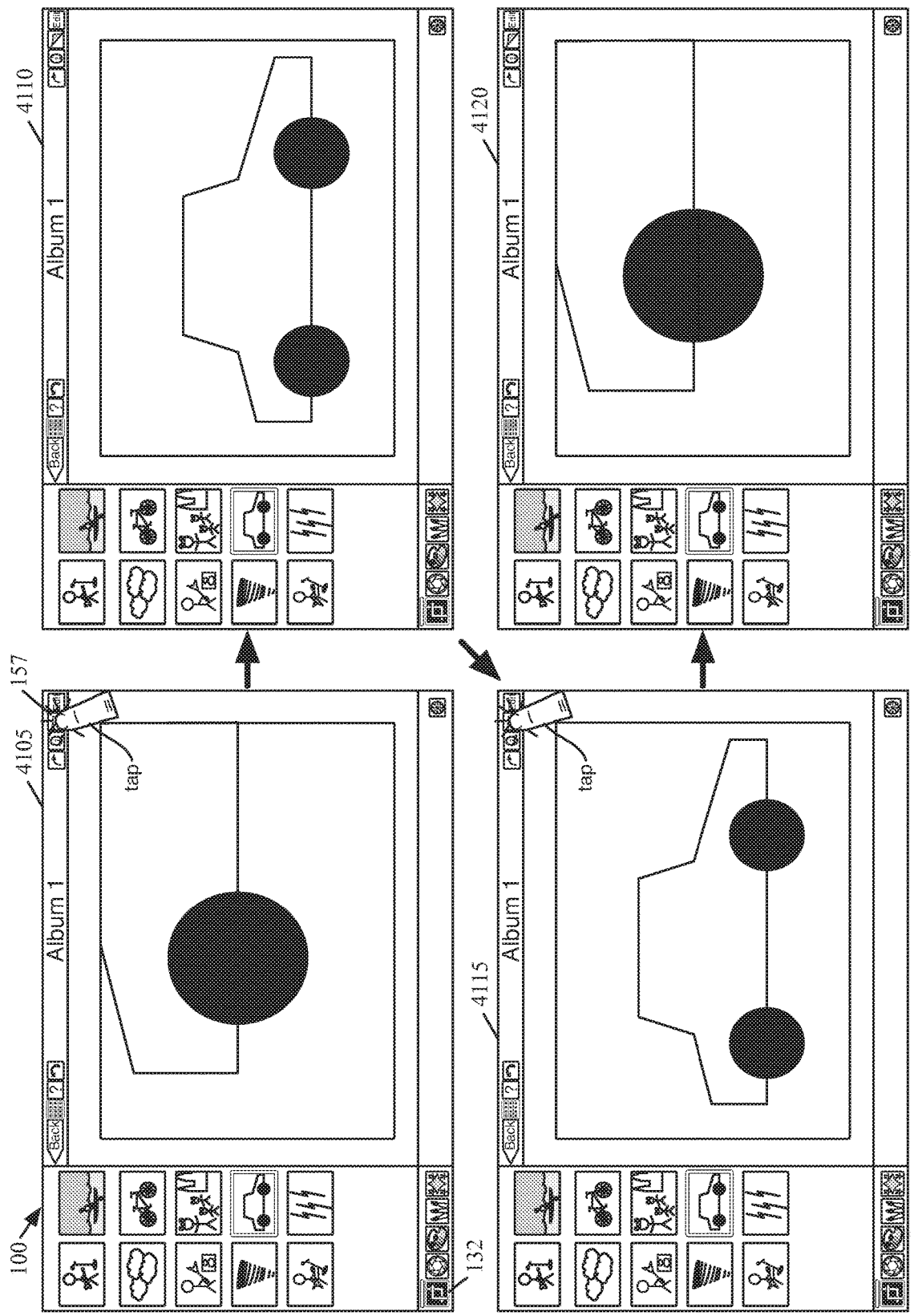
FIG. 41 conceptually illustrates a toggle operation of some embodiments that allows the user to toggle between a cropped image and the original image when the crop tool is active.

FIG. 41 conceptually illustrates a toggle operation of some embodiments that allows the user to toggle between a cropped image and the original image when the crop tool 132 is active. FIG. 41 illustrates the toggle operation of GUI 100 in four stages 4105-4120.

The first stage 4105 of the GUI 100 shows an image after it has been cropped using the crop tool 132. As shown, a user has activated the crop tool 132 (e.g., by selecting the UI item 132), as indicated by the highlighting of the crop tool 132. The cropped image displays only the cropped portion of the original image, which in this image is the front portion of a car. The first stage also illustrates that the user has selected the toggle button 157.

The second stage 4110 illustrates the GUI 100 after the user has selected the toggle button 157 when the crop tool 132 is activated. The cropped image in the image display area 145 has been replaced by the original, un-cropped image. The original image displays the entire image, which in this image is the entire car without any of the cropping edits.

The third stage 4115 then illustrates the GUI 100 after the user has selected the toggle button 157 again, the effect of which is to revert from the original image back to the cropped image. This results in the illustration for the fourth stage 4120, which illustrates the cropped image with again only the front portion of the car being displayed in the image.

The FIGS. 38-41 described above provide examples of a feature for toggling between two images. In some embodiments, the feature provides a visual indication when switching from one image to the other image. For instance, some embodiments display an animation (e.g., the peeling animations described above by reference to FIGS. 33a-33c and 34a-34c) that transitions from displaying one image to displaying the other image.

IV. Image Beaming

The application of some embodiments provides a feature that allows the user of the application to send images to users of other devices that are also running the application. The following section will describe several examples and embodiments of the feature.

Figure 42:
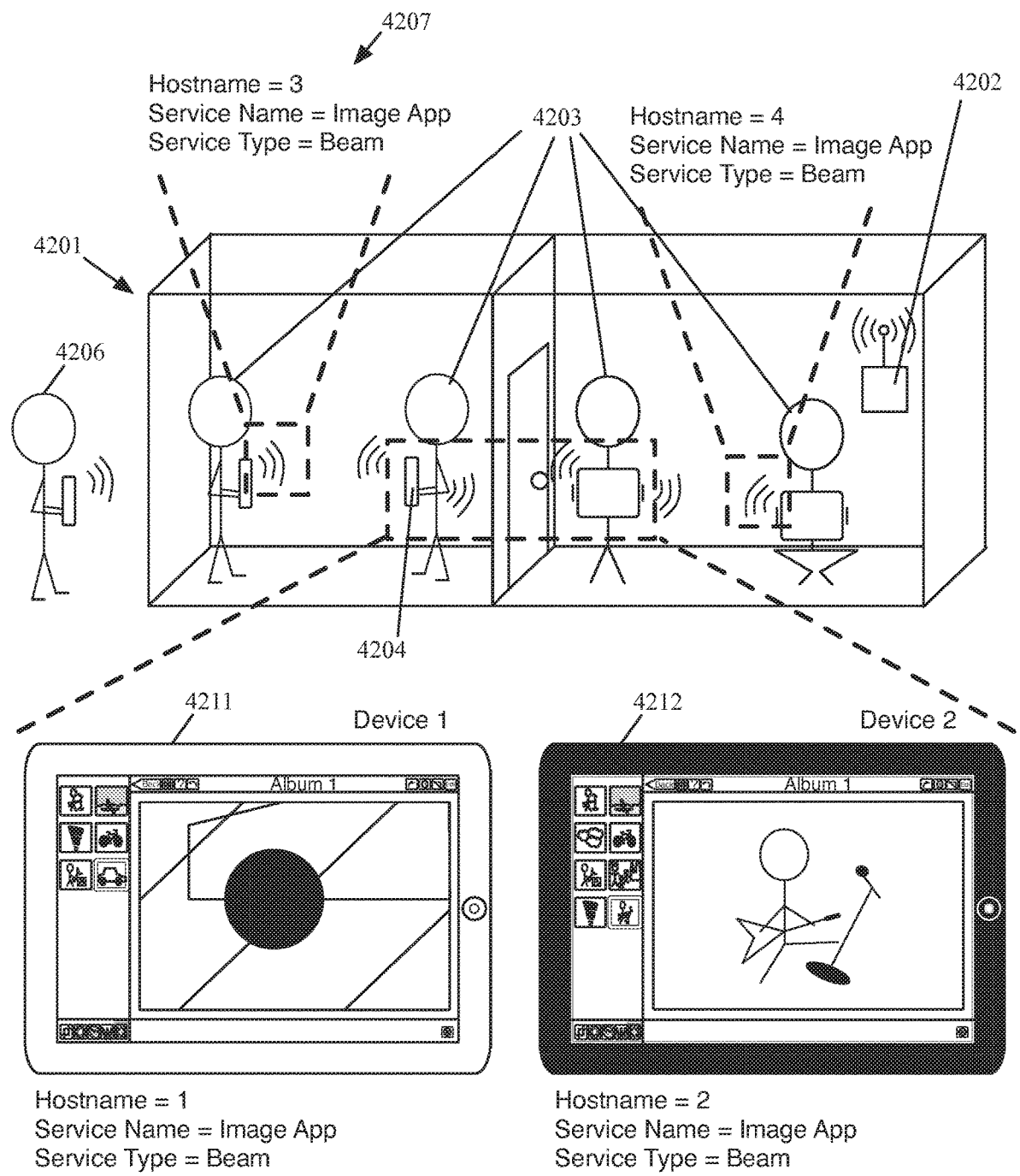
FIG. 42 conceptually illustrates an example of two devices using the beaming services of the image editing application of some embodiments.

FIG. 42 conceptually illustrates an example of two devices using the beaming services of the image editing application of some embodiments. Specifically, FIG. 42 illustrates a locality 4201 that is serviced by a wireless network transceiver 4202 that provides network communication services (e.g. Wi-Fi service) to four participants 4203 with handheld devices 4204. This figure also illustrates a fifth participant 4206 who is outside the range of the wireless network transceiver 4202 and therefore unable to receive communications. It should be noted that even when a participant is within this locality, the participant might not be able to use the network transceiver 4202 for establishing communication with the other devices if the particular device is not part of that network. Accordingly, in this situation, a device might receive communication with other devices because it is outside of the network or because the device is outside of the range of the wireless network transceiver.

As shown in FIG. 42, each device 4204 within the network broadcasts a beaming service available message 4207 to indicate that the device 4204 is available to receive data from the image editing applications of the other devices 4204 through the beaming services of these applications. The structure of this message 4207 includes the hostname of the device, service name of the device, and the service type. The hostname is used to identify each device within the network with an identifier. This figure illustrates four devices 4204, each with a different hostname, including devices "1", "2", "3" and "4". The service name of the device indicates that the application using the beaming service is the image editing application. The service type indicates that each message is broadcast for the beaming services.

In the example illustrated in FIG. 42, the two devices that are about to establish communication with each other are "Device 1" 4211 and "Device 2" 4212, as further described below by reference to FIG. 43. FIG. 42 illustrates that the image editing application is concurrently running on both devices, device 1 4211 and device 2 4212, in order to allow these two devices to exchange image data. In other words, for any first device to be able to receive image data from a second device, the first device, in some embodiments, has to have its image editing application active so that it is broadcasting its beaming service availability message to inform other nearby devices, including the second device, that it is ready to receive messages. However, one of ordinary skill in the art will recognize that in other embodiments, devices will broadcast this beaming service message even when the image editing application is not being executed by the device. In these embodiments, the user will be prompted to open the image editing application to receive the image data when a second device 4212 beams an image to a first device 4211 that does not have its image editing application open.

In the example illustrated in FIG. 42 and the examples described below, the devices communicate through a wireless network 4202 (e.g., Wi-Fi network that is established by a wireless transceiver that is not part of one of the devices). Other embodiments, however, do not need such a wireless transceiver 4202 to establish a communication between the devices 4204. For instance, some embodiments use the Bluetooth transceiver of the device to establish a wireless link between the devices and then use this link to beam images between devices. In both the Bluetooth approach and the local wireless network approach have an advantage over prior IR based approaches in that they do not require the devices be in line of sight with each other in order to establish inferred communications between them. However, some of the features described above and below could be implemented in more traditional IR based approaches.

Figure 43:
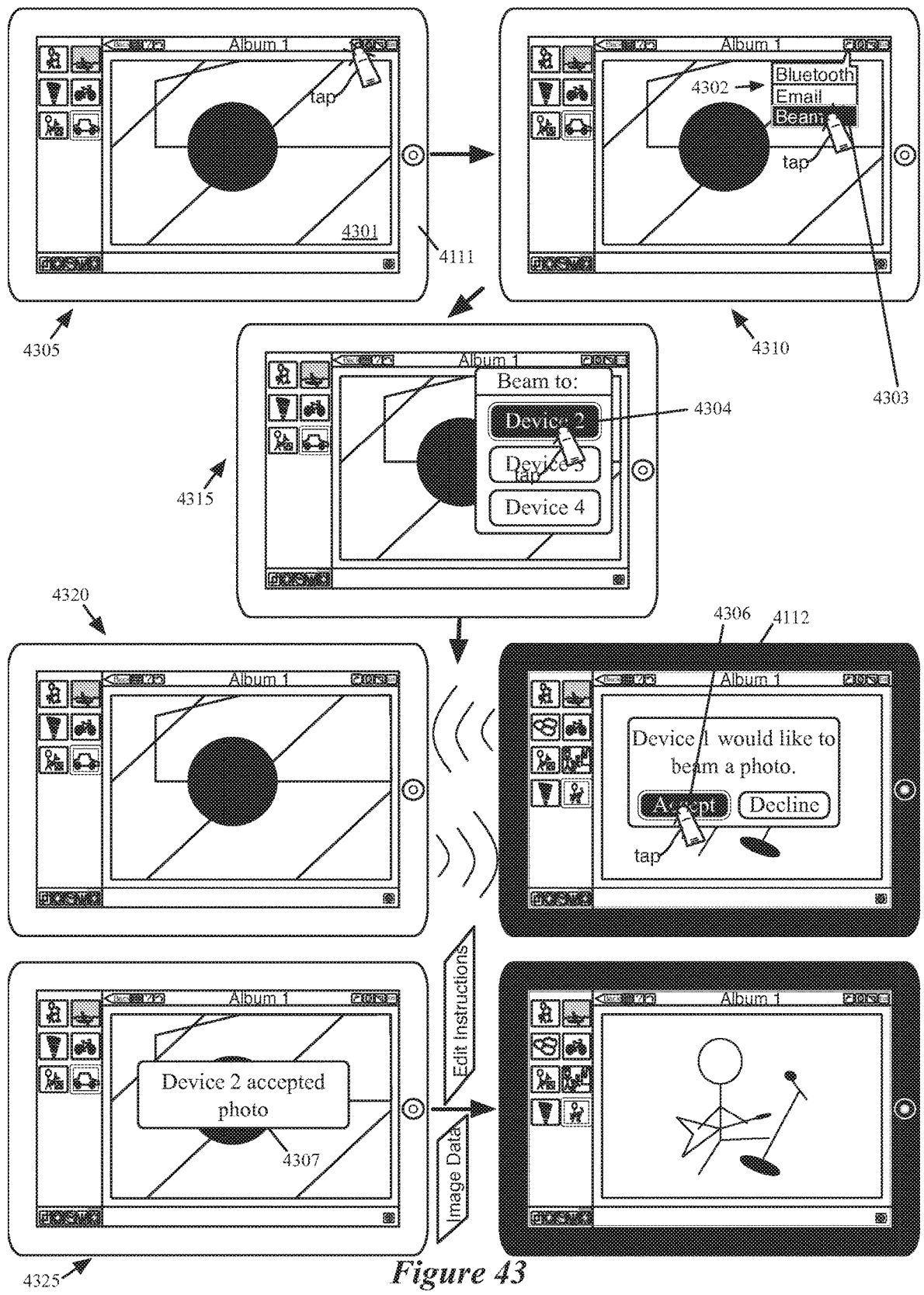
FIG. 43 conceptually illustrates an example of a first device beaming an edited image to a second device.

FIG. 43 conceptually illustrates an example of a first device 4211 beaming an edited image to a second device 4212. This example is described in terms of five stages 4305-4325. The first three stages 4305-4315 show a first user's interaction with the first device 4311 while the fourth and fifth stages 4320-4325 illustrate the GUI 100 display and interaction on both the first device 4211 and the second device 4212.

The first stage shows an edited image 4301. It also shows the first user's selection of the share button 155 through the touching of the location of display of this icon on the display. The share button 155 enables a user to share an image in a variety of ways. In some embodiments, the user can send a selected image to another compatible device on the same network (e.g., Wi-Fi or Bluetooth). The second stage 4310 shows that in response to this selection, a window 4302 has opened that provides the user with multiple choices for transmitting the edited image 4301. This stage 4310 also shows that the user has selected Beam 4303 as a transmission option for transmitting the image 4301.

The third stage 4315 shows that another window has opened in response to the selection of the beam option 4303 in the window 4302 in the second stage 4310. This third stage 4315 also shows the user's selection of Device 2 4304.

The fourth stage 4320 illustrates that after the selection of Device 2 4304 on the first device 4211, the image editing application on the second device 4212 informs the second user that device one would like to beam a photo to the user. The fourth stage 4320 also shows that the second user of the second device 4212 has accepted by touching the accept option 4306 and that this acceptance has been relayed back to the first device 4211 through another message transmission.

Finally the fifth stage 4325 shows that the first device 4211 provides a display prompt 4307 that notifies the first user that the user of the second device 4212 has accepted the image. It also shows that in response to this acceptance, the first device 4211 has transmitted the image data along with the instructions for editing this image to the second device 4212.

Figure 44:
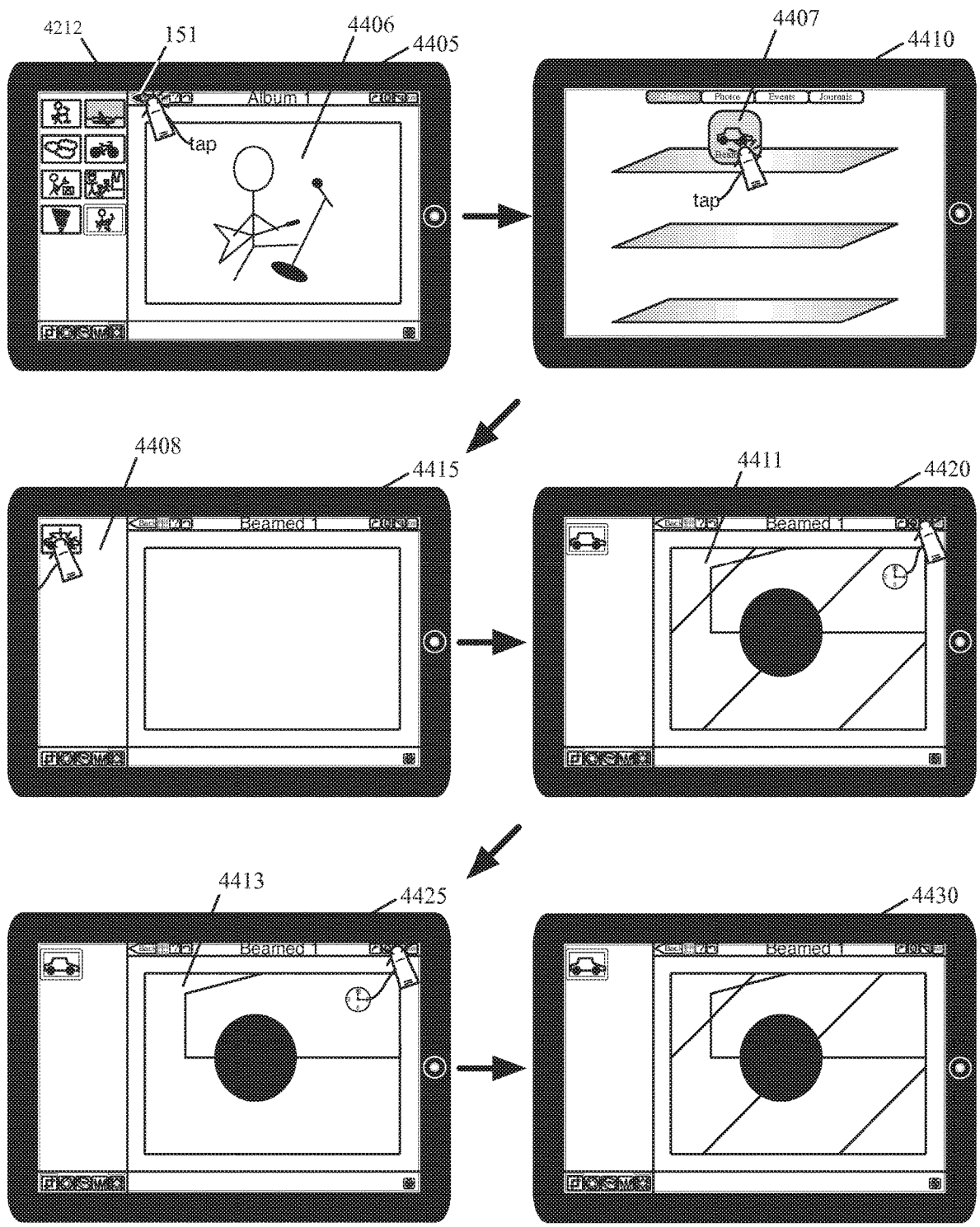
FIG. 44 conceptually illustrates an example of a user browsing through a library of beamed images on a device.

FIG. 44 conceptually illustrates an example of a user browsing through a library of beamed images on a device 4212. The figure also illustrates the user toggling through an edited version of a beamed image and the original image. This example is described in terms of six stages 4405-4430.

The first stage 4405 of the GUI 100 illustrates an image 4406 displayed on the device 4212 that is stored in a library of images that have not been beamed to the device 4212. The first stage 4405 also illustrates that the user has selected the back icon 151, which enables the user to navigate back to a collection organization GUI. In order to access other image libraries stored on the device, which is illustrated in the second stage 4410. In some embodiments, when the device receives a beamed image, the device stores the image in a particular library consisting only of other images that have been beamed to a device.

The second stage 4410 illustrates the GUI 100, which displays the image albums currently stored on the device. In this example, the user has selected the albums icon 4407 to view the image albums currently stored on the device 4112. The device only has a single image album labeled Beamed 4407. In some embodiments, this beamed image album 4407 stores only the images that have been beamed to the device. The second stage also illustrates the user has selected the beamed image album 4407.

The third stage 4415 illustrates the GUI 100 and the thumbnail images 4408 of the photos stored in the beamed image library 4407. The library currently contains only one image 4409, which the user has selected for display.

The fourth stage 4420 of the GUI 100 shows the display of the beamed image 4411 after the user has selected the thumbnail 4409 of the image. As shown, the image 4411 has had certain edits made to the image. The edits are represented in this image through the diagonal lines displayed on the image 4411. The fourth stage 4420 also illustrates that the user has selected and continues to select the toggle button 157 (e.g. by touching the toggle button without releasing their finger from the screen) the effect of which is illustrated in the fifth stage 4425.

The fifth stage 4425 illustrates the GUI 100 and the original image 4413 that appears within a certain threshold time period after the user selects and holds down the toggle button 157. The edited beamed image 4411 in the image display area 145 has been replaced by the original beamed image 4413. As described above, the application can easily perform this toggle operation because the application maintains the original image 4413 in a non-destructive way. The original image 4413 is differentiated from the edited image 4411 by the absence of the diagonal lines that were displayed on the edited beamed image 4411 in the first stage 4405.

The sixth stage 4430 then illustrates the GUI 100 after the user has released the toggle button 157, which again reverts the image being displayed from the original beamed image 4413 back to the edited image 4411.

Figure 45:
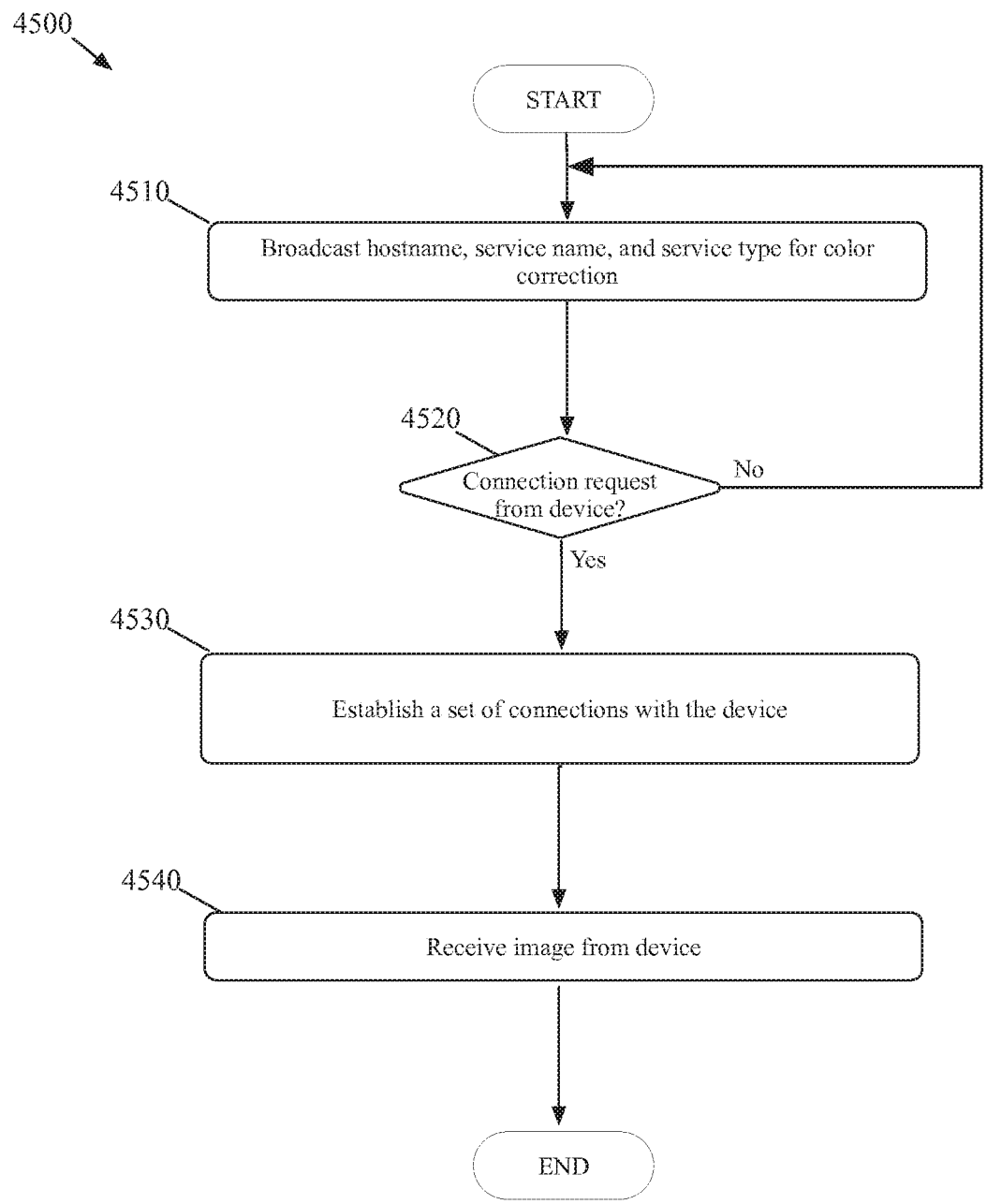
FIG. 45 conceptually illustrates a process of some embodiments for broadcasting a beaming service for receiving beamed images.

FIG. 45 conceptually illustrates a process 4500 of some embodiments for broadcasting a beaming service for receiving beamed images. In some embodiments, the process 4500 is performed by an image editing application (e.g., the image editing applications described above by reference to FIGS. 1-44) while the image editing application is running. The image editing application in some such embodiments performs the process 4500 when the image editing application is started. In some embodiments, the process 4500 is performed by an operating system (e.g., as a service) when the image editing application is not running. This way, the process 4500 may detect when another device sends a request to transmit an image to the device on which the process 4500 is running while the image editing application is not running.

The following description will be described in terms of a first device and a second device for purpose for explanation. The process 4500 is being performed on the first device and the second device is different device that, in some embodiments, is running the image editing application. One of ordinary skill in the art will realize that the service may be broadcasted to any number of different devices and, thus, receive image data from any device that detects the service and request to send image data to the first device.

The process 4500 starts by broadcasting (at 4510) a service that specifies a hostname parameter, a service name parameter, and a service type parameter. The hostname parameter is the hostname of the device from which the process 4500 is broadcasting (e.g., the device on which the image editing application is running). The service name parameter is a name used to identify the service being broadcasted. In some embodiments, the service name parameter is the name of the image editing application. The service type parameter specifies the type of service that is broadcasted. In some instances, an application on a device may provide several different services for the application. Thus, using the hostname and service name is not sufficient to differentiate among the several services broadcasted for the application. As such, the service type parameter is used to differentiate among different services that may be provided by a single application running on a device.

Next, the process 4500 determines (at 4520) whether a connection request from the second is received. In some embodiments, the process 4500 receives a request to establish a set of connections with second device through which the first and second devices use to communicate. When the process 4500 determines that a connection request from the second device is received, the process 4500 proceeds to 4530. Otherwise, the process 4500 returns to 4510 to continue broadcasting the service.

At 4530, the process 4500 establishes a set of connections (e.g., by establishing a set of network sockets) with the second device through which the first and second devices use to communicate. After establishing the set of connections, the process 4500 receives (at 4540) an image from the second device. In some embodiments, the process 4500 receives the image in the form of a data structure of the image that is similar to the data structure described above by reference to FIG. 37.

Figure 46:
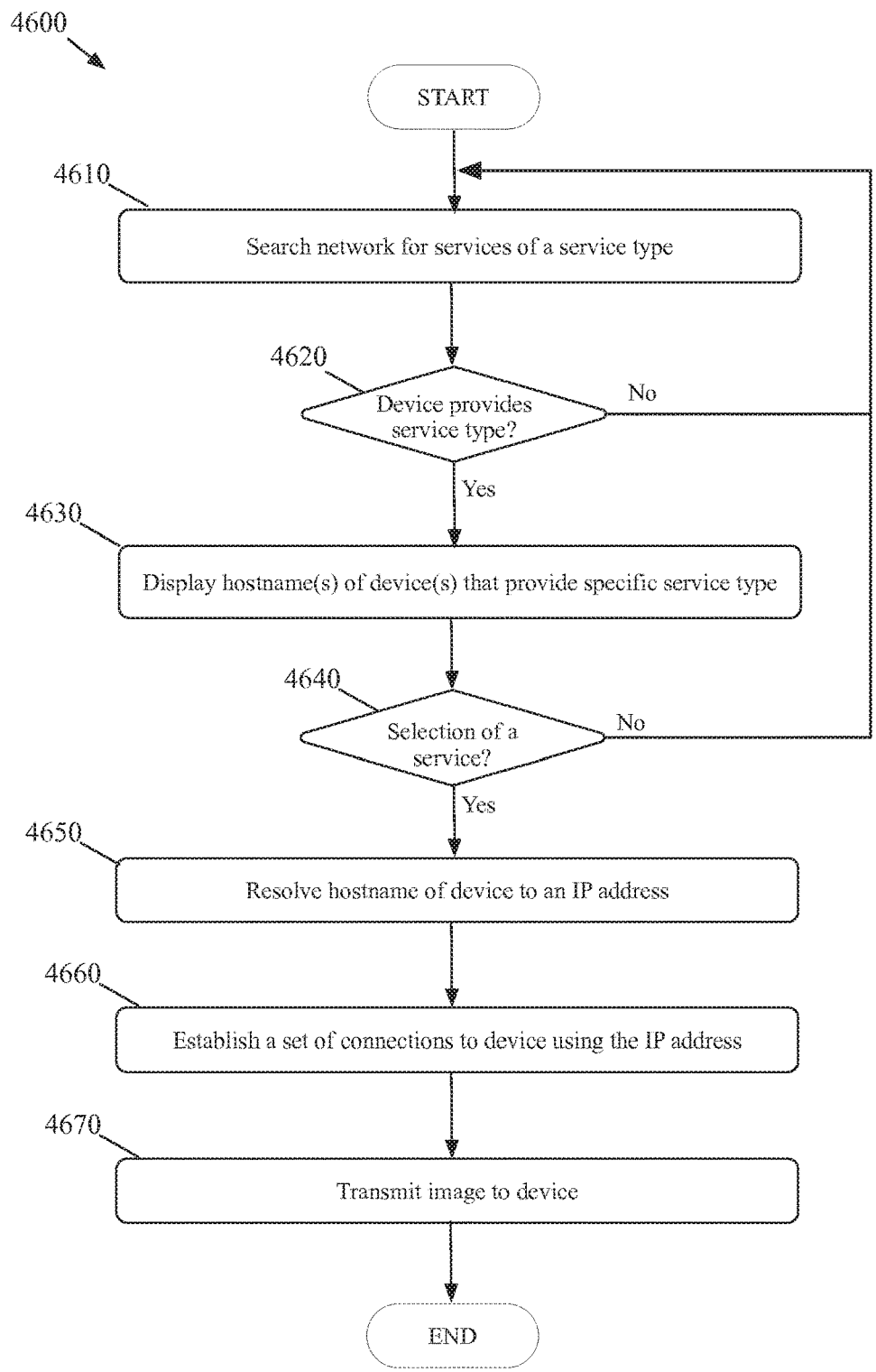
FIG. 46 conceptually illustrates a process of some embodiments for detecting a beaming service to identify candidate devices for receiving beamed images.

FIG. 46 conceptually illustrates a process 4600 of some embodiments for detecting a beaming service to identify candidate devices for receiving beamed images. The process 4600 of some embodiments is performed by an image editing application (e.g., the image editing applications described above by reference to FIGS. 1-44) while the application is running. In some embodiments, the image editing application in some such embodiments performs the process 4500 when the image editing application is started.

The process 4600 begins by searching (at 4610) a network for services of a service type. As noted above, the image editing application of some embodiments broadcasts a service that specifies a service type along with a service name and the hostname of the device on which the application is running. In some embodiments, the process 4600 searches for services broadcasted by the image editing application of such embodiments. The process 4600 in some embodiments uses a service discovery protocol to search the network for services of a service type. Examples of service discovery protocols include Apple Bonjour®, zero configuration networking (zeroconf), a service location protocol (SLP), simple service discovery protocol (SSDP), Bluetooth® service discovery protocol (SDP), etc. In some embodiments, the network that the process 4600 is searching is a single broadcast domain network.

Next, the process 4600 determines (at 4620) whether a device that provides the service type is identified. In some embodiments, the process 4600 uses a service discovery protocol mentioned above to make the determination. When the process 4600 determines that a device that provides the service type is not identified, the process 4600 returns to 4610 to continue searching the network.

When the process 4600 determines that a device that provides the service type is identified, the process 4600 displays (at 4630) the hostname of the host. As mentioned above, some embodiments broadcast a service that specifies the hostname of the host. In some embodiments, the process 4600 displays the hostname and/or the service name specified by the service in a GUI (e.g., the GUI 100 described above by reference to FIG. 43).

The process 4600 then determines (at 4640) whether a selection of a service is received. When the process 4600 determines that a selection of a service is received, the process 4600 proceeds to 4650. Otherwise, the process 4600 returns to 4610 to continue searching for services of a service type and displaying the hostnames of devices that provide the services of the service type.

At 4650, the process 4600 resolves the hostname of the device that is providing the selected service to an Internet Protocol (IP) address. In some embodiments, the process 4600 uses a service discovery protocol explained above to resolve the hostname of the device.

Next, the process 4600 establishes (at 4660) a set of connections to the device using the IP address. The process 4600 of some embodiments uses the IP address to establish a set of network sockets with the device.

Finally, the process 4600 transmits (at 4670) an image to the device. In some embodiments, the process 4500 transmits the image in the form of a data structure of the image that is similar to the data structure described above by reference to FIG. 37.

To transmit the image (or image data structure), the process 4600 divides the image data into defined-size portions (e.g., 65536 byes) and transmits the image data in packets. In some embodiments, each packet includes a header and a portion of the image data (e.g., the payload). The packet header of some embodiments includes various fields that include a signature field for versioning purposes, a type field for specifying the type of packet (e.g., payload packet, cancel packet, acknowledgement packet, etc.), a UUID for uniquely identifying the packet against other packets, a packet index field, a packet count field, an item index field, an item count field, a filename length field, etc.

The above-described FIGS. 45 and 46 illustrate example techniques for receiving an image from a single device and transmitting an image to a single device. One of ordinary skill in the art will recognize that the similar techniques may be used to receive multiple images from multiple different devices. Similarly, similar techniques may be used to transmit multiple images to multiple different devices.

V. Image Viewing, Editing, and Organization Application

Figure 47:
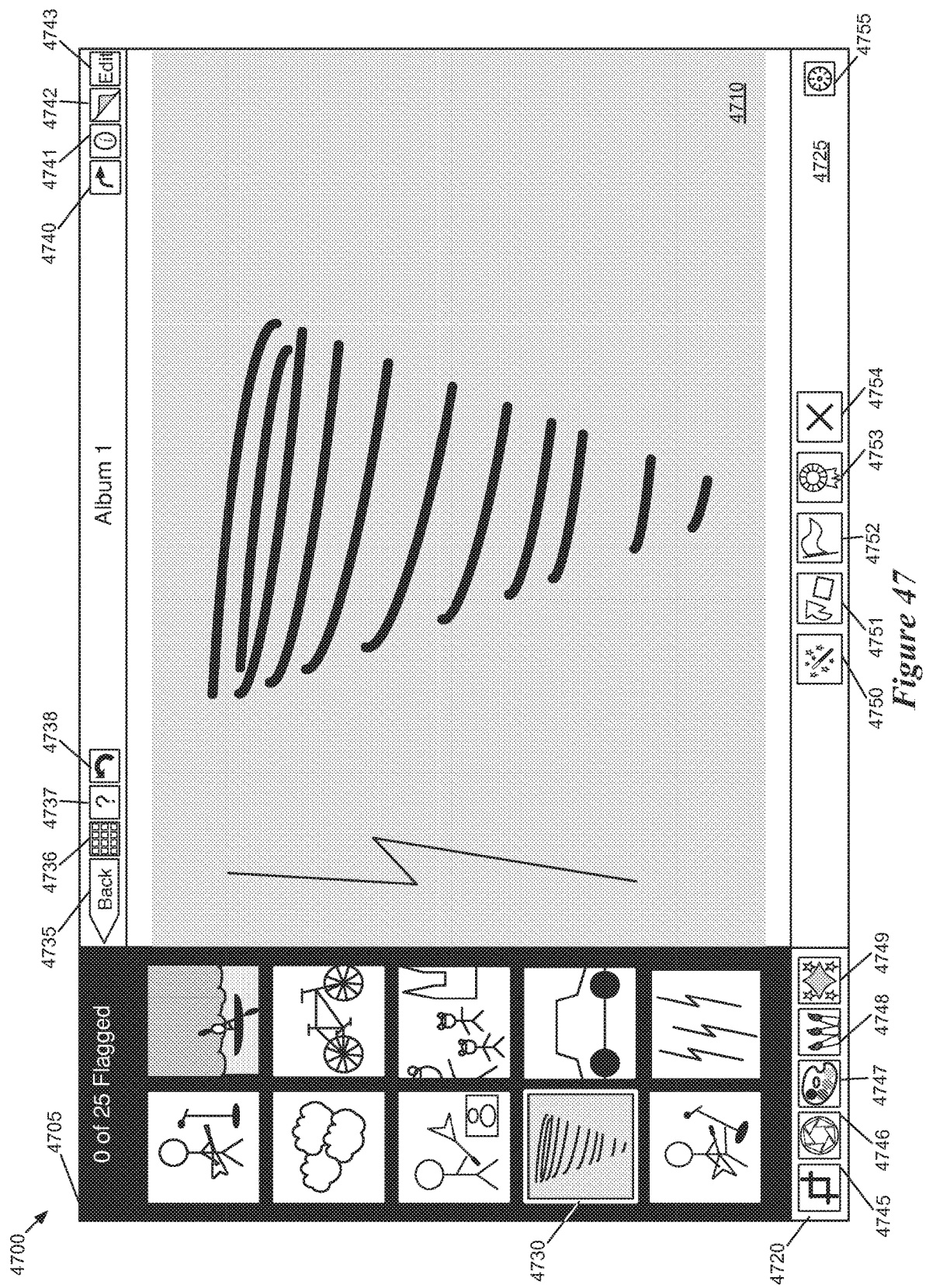
FIG. 47 illustrates a detailed view of a GUI of some embodiments for viewing, editing, and organizing images.

The above-described figures illustrated various examples of the GUI of an image viewing, editing, and organization application of some embodiments. FIG. 47 illustrates a detailed view of a GUI 4700 of some embodiments for viewing, editing, and organizing images. The GUI 4700 will be described in part by reference to FIG. 48, which conceptually illustrates a data structure 4800 for an image as stored by the application of some embodiments.

The data structure 4800 includes an image ID 4805, image data 4810, edit instructions 4815, Exchangeable image file format (Exif) data 4825, a caption 4830, shared image data 4835, cached versions 4840 of the image, any tags 4845 on the image, and any additional data 4850 for the image. The image ID 4805 is a unique identifier for the image, which in some embodiments is used by the collection data structures to refer to the images stored in the collection.

The image data 4810 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 4815 include information regarding any edits the user has applied to the image. In this manner, the application stores the image in a non-destructive format, such that the application can easily revert from an edited version of the image to the original at any time. For instance, the user can apply a saturation effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

The Exif data 4825 includes various information stored by the camera that captured the image, when that information is available. While Exif is one particular file format that is commonly used by digital cameras, one of ordinary skill in the art will recognize that comparable information may be available in other formats as well, or may even be directly input by a user. The Exif data 4825 includes camera settings data, GPS data, and a timestamp. The camera settings data includes information about the camera settings for a image, if that information is available from the camera that captured the image. This information, for example, might include the aperture, focal length, shutter speed, exposure compensation, and ISO. The GPS data 4825 indicates the location at which a image was captured, while the timestamp indicates the time (according to the camera's clock) at which the image was captured.

The caption 4830 is a user-entered description of the image. In some embodiments, this information is displayed with the photo in the image viewing area, but may also be used to display over the photo in a created journal, and may be used if the image is posted to a social media or photo-sharing website. When the user posts the image to such a website, the application generates shared image data 4835 for the image. This information stores the location (e.g., Facebook®, Flickr®, etc.), as well as an object ID for accessing the image in the website's database. The last access date is a date and time at which the application last used the object ID to access any user comments on the photo from the social media or photo sharing website.

The cached image versions 4840 store versions of the image that are commonly accessed and displayed, so that the application does not need to repeatedly generate these images from the full-size image data 4810. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

The tags 4845 are information that the application enables the user to associate with an image. For instance, in some embodiments, users can mark the image as a favorite, flag the image (e.g., for further review), and hide the image so that the image will not be displayed within the standard thumbnail grid for a collection and will not be displayed in the image display area when the user cycles through a collection that includes the image. Other embodiments may include additional tags. Finally, the image data structure 4800 includes additional data 4850 that the application might store with an image (e.g., locations and sizes of faces, etc.).

One of ordinary skill in the art will recognize that the image data structure 4800 is only one possible data structure that the application might use to store the required information for an image. For example, different embodiments might store additional or less information, store the information in a different order, etc.

Returning to FIG. 47, the GUI 4700 includes a thumbnail display area 4705, an image display area 4710, a first toolbar 4715, a second toolbar 4720, and a third toolbar 4725. The thumbnail display area 4705 displays thumbnails of the images in a selected collection. Thumbnails are small representations of a full-size image, and represent only a portion of an image in some embodiments. For example, the thumbnails in thumbnail display area 4705 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), and then use this location to center the thumbnail portion in the clipped direction. Thus, if the faces in the theoretical 1600×1200 image were all located on the left side of the image, the application would use the leftmost 1200 columns of pixels rather than cut off 200 columns on either side.

After determining the portion of the image to use for the thumbnail, the image-viewing application generates a low-resolution version (e.g., using pixel blending and other techniques) of the image. The application of some embodiments stores the thumbnail for an image as a cached version 4840 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input). The selected thumbnails are displayed with a highlight or other indicator of selection. In thumbnail display area 4705, the thumbnail 4730 is selected. In addition, as shown, the thumbnail display area 4705 of some embodiments indicates a number of images in the collection that have been flagged (i.e., that have a tag 4845 for the flag set to yes). In some embodiments, this text is selectable in order to display only the thumbnails of the flagged images.

The application displays selected images in the image display area 4710 at a larger resolution than the corresponding thumbnails. The images are not typically displayed at the full size of the image, as images often have a higher resolution than the display device. As such, the application of some embodiments stores a cached version 4840 of the image designed to fit into the image display area. Images in the image display area 4710 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 4715 displays title information (e.g., the name of the collection shown in the GUI, a caption that a user has added to the currently selected image, etc.). In addition, the toolbar 4715 includes a first set of GUI items 4735-4738 and a second set of GUI items 4740-4743.

The first set of GUI items includes a back button 4735, a grid button 4736, a help button 4737, and an undo button 4738. The back button 4735 enables the user to navigate back to a collection organization GUI, from which users can select between different collections of images (e.g., albums, events, journals, etc.). Selection of the grid button 4736 causes the application to move the thumbnail display area on or off of the GUI (e.g., via a slide animation). In some embodiments, users can also slide the thumbnail display area on or off of the GUI via a swipe gesture. The help button 4737 activates a context-sensitive help feature that identifies a current set of tools active for the user and provides help indicators for those tools that succinctly describe the tools to the user. In some embodiments, the help indicators are selectable to access additional information about the tools. Selection of the undo button 4738 causes the application to remove the most recent edit to the image, whether this edit is a crop, color adjustment, etc. In order to perform this undo, some embodiments remove the most recent instruction from the set of edit instructions 4815 stored with the image.

The second set of GUI items includes a sharing button 4740, an information button 4741, a show original button 4742, and an edit button 4743. The sharing button 4740 enables a user to share an image in a variety of different ways. In some embodiments, the user can send a selected image to another compatible device on the same network (e.g., Wi-Fi or Bluetooth network), upload an image to an image hosting or social media website, and create a journal (i.e., a presentation of arranged images to which additional content can be added) from a set of selected images, among others.

The information button 4741 activates a display area that displays additional information about one or more selected images. The information displayed in the activated display area may include some or all of the Exif data 4825 stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data 4835 and sends this information to the website. The comment stream and, in some cases, additional information, are received from the website and displayed to the user.

The show original button 4742 enables the user to toggle between the original version of an image and the current edited version of the image. When a user selects the button, the application displays the original version of the image without any of the editing instructions 4815 applied. In some embodiments, the appropriate size image is stored as one of the cached versions 4840 of the image, making it quickly accessible. When the user selects the button again 4742 again, the application displays the edited version of the image, with the editing instructions 4815 applied.

The edit button 4743 allows the user to enter or exit edit mode. When a user has selected one of the sets of editing tools in the toolbar 4720, the edit button 4743 returns the user to the viewing and organization mode, as shown in FIG. 47. When the user selects the edit button 4743 while in the viewing mode, the application returns to the last used set of editing tools in the order shown in toolbar 4720. That is, the items in the toolbar 4720 are arranged in a particular order, and the edit button 4743 activates the rightmost of those items for which edits have been made to the selected image.

The toolbar 4720, as mentioned, includes five items 4745-4749, arranged in a particular order from left to right. The crop item 4745 activates a cropping and rotation tool that allows the user to align crooked images and remove unwanted portions of an image. The exposure item 4746 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 4747 activates a set of color tools that enable the user to modify the saturation and vibrancy, as well as color-specific saturations (e.g., blue pixels or green pixels) and white balance. In some embodiments, some of these tools are presented as a set of sliders. The brushes item 4748 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 4749 activates a set of special effects that the user can apply to the image. These effects include gradients, tilt shifts, non-photorealistic desaturation effects, grayscale effects, various filters, etc. In some embodiments, the application presents these effects as a set of items that fan out from the toolbar 4725.

As stated, the UI items 4745-4749 are arranged in a particular order. This order follows the order in which users most commonly apply the five different types of edits. Accordingly, the editing instructions 4815 are stored in this same order, in some embodiments. When a user selects one of the items 4745-4749, some embodiments apply only the edits from the tools to the left of the selected tool to the displayed image (though other edits remain stored within the instruction set 4815).

The toolbar 4725 includes a set of GUI items 4750-4754 as well as a settings item 4755. The auto-enhance item 4750 automatically performs enhancement edits to an image (e.g., removing apparent red-eye, balancing color, etc.). The rotation button 4751 rotates any selected images. In some embodiments, each time the rotation button is pressed, the image rotates 90 degrees in a particular direction. The auto-enhancement, in some embodiments, comprises a predetermined set of edit instructions that are placed in the instruction set 4815. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

Figure 48:
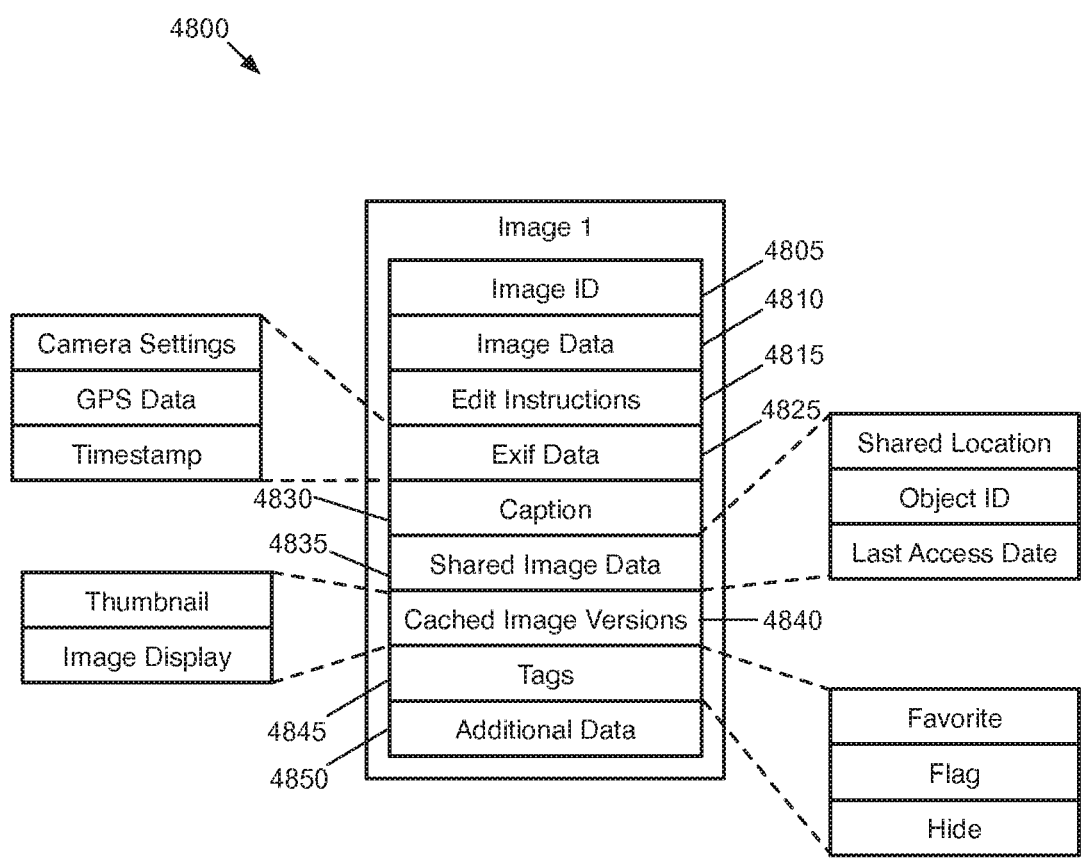
FIG. 48 conceptually illustrates a data structure for an image as stored by the application of some embodiments.

The flag button 4752 tags any selected image as flagged. In some embodiments, the flagged images of a collection can be displayed without any of the unflagged images. The favorites button 4753 allows a user to mark any selected images as favorites. In some embodiments, this tags the image as a favorite and also adds the image to a collection of favorite images. The hide button 4754 enables a user to tag an image as hidden. In some embodiments, a hidden image will not be displayed in the thumbnail display area and/or will not be displayed when a user cycles through the images of a collection in the image display area. As shown in FIG. 48, many of these features are stored as tags in the image data structure.

Finally, the settings button 4755 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 4700 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

VI. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 49:
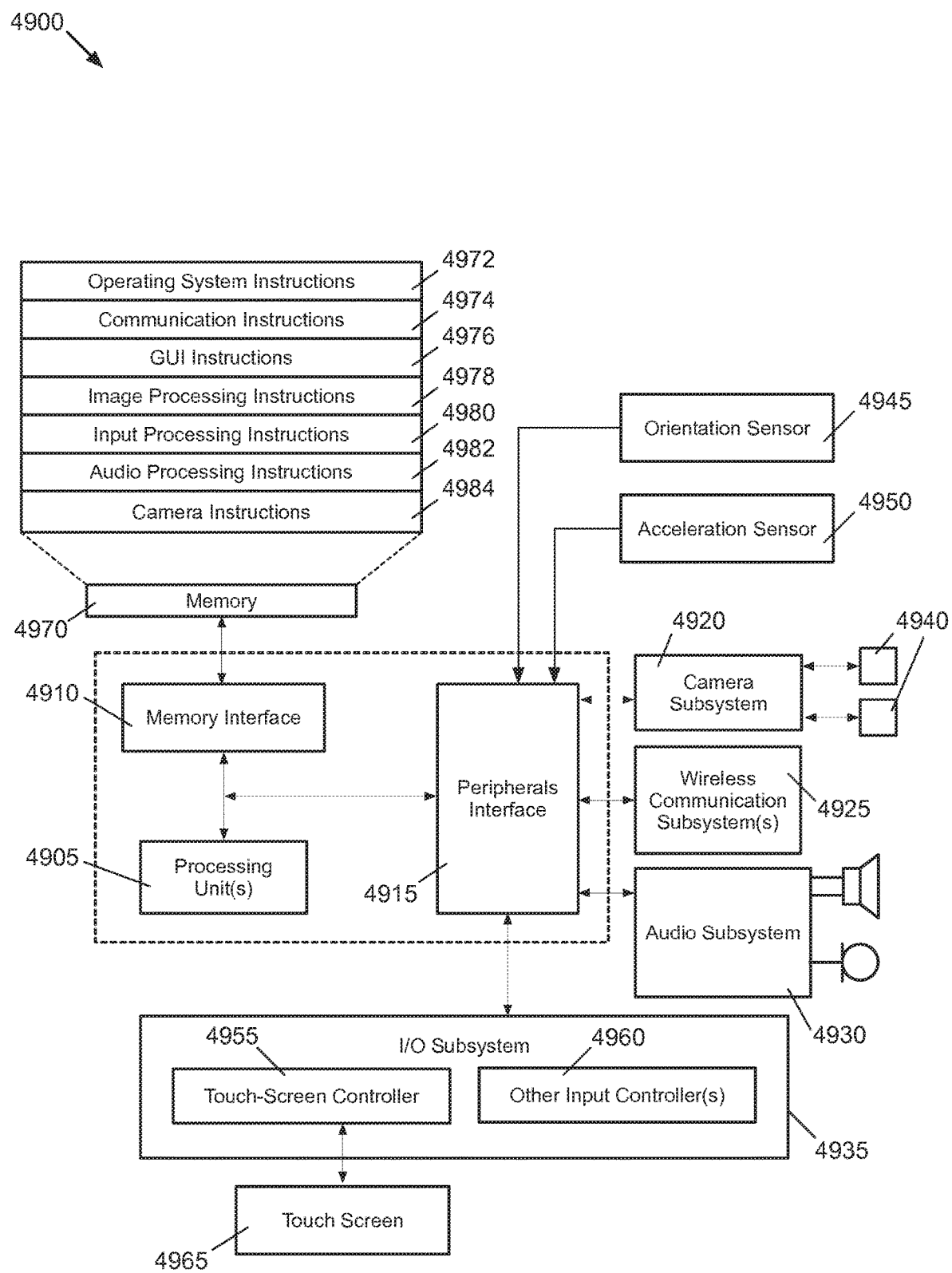
FIG. 49 is an example of an architecture of a mobile computing device.

The image editing and viewing applications of some embodiments operate on mobile devices. FIG. 49 is an example of an architecture 4900 of such a mobile computing device. Examples of mobile computing devices include smartphones, tablets, laptops, etc. As shown, the mobile computing device 4900 includes one or more processing units 4905, a memory interface 4910 and a peripherals interface 4915.

The peripherals interface 4915 is coupled to various sensors and subsystems, including a camera subsystem 4920, a wireless communication subsystem(s) 4925, an audio subsystem 4930, an I/O subsystem 4935, etc. The peripherals interface 4915 enables communication between the processing units 4905 and various peripherals. For example, an orientation sensor 4945 (e.g., a gyroscope) and an acceleration sensor 4950 (e.g., an accelerometer) is coupled to the peripherals interface 4915 to facilitate orientation and acceleration functions.

The camera subsystem 4920 is coupled to one or more optical sensors 4940 (e.g., a charged coupled device (CCD) optical sensor, a complementary metal-oxide-semiconductor (CMOS) optical sensor, etc.). The camera subsystem 4920 coupled with the optical sensors 4940 facilitates camera functions, such as image and/or video data capturing. The wireless communication subsystem 4925 serves to facilitate communication functions. In some embodiments, the wireless communication subsystem 4925 includes radio frequency receivers and transmitters, and optical receivers and transmitters (not shown in FIG. 49) These receivers and transmitters of some embodiments are implemented to operate over one or more communication networks such as a GSM network, a Wi-Fi network, a Bluetooth network, etc. The audio subsystem 4930 is coupled to a speaker to output audio (e.g., to output different sound effects associated with different image operations). Additionally, the audio subsystem 4930 is coupled to a microphone to facilitate voice-enabled functions, such as voice recognition, digital recording, etc.

The I/O subsystem 4935 involves the transfer between input/output peripheral devices, such as a display, a touch screen, etc., and the data bus of the processing units 4905 through the peripherals interface 4915. The I/O subsystem 4935 includes a touch-screen controller 4955 and other input controllers 4960 to facilitate the transfer between input/output peripheral devices and the data bus of the processing units 4905. As shown, the touch-screen controller 4955 is coupled to a touch screen 4965. The touch-screen controller 4955 detects contact and movement on the touch screen 4965 using any of multiple touch sensitivity technologies. The other input controllers 4960 are coupled to other input/control devices, such as one or more buttons. Some embodiments include a near-touch sensitive screen and a corresponding controller that can detect near-touch interactions instead of or in addition to touch interactions.

The memory interface 4910 is coupled to memory 4970. In some embodiments, the memory 4970 includes volatile memory (e.g., high-speed random access memory), non-volatile memory (e.g., flash memory), a combination of volatile and non-volatile memory, and/or any other type of memory. As illustrated in FIG. 49, the memory 4970 stores an operating system (OS) 4972. The OS 4972 includes instructions for handling basic system services and for performing hardware dependent tasks.

The memory 4970 also includes communication instructions 4974 to facilitate communicating with one or more additional devices; graphical user interface instructions 4976 to facilitate graphic user interface processing; image processing instructions 4978 to facilitate image-related processing and functions; input processing instructions 4980 to facilitate input-related (e.g., touch input) processes and functions; audio processing instructions 4982 to facilitate audio-related processes and functions; and camera instructions 4984 to facilitate camera-related processes and functions. The instructions described above are merely exemplary and the memory 4970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 49 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 49 may be split into two or more integrated circuits.

B. Computer System

Figure 50:
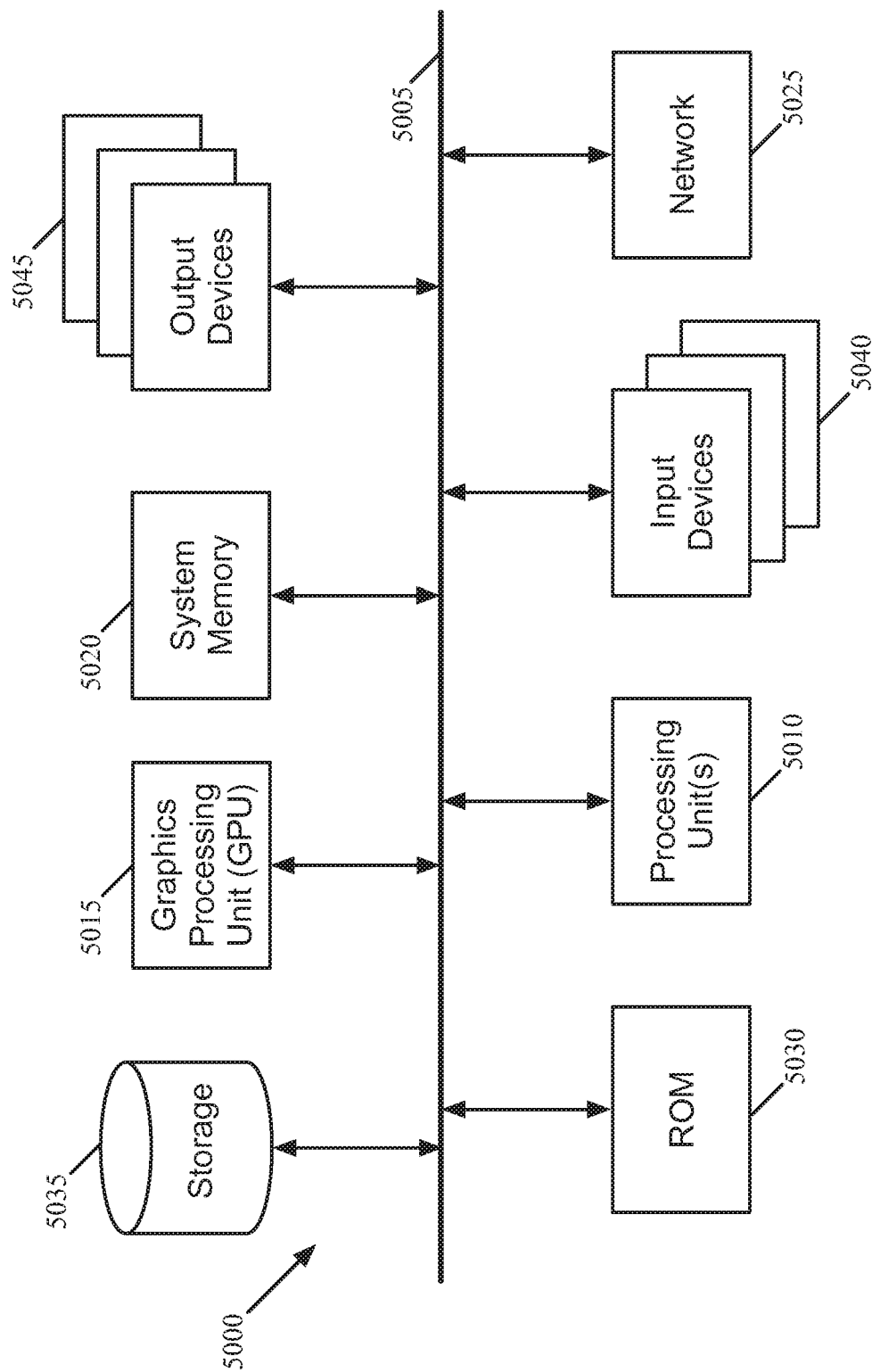
FIG. 50 conceptually illustrates an electronic device with which some embodiments of the invention are implemented.

FIG. 50 conceptually illustrates another example of an electronic system 5000 with which some embodiments of the invention are implemented. The electronic system 5000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 5000 includes a bus 5005, processing unit(s) 5010, a graphics processing unit (GPU) 5015, a system memory 5020, a network 5025, a read-only memory 5030, a permanent storage device 5035, input devices 5040, and output devices 5045.

The bus 5005 collectively represents all system, peripheral, and chipset buses that communicatively connect the numerous internal devices of the electronic system 5000. For instance, the bus 5005 communicatively connects the processing unit(s) 5010 with the read-only memory 5030, the GPU 5015, the system memory 5020, and the permanent storage device 5035.

From these various memory units, the processing unit(s) 5010 retrieves instructions to execute and data to process in order to execute the processes of the invention. The processing unit(s) may be a single processor or a multi-core processor in different embodiments. Some instructions are passed to and executed by the GPU 5015. The GPU 5015 can offload various computations or complement the image processing provided by the processing unit(s) 5010. In some embodiments, such functionality can be provided using CoreImage's kernel shading language.

The read-only-memory (ROM) 5030 stores static data and instructions that are needed by the processing unit(s) 5010 and other modules of the electronic system. The permanent storage device 5035, on the other hand, is a read-and-write memory device. This device is a non-volatile memory unit that stores instructions and data even when the electronic system 5000 is off. Some embodiments of the invention use a mass-storage device (such as a magnetic or optical disk and its corresponding disk drive) as the permanent storage device 5035.

Other embodiments use a removable storage device (such as a floppy disk, flash memory device, etc., and its corresponding drive) as the permanent storage device. Like the permanent storage device 5035, the system memory 5020 is a read-and-write memory device. However, unlike storage device 5035, the system memory 5020 is a volatile read-and-write memory, such a random access memory. The system memory 5020 stores some of the instructions and data that the processor needs at runtime. In some embodiments, the invention's processes are stored in the system memory 5020, the permanent storage device 5035, and/or the read-only memory 5030. For example, the various memory units include instructions for processing multimedia clips in accordance with some embodiments. From these various memory units, the processing unit(s) 5010 retrieves instructions to execute and data to process in order to execute the processes of some embodiments.

The bus 5005 also connects to the input and output devices 5040 and 5045. The input devices 5040 enable the user to communicate information and select commands to the electronic system. The input devices 5040 include alpha-numeric keyboards and pointing devices (also called "cursor control devices"), cameras (e.g., webcams), microphones or similar devices for receiving voice commands, etc. The output devices 5045 display images generated by the electronic system or otherwise output data. The output devices 5045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 50, bus 5005 also couples electronic system 5000 to a network 5025 through a network adapter (not shown). In this manner, the computer can be a part of a network of computers (such as a local area network ("LAN"), a wide area network ("WAN"), or an Intranet, or a network of networks, such as the Internet. Any or all components of electronic system 5000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 16, 45, and 46) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, the various UI controls illustrated in FIGS. 1-15, 18-30, 33a-33c, 34a-34c, 38-41, and 44 are either depicted as being set with a finger gesture (e.g., placing, pointing, tapping one or more fingers) on a touch sensitive screen or simply shown in a position without any indication of how they were moved into position. One of ordinary skill in the art will understand that the controls of FIGS. 1-15, 18-30, 33a-33c, 34a-34c, 38-41, and 44 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A method of receiving a slider setting selection, the method comprising:
displaying an image;
displaying a slider tool for performing an operation on the image;
displaying a plurality of thumbnail images of the image at a plurality of locations overlaid along the slider tool, each thumbnail image being overlaid at a different location of the plurality of locations that corresponds to a different particular setting within a continuous range of settings for the slider tool, wherein each thumbnail image represents a preview of the operation applied to the image based on the different particular setting of the slider tool at the location of the thumbnail image;
receiving selection of a setting from the continuous range of settings for the slider tool to obtain a selected setting; and
responsive to receiving selection of the setting for the slider tool:
determining a particular setting of the different settings that is associated with a particular thumbnail image of the plurality of thumbnail images that is closest to the selected setting;
performing the operation on the image using the selected setting, wherein displaying the slider tool comprises:
displaying an indicator overlaid on the slider tool at the selected setting from the continuous range of settings for the slider tool;
highlighting the particular thumbnail image of the plurality of thumbnail images; and
continuing to highlight the particular thumbnail image as the indicator is moved until the selected setting is closer to another setting of the different settings associated with a second thumbnail image of the plurality of thumbnail images.

2. The method as recited in claim 1, wherein displaying the indicator comprises positioning a line at the selected setting from the continuous range of settings for the slider tool, the line being perpendicular to a major dimension of the slider tool and visible above any thumbnail images on the slider tool.

3. The method as recited in claim 1, further comprising:
receiving a gestural command on the indicator; and
moving the indicator to a different location on the slider tool corresponding to a second setting in the continuous range of settings for the slider tool in response to the gestural command.

4. The method as recited in claim 3, further comprising:
upon the indicator being moved to the different location on the slider tool, highlighting a second thumbnail image of the plurality of thumbnail images corresponding to the second setting; and
performing the operation on the image using the second setting from the continuous range of settings for the slider tool.

5. The method as recited in claim 1, wherein the selected setting does not match any of the different settings associated with the plurality of thumbnail images.

6. The method as recited in claim 1, wherein the plurality of locations are positioned along a curved line.

7. The method as recited in claim 1, further comprising:
displaying an operation toolbar comprising a plurality of icons corresponding to different operations available to modify the image; and
responsive to receiving selection of the selected setting, highlighting a particular icon of the plurality of icons corresponding to the operation.

8. A non-transitory machine readable medium storing a program which when executed by at least one processing unit provides a graphical user interface (GUI) for an image editing application, the program comprising sets of instructions for:
displaying an image;
displaying a slider tool for performing an operation on the image;
displaying a plurality of thumbnail images of the image at a plurality of locations overlaid along the slider tool, each thumbnail image being overlaid at a different location of the plurality of locations that corresponds to a different setting within a continuous range of settings for the slider tool, wherein each thumbnail image represents a preview of the operation applied to the image based on the different setting of the slider tool at the location of the thumbnail image;
receiving selection of a setting from the continuous range of settings for the slider tool to obtain a selected setting; and
responsive to receiving selection of the setting for the slider tool:
determining a particular setting of the different settings that is associated with a particular thumbnail image of the plurality of thumbnail images that is closest to the selected setting;
performing the operation on the image using the selected setting, wherein displaying the slider tool comprises:
displaying an indicator overlaid on the slider tool at the selected setting from the continuous range of settings for the slider tool;
highlighting the particular thumbnail image of the plurality of thumbnail images; and
continuing to highlight the particular thumbnail image as the indicator is moved until the selected setting is closer to another setting of the different settings associated with a second thumbnail image of the plurality of thumbnail images.

9. The non-transitory machine readable medium as recited in claim 8, wherein displaying the indicator comprises positioning a line at the selected setting from the continuous range of settings for the slider tool, the line being perpendicular to a major dimension of the slider tool and visible above any thumbnail images on the slider tool.

10. The non-transitory machine readable medium as recited in claim 8, wherein the program further comprises a set of instructions for:
receiving a gestural command on the indicator; and
moving the indicator to a different location on the slider tool corresponding to a second setting in the continuous range of settings for the slider tool in response to the gestural command.

11. The non-transitory machine readable medium as recited in claim 10, wherein the program further comprises a set of instructions for:
upon the indicator being moved to the different location on the slider tool, highlighting a second thumbnail image of the plurality of thumbnail images corresponding to the second setting; and
performing the operation on the image using the second setting from the continuous range of settings for the slider tool.

12. The non-transitory machine readable medium as recited in claim 8, wherein the selected setting does not match any of the different settings associated with the plurality of thumbnail images.

13. The non-transitory machine readable medium as recited in claim 8, wherein the plurality of locations are positioned along a curved line.

14. The non-transitory machine readable medium as recited in claim 8, wherein the program further comprises a set of instructions for:
   displaying an operation toolbar comprising a plurality of icons corresponding to different operations available to modify the image; and
   responsive to receiving selection of the selected setting for the slider tool, highlighting a particular icon of the plurality of icons corresponding to the operation.

15. A system for providing a graphical user interface (GUI) for an image editing application, the system comprising:
   at least one processing unit; and
   a non-transitory machine readable medium storing a program executable by the at least one processing unit, the program comprising sets of instructions for:
   displaying an image;
   displaying a slider tool for performing an operation on the image;
   displaying a plurality of thumbnail images of the image at a plurality of locations overlaid along the slider tool, each thumbnail image being overlaid at a different location of the plurality of locations that corresponds to a different setting within a continuous range of settings for the slider tool, wherein each thumbnail image represents a preview of the operation applied to the image based on the different setting of the slider tool at the location of the thumbnail image;
   receiving selection of a setting from the continuous range of settings for the slider tool to obtain a selected setting; and
   responsive to receiving selection of the setting for the slider tool:
      determining a particular setting of the different settings that is associated with a particular thumbnail image of the plurality of thumbnail images that is closest to the selected setting;
      performing the operation on the image using the selected setting, wherein displaying the slider tool comprises:
      displaying an indicator overlaid on the slider tool at the selected setting from the continuous range of settings for the slider tool;
      highlighting the particular thumbnail image of the plurality of thumbnail images; and
      continuing to highlight the particular thumbnail image as the indicator is moved until the selected setting is closer to another setting of the different settings associated with a second thumbnail image of the plurality of thumbnail images.

16. The system as recited in claim 15, wherein displaying the indicator comprises positioning a line at the selected setting from the continuous range of settings for the slider tool, the line being perpendicular to a major dimension of the slider tool and visible above any thumbnail images on the slider tool.

17. The system as recited in claim 15, wherein the program further comprises a set of instructions for:
   receiving a gestural command on the indicator; and
   moving the indicator to a different location on the slider tool corresponding to a second setting in the continuous range of settings for the slider tool in response to the gestural command.

18. The system as recited in claim 17, wherein the program further comprises a set of instructions for:
   upon the indicator being moved to the different location on the slider tool, highlighting a second thumbnail image of the plurality of thumbnail images corresponding to the second setting; and
   performing the operation on the image using the second setting from the continuous range of settings for the slider tool.

19. The system as recited in claim 15, wherein the plurality of locations are positioned along a straight line.

20. The system as recited in claim 15, wherein the program further comprises a set of instructions for:
   displaying an operation toolbar comprising a plurality of icons corresponding to different operations available to modify the image; and
   responsive to receiving selection of the selected setting, highlighting a particular icon of the plurality of icons corresponding to the operation.

\* \* \* \* \*